(12) United States Patent
Odate et al.

(10) Patent No.: US 12,460,205 B2
(45) Date of Patent: Nov. 4, 2025

(54) COMPOSITIONS AND METHODS FOR TREATING ALPHA-1 ANTITRYPSIN DEFICIENCY

(71) Applicant: Intellia Therapeutics, Inc., Cambridge, MA (US)

(72) Inventors: Shobu Odate, Arlington, MA (US); Walter Strapps, Dedham, MA (US); Reynald Michael Lescarbeau, Medford, MA (US)

(73) Assignee: Intellia Therapeutics, Inc., Cambridge, MA (US)

( * ) Notice: Subject to any disclaimer, the term of this patent is extended or adjusted under 35 U.S.C. 154(b) by 112 days.

(21) Appl. No.: 18/063,817

(22) Filed: Dec. 9, 2022

(65) Prior Publication Data

US 2023/0212575 A1 Jul. 6, 2023

Related U.S. Application Data

(60) Division of application No. 16/446,764, filed on Jun. 20, 2019, now Pat. No. 11,549,107, which is a continuation of application No. PCT/US2017/067800, filed on Dec. 21, 2017.

(60) Provisional application No. 62/438,219, filed on Dec. 22, 2016.

(51) Int. Cl.
| | |
|---|---|
| C12N 15/113 | (2010.01) |
| A61K 9/14 | (2006.01) |
| A61K 9/51 | (2006.01) |
| A61K 47/24 | (2006.01) |
| A61K 47/28 | (2006.01) |
| C12N 15/86 | (2006.01) |

(52) U.S. Cl.
CPC .............. *C12N 15/113* (2013.01); *A61K 9/14* (2013.01); *A61K 9/5146* (2013.01); *A61K 47/24* (2013.01); *A61K 47/28* (2013.01); *C12N 15/86* (2013.01); *C12N 2310/20* (2017.05)

(58) Field of Classification Search
None
See application file for complete search history.

(56) References Cited

U.S. PATENT DOCUMENTS

| | | | |
|---|---|---|---|
| 5,378,825 A | 1/1995 | Cook et al. | |
| 5,585,481 A | 12/1996 | Arnold, Jr. et al. | |
| 7,250,496 B2 | 7/2007 | Bentwich | |
| 2015/0011607 A1* | 1/2015 | Brown | C12N 15/113 435/375 |
| 2015/0059010 A1 | 2/2015 | Cigan et al. | |
| 2015/0166984 A1 | 6/2015 | Liu et al. | |
| 2016/0024524 A1* | 1/2016 | Joung | C12N 9/96 435/258.1 |
| 2018/0273979 A1 | 9/2018 | Frisch | |
| 2020/0216843 A1* | 7/2020 | Shen | C12N 15/86 |

FOREIGN PATENT DOCUMENTS

| | | | | |
|---|---|---|---|---|
| CN | 106103706 A | 11/2016 | | |
| JP | 2016528887 A | 9/2016 | | |
| WO | 9313121 A1 | 7/1993 | | |
| WO | 9532305 A1 | 11/1995 | | |
| WO | WO-2014089290 A1 * | 6/2014 | ............. | A61K 38/00 |
| WO | WO-2014136086 A1 * | 9/2014 | ........... | A61K 31/713 |
| WO | 2015003113 A2 | 1/2015 | | |
| WO | 2015070083 A1 | 5/2015 | | |
| WO | 2015099850 A1 | 7/2015 | | |
| WO | 2016089433 A1 | 6/2016 | | |
| WO | 2014204726 A9 | 10/2016 | | |
| WO | 2016164356 A1 | 10/2016 | | |
| WO | 2017093804 A2 | 6/2017 | | |
| WO | WO-2017100343 A1 * | 6/2017 | ............. | A61K 48/00 |
| WO | 2017165862 A1 | 9/2017 | | |
| WO | 2017185054 A1 | 10/2017 | | |
| WO | WO-2017173054 A1 * | 10/2017 | ................ | A61P 1/16 |
| WO | WO-2018107028 A1 * | 6/2018 | ............. | A61P 35/00 |

OTHER PUBLICATIONS

Adams et al., "The Biochemistry of the Nucleic Acids", ed., 11th ed., 1992.
Borel et al., "Simultaneous disruption of five Serpina1 genes in mice using CRISPR/Cas9 to generate the first model of alpha-one antitrypsin deficiency, the leading cause of genetic COPD", https://www.umassmed.edu/globalassets/mueller-lab-for-gene-therapy/images/blog-posts/2015-umms-aat.pdf, XP002768895, [retrieved on May 1, 2015].
Carlson, J A et al. "Accumulation of PiZ alpha 1-antitrypsin causes liver damage in transgenic mice." The Journal of clinical investigation vol. 83,4 (1989): 1183-90.
International Search Report and Written Opinion for PCT/US2017/067800 dated Mar. 14, 2018.
Kelley Melissa L et al: "Versatility of chemically synthesized guide RNAs for CRISPR-Cas9 genome editing", Journal of Biotechnology, Elsevier, vol. 233, (2016), p. 74-83.
Makarova, Kira S, et al., "An updated evolutionary classification of CRISPR-Cas systems." Nature reviews. Microbiology vol. 13,11 (2015): 722-36.
Mefferd et al., "Expression of CRISPR/Cas single guide RNAs using small tRNA promoters", RNA, (2015), 21:1683-9.
Scherer, Lisa J et al. "Optimization and characterization of tRNA-shRNA expression constructs." Nucleic acids research vol. 35,8 (2007): 2620-8.
Shmakov, Sergey et al. "Discovery and Functional Characterization of Diverse Class 2 CRISPR-Cas Systems." Molecular cell vol. 60,3 (2015): 385-97.

(Continued)

*Primary Examiner* — Brian Whiteman
(74) *Attorney, Agent, or Firm* — McNeill PLLC

(57) ABSTRACT

Compositions and methods for introducing double-stranded breaks within the SERPINA1 gene are provided. Compositions and methods for reducing and eliminating mutant forms of α1-antitrypsin (AAT), such as seen in subjects having α1-antitrypsin deficiency (AATD), are provided.

18 Claims, 15 Drawing Sheets

Specification includes a Sequence Listing.

(56) References Cited

OTHER PUBLICATIONS

Smith, Cory et al. "Efficient and allele-specific genome editing of disease loci in human iPSCs." Molecular therapy : the journal of the American Society of Gene Therapy vol. 23,3 (2014): 570-577.
Tsai, Shengdar Q et al. "GUIDE-seq enables genome-wide profiling of off-target cleavage by CRISPR-Cas hucleases." Nature biotechnology vol. 33,2 (2015): 187-197.
Turner, A.M., "Alpha-1 Antitrypsin Deficiency: New Developments in Augmentation and Other Therapies", BioDrugs (2013) 27: 547-558.
Vester and Wengel, "LNA (locked nucleic acid): high-affinity targeting of complementary RNA and DNA", Biochemistry, (2004), 43(42):13233-41.
Yusa, Kosuke et al. "Targeted gene corrections of a1-antitryypsin deficiency in induced pluripotent stem cells" Nature 487:391-396 (2011).
Zetsche et al., "Cpf1 is a Single RNA-Guided Endonuclease of a Class 2 CRISPR-Cas System," Cell, (2015) 163, 3:759-771.

* cited by examiner

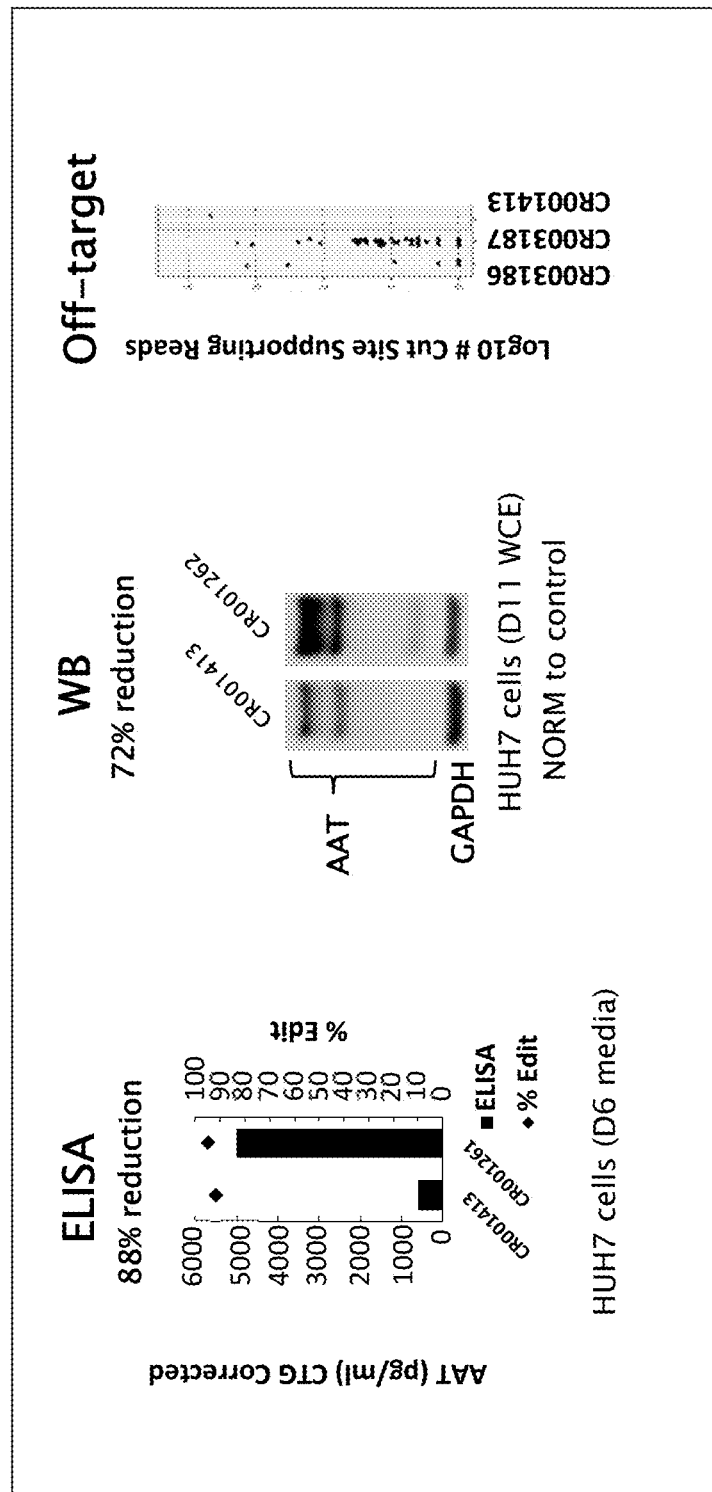

COMPOSITIONS AND METHODS FOR TREATING ALPHA-1 ANTITRYPSIN DEFICIENCY

This application is a Divisional of U.S. patent application Ser. No. 16/446,764, which was filed on Jun. 20, 2019, which is a Continuation of International Application No. PCT/US2017/067800, which was filed on Dec. 21, 2017 and claims the benefit of priority to U.S. Provisional Application No. 62/438,219, which was filed on Dec. 22, 2016, all of which are incorporated by reference in their entirety.

The patent application is filed with a sequence listing in electronic format. The Sequence Listing is provided as a file entitled "01155-0005-01US_ST26," which was created on Dec. 8, 2022, and which is 540,049 bytes in size. The information in the electronic format of the sequence listing is incorporated herein by reference in its entirety.

Alpha-1 antitrypsin (AAT or A1AT) or serum trypsin inhibitor is a type of serine protease inhibitor (also termed a serpin) encoded by the SERPINA1 gene. AAT is primarily synthesized and secreted by hepatocytes, and functions to inhibit the activity of neutrophil elastase in the lung. Without sufficient quantities of functioning AAT, neutrophil elastase is uncontrolled and damages alveoli in the lung. Thus, mutations in SERPINA1 that result in decreased levels of AAT, or decreased levels of properly functioning AAT, lead to lung pathology. Moreover, mutations in SERPINA1 that lead to production of misformed AAT that does not exit the liver leads to liver pathology due to accumulation of AAT in the hepatocytes. Thus, insufficient and improperly formed AAT caused by SERPINA1 mutation leads to both lung and liver pathology.

More than one hundred allelic variants have been described for the SERPINA1 gene. Variants are generally classified according to their effect on serum levels of AAT. For example, M alleles are normal variants associated with normal serum AAT levels, whereas Z and S alleles are mutant variants associated with decreased AAT levels. The presence of Z and S alleles is associated al-antitrypsin deficiency (AATD or A1AD), a genetic disorder characterized by mutations in the SERPINA1 gene that leads to the production of abnormal AAT.

There are many forms and degrees of AATD. The "Z-variant" is the most common, causing severe clinical disease in both liver and lung. The Z-variant is characterized by a single nucleotide change in the 5' end of the 5$^{th}$ exon that results in a missense mutation of glutamic acid to lysine at amino acid position 342 (E342K). Symptoms arise in patients that are both homozygous (ZZ) and heterozygous (MZ or SZ) at the Z allele. The presence of one or two Z alleles results in SERPINA1 mRNA instability, and AAT protein polymerization and aggregation in liver hepatocytes. Patients having at least one Z allele have an increased incidence of liver cancer due to the accumulation of aggregated AAT protein in the liver. In addition to liver pathology, AATD characterized by at least one Z allele is also characterized by lung disease due to the decrease in AAT in the alveoli and the resulting decrease in inhibition of neutrophil elastase. The prevalence of the severe ZZ-form (i.e., homozygous expression of the Z-variant) is 1:2,000 in northern European populations, and 1:4,500 in the United States.

A need exists to ameliorate the negative effects of AATD in both the liver and lung. The present invention provides compositions and methods using the CRISPR/Cas system to knock out the SERPINA1 gene thereby eliminating the production of mutant forms of AAT that are associated with liver symptoms in patients with AATD.

SUMMARY

Embodiment 01 A method of inducing a double-stranded break (DSB) within the SERPINA1 gene, comprising delivering a composition to a cell, wherein the composition comprises a guide RNA comprising a guide sequence selected from SEQ ID NOs: 5-129 or a guide sequence that is at least 99%, 98%, 97%, 96%, 95%, 94%, 93%, 92%, 91%, or 90% identical to a sequence selected from SEQ ID NOs: 5-129.

Embodiment 02 A method of modifying the SERPINA1 gene comprising delivering a composition to a cell, wherein the composition comprises (i) an RNA-guided DNA binding agent or a nucleic acid encoding an RNA-guided DNA binding agent and (ii) a guide RNA comprising a guide sequence selected from SEQ ID NOs: 5-129 or a guide sequence that is at least 99%, 98%, 97%, 96%, 95%, 94%, 93%, 92%, 91%, or 90% identical to a sequence selected from SEQ ID NOs: 5-129.

Embodiment 03 A method of treating alpha-1 antitrypsin deficiency (AATD), comprising administering a composition to a subject in need thereof, wherein the composition comprises (i) an RNA-guided DNA binding agent or a nucleic acid encoding an RNA-guided DNA binding agent and (ii) a guide RNA comprising a guide sequence selected from SEQ ID NOs: 5-129 or a guide sequence that is at least 99%, 98%, 97%, 96%, 95%, 94%, 93%, 92%, 91%, or 90% identical to a sequence selected from SEQ ID NOs: 5-129, thereby treating AATD.

Embodiment 04 A method for reducing or preventing the accumulation of alpha-1 antitrypsin (AAT) in the liver in a subject, comprising administering a composition to a subject in need thereof, wherein the composition comprises (i) an RNA-guided DNA binding agent or a nucleic acid encoding an RNA-guided DNA binding agent and (ii) a guide RNA comprising a guide sequence selected from SEQ ID NOs: 5-129 or a guide sequence that is at least 99%, 98%, 97%, 96%, 95%, 94%, 93%, 92%, 91%, or 90% identical to a sequence selected from SEQ ID NOs: 5-129, thereby reducing accumulation of AAT in the liver. Embodiment 05 A composition comprising a guide RNA comprising a guide sequence selected from SEQ ID NOs: 5-129 or a guide sequence that is at least 99%, 98%, 97%, 96%, 95%, 94%, 93%, 92%, 91%, or 90% identical to a sequence selected from SEQ ID NOs: 5-129.

Embodiment 06 A composition comprising a vector encoding a guide RNA, wherein the guide RNA comprises a guide sequence selected from SEQ ID NOs: 5-129 or a guide sequence that is at least 99%, 98%, 97%, 96%, 95%, 94%, 93%, 92%, 91%, or 90% identical to a sequence selected from SEQ ID NOs: 5-129.

Embodiment 07 The composition of embodiment 5 or 6, for use in inducing a double-stranded break (DSB) within the SERPINA1 gene in a cell or subject.

Embodiment 08 The composition of embodiment 5 or 6, for use in modifying the SERPINA1 gene in a cell or subject.

Embodiment 09 The composition of embodiment 5 or 6, for use in treating alpha-1 antitrypsin deficiency (AATD) in a subject.

Embodiment 10 The composition of embodiment 5 or 6, for use in reducing AAT serum or liver concentration in a subject.

Embodiment 11 The composition of embodiment 5 or 6, for use in reducing or preventing the accumulation of alpha-1 antitrypsin (AAT) in the liver in a subject.

Embodiment 12 The method of any one of embodiments 1-4 or the composition for use of any one of embodiments 5-11, wherein the composition reduces serum and/or liver AAT levels.

Embodiment 13 The method or composition for use of embodiment 12, wherein the serum and/or liver AAT levels are reduced by at least 50% as compared to serum and/or AAT levels before administration of the composition.

Embodiment 14 The method or composition for use of embodiment 12, wherein the serum and/or AAT levels are reduced by 50-60%, 60-70%, 70-80%, 80-90%, 90-95%, 95-98%, 98-99%, or 99-100% as compared to serum and/or AAT levels before administration of the composition.

Embodiment 15 The method or composition for use of any one of embodiments 1-4 or 7-14, wherein the composition results in editing of the SERPINA1 gene.

Embodiment 16 The method or composition for use of embodiment 15, wherein the editing is calculated as a percentage of the population that is edited (percent editing).

Embodiment 17 The method or composition for use of embodiment 16, wherein the percent editing is between 30 and 99%.

Embodiment 18 The method or composition for use of embodiment 17, wherein the percent editing is between 30 and 35%, 35 and 40%, 40 and 45%, 45 and 50%, 50 and 55%, 55 and 60%, 60 and 65%, 65 and 70%, 70 and 75%, 75 and 80%, 80 and 85%, 85 and 90%, 90 and 95%, or 95 and 99%.

Embodiment 19 The method or composition for use of any one of embodiments 1-4 or 7-18, wherein the composition is administered or delivered at least two times.

Embodiment 20 The method or composition for use of embodiment 19, wherein the composition is administered or delivered at least three times.

Embodiment 21 The method or composition for use of embodiment 19, wherein the composition is administered or delivered at least four times.

Embodiment 22 The method or composition for use of embodiment 19, wherein the composition is administered or delivered up to five, six, seven, eight, nine, or ten times.

Embodiment 23 The method or composition for use of any one of embodiments 19-22, wherein the administration or delivery occurs at an interval of 1, 2, 3, 4, 5, 6, 7, 8, 9, 10, 11, 12, 13, 14, or 15 days.

Embodiment 24 The method or composition for use of any one of embodiments 19-22, wherein the administration or delivery occurs at an interval of 1, 2, 3, 4, 5, 6, 7, 8, 9, 10, 11, 12, 13, 14, or 15 weeks.

Embodiment 25 The method or composition for use of any one of embodiments 19-22, wherein the administration or delivery occurs at an interval of 1, 2, 3, 4, 5, 6, 7, 8, 9, 10, 11, 12, 13, 14, or 15 months.

Embodiment 26 The method or composition of any one of the preceding embodiments, wherein the guide sequence is selected from SEQ ID NOs: 5-129.

Embodiment 27 The method or composition of any one of the preceding embodiments, wherein the guide RNA is at least partially complementary to a target sequence present in the human SERPINA1 gene.

Embodiment 28 The method or composition of embodiment 27, wherein the target sequence is in exon 2, 3, 4, or 5 of the human SERPINA1 gene.

Embodiment 29 The method or composition of embodiment 27, wherein the target sequence is in exon 2 of the human SERPINA1 gene.

Embodiment 30 The method or composition of embodiment 27, wherein the target sequence is in exon 3 of the human SERPINA1 gene.

Embodiment 31 The method or composition of embodiment 27, wherein the target sequence is in exon 4 of the human SERPINA1 gene.

Embodiment 32 The method or composition of embodiment 27, wherein the target sequence is in exon 5 of the human SERPINA1 gene.

Embodiment 33 The method or composition of any one of embodiments 1-32, wherein the guide sequence is complementary to a target sequence in the positive strand of SERPINA1.

Embodiment 34 The method or composition of any one of embodiments 1-32, wherein the guide sequence is complementary to a target sequence in the negative strand of SERPINA1.

Embodiment 35 The method or composition of any one of embodiments 1-32, further comprising a second guide sequence, wherein the first guide sequence is complementary to a first target sequence in the positive strand of the SERPINA1 gene, and wherein the second guide sequence is complementary to a second target sequence in the negative strand of the SERPINA1 gene.

Embodiment 36 The method or composition of any one of the preceding embodiments, wherein the guide RNA comprises a crRNA that comprises the guide sequence and further comprises a nucleotide sequence of SEQ ID NO: 140, wherein the nucleotides of SEQ ID NO: 140 follow the guide sequence at its 3' end.

Embodiment 37 The method or composition of any one of the preceding embodiments, wherein the guide RNA is a dual guide (dgRNA).

Embodiment 38 The method or composition of embodiment 37, wherein the dual guide RNA comprises a crRNA comprising a nucleotide sequence of SEQ ID NO: 140, wherein the nucleotides of SEQ ID NO: 140 follow the guide sequence at its 3' end, and a trRNA.

Embodiment 39 The method or composition of any one of embodiments 1-36, wherein the guide RNA is a single guide (sgRNA).

Embodiment 40 The method or composition of embodiment 39, wherein the sgRNA comprises a guide sequence that has the pattern of SEQ ID NO: 130.

Embodiment 41 The method or composition of embodiment 39, wherein the sgRNA comprises the sequence of SEQ ID NO: 130.

Embodiment 42 The method or composition of embodiment 40 or 41, wherein each N in SEQ ID NO: 130 is any natural or non-natural nucleotide, wherein the N's form the guide sequence, and the guide sequence targets an RNA-guided DNA binding agent to the SERPINA1 gene.

Embodiment 43 The method or composition of any one of embodiments 39-42, wherein the sgRNA comprises any one of the guide sequences of SEQ ID NOs: 5-129 and the nucleotides of SEQ ID NO: 140.

Embodiment 44 The method or composition of any one of embodiments 39-43, wherein the sgRNA comprises a guide sequence that is at least 99%, 98%, 97%, 96%, 95%, 94%, 93%, 92%, 91%, or 90% identical to a sequence selected from SEQ ID Nos: 5-129.

Embodiment 45 The method or composition of embodiment 42, wherein each N in SEQ ID NO: 130 are replaced with a sequence selected from SEQ ID Nos: 5-129.

Embodiment 46 The method or composition of any one of the preceding embodiments, wherein the guide RNA comprises at least one modification.

Embodiment 47 The method or composition of embodiment 46, wherein the at least one modification includes a 2'-O-methyl (2'-O-Me) modified nucleotide.

Embodiment 48 The method or composition of embodiment 46 or 47, wherein the at least one modification includes a phosphorothioate (PS) bond between nucleotides.

Embodiment 49 The method or composition of any one of embodiments 46-48, wherein the at least one modification includes a 2'-fluoro (2'-F) modified nucleotide.

Embodiment 50 The method or composition of any one of embodiments 46-49, wherein the at least one modification includes a modification at one or more of the first five nucleotides at the 5' end.

Embodiment 51 The method or composition of any one of embodiments 46-50, wherein the at least one modification includes a modification at one or more of the last five nucleotides at the 3' end.

Embodiment 52 The method or composition of any one of embodiments 46-51, wherein the at least one modification includes PS bonds between the first four nucleotides.

Embodiment 53 The method or composition of any one of embodiments 46-52, wherein the at least one modification includes PS bonds between the last four nucleotides.

Embodiment 54 The method or composition of any one of embodiments 46-53, wherein the at least one modification includes 2'-O-Me modified nucleotides at the first three nucleotides at the 5' end.

Embodiment 55 The method or composition of any one of embodiments 46-54, wherein the at least one modification includes 2'-O-Me modified nucleotides at the last three nucleotides at the 3' end.

Embodiment 56 The method or composition of any one of embodiments 46-55, wherein the guide RNA comprises the modified nucleotides of SEQ ID NO: 130.

Embodiment 57 The method or composition of any one of embodiments 1-56, wherein the composition further comprises a pharmaceutically acceptable excipient.

Embodiment 58 The method or composition of any one of embodiments 1-57, wherein the guide RNA and optionally the RNA-guided DNA binding agent or a nucleic acid encoding an RNA-guided DNA binding agent is/are associated with a lipid nanoparticle (LNP).

Embodiment 59 The method or composition of embodiment 58, wherein the LNP comprises a CCD lipid.

Embodiment 60 The method or composition of embodiment 59, wherein the CCD lipid is Lipid A.

Embodiment 61 The method or composition of embodiment 58-60, wherein the LNP comprises a neutral lipid.

Embodiment 62 The method or composition of embodiment 61, wherein the neutral lipid is DSPC Embodiment 63 The method or composition of any one of embodiments 58-62, wherein the LNP comprises a helper lipid.

Embodiment 64 The method or composition of embodiment 63, wherein the helper lipid is cholesterol.

Embodiment 65 The method or composition of any one of embodiments 58-64, wherein the LNP comprises a stealth lipid.

Embodiment 66 The method or composition of embodiment 58-65, wherein the stealth lipid is PEG2k-DMG.

Embodiment 67 The method or composition of any one of the preceding embodiments, wherein the composition further comprises an RNA-guided DNA binding agent.

Embodiment 68 The method or composition of any one of the preceding embodiments, wherein the composition further comprises an mRNA that encodes an RNA-guided DNA binding agent.

Embodiment 69 The method or composition of embodiment 67 or 68, wherein the RNA-guided DNA binding agent is a Cas cleavase.

Embodiment 70 The method or composition of embodiment 69, wherein the RNA-guided DNA binding agent is Cas9.

Embodiment 71 The method or composition of any one of embodiments 67-70, wherein the RNA-guided DNA binding agent is modified.

Embodiment 72 The method or composition of any one of embodiments 67-71, wherein the RNA-guided DNA binding agent is a nickase.

Embodiment 73 The method or composition of embodiment 71 or 72, wherein the modified RNA-guided DNA binding agent comprises a nuclear localization signal (NLS).

Embodiment 74 The method or composition of any one of embodiments 67-73, wherein the RNA-guided DNA binding agent is a Cas from a Type-II CRISPR/Cas system.

Embodiment 75 The method or composition of any one of the preceding embodiments, wherein the composition is a pharmaceutical formulation and further comprises a pharmaceutically acceptable carrier.

Embodiment 76 The method or composition for use of any one of embodiments 1-4 or 7-75, wherein the composition reduces or prevents accumulation of alpha-1 antitrypsin (AAT) in the liver.

Embodiment 77 The method or composition for use of embodiment 76, wherein the AAT is misformed.

Embodiment 78 The method or composition for use of any one of embodiments 1-4 or 7-77, wherein non-homologous ending joining (NHEJ) leads to a mutation during repair of a DSB in the SERPINA1 gene.

Embodiment 79 The method or composition for use of embodiment 78, wherein NHEJ leads to a deletion or insertion of a nucleotide(s) during repair of a DSB in the SERPINA1 gene.

Embodiment 80 The method or composition for use of embodiment 80, wherein the deletion or insertion of a nucleotide(s) induces a frame shift or nonsense mutation in the SERPINA1 gene.

Embodiment 81 The method or composition for use of embodiment 80, wherein a frame shift or nonsense mutation is induced in the SERPINA1 gene of at least 50% of liver cells.

Embodiment 82 The method or composition for use of embodiment 81, wherein a frame shift or nonsense mutation is induced in the SERPINA1 gene of 50%-60%, 60%-70%, 70% or 80%, 80%-90%, 90-95%, 95%-99%, or 99%-100% of liver cells.

Embodiment 83 The method or composition for use of any one of embodiments 79-82, wherein a deletion or insertion of a nucleotide(s) occurs in the SERPINA1 gene at least 50-fold or more than in off-target sites.

Embodiment 84 The method or composition for use of embodiment 83, wherein the deletion or insertion of a nucleotide(s) occurs in the SERPINA1 gene 50-fold to 150-fold, 150-fold to 500-fold, 500-fold to 1500-fold, 1500-fold to 5000-fold, 5000-fold to 15000-fold, 15000-fold to 30000-fold, or 30000-fold to 60000-fold more than in off-target sites.

Embodiment 85 The method or composition for use of any one of embodiments 1-4 or 7-84, wherein administering the composition reduces levels of AAT in the subject.

Embodiment 86 The method or composition for use of embodiment 85, wherein the levels of AAT are reduced by at least 40%.

Embodiment 87 The method or composition for use of embodiment 86, wherein the levels of AAT are reduced by 40-50%, 50%-60%, 60%-70%, 70% or 80%, 80%-90%, 90-95%, 95%-99%, or 99%-100%.

Embodiment 88 The method or composition for use of embodiment 86 or 87, wherein the levels of AAT are measured in serum, plasma, blood, cerebral spinal fluid, or sputum.

Embodiment 89 The method or composition for use of embodiment 86 or 87, wherein the levels of AAT are measured in liver and/or serum.

Embodiment 90 The method or composition for use of any one of embodiments 85-89, wherein the levels of AAT are measured via enzyme-linked immunosorbent assay (ELISA).

Embodiment 91 The method or composition for use of any one of embodiments 1-4 or 7-90, wherein the subject has AATD.

Embodiment 92 The method or composition for use of any one of embodiments 1-4 or 7-91, wherein the subject is human.

Embodiment 93 The method or composition for use of embodiment 91 or 92, wherein the subject has AATD wt.

Embodiment 94 The method or composition for use of embodiment 91 or 92, wherein the subject has hereditary AATD.

Embodiment 95 The method or composition for use of any one of embodiments 1-4, 7-92, or 94, wherein the subject has a family history of AATD.

Embodiment 96 The method or composition for use of any one of embodiments 1-4 or 7-95, wherein the subject has only or predominantly liver symptoms of AATD.

Embodiment 97 The method or composition for use of any one of embodiments 1-4 or 7-96, wherein the subject is heterozygous for the Z allele at the SERPINA1 locus.

Embodiment 98 The method of embodiment 97, wherein the subject has one Z allele and one S allele at the SERPINA1 locus.

Embodiment 99 The method or composition for use of any one of embodiments 1-4 or 7-98, wherein the subject does not have a E342K mutation in the amino acid sequence of AAT, but has reduced levels of wildtype AAT.

Embodiment 100 The method or composition for use of any one of embodiments 1-4 or 7-99, wherein the subject has an improvement, stabilization, or slowing of edema, ascites, or jaundice, or a delay in need for liver transplantation.

Embodiment 101 The method or composition for use of any one of embodiments 1-4 or 7-99, wherein the subject has an improvement, stabilization, or slowing of change as measured by imaging methods or liver enzyme levels as a result of administration.

Embodiment 102 The method or composition for use of any one of embodiments 1-4 or 7-101, wherein the composition or pharmaceutical formulation is administered via a viral vector.

Embodiment 103 The method or composition for use of any one of embodiments 1-4 or 7-102, wherein the composition or pharmaceutical formulation is administered via lipid nanoparticles.

Embodiment 104 The method or composition for use of any one of embodiments 1-4 or 7-103, wherein the subject is tested for specific mutations in the SERPINA1 gene before administering the composition or formulation.

Embodiment 105 The method or composition of any one of embodiments 1-104, wherein the sequence selected from SEQ ID NOs: 5-129 is SEQ ID NO: 5.

Embodiment 106 The method or composition of any one of embodiments 1-104, wherein the sequence selected from SEQ ID NOs: 5-129 is SEQ ID NO: 6.

Embodiment 107 The method or composition of any one of embodiments 1-104, wherein the sequence selected from SEQ ID NOs: 5-129 is SEQ ID NO: 7.

Embodiment 108 The method or composition of any one of embodiments 1-104, wherein the sequence selected from SEQ ID NOs: 5-129 is SEQ ID NO: 8.

Embodiment 109 The method or composition of any one of embodiments 1-104, wherein the sequence selected from SEQ ID NOs: 5-129 is SEQ ID NO: 9.

Embodiment 110 The method or composition of any one of embodiments 1-104, wherein the sequence selected from SEQ ID NOs: 5-129 is SEQ ID NO: 10.

Embodiment 111 The method or composition of any one of embodiments 1-104, wherein the sequence selected from SEQ ID NOs: 5-129 is SEQ ID NO: 11.

Embodiment 112 The method or composition of any one of embodiments 1-104, wherein the sequence selected from SEQ ID NOs: 5-129 is SEQ ID NO: 12.

Embodiment 113 The method or composition of any one of embodiments 1-104, wherein the sequence selected from SEQ ID NOs: 5-129 is SEQ ID NO: 13.

Embodiment 114 The method or composition of any one of embodiments 1-104, wherein the sequence selected from SEQ ID NOs: 5-129 is SEQ ID NO: 14.

Embodiment 115 The method or composition of any one of embodiments 1-104, wherein the sequence selected from SEQ ID NOs: 5-129 is SEQ ID NO: 15.

Embodiment 116 The method or composition of any one of embodiments 1-104, wherein the sequence selected from SEQ ID NOs: 5-129 is SEQ ID NO: 16.

Embodiment 117 The method or composition of any one of embodiments 1-104, wherein the sequence selected from SEQ ID NOs: 5-129 is SEQ ID NO: 17.

Embodiment 118 The method or composition of any one of embodiments 1-104, wherein the sequence selected from SEQ ID NOs: 5-129 is SEQ ID NO: 18.

Embodiment 119 The method or composition of any one of embodiments 1-104, wherein the sequence selected from SEQ ID NOs: 5-129 is SEQ ID NO: 19.

Embodiment 120 The method or composition of any one of embodiments 1-104, wherein the sequence selected from SEQ ID NOs: 5-129 is SEQ ID NO: 20.

Embodiment 121 The method or composition of any one of embodiments 1-104, wherein the sequence selected from SEQ ID NOs: 5-129 is SEQ ID NO: 21.

Embodiment 122 The method or composition of any one of embodiments 1-104, wherein the sequence selected from SEQ ID NOs: 5-129 is SEQ ID NO: 22.

Embodiment 123 The method or composition of any one of embodiments 1-104, wherein the sequence selected from SEQ ID NOs: 5-129 is SEQ ID NO: 23.

Embodiment 124 The method or composition of any one of embodiments 1-104, wherein the sequence selected from SEQ ID NOs: 5-129 is SEQ ID NO: 24.

Embodiment 125 The method or composition of any one of embodiments 1-104, wherein the sequence selected from SEQ ID NOs: 5-129 is SEQ ID NO: 25.

Embodiment 126 The method or composition of any one of embodiments 1-104, wherein the sequence selected from SEQ ID NOs: 5-129 is SEQ ID NO: 26.

Embodiment 127 The method or composition of any one of embodiments 1-104, wherein the sequence selected from SEQ ID NOs: 5-129 is SEQ ID NO: 27.

Embodiment 128 The method or composition of any one of embodiments 1-104, wherein the sequence selected from SEQ ID NOs: 5-129 is SEQ ID NO: 28.

Embodiment 129 The method or composition of any one of embodiments 1-104, wherein the sequence selected from SEQ ID NOs: 5-129 is SEQ ID NO: 29.

Embodiment 130 The method or composition of any one of embodiments 1-104, wherein the sequence selected from SEQ ID NOs: 5-129 is SEQ ID NO: 30.

Embodiment 131 The method or composition of any one of embodiments 1-104, wherein the sequence selected from SEQ ID NOs: 5-129 is SEQ ID NO: 31.

Embodiment 132 The method or composition of any one of embodiments 1-104, wherein the sequence selected from SEQ ID NOs: 5-129 is SEQ ID NO: 32.

Embodiment 133 The method or composition of any one of embodiments 1-104, wherein the sequence selected from SEQ ID NOs: 5-129 is SEQ ID NO: 33.

Embodiment 134 The method or composition of any one of embodiments 1-104, wherein the sequence selected from SEQ ID NOs: 5-129 is SEQ ID NO: 34.

Embodiment 135 The method or composition of any one of embodiments 1-104, wherein the sequence selected from SEQ ID NOs: 5-129 is SEQ ID NO: 35.

Embodiment 136 The method or composition of any one of embodiments 1-104, wherein the sequence selected from SEQ ID NOs: 5-129 is SEQ ID NO: 36.

Embodiment 137 The method or composition of any one of embodiments 1-104, wherein the sequence selected from SEQ ID NOs: 5-129 is SEQ ID NO: 37.

Embodiment 138 The method or composition of any one of embodiments 1-104, wherein the sequence selected from SEQ ID NOs: 5-129 is SEQ ID NO: 38.

Embodiment 139 The method or composition of any one of embodiments 1-104, wherein the sequence selected from SEQ ID NOs: 5-129 is SEQ ID NO: 39.

Embodiment 140 The method or composition of any one of embodiments 1-104, wherein the sequence selected from SEQ ID NOs: 5-129 is SEQ ID NO: 40.

Embodiment 141 The method or composition of any one of embodiments 1-104, wherein the sequence selected from SEQ ID NOs: 5-129 is SEQ ID NO: 41.

Embodiment 142 The method or composition of any one of embodiments 1-104, wherein the sequence selected from SEQ ID NOs: 5-129 is SEQ ID NO: 42.

Embodiment 143 The method or composition of any one of embodiments 1-104, wherein the sequence selected from SEQ ID NOs: 5-129 is SEQ ID NO: 43.

Embodiment 144 The method or composition of any one of embodiments 1-104, wherein the sequence selected from SEQ ID NOs: 5-129 is SEQ ID NO: 44.

Embodiment 145 The method or composition of any one of embodiments 1-104, wherein the sequence selected from SEQ ID NOs: 5-129 is SEQ ID NO: 45.

Embodiment 146 The method or composition of any one of embodiments 1-104, wherein the sequence selected from SEQ ID NOs: 5-129 is SEQ ID NO: 46.

Embodiment 147 The method or composition of any one of embodiments 1-104, wherein the sequence selected from SEQ ID NOs: 5-129 is SEQ ID NO: 47.

Embodiment 148 The method or composition of any one of embodiments 1-104, wherein the sequence selected from SEQ ID NOs: 5-129 is SEQ ID NO: 48.

Embodiment 149 The method or composition of any one of embodiments 1-104, wherein the sequence selected from SEQ ID NOs: 5-129 is SEQ ID NO: 49.

Embodiment 150 The method or composition of any one of embodiments 1-104, wherein the sequence selected from SEQ ID NOs: 5-129 is SEQ ID NO: 50.

Embodiment 151 The method or composition of any one of embodiments 1-104, wherein the sequence selected from SEQ ID NOs: 5-129 is SEQ ID NO: 51.

Embodiment 152 The method or composition of any one of embodiments 1-104, wherein the sequence selected from SEQ ID NOs: 5-129 is SEQ ID NO: 52.

Embodiment 153 The method or composition of any one of embodiments 1-104, wherein the sequence selected from SEQ ID NOs: 5-129 is SEQ ID NO: 53.

Embodiment 154 The method or composition of any one of embodiments 1-104, wherein the sequence selected from SEQ ID NOs: 5-129 is SEQ ID NO: 54.

Embodiment 155 The method or composition of any one of embodiments 1-104, wherein the sequence selected from SEQ ID NOs: 5-129 is SEQ ID NO: 55.

Embodiment 156 The method or composition of any one of embodiments 1-104, wherein the sequence selected from SEQ ID NOs: 5-129 is SEQ ID NO: 56.

Embodiment 157 The method or composition of any one of embodiments 1-104, wherein the sequence selected from SEQ ID NOs: 5-129 is SEQ ID NO: 57.

Embodiment 158 The method or composition of any one of embodiments 1-104, wherein the sequence selected from SEQ ID NOs: 5-129 is SEQ ID NO: 58.

Embodiment 159 The method or composition of any one of embodiments 1-104, wherein the sequence selected from SEQ ID NOs: 5-129 is SEQ ID NO: 59.

Embodiment 160 The method or composition of any one of embodiments 1-104, wherein the sequence selected from SEQ ID NOs: 5-129 is SEQ ID NO: 60.

Embodiment 161 The method or composition of any one of embodiments 1-104, wherein the sequence selected from SEQ ID NOs: 5-129 is SEQ ID NO: 61.

Embodiment 162 The method or composition of any one of embodiments 1-104, wherein the sequence selected from SEQ ID NOs: 5-129 is SEQ ID NO: 62.

Embodiment 163 The method or composition of any one of embodiments 1-104, wherein the sequence selected from SEQ ID NOs: 5-129 is SEQ ID NO: 63.

Embodiment 164 The method or composition of any one of embodiments 1-104, wherein the sequence selected from SEQ ID NOs: 5-129 is SEQ ID NO: 64.

Embodiment 165 The method or composition of any one of embodiments 1-104, wherein the sequence selected from SEQ ID NOs: 5-129 is SEQ ID NO: 65.

Embodiment 166 The method or composition of any one of embodiments 1-104, wherein the sequence selected from SEQ ID NOs: 5-129 is SEQ ID NO: 66.

Embodiment 167 The method or composition of any one of embodiments 1-104, wherein the sequence selected from SEQ ID NOs: 5-129 is SEQ ID NO: 67.

Embodiment 168 The method or composition of any one of embodiments 1-104, wherein the sequence selected from SEQ ID NOs: 5-129 is SEQ ID NO: 68.

Embodiment 169 The method or composition of any one of embodiments 1-104, wherein the sequence selected from SEQ ID NOs: 5-129 is SEQ ID NO: 69.

Embodiment 170 The method or composition of any one of embodiments 1-104, wherein the sequence selected from SEQ ID NOs: 5-129 is SEQ ID NO: 70.

Embodiment 171 The method or composition of any one of embodiments 1-104, wherein the sequence selected from SEQ ID NOs: 5-129 is SEQ ID NO: 71.

Embodiment 172 The method or composition of any one of embodiments 1-104, wherein the sequence selected from SEQ ID NOs: 5-129 is SEQ ID NO: 72.

Embodiment 173 The method or composition of any one of embodiments 1-104, wherein the sequence selected from SEQ ID NOs: 5-129 is SEQ ID NO: 73.

Embodiment 174 The method or composition of any one of embodiments 1-104, wherein the sequence selected from SEQ ID NOs: 5-129 is SEQ ID NO: 74.

Embodiment 175 The method or composition of any one of embodiments 1-104, wherein the sequence selected from SEQ ID NOs: 5-129 is SEQ ID NO: 75.

Embodiment 176 The method or composition of any one of embodiments 1-104, wherein the sequence selected from SEQ ID NOs: 5-129 is SEQ ID NO: 76.

Embodiment 177 The method or composition of any one of embodiments 1-104, wherein the sequence selected from SEQ ID NOs: 5-129 is SEQ ID NO: 77.

Embodiment 178 The method or composition of any one of embodiments 1-104, wherein the sequence selected from SEQ ID NOs: 5-129 is SEQ ID NO: 78.

Embodiment 179 The method or composition of any one of embodiments 1-104, wherein the sequence selected from SEQ ID NOs: 5-129 is SEQ ID NO: 79.

Embodiment 180 The method or composition of any one of embodiments 1-104, wherein the sequence selected from SEQ ID NOs: 5-129 is SEQ ID NO: 80.

Embodiment 181 The method or composition of any one of embodiments 1-104, wherein the sequence selected from SEQ ID NOs: 5-129 is SEQ ID NO: 81.

Embodiment 182 The method or composition of any one of embodiments 1-104, wherein the sequence selected from SEQ ID NOs: 5-129 is SEQ ID NO: 82.

Embodiment 183 The method or composition of any one of embodiments 1-104, wherein the sequence selected from SEQ ID NOs: 5-129 is SEQ ID NO: 83.

Embodiment 184 The method or composition of any one of embodiments 1-104, wherein the sequence selected from SEQ ID NOs: 5-129 is SEQ ID NO: 84.

Embodiment 185 The method or composition of any one of embodiments 1-104, wherein the sequence selected from SEQ ID NOs: 5-129 is SEQ ID NO: 85.

Embodiment 186 The method or composition of any one of embodiments 1-104, wherein the sequence selected from SEQ ID NOs: 5-129 is SEQ ID NO: 86.

Embodiment 187 The method or composition of any one of embodiments 1-104, wherein the sequence selected from SEQ ID NOs: 5-129 is SEQ ID NO: 87.

Embodiment 188 The method or composition of any one of embodiments 1-104, wherein the sequence selected from SEQ ID NOs: 5-129 is SEQ ID NO: 88.

Embodiment 189 The method or composition of any one of embodiments 1-104, wherein the sequence selected from SEQ ID NOs: 5-129 is SEQ ID NO: 89.

Embodiment 190 The method or composition of any one of embodiments 1-104, wherein the sequence selected from SEQ ID NOs: 5-129 is SEQ ID NO: 90.

Embodiment 191 The method or composition of any one of embodiments 1-104, wherein the sequence selected from SEQ ID NOs: 5-129 is SEQ ID NO: 91.

Embodiment 192 The method or composition of any one of embodiments 1-104, wherein the sequence selected from SEQ ID NOs: 5-129 is SEQ ID NO: 92.

Embodiment 193 The method or composition of any one of embodiments 1-104, wherein the sequence selected from SEQ ID NOs: 5-129 is SEQ ID NO: 93.

Embodiment 194 The method or composition of any one of embodiments 1-104, wherein the sequence selected from SEQ ID NOs: 5-129 is SEQ ID NO: 94.

Embodiment 195 The method or composition of any one of embodiments 1-104, wherein the sequence selected from SEQ ID NOs: 5-129 is SEQ ID NO: 95.

Embodiment 196 The method or composition of any one of embodiments 1-104, wherein the sequence selected from SEQ ID NOs: 5-129 is SEQ ID NO: 96.

Embodiment 197 The method or composition of any one of embodiments 1-104, wherein the sequence selected from SEQ ID NOs: 5-129 is SEQ ID NO: 97.

Embodiment 198 The method or composition of any one of embodiments 1-104, wherein the sequence selected from SEQ ID NOs: 5-129 is SEQ ID NO: 98.

Embodiment 199 The method or composition of any one of embodiments 1-104, wherein the sequence selected from SEQ ID NOs: 5-129 is SEQ ID NO: 99.

Embodiment 200 The method or composition of any one of embodiments 1-104, wherein the sequence selected from SEQ ID NOs: 5-129 is SEQ ID NO: 100.

Embodiment 201 The method or composition of any one of embodiments 1-104, wherein the sequence selected from SEQ ID NOs: 5-129 is SEQ ID NO: 101.

Embodiment 202 The method or composition of any one of embodiments 1-104, wherein the sequence selected from SEQ ID NOs: 5-129 is SEQ ID NO: 102.

Embodiment 203 The method or composition of any one of embodiments 1-104, wherein the sequence selected from SEQ ID NOs: 5-129 is SEQ ID NO: 103.

Embodiment 204 The method or composition of any one of embodiments 1-104, wherein the sequence selected from SEQ ID NOs: 5-129 is SEQ ID NO: 104.

Embodiment 205 The method or composition of any one of embodiments 1-104, wherein the sequence selected from SEQ ID NOs: 5-129 is SEQ ID NO: 105.

Embodiment 206 The method or composition of any one of embodiments 1-104, wherein the sequence selected from SEQ ID NOs: 5-129 is SEQ ID NO: 106.

Embodiment 207 The method or composition of any one of embodiments 1-104, wherein the sequence selected from SEQ ID NOs: 5-129 is SEQ ID NO: 107.

Embodiment 208 The method or composition of any one of embodiments 1-104, wherein the sequence selected from SEQ ID NOs: 5-129 is SEQ ID NO: 108.

Embodiment 209 The method or composition of any one of embodiments 1-104, wherein the sequence selected from SEQ ID NOs: 5-129 is SEQ ID NO: 109.

Embodiment 210 The method or composition of any one of embodiments 1-104, wherein the sequence selected from SEQ ID NOs: 5-129 is SEQ ID NO: 110.

Embodiment 211 The method or composition of any one of embodiments 1-104, wherein the sequence selected from SEQ ID NOs: 5-129 is SEQ ID NO: 111.

Embodiment 212 The method or composition of any one of embodiments 1-104, wherein the sequence selected from SEQ ID NOs: 5-129 is SEQ ID NO: 112.

Embodiment 213 The method or composition of any one of embodiments 1-104, wherein the sequence selected from SEQ ID NOs: 5-129 is SEQ ID NO: 113.

Embodiment 214 The method or composition of any one of embodiments 1-104, wherein the sequence selected from SEQ ID NOs: 5-129 is SEQ ID NO: 114.

Embodiment 215 The method or composition of any one of embodiments 1-104, wherein the sequence selected from SEQ ID NOs: 5-129 is SEQ ID NO: 115.

Embodiment 216 The method or composition of any one of embodiments 1-104, wherein the sequence selected from SEQ ID NOs: 5-129 is SEQ ID NO: 116.

Embodiment 217 The method or composition of any one of embodiments 1-104, wherein the sequence selected from SEQ ID NOs: 5-129 is SEQ ID NO: 117.

Embodiment 218 The method or composition of any one of embodiments 1-104, wherein the sequence selected from SEQ ID NOs: 5-129 is SEQ ID NO: 118.

Embodiment 219 The method or composition of any one of embodiments 1-104, wherein the sequence selected from SEQ ID NOs: 5-129 is SEQ ID NO: 119.

Embodiment 220 The method or composition of any one of embodiments 1-104, wherein the sequence selected from SEQ ID NOs: 5-129 is SEQ ID NO: 120.

Embodiment 221 The method or composition of any one of embodiments 1-104, wherein the sequence selected from SEQ ID NOs: 5-129 is SEQ ID NO: 121.

Embodiment 222 The method or composition of any one of embodiments 1-104, wherein the sequence selected from SEQ ID NOs: 5-129 is SEQ ID NO: 122.

Embodiment 223 The method or composition of any one of embodiments 1-104, wherein the sequence selected from SEQ ID NOs: 5-129 is SEQ ID NO: 123.

Embodiment 224 The method or composition of any one of embodiments 1-104, wherein the sequence selected from SEQ ID NOs: 5-129 is SEQ ID NO: 124.

Embodiment 225 The method or composition of any one of embodiments 1-104, wherein the sequence selected from SEQ ID NOs: 5-129 is SEQ ID NO: 125.

Embodiment 226 The method or composition of any one of embodiments 1-104, wherein the sequence selected from SEQ ID NOs: 5-129 is SEQ ID NO: 126.

Embodiment 227 The method or composition of any one of embodiments 1-104, wherein the sequence selected from SEQ ID NOs: 5-129 is SEQ ID NO: 127.

Embodiment 228 The method or composition of any one of embodiments 1-104, wherein the sequence selected from SEQ ID NOs: 5-129 is SEQ ID NO: 128.

Embodiment 229 The method or composition of any one of embodiments 1-104, wherein the sequence selected from SEQ ID NOs: 5-129 is SEQ ID NO: 129.

Embodiment 230 The method or composition of any one of embodiments 1-104, further comprising the sequence of SEQ ID NO: 140 or 141.

Embodiment 231 The method or composition of embodiment 230 comprising the modification pattern of SEQ ID NO: 130.

Embodiment 232 The method or composition of any one of embodiments 1-104, wherein the sequence is selected from SEQ ID NO: 131-139.

Embodiment 233 The method or composition of any one of embodiments 1-104, wherein the sequence selected from SEQ ID NOs: 131-139 is SEQ ID NO: 131.

Embodiment 234 The method or composition of any one of embodiments 1-104, wherein the sequence selected from SEQ ID NOs: 131-139 is SEQ ID NO: 132.

Embodiment 235 The method or composition of any one of embodiments 1-104, wherein the sequence selected from SEQ ID NOs: 131-139 is SEQ ID NO: 133.

Embodiment 236 The method or composition of any one of embodiments 1-104, wherein the sequence selected from SEQ ID NOs: 131-139 is SEQ ID NO: 134.

Embodiment 237 The method or composition of any one of embodiments 1-104, wherein the sequence selected from SEQ ID NOs: 131-139 is SEQ ID NO: 135.

Embodiment 238 The method or composition of any one of embodiments 1-104, wherein the sequence selected from SEQ ID NOs: 131-139 is SEQ ID NO: 136.

Embodiment 239 The method or composition of any one of embodiments 1-104, wherein the sequence selected from SEQ ID NOs: 131-139 is SEQ ID NO: 137.

Embodiment 240 The method or composition of any one of embodiments 1-104, wherein the sequence selected from SEQ ID NOs: 131-139 is SEQ ID NO: 138.

Embodiment 241 The method or composition of any one of embodiments 1-104, wherein the sequence selected from SEQ ID NOs: 131-139 is SEQ ID NO: 139.

Embodiment 242 The method or composition of any one of embodiments 232-241, wherein the sequence selected from SEQ ID NOs: 131-139 comprises the modifications shown for the respective sequence in Table 2.

Embodiment 243 Use of a composition or formulation of any of embodiments 5-241 for the preparation of a medicament for treating a human subject having AATD.

FIGURE LEGENDS

Figure 3:
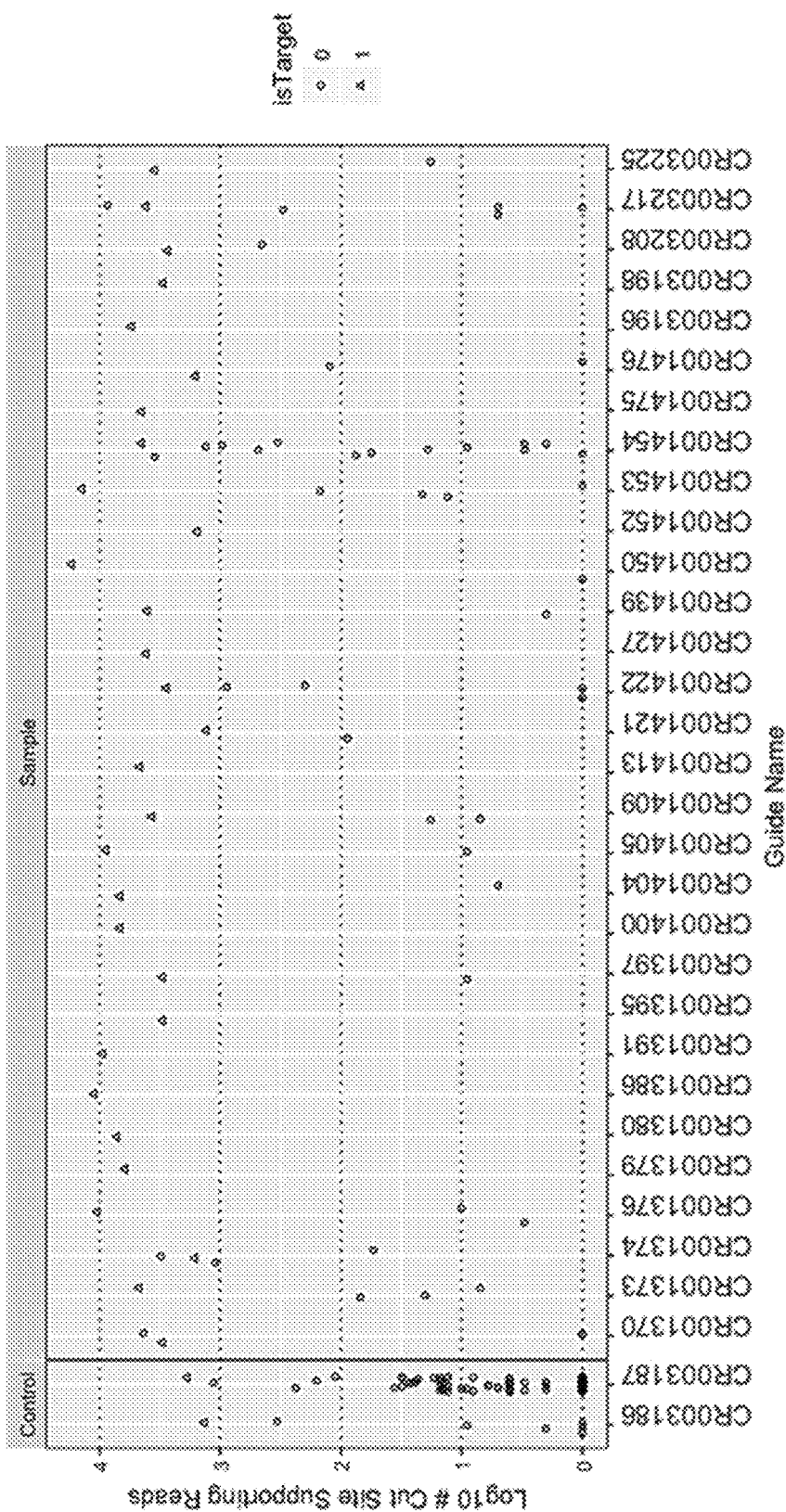
FIG. 3 shows off-target analysis of certain guide RNAs targeting SERPINA1. In the graph, triangles represent the identification of the on-target cut site, while circles represent the identification of potential off-target sites.
Figures 5A, 5B, 5C:
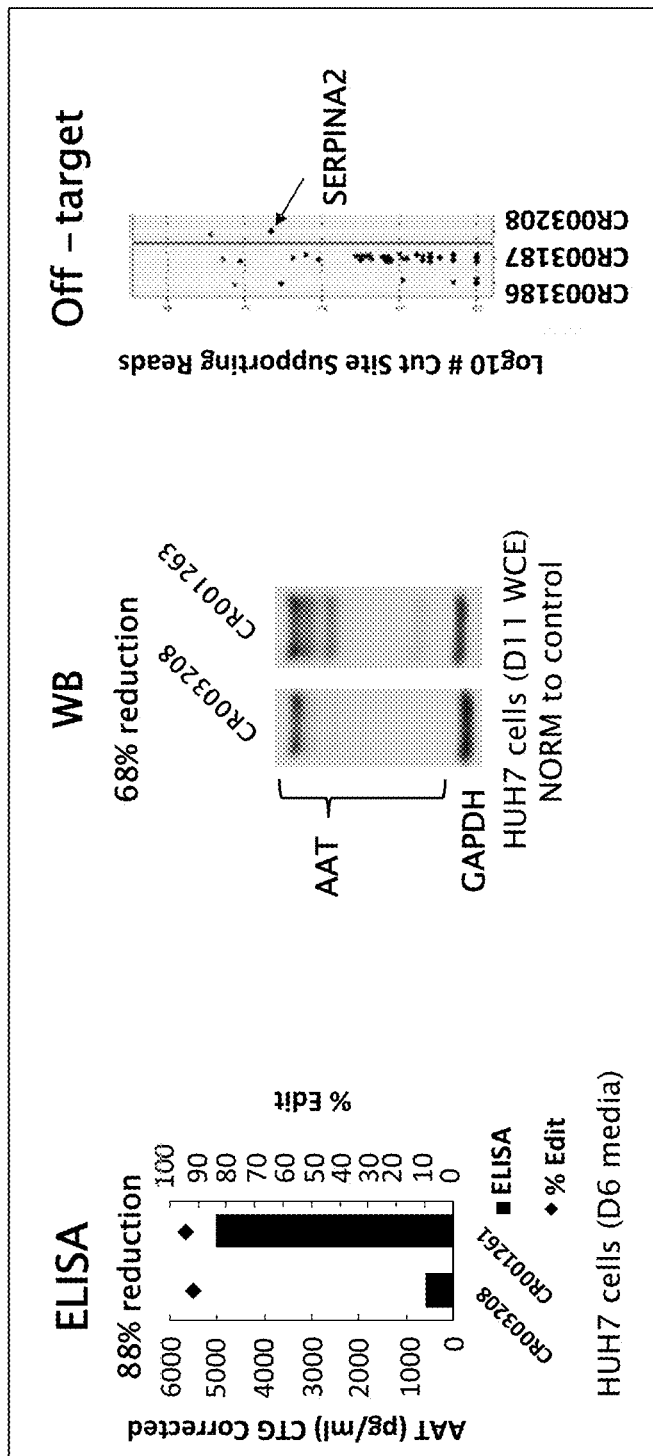

FIGS. 5A-5C show ELISA data for CR003208 and control guide CR001263 showing percent reduction in AAT secretion in HUH7 cells (5A), western blot (WB) analysis of percent reduction in AAT in HUH7 cells (5B), and off-target analysis (5C). In FIG. 5C, a single potential off-target site was identified in the related gene SERPINA2, as denoted by the arrow (see also, FIG. 3). The human guide sequences and the sequence complementary to the corresponding target sequence in cynomolgus monkey are both CR003208 (SEQ ID No: 107). Note that chromosome positions of the target sequence complementary to the human guide sequence are listed in Table 1.

FIGS. 6A-6C show ELISA data for CR001413 and control guide CR001262 showing percent reduction in AAT secretion in HUH7 cells (6A), western blot (WB) analysis of percent reduction in AAT in HUH7 cells (6B), and off-target analysis (6C). The human guide sequences and the sequence complementary to the corresponding target sequence in cynomolgus monkey are CR001413 (SEQ ID No: 51), and GUUGAGGAACAGGCCGUUGC (SEQ ID No: 271), respectively. Note that chromosome positions of the target sequence complementary to the human guide sequence are listed in Table 1.

Figures 7A, 7B, 7C:
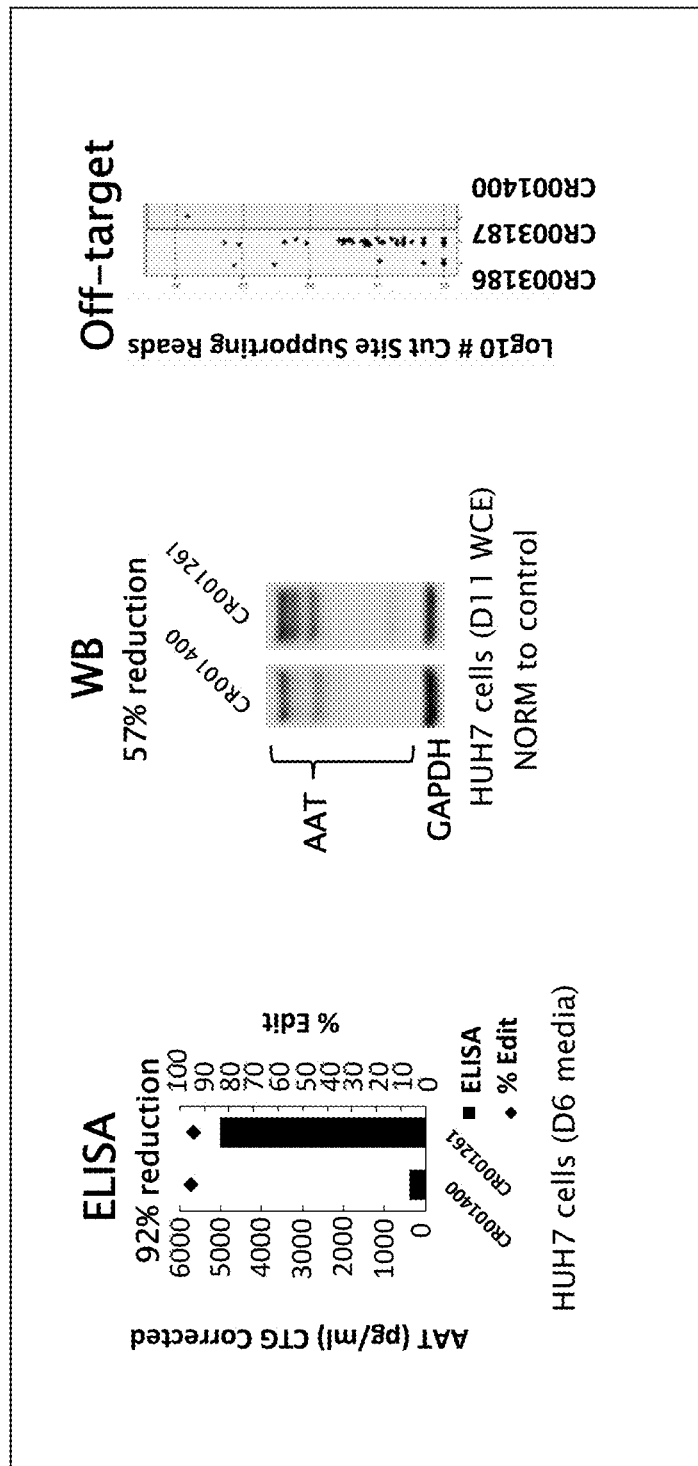

FIGS. 7A-7C show ELISA data for CR001400 and control guide CR001261 showing percent reduction in AAT secretion in HUH7 cells (7A), western blot (WB) analysis of percent reduction in AAT in HUH7 cells (7B), and off-target analysis (7C). The human guide sequences and the sequence complementary to the corresponding target sequence in cynomolgus monkey are SEQ ID No: 38, and ACU- CACAGUGAAAUCCUGGA (SEQ ID No: 272), respectively. Note that chromosome positions of the target sequence complementary to the human guide sequence are listed in Table 1.

Figures 8A, 8B, 8C:
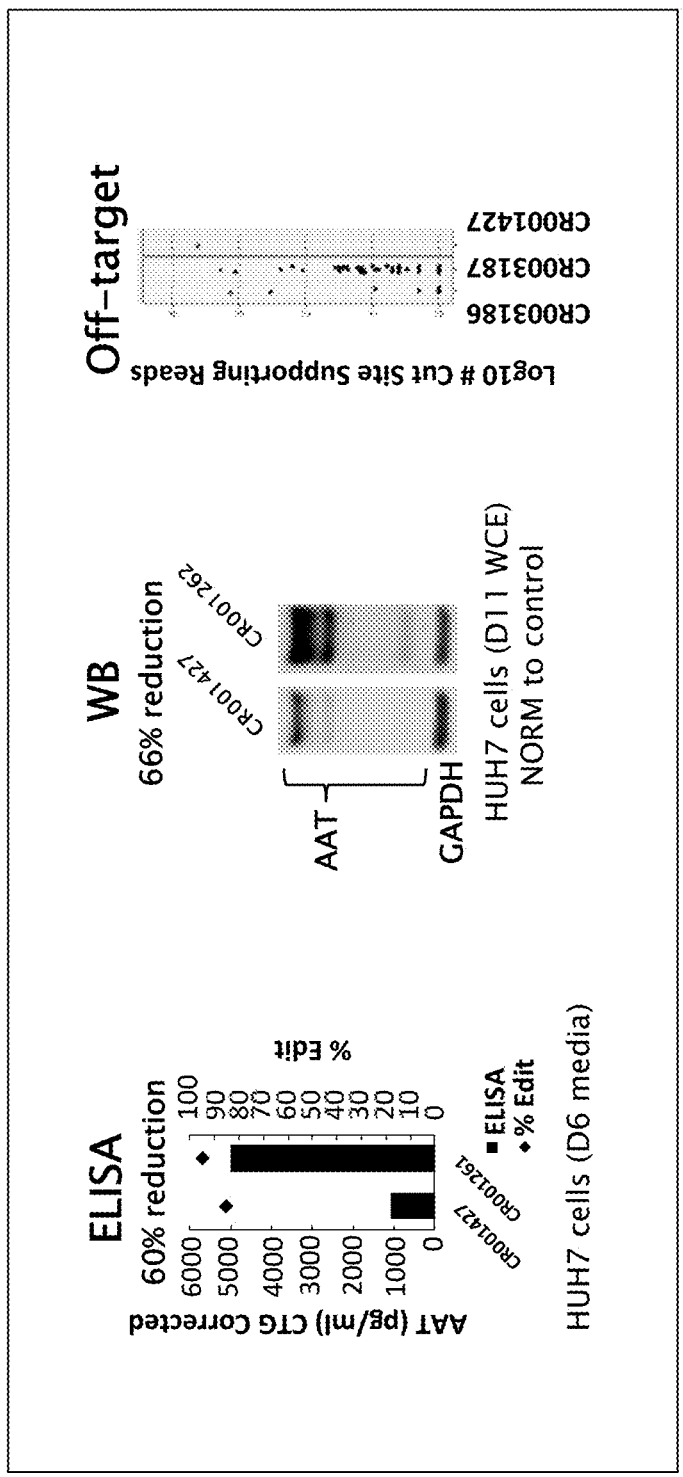

FIGS. 8A-8C show ELISA data for CR001427 and control guide CR001262 showing percent reduction in AAT secretion in HUH7 cells (8A), western blot (WB) analysis of percent reduction in AAT in HUH7 cells (8B), and off-target analysis (8C). The human guide sequences and the sequence complementary to the corresponding target sequence in cynomolgus monkey are both CR001427 (SEQ ID No: 65). Note that chromosome positions of the target sequence complementary to the human guide sequence are listed in Table 1.

Figures 9A, 9B, 9C:
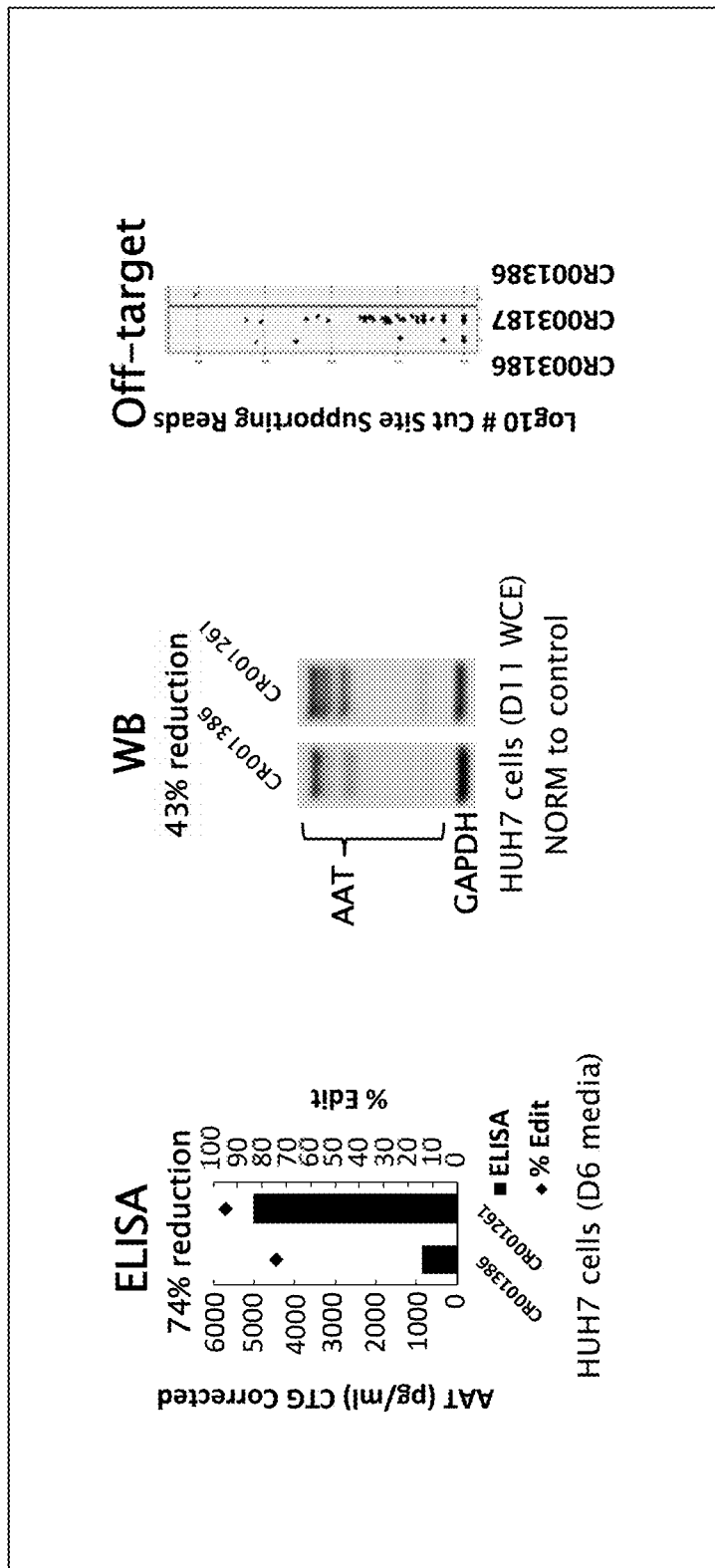

FIGS. 9A-9C show ELISA data for CR001386 and control guide CR001261 showing percent reduction in AAT secretion in HUH7 cells (9A), western blot (WB) analysis of percent reduction in AAT in HUH7 cells (9B), and off-target analysis (9C). The human guide sequences and the sequence complementary to the corresponding target sequence in cynomolgus monkey are CR001386 (SEQ ID No: 24), and GAAGCCGAACUCAGCCAGGC (SEQ ID No: 273), respectively. Note that chromosome positions of the target sequence complementary to the human guide sequence are listed in Table 1.

Figures 10A, 10B, 10C:
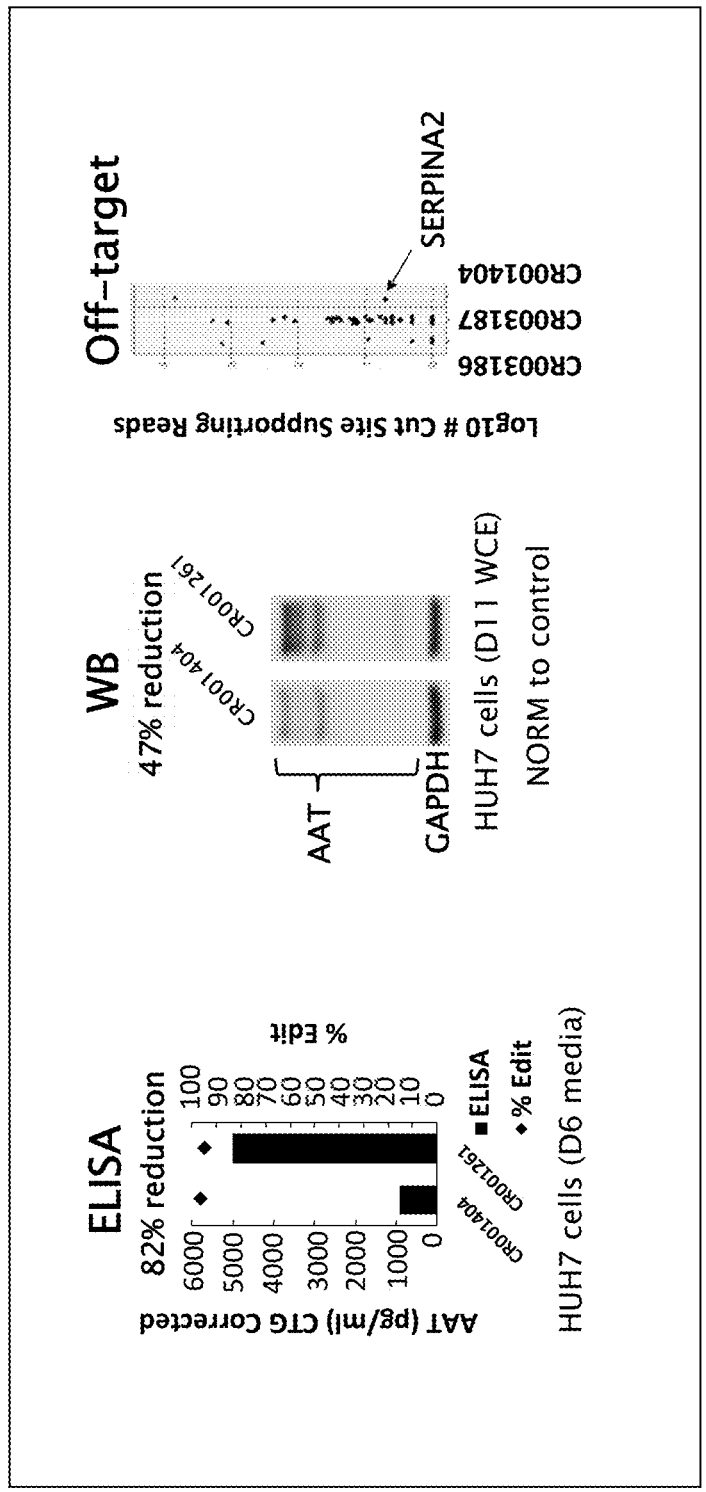

FIGS. 10A-10C show ELISA data for CR001404 and control guide CR001261 showing percent reduction in AAT secretion in HUH7 cells (10A), western blot (WB) analysis of percent reduction in AAT in HUH7 cells (10B), and off-target analysis (10C). In FIG. 10C, a single off-target site was identified, as denoted by the arrow (see also, FIG. 3). The human guide sequences and the sequence complementary to the corresponding target sequence in cynomolgus monkey, are CR001404 (SEQ ID No: 42), and CAACGUCACGGAGAUUCCGG (SEQ ID No: 274), respectively. Note that chromosome positions of the target sequence complementary to the human guide sequence are listed in Table 1.

Figure 11:
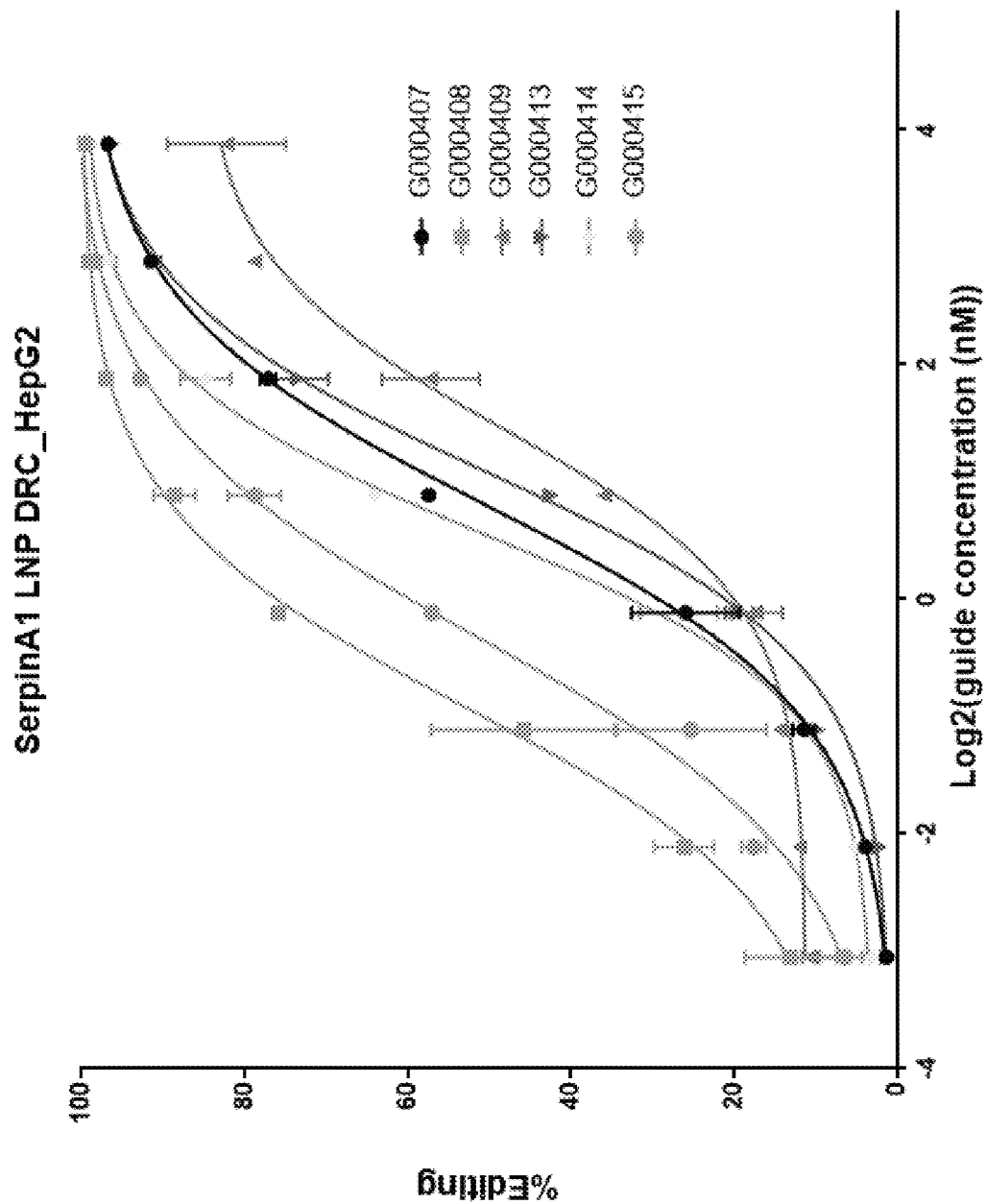

FIG. 11 shows percent editing of AAT in HepG2 cells for various guides at various concentrations in a dose response curve ("DRC").

Figure 12:
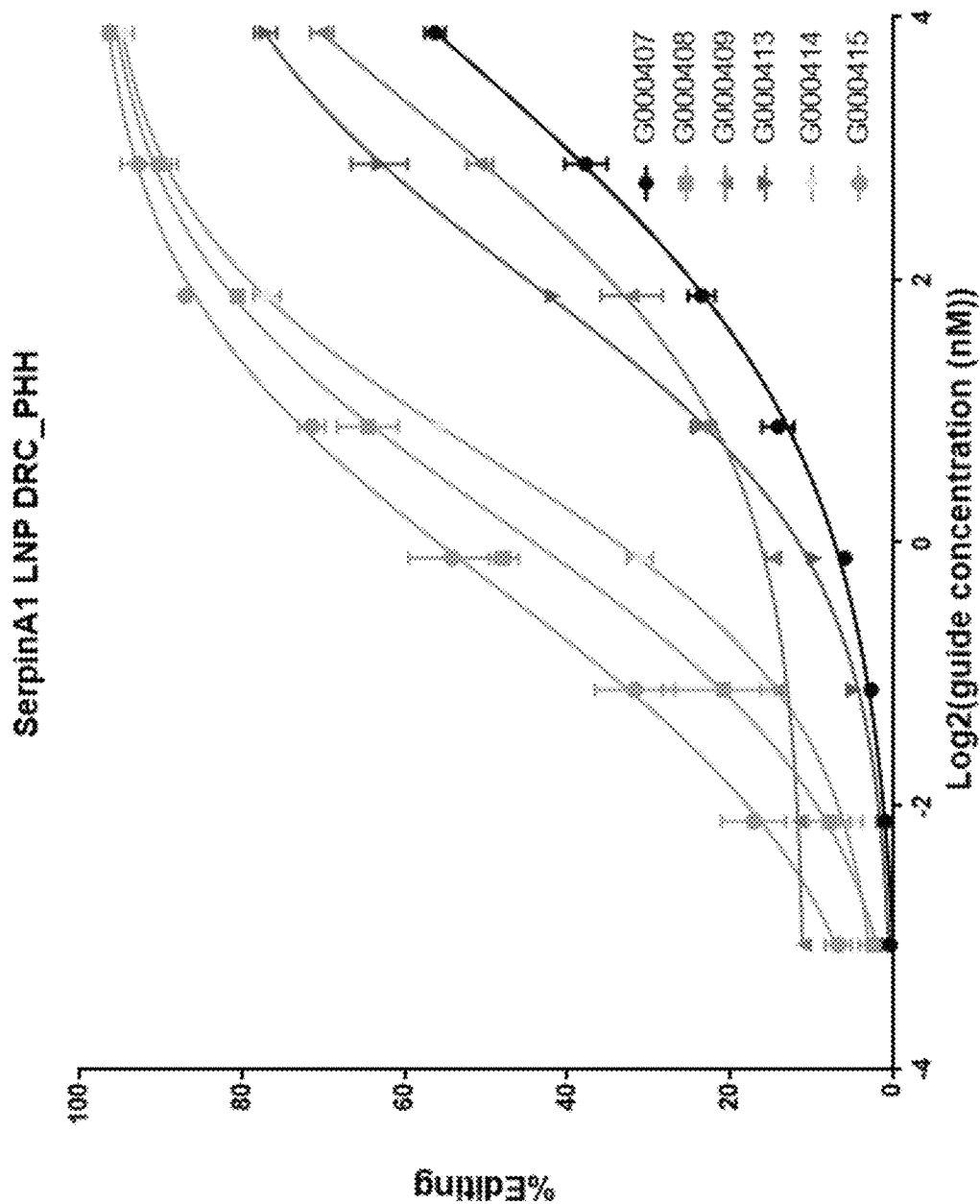

FIG. 12 shows percent editing of AAT in primary human hepatocytes (PHH) cells for various guides at various concentrations in a dose response curve ("DRC").

Figure 13A:
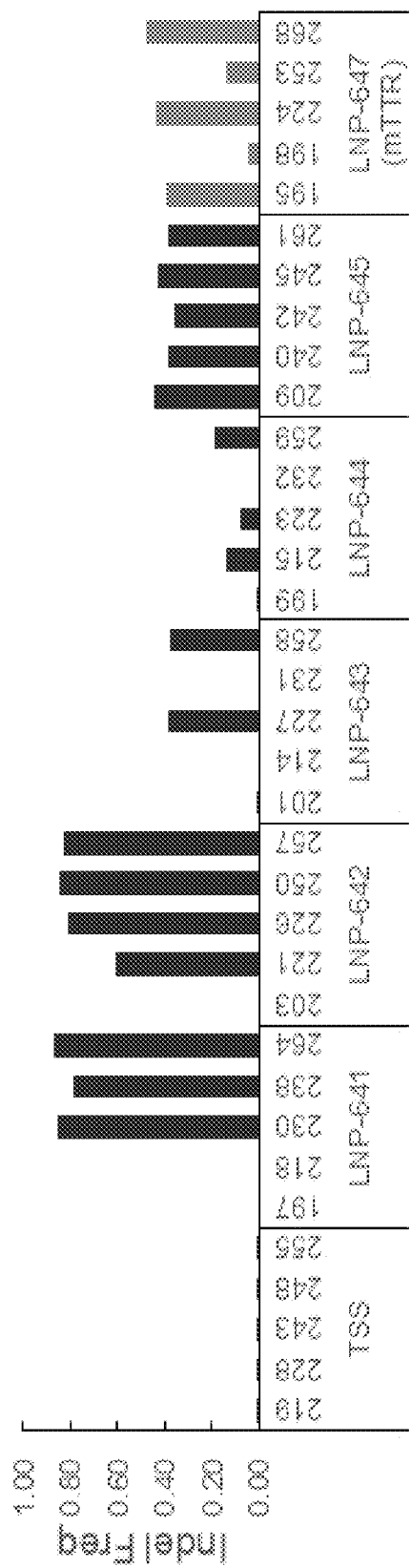
Figure 13B:
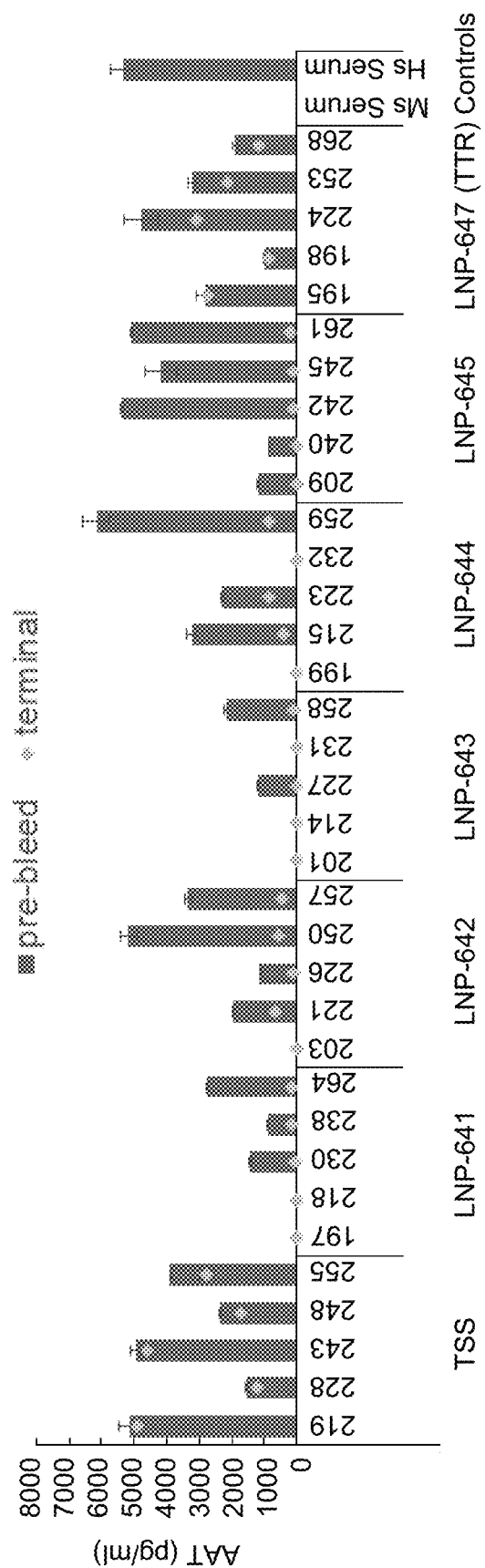
Figure 13C:
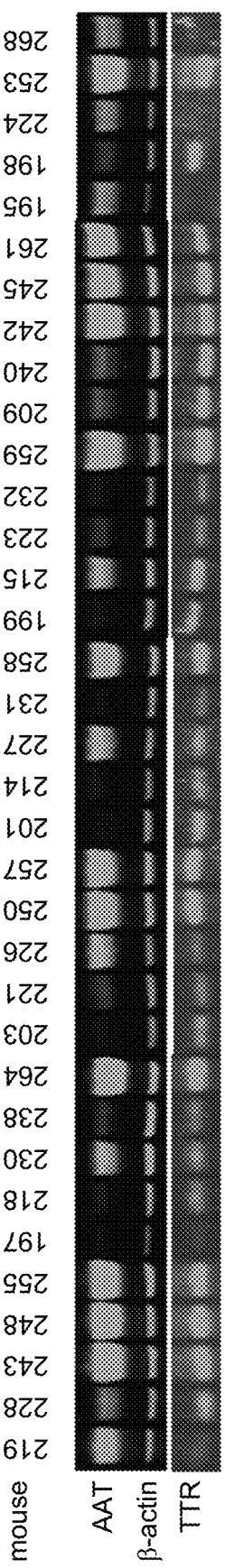

FIGS. 13A-C show the results of an in vivo experiment in transgenic mice harboring copies of the human PiZ variant of SERPINA1. FIG. 13A shows robust editing of the PiZ variant of SERPINA1 across each group, with no editing detected in the vehicle control (TSS). FIG. 13B shows ELISA data from this same experiment, while FIG. 13C shows Western Blot data from this same experiment.

DETAILED DESCRIPTION

Provided herein are guide RNA compositions useful in CRISPR/Cas9 systems to edit the SERPINA1 gene. The guide RNAs, in dual or single guide RNA formats, with RNA-guided DNA binding agents, e.g., Cas9 or mRNA encoding RNA-guided DNA binding agent, e.g., mRNA encoding Cas9, may be administered to subjects having non-wild type SERPINA1 gene sequences, such as, for example, subjects with alpha-1 antitrypsin deficiency ("AATD" or "A1AD"). Guide sequences targeting the SERPINA1 gene are shown in Table 1 at SEQ ID Nos: 5-129. Control guides used in the experiments described herein are shown at SEQ ID Nos: 1-4.

TABLE 1

SERPINA1 targeted and control guide sequence nomenclature, chromosomal coordinates, and sequence

| SEQ ID No | Guide ID | Description | Chromosomal coordinates | Guide Sequences |
|---|---|---|---|---|
| 1 | CR001261 | Control 1 | Chr1: 55039269-55039291 | GCCAGACUCC AAGUUCUGCC |
| 2 | CR001262 | Control 2 | Chr1: 55039155-55039177 | UAAGGCCAGU GGAAAGAAUU |
| 3 | CR001263 | Control 3 | Chr1: 55039180-55039202 | GGCAGCGAGG AGUCCACAGU |
| 4 | CR001264 | Control 4 | Chr1: 55039149-55039171 | UCUUUCCACU GGCCUUAACC |
| 5 | CR001367 | Exon 2 | Chr14: 94383211-94383233 | CAAUGCCGUC UUCUGUCUCG |
| 6 | CR001368 | Exon 2 | Chr14: 94383210-94383232 | AAUGCCGUCU UCUGUCUCGU |
| 7 | CR001369 | Exon 2 | Chr14: 94383209-94383231 | AUGCCGUCUU CUGUCUCGUG |
| 8 | CR001370 | Exon 2 | Chr14: 94383206-94383228 | AUGCCCCACG AGACAGAAGA |
| 9 | CR001371 | Exon 2 | Chr14: 94383195-94383217 | CUCGUGGGGC AUCCUCCUGC |
| 10 | CR001372 | Exon 2 | Chr14: 94383152-94383174 | GGAUCCUCAG CCAGGGAGAC |
| 11 | CR001373 | Exon 2 | Chr14: 94383146-94383168 | UCCCUGGCUG AGGAUCCCCA |
| 12 | CR001374 | Exon 2 | Chr14: 94383145-94383167 | UCCCUGGGGA UCCUCAGCCA |
| 13 | CR001375 | Exon 2 | Chr14: 94383144-94383166 | CUCCCUGGGG AUCCUCAGCC |
| 14 | CR001376 | Exon 2 | Chr14: 94383115-94383137 | GUGGGAUGUA UCUGUCUUCU |
| 15 | CR001377 | Exon 2 | Chr14: 94383114-94383136 | GGUGGGAUGU AUCUGUCUUC |
| 16 | CR001378 | Exon 2 | Chr14: 94383105-94383127 | AGAUACAUCC CACCAUGAUC |
| 17 | CR001379 | Exon 2 | Chr14: 94383097-94383119 | UGGGUGAUCC UGAUCAUGGU |
| 18 | CR001380 | Exon 2 | Chr14: 94383096-94383118 | UUGGGUGAUC CUGAUCAUGG |

TABLE 1-continued

SERPINA1 targeted and control guide sequence nomenclature, chromosomal coordinates, and sequence

| SEQ ID No | Guide ID | Description | Chromosomal coordinates | Guide Sequences |
|---|---|---|---|---|
| 19 | CR001381 | Exon 2 | Chr14: 94383093-94383115 | AGGUUGGGUG AUCCUGAUCA |
| 20 | CR001382 | Exon 2 | Chr14: 94383078-94383100 | GGGUGAUCUU GUUGAAGGUU |
| 21 | CR001383 | Exon 2 | Chr14: 94383077-94383099 | GGGGUGAUCU UGUUGAAGGU |
| 22 | CR001384 | Exon 2 | Chr14: 94383069-94383091 | CAACAAGAUC ACCCCCAACC |
| 23 | CR001385 | Exon 2 | Chr14: 94383057-94383079 | AGGCGAACUC AGCCAGGUUG |
| 24 | CR001386 | Exon 2 | Chr14: 94383055-94383077 | GAAGGCGAAC UCAGCCAGGU |
| 25 | CR001387 | Exon 2 | Chr14: 94383051-94383073 | GGCUGAAGGC GAACUCAGCC |
| 26 | CR001388 | Exon 2 | Chr14: 94383037-94383059 | CAGCUGGCGG UAUAGGCUGA |
| 27 | CR001389 | Exon 2 | Chr14: 94383036-94383058 | CUUCAGCCUA UACCGCCAGC |
| 28 | CR001390 | Exon 2 | Chr14: 94383030-94383052 | GGUGUGCCAG CUGGCGGUAU |
| 29 | CR001391 | Exon 2 | Chr14: 94383021-94383043 | UGUUGGACUG GUGUGCCAGC |
| 30 | CR001392 | Exon 2 | Chr14: 94383009-94383031 | AGAUAUUGGU GCUGUUGGAC |
| 31 | CR001393 | Exon 2 | Chr14: 94383004-94383026 | GAAGAAGAUA UUGGUGCUGU |
| 32 | CR001394 | Exon 2 | Chr14: 94382995-94383017 | CACUGGGGAG AAGAAGAUAU |
| 33 | CR001395 | Exon 2 | Chr14: 94382980-94383002 | GGCUGUAGCG AUGCUCACUG |
| 34 | CR001396 | Exon 2 | Chr14: 94382979-94383001 | AGGCUGUAGC GAUGCUCACU |
| 35 | CR001397 | Exon 2 | Chr14: 94382978-94383000 | AAGGCUGUAG CGAUGCUCAC |
| 36 | CR001398 | Exon 2 | Chr14: 94382928-94382950 | UGACACUCAC GAUGAAAUCC |
| 37 | CR001399 | Exon 2 | Chr14: 94382925-94382947 | CACUCACGAU GAAAUCCUGG |
| 38 | CR001400 | Exon 2 | Chr14: 94382924-94382946 | ACUCACGAUG AAAUCCUGGA |
| 39 | CR001401 | Exon 2 | Chr14: 94382910-94382932 | GGUUGAAAUU CAGGCCCUCC |
| 40 | CR001402 | Exon 2 | Chr14: 94382904-94382926 | GGGCCUGAAU UUCAACCUCA |
| 41 | CR001403 | Exon 2 | Chr14: 94382895-94382917 | UUUCAACCUC ACGGAGAUUC |
| 42 | CR001404 | Exon 2 | Chr14: 94382892-94382914 | CAACCUCACG GAGAUUCCGG |
| 43 | CR001405 | Exon 2 | Chr14: 94382889-94382911 | GAGCCUCCGG AAUCUCCGUG |
| 44 | CR001406 | Exon 2 | Chr14: 94382876-94382898 | CCGGAGGCUC AGAUCCAUGA |
| 45 | CR001407 | Exon 2 | Chr14: 94382850-94382872 | UGAGGGUACG GAGGAGUUCC |
| 46 | CR001408 | Exon 2 | Chr14: 94382841-94382863 | CUGGCUGGUU GAGGGUACGG |
| 47 | CR001409 | Exon 2 | Chr14: 94382833-94382855 | CUGGCUGUCU GGCUGGUUGA |
| 48 | CR001410 | Exon 2 | Chr14: 94382810-94382832 | CUCCAGCUGA CCACCGGCAA |
| 49 | CR001411 | Exon 2 | Chr14: 94382808-94382830 | GGCCAUUGCC GGUGGUCAGC |
| 50 | CR001412 | Exon 2 | Chr14: 94382800-94382822 | GAGGAACAGG CCAUUGCCGG |
| 51 | CR001413 | Exon 2 | Chr14: 94382797-94382819 | GCUGAGGAAC AGGCCAUUGC |
| 52 | CR001414 | Exon 2 | Chr14: 94382793-94382815 | CAAUGGCCUG UUCCUCAGCG |
| 53 | CR001415 | Exon 2 | Chr14: 94382792-94382814 | AAUGGCCUGU UCCUCAGCGA |
| 54 | CR001416 | Exon 2 | Chr14: 94382787-94382809 | UCAGGCCCUC GCUGAGGAAC |

TABLE 1-continued

SERPINA1 targeted and control guide sequence nomenclature, chromosomal coordinates, and sequence

| SEQ ID No | Guide ID | Description | Chromosomal coordinates | Guide Sequences |
|---|---|---|---|---|
| 55 | CR001417 | Exon 2 | Chr14: 94382781-94382803 | CUAGCUUCAGGCCCUCGCUG |
| 56 | CR001418 | Exon 2 | Chr14: 94382778-94382800 | CAGCGAGGGCCUGAAGCUAG |
| 57 | CR001419 | Exon 2 | Chr14: 94382769-94382791 | AAAACUUAUCCACUAGCUUC |
| 58 | CR001420 | Exon 2 | Chr14: 94382766-94382788 | GAAGCUAGUGGAUAAGUUUU |
| 59 | CR001421 | Exon 2 | Chr14: 94382763-94382785 | GCUAGUGGAUAAGUUUUUGG |
| 60 | CR001422 | Exon 2 | Chr14: 94382724-94382746 | UGACAGUGAAGGCUUCUGAG |
| 61 | CR001423 | Exon 2 | Chr14: 94382716-94382738 | AAGCCUUCACUGUCAACUUC |
| 62 | CR001424 | Exon 2 | Chr14: 94382715-94382737 | AGCCUUCACUGUCAACUUCG |
| 63 | CR001425 | Exon 2 | Chr14: 94382713-94382735 | GUCCCCGAAGUUGACAGUGA |
| 64 | CR001426 | Exon 2 | Chr14: 94382703-94382725 | CAACUUCGGGGACACCGAAG |
| 65 | CR001427 | Exon 2 | Chr14: 94382689-94382711 | GAUCUGUUUCUUGGCCUCUU |
| 66 | CR001428 | Exon 2 | Chr14: 94382680-94382702 | GUAAUCGUUGAUCUGUUUCU |
| 67 | CR001429 | Exon 2 | Chr14: 94382676-94382698 | GAAACAGAUCAACGAUUACG |
| 68 | CR001430 | Exon 2 | Chr14: 94382670-94382692 | GAUCAACGAUUACGUGGAGA |
| 69 | CR001431 | Exon 2 | Chr14: 94382669-94382691 | AUCAACGAUUACGUGGAGAA |
| 70 | CR001432 | Exon 2 | Chr14: 94382660-94382682 | UACGUGGAGAAGGGUACUCA |
| 71 | CR001433 | Exon 2 | Chr14: 94382659-94382681 | ACGUGGAGAAGGGUACUCAA |
| 72 | CR001434 | Exon 2 | Chr14: 94382643-94382665 | UCAAGGGAAAAUUGUGGAUU |
| 73 | CR001435 | Exon 2 | Chr14: 94382637-94382659 | GAAAAUUGUGGAUUUGGUCA |
| 74 | CR001436 | Exon 2 | Chr14: 94382607-94382629 | CAGAGACACAGUUUUUGCUC |
| 75 | CR001437 | Exon 3 | Chr14: 94381127-94381149 | UCCCCUCUCUCCAGGCAAAU |
| 76 | CR001438 | Exon 3 | Chr14: 94381098-94381120 | CUCGGUGUCCUUGACUUCAA |
| 77 | CR001439 | Exon 3 | Chr14: 94381097-94381119 | CUUUGAAGUCAAGGACACCG |
| 78 | CR001440 | Exon 3 | Chr14: 94381080-94381102 | CACGUGGAAGUCCUCUUCCU |
| 79 | CR001441 | Exon 3 | Chr14: 94381079-94381101 | CGAGGAAGAGGACUUCCACG |
| 80 | CR001442 | Exon 3 | Chr14: 94381073-94381095 | AGAGGACUUCCACGUGGACC |
| 81 | CR001443 | Exon 3 | Chr14: 94381064-94381086 | CGGUGGUCACCUGGUCCACG |
| 82 | CR001444 | Exon 3 | Chr14: 94381058-94381080 | GGACCAGGUGACCACCGUGA |
| 83 | CR001445 | Exon 3 | Chr14: 94381055-94381077 | GCACCUUCACGGUGGUCACC |
| 84 | CR001446 | Exon 3 | Chr14: 94381047-94381069 | CAUCAUAGGCACCUUCACGG |
| 85 | CR001447 | Exon 3 | Chr14: 94381036-94381058 | GUGCCUAUGAUGAAGCGUUU |
| 86 | CR001448 | Exon 3 | Chr14: 94381033-94381055 | AUGCCUAAACGCUUCAUCAU |
| 87 | CR001449 | Exon 3 | Chr14: 94381001-94381023 | UGGACAGCUUCUUACAGUGC |
| 88 | CR001450 | Exon 3 | Chr14: 94380995-94381017 | CUGUAAGAAGCUGUCCAGCU |
| 89 | CR001451 | Exon 3 | Chr14: 94380974-94380996 | GGUGCUGCUGAUGAAAUACC |
| 90 | CR001452 | Exon 3 | Chr14: 94380973-94380995 | GUGCUGCUGAUGAAAUACCU |

TABLE 1-continued

SERPINA1 targeted and control guide sequence nomenclature, chromosomal coordinates, and sequence

| SEQ ID No | Guide ID | Description | Chromosomal coordinates | Guide Sequences |
|---|---|---|---|---|
| 91 | CR001453 | Exon 3 | Chr14: 94380956-94380978 | AGAUGGCGGU GGCAUUGCCC |
| 92 | CR001454 | Exon 3 | Chr14: 94380945-94380967 | AGGCAGGAAG AAGAUGGCGG |
| 93 | CR001474 | Exon 5 | Chr14: 94378611-94378633 | GGUCAGCACA GCCUUAUGCA |
| 94 | CR001475 | Exon 5 | Chr14: 94378581-94378603 | AGAAAGGGAC UGAAGCUGCU |
| 95 | CR001476 | Exon 5 | Chr14: 94378580-94378602 | GAAAGGGACU GAAGCUGCUG |
| 96 | CR001477 | Exon 5 | Chr14: 94378565-94378587 | UGCUGGGGCC AUGUUUUUAG |
| 97 | CR001478 | Exon 5 | Chr14: 94378557-94378579 | GGGUAUGGCC UCUAAAAACA |
| 98 | CR001483 | Exon 5 | Chr14: 94378526-94378548 | UGUUGAACUU GACCUCGGGG |
| 99 | CR001484 | Exon 5 | Chr14: 94378521-94378543 | GGGUUUGUUG AACUUGACCU |
| 100 | CR003190 | Exon 2 | Chr14: 94383131-94383153 | UUCUGGGCAG CAUCUCCCUG |
| 101 | CR003191 | Exon 2 | Chr14: 94383129-94383151 | UCUUCUGGGC AGCAUCUCCC |
| 102 | CR003196 | Exon 2 | Chr14: 94383024-94383046 | UGGACUGGUG UGCCAGCUGG |
| 103 | CR003204 | Exon 2 | Chr14: 94382961-94382983 | AGCCUUUGCA AUGCUCUCCC |
| 104 | CR003205 | Exon 2 | Chr14: 94382935-94382957 | UUCAUCGUGA GUGUCAGCCU |
| 105 | CR003206 | Exon 2 | Chr14: 94382901-94382923 | UCUCCGUGAG GUUGAAAUUC |
| 106 | CR003207 | Exon 2 | Chr14: 94382822-94382844 | GUCAGCUGGA GCUGGCUGUC |
| 107 | CR003208 | Exon 2 | Chr14: 94382816-94382838 | AGCCAGCUCC AGCUGACCAC |
| 108 | CR003217 | Exon 3 | Chr14: 94380942-94380964 | AUCAGGCAGG AAGAAGAUGG |
| 109 | CR003218 | Exon 3 | Chr14: 94380938-94380960 | CAUCUUCUUC CUGCCUGAUG |
| 110 | CR003219 | Exon 3 | Chr14: 94380937-94380959 | AUCUUCUUCC UGCCUGAUGA |
| 111 | CR003220 | Exon 3 | Chr14: 94380881-94380903 | CGAUAUCAUC ACCAAGUUCC |
| 112 | CR003221 | Exon 4 | Chr14: 94379554-94379576 | CAGAUCAUAG GUUCCAGUAA |
| 113 | CR003222 | Exon 4 | Chr14: 94379507-94379529 | AUCACUAAGG UCUUCAGCAA |
| 114 | CR003223 | Exon 4 | Chr14: 94379506-94379528 | UCACUAAGGU CUUCAGCAAU |
| 115 | CR003224 | Exon 4 | Chr14: 94379505-94379527 | CACUAAGGUC UUCAGCAAUG |
| 116 | CR003225 | Exon 4 | Chr14: 94379453-94379475 | CUCACCUUGG AGAGCUUCAG |
| 117 | CR003226 | Exon 4 | Chr14: 94379452-94379474 | UCUCACCUUG GAGAGCUUCA |
| 118 | CR003227 | Exon 4 | Chr14: 94379451-94379473 | AUCUCACCUU GGAGAGCUUC |
| 119 | CR003235 | Exon 5 | Chr14: 94378525-94378547 | UUGUUGAACU UGACCUCGGG |
| 120 | CR003236 | Exon 5 | Chr14: 94378524-94378546 | UUUGUUGAAC UUGACCUCGG |
| 121 | CR003237 | Exon 5 | Chr14: 94378523-94378545 | GUUUGUUGAA CUUGACCUCG |
| 122 | CR003238 | Exon 5 | Chr14: 94378522-94378544 | GGUUUGUUGA ACUUGACCUC |
| 123 | CR003240 | Exon 5 | Chr14: 94378501-94378523 | UCAAUCAUUA AGAAGACAAA |
| 124 | CR003241 | Exon 5 | Chr14: 94378500-94378522 | UUCAAUCAUU AAGAAGACAA |
| 125 | CR003242 | Exon 5 | Chr14: 94378472-94378494 | UACCAAGUCU CCCCUCUUCA |
| 126 | CR003243 | Exon 5 | Chr14: 94378471-94378493 | ACCAAGUCUC CCCUCUUCAU |

TABLE 1-continued

SERPINA1 targeted and control guide sequence nomenclature, chromosomal coordinates, and sequence

| SEQ ID No | Guide ID | Description | Chromosomal coordinates | Guide Sequences |
|---|---|---|---|---|
| 127 | CR003244 | Exon 5 | Chr14: 94378463-94378485 | UCCCCUCUUC AUGGGAAAAG |
| 128 | CR003245 | Exon 5 | Chr14: 94378461-94378483 | CACCACUUUU CCCAUGAAGA |
| 129 | CR003246 | Exon 5 | Chr14: 94378460-94378482 | UCACCACUUU UCCCAUGAAG |

Each of the Guide Sequences above may further comprise additional nucleotides to form a crRNA, e.g., with the following exemplary nucleotide sequence following the Guide Sequence at its 3' end: GUUUUAGAGCUAUGCU-GUUUUG (SEQ ID NO: 140). In the case of a sgRNA, the above Guide Sequences may further comprise additional nucleotides to form a sgRNA, e.g., with the following exemplary nucleotide sequence following the 3' end of the Guide Sequence: GUUUUAGAGCUA-GAAAUAGCAAGUUAAAAUAAGGCUAGU-CCGUUAUCAACUU GAAAAAGUGGCACCGAGUCG-GUGCUUUU (SEQ ID NO: 141) in 5' to 3' orientation.

In some embodiments, the sgRNA is modified. In some embodiments, the modified sgRNA comprises any one of the sequences recited in Table 2 (SEQ ID Nos: 130-139, 408, and 410-421). In Table 2, "N" may be any natural or non-natural nucleotide. In some embodiments, compositions comprising SEQ ID NO: 130 are encompassed wherein each N in SEQ ID NO: 130 is collectively replaced with a guide sequence selected from SEQ ID NOs: 5-129, wherein the modification pattern shown in SEQ ID NO: 130 remains.

In some embodiments, compositions comprising SEQ ID NO: 410 are encompassed wherein each N in SEQ ID NO: 410 is collectively replaced with a guide sequence selected from SEQ ID NOs: 5-129, wherein the modification pattern shown in SEQ ID NO: 410 remains.

In some embodiments, compositions comprising SEQ ID NO: 411 are encompassed wherein each N in SEQ ID NO: 411 is collectively replaced with a guide sequence selected from SEQ ID NOs: 5-129, wherein the modification pattern shown in SEQ ID NO: 411 remains.

In some embodiments, compositions comprising SEQ ID NO: 412 are encompassed wherein each N in SEQ ID NO: 412 is collectively replaced with a guide sequence selected from SEQ ID NOs: 5-129, wherein the modification pattern shown in SEQ ID NO: 412 remains.

In some embodiments, compositions comprising SEQ ID NO: 413 are encompassed wherein each N in SEQ ID NO: 413 is collectively replaced with a guide sequence selected from SEQ ID NOs: 5-129, wherein the modification pattern shown in SEQ ID NO: 413 remains.

In some embodiments, compositions comprising SEQ ID NO: 414 are encompassed wherein each N in SEQ ID NO: 414 is collectively replaced with a guide sequence selected from SEQ ID NOs: 5-129, wherein the modification pattern shown in SEQ ID NO: 414 remains.

In some embodiments, compositions comprising SEQ ID NO: 415 are encompassed wherein each N in SEQ ID NO: 415 is collectively replaced with a guide sequence selected from SEQ ID NOs: 5-129, wherein the modification pattern shown in SEQ ID NO: 415 remains.

In some embodiments, compositions comprising SEQ ID NO: 416 are encompassed wherein each N in SEQ ID NO: 416 is collectively replaced with a guide sequence selected from SEQ ID NOs: 5-129, wherein the modification pattern shown in SEQ ID NO: 416 remains.

In some embodiments, compositions comprising SEQ ID NO: 417 are encompassed wherein each N in SEQ ID NO: 417 is collectively replaced with a guide sequence selected from SEQ ID NOs: 5-129, wherein the modification pattern shown in SEQ ID NO: 417 remains.

In some embodiments, compositions comprising SEQ ID NO: 418 are encompassed wherein each N in SEQ ID NO: 418 is collectively replaced with a guide sequence selected from SEQ ID NOs: 5-129, wherein the modification pattern shown in SEQ ID NO: 418 remains.

In some embodiments, compositions comprising SEQ ID NO: 419 are encompassed wherein each N in SEQ ID NO: 419 is collectively replaced with a guide sequence selected from SEQ ID NOs: 5-129, wherein the modification pattern shown in SEQ ID NO: 419 remains.

In some embodiments, compositions comprising SEQ ID NO: 420 are encompassed wherein each N in SEQ ID NO: 420 is collectively replaced with a guide sequence selected from SEQ ID NOs: 5-129, wherein the modification pattern shown in SEQ ID NO: 420 remains.

In some embodiments, compositions comprising SEQ ID NO: 421 are encompassed wherein each N in SEQ ID NO: 421 is collectively replaced with a guide sequence selected from SEQ ID NOs: 5-129, wherein the modification pattern shown in SEQ ID NO: 421 remains.

TABLE 2

SERPINA1 targeted sgRNAs

| SEQ ID | sgRNA ID | Description | Sequence |
|---|---|---|---|
| 130 | Mod Only-N | sgRNA modified sequence | mN*mN*mN*NNNNNNNNNNNNNNNNNNNNGUUUUAGAmGmCm UmAmGmAmAmAmUmAmGmCAAGUUAAAAUAAGGCUAGU CCGUUAUCAmAmCmUmUmGmAmAmAmAmAmGmUmGmGm CmAmCmCmGmAmGmUmCmGmGmUmGmCmU*mU*mU*mU |
| 408 | Mod-Only | sgRNA modified sequence | GUUUUAGAmGmCmUmAmGmAmAmAmUmAmGmCAAGUUA AAAUAAGGCUAGUCCGUUAUCAmAmCmUmUmGmAmAmA mAmAmGmUmGmGmCmAmCmCmGmAmGmUmCmGmGmUm GmCmU*mU*mU*mU |

TABLE 2-continued

SERPINA1 targeted sgRNAs

| SEQ ID | sgRNA ID | Description | Sequence |
|---|---|---|---|
| 131 | G000407 | sgRNA modified sequence | mA*mG*mC*CAGCUCCAGCUGACCACGUUUUAGAmGmCmU mAmGmAmAmAmUmAmGmCAAGUUAAAAUAAGGCUAGUC CGUUAUCAmAmCmUmUmGmAmAmAmAmAmGmUmGmC mAmCmCmGmAmGmUmCmGmGmUmGmCmU*mU*mU*mU |
| 132 | G000408 | sgRNA modified sequence | mG*mC*mU*GAGGAACAGGCCAUUGCGUUUUAGAmGmCm UmAmGmAmAmAmUmAmGmCAAGUUAAAAUAAGGCUAGU CCGUUAUCAmAmCmUmUmGmAmAmAmAmAmGmUmGm CmAmCmCmGmAmGmUmCmGmGmUmGmCmU*mU*mU*mU |
| 133 | G000409 | sgRNA modified sequence | mA*mC*mU*CACGAUGAAAUCCUGGAGUUUUAGAmGmCm UmAmGmAmAmAmUmAmGmCAAGUUAAAAUAAGGCUAGU CCGUUAUCAmAmCmUmUmGmAmAmAmAmAmGmUmGm CmCmCmGmAmGmUmCmGmGmUmGmCmU*mU*mU*mU |
| 134 | G000410 | sgRNA modified sequence | mU*mU*mG*GGUGAUCCUGAUCAUGGGUUUUAGAmGmCm UmAmGmAmAmAmUmAmGmCAAGUUAAAAUAAGGCUAGU CCGUUAUCAmAmCmUmUmGmAmAmAmAmAmGmUmGm CmCmCmGmAmGmUmCmGmGmUmGmCmU*mU*mU*mU |
| 135 | G000411 | sgRNA modified sequence | mU*mG*mG*GUGAUCCUGAUCAUGGUGUUUUAGAmGmCm UmAmGmAmAmAmUmAmGmCAAGUUAAAAUAAGGCUAGU CCGUUAUCAmAmCmUmUmGmAmAmAmAmAmGmUmGm CmCmCmGmAmGmUmCmGmGmUmGmCmU*mU*mU*mU |
| 136 | G000412 | sgRNA modified sequence | mG*mA*mU*CUGUUUCUUGGCCUCUUGUUUUAGAmGmCm UmAmGmAmAmAmUmAmGmCAAGUUAAAAUAAGGCUAGU CCGUUAUCAmAmCmUmUmGmAmAmAmAmAmGmUmGm CmCmCmGmAmGmUmCmGmGmUmGmCmU*mU*mU*mU |
| 137 | G000413 | sgRNA modified sequence | mG*mA*mA*GGCGAACUCAGCCAGGUGUUUUAGAmGmCm UmAmGmAmAmAmUmAmGmCAAGUUAAAAUAAGGCUAGU CCGUUAUCAmAmCmUmUmGmAmAmAmAmAmGmUmGm CmCmCmGmAmGmUmCmGmGmUmGmCmU*mU*mU*mU |
| 138 | G000414 | sgRNA modified sequence | mC*mA*mA*CCUCACGGAGAUUCCGGGUUUUAGAmGmCm UmAmGmAmAmAmUmAmGmCAAGUUAAAAUAAGGCUAGU CCGUUAUCAmAmCmUmUmGmAmAmAmAmAmGmUmGm CmCmCmGmAmGmUmCmGmGmUmGmCmU*mU*mU*mU |
| 139 | G000415 | sgRNA modified sequence | mU*mG*mU*UGGACUGGUGUGCCAGCGUUUUAGAmGmCm UmAmGmAmAmAmUmAmGmCAAGUUAAAAUAAGGCUAGU CCGUUAUCAmAmCmUmUmGmAmAmAmAmAmGmUmGm CmCmCmGmAmGmUmCmGmGmUmGmCmU*mU*mU*mU |
| 410 | G000537/G 211-33 (mod only) | 5'end 3xOMePS | mN*mN*mN*NNNNNNNNNNNNNNNNNNNGUUUUAGAmGmCm UmAmGmAmAmAmUmAmGmCAAGUUAAAAUAAGGCUAGU CCGUUAUCAmAmCmUmUmGmAmAmAmAmAmGmUmGm CmCmCmGmAmGmUmCmGmGmUmGmCmUmUmU |
| 411 | G000538/G 211-34 (mod only) | 3'end 3xOMePS | mNmNmNNNNNNNNNNNNNNNNNNNGUUUUAGAmGmCmUm AmGmAmAmAmUmAmGmCAAGUUAAAAUAAGGCUAGUCC GUUAUCAmAmCmUmGmAmAmAmAmAmGmUmGmC mAmCmCmGmAmGmUmCmGmGmUmGmCmU*mU*mU*mU |
| 412 | G000539/G 211-35 (mod only) | 5xOMePS | mN*mN*mN*mN*mN*NNNNNNNNNNNNNNNGUUUUAGAm GmCmUmAmGmAmAmAmUmAmGmCAAGUUAAAAUAAGG CUAGUCCGUUAUCAmAmCmUmUmGmAmAmAmAmAmGmUm GmCmAmCmCmGmAmGmUmCmGmGmUmGmUmG*mC*mU*mU* mU*mU |
| 413 | G000541/G 211-37 (mod only) | 3xOMePS+2 PS | mN*mN*mN*N*N*NNNNNNNNNNNNNNNGUUUUAGAmGmC mUmAmGmAmAmAmUmAmGmCAAGUUAAAAUAAGGCUAG UCCGUUAUCAmAmCmUmUmGmAmAmAmAmAmGmUmGmG mCmAmCmCmGmAmGmUmCmGmGmUmG*mC*mU*mU*mU* mU |
| 414 | G000542/G 211-38 (mod only) | 3xOMePS+7 PS | mN*mN*mN*N*N*N*N*N*N*NNNNNNNNNNNGUUUUAGA mGmCmUmAmGmAmAmAmUmAmGmCAAGUUAAAAUAAGG CUAGUCCGUUAUCAmAmCmUmUmGmAmAmAmAmAmGmU mGmGmCmAmCmCmCmGmAmGmU*mC*mG*mG*mU*mG*mC*m U*mU*mU*mU |

TABLE 2-continued

SERPINA1 targeted sgRNAs

| SEQ ID | sgRNA ID | Description | Sequence |
|---|---|---|---|
| 415 | G000543/G211-39 (mod only) | invd abasic | (invd) NNNNNNNNNNNNNNNNNNNNGUUUAGAmGmCmUmAmG mAmAmAmUmAmGmCAAGUUAAAAUAAGGCUAGUCCGUU AUCAmAmCmUmUmGmAmAmAmAmAmGmUmGmGmCmAm CmCmGmAmGmUmCmGmGmUmGmCmUmUmU(invd) |
| 416 | G000544/G211-40 (mod only) | invd abasic 3xOMePS | (invd)mN*mN*mN*NNNNNNNNNNNNNNNNNNNGUUUAGAmG mCmUmAmGmAmAmAmUmAmGmCAAGUUAAAAUAAGGCU AGUCCGUUAUCAmAmCmUmUmGmAmAmAmAmAmGmUmG mGmCmAmCmCmGmAmGmUmCmGmGmUmGmCmU*mU*mU *mU(invd) |
| 417 | G000564/G211-42 (mod only) | 3xMOE-PS | moeN*moeN*moeN*NNNNNNNNNNNNNNNNNNNGUUUAGAm GmCmUmAmGmAmAmAmUmAmGmCAAGUUAAAAUAAGGC UAGUCCGUUAUCAmAmCmUmUmGmAmAmAmAmAmGmUm GmGmCmAmCmCmGmAmGmUmCmGmGmUmGmCmoeU*moe U*moeU*mU |
| 418 | G000545/G211-43 (mod only) | US loop PS | mN*mN*mN*NNNNNNNNNNNNNNNNNNNGUUUAGAmGmCm UmA*mG*mA*mA*mA*mUmAmGmCAAGUUAAAAUAAGGC UAGUCCGUUAUCAmAmCmUmUmGmAmAmAmAmAmGmUm GmGmCmAmCmCmGmAmGmUmCmGmGmUmGmCmU*mU*m U*mU |
| 419 | G000546/G211-44 (mod only) | H1 loop PS | mN*mN*mN*NNNNNNNNNNNNNNNNNNNGUUUAGAmGmCm UmAmGmAmAmAmUmAmGmCAAGUUAAAAUAAGGCUAGU CCGUUAUCAmAmCmUmU*mG*mA*mA*mA*mAmAmGmUm GmGmCmAmCmCmGmAmGmUmCmGmGmUmGmCmU*mU*m U*mU |
| 420 | G000547/G211-45 (mod only) | H2 loop PS | mN*mN*mN*NNNNNNNNNNNNNNNNNNNGUUUAGAmGmCm UmAmGmAmAmAmUmAmGmCAAGUUAAAAUAAGGCUAGU CCGUUAUCAmAmCmUmUmGmAmAmAmAmAmGmUmGmGm CmAmCmCmG*mA*mG*mU*mCmGmGmUmGmCmU*mU*mU* mU |
| 421 | G000548/G211-46 (mod only) | all loops PS | mN*mN*mN*NNNNNNNNNNNNNNNNNNNGUUUAGAmGmCm UmA*mG*mA*mA*mA*mUmAmGmCAAGUUAAAAUAAGGC UAGUCCGUUAUCAmAmCmUmU*mG*mA*mA*mA*mAmAm GmUmGmGmCmAmCmCmG*mA*mG*mU*mCmGmGmUmGmC mU*mU*mU*mU |

*= PS linkage; 'm' = 2'-O-Me nucleotide

Unless stated otherwise, the following terms and phrases as used herein are intended to have the following meanings:

"Polynucleotide" and "nucleic acid" are used herein to refer to a multimeric compound comprising nucleosides or nucleoside analogs which have nitrogenous heterocyclic bases or base analogs linked together along a backbone, including conventional RNA, DNA, mixed RNA-DNA, and polymers that are analogs thereof. A nucleic acid "backbone" can be made up of a variety of linkages, including one or more of sugar-phosphodiester linkages, peptide-nucleic acid bonds ("peptide nucleic acids" or PNA; PCT No. WO 95/32305), phosphorothioate linkages, methylphosphonate linkages, or combinations thereof. Sugar moieties of a nucleic acid can be ribose, deoxyribose, or similar compounds with substitutions, e.g., 2' methoxy or 2' halide substitutions. Nitrogenous bases can be conventional bases (A, G, C, T, U), analogs thereof (e.g., modified uridines such as 5-methoxyuridine, pseudouridine, or N1-methylpseudouridine, or others); inosine; derivatives of purines or pyrimidines (e.g., N4-methyl deoxyguanosine, deaza- or aza-purines, deaza- or aza-pyrimidines, pyrimidine bases with substituent groups at the 5 or 6 position (e.g., 5-methylcytosine), purine bases with a substituent at the 2, 6, or 8 positions, 2-amino-6-methylaminopurine, 06-methylguanine, 4-thio-pyrimidines, 4-amino-pyrimidines, 4-dimethylhydrazine-pyrimidines, and 04-alkyl-pyrimidines; U.S. Pat. No. 5,378,825 and PCT No. WO 93/13121). For general discussion see The Biochemistry of the Nucleic Acids 5-36, Adams et al., ed., 11th ed., 1992). Nucleic acids can include one or more "abasic" residues where the backbone includes no nitrogenous base for position(s) of the polymer (U.S. Pat. No. 5,585,481). A nucleic acid can comprise only conventional RNA or DNA sugars, bases and linkages, or can include both conventional components and substitutions (e.g., conventional bases with 2' methoxy linkages, or polymers containing both conventional bases and one or more base analogs). Nucleic acid includes "locked nucleic acid" (LNA), an analogue containing one or more LNA nucleotide monomers with a bicyclic furanose unit locked in an RNA mimicking sugar conformation, which enhance hybridization affinity toward complementary RNA and DNA sequences (Vester and Wengel, 2004, Biochemistry 43(42): 13233-41). RNA and DNA have different sugar moieties and can differ by the presence of uracil or analogs thereof in RNA and thymine or analogs thereof in DNA.

"Guide RNA", "gRNA", and simply "guide" are used herein interchangeably to refer to either a crRNA (also known as CRISPR RNA), or the combination of a crRNA and a trRNA (also known as tracrRNA). The crRNA and trRNA may be associated as a single RNA molecule (single guide RNA, sgRNA) or in two separate RNA molecules (dual guide RNA, dgRNA). "Guide RNA" or "gRNA" or "guide" refers to each type. The trRNA may be a naturally-occurring sequence, or a trRNA sequence with modifications or variations compared to naturally-occurring sequences.

As used herein, a "guide sequence" refers to a sequence within a guide RNA that is complementary to a target sequence and functions to direct a guide RNA to a target sequence for binding or modification (e.g., cleavage) by an RNA-guided DNA binding agent. A "guide sequence" may also be referred to as a "targeting sequence," or a "spacer sequence." A guide sequence can be 20 base pairs in length, e.g., in the case of a guide RNA for a *Streptococcus pyogenes* Cas9 (i.e., Spy Cas9) and related Cas9 homologs/orthologs. Shorter or longer sequences can also be used as guides, e.g., 15-, 16-, 17-, 18-, 19-, 21-, 22-, 23-, 24-, or 25-nucleotides in length. In some embodiments, the target sequence is in a gene or on a chromosome, for example, and is complementary to the guide sequence. In some embodiments, the degree of complementarity or identity between a guide sequence and its corresponding target sequence may be about 75%, 80%, 85%, 90%, 95%, 96%, 97%, 98%, 99%, or 100%. In some embodiments, the guide sequence and the target region may be 100% complementary or identical. In other embodiments, the guide sequence and the target region may contain at least one mismatch. For example, the guide sequence and the target sequence may contain 1, 2, 3, or 4 mismatches, where the total length of the target sequence is at least 17, 18, 19, 20 or more base pairs. In some embodiments, the guide sequence and the target region may contain 1-4 mismatches where the guide sequence comprises at least 17, 18, 19, 20 or more nucleotides. In some embodiments, the guide sequence and the target region may contain 1, 2, 3, or 4 mismatches where the guide sequence comprises 20 nucleotides.

Target sequences for Cas proteins include both the positive and negative strands of genomic DNA (i.e., the sequence given and the sequence's reverse compliment), as a nucleic acid substrate for a Cas protein is a double stranded nucleic acid. Accordingly, where a guide sequence is said to be "complementary to a target sequence", it is to be understood that the guide sequence may direct a guide RNA to bind to the reverse complement of a target sequence. Thus, in some embodiments, where the guide sequence binds the reverse complement of a target sequence, the guide sequence is identical to certain nucleotides of the target sequence (e.g., the target sequence not including the PAM) except for the substitution of U for T in the guide sequence.

As used herein, an "RNA-guided DNA binding agent" means a polypeptide or complex of polypeptides having RNA and DNA binding activity, or a DNA-binding subunit of such a complex, wherein the DNA binding activity is sequence-specific and depends on the sequence of the RNA. RNA-guided DNA binding agents include Cas proteins (e.g., Cas9 proteins), such as Cas nucleases (e.g., Cas9 nucleases). "Cas nuclease", also called "Cas protein", as used herein, encompasses Cas cleavases, Cas nickases, and inactivated forms thereof ("dCas DNA binding agents"). Cas proteins further encompass a Csm or Cmr complex of a type III CRISPR system, the Cas10, Csm1, or Cmr2 subunit thereof, a Cascade complex of a type I CRISPR system, the Cas3 subunit thereof, and Class 2 Cas nucleases. As used herein, a "Class 2 Cas nuclease" is a single-chain polypeptide with RNA-guided DNA binding activity, such as a Cas9 nuclease or a Cpf1 nuclease. Class 2 Cas nucleases include Class 2 Cas cleavases/nickases (e.g., H840A, D10A, or N863A variants), which further have RNA-guided DNA cleavase or nickase activity, and Class 2 dCas DNA binding agents, in which cleavase/nickase activity is inactivated. Class 2 Cas nucleases include, for example, Cas9, Cpf1, C2c1, C2c2, C2c3, HF Cas9 (e.g., N497A/R661A/Q695A/Q926A variants), HypaCas9 (e.g., N692A/M694A/Q695A/H698A variants), eSPCas9(1.0) (e.g., K810A/K1003A/R1060A variants), and eSPCas9(1.1) (e.g., K848A/K1003A/R1060A variants) proteins and modifications thereof. Cpf1 protein, Zetsche et al., Cell, 163: 1-13 (2015), is homologous to Cas9, and contains a RuvC-like nuclease domain. The Cpf1 sequences of Zetsche et al. are incorporated by reference in their entirety. See, e.g., Zetsche et al. at Tables S1 and S3. "Cas9" encompasses Spy Cas9, the variants of Cas9 listed herein, and equivalents thereof. See, e.g., Makarova et al., Nat Rev Microbiol, 13(11): 722-36 (2015); Shmakov et al., Molecular Cell, 60:385-397 (2015).

As used herein, a first sequence is considered to "comprise a sequence with at least X % identity to" a second sequence if an alignment of the first sequence to the second sequence shows that X % or more of the positions of the second sequence in its entirety are matched by the first sequence. For example, the sequence AAGA comprises a sequence with 100% identity to the sequence AAG because an alignment would give 100% identity in that there are matches to all three positions of the second sequence. The differences between RNA and DNA (generally the exchange of uridine for thymidine or vice versa) and the presence of nucleoside analogs such as modified uridines do not contribute to differences in identity or complementarity among polynucleotides as long as the relevant nucleotides (such as thymidine, uridine, or modified uridine) have the same complement (e.g., adenosine for all of thymidine, uridine, or modified uridine; another example is cytosine and 5-methylcytosine, both of which have guanosine or modified guanosine as a complement). Thus, for example, the sequence 5'-AXG where X is any modified uridine, such as pseudouridine, N1-methyl pseudouridine, or 5-methoxyuridine, is considered 100% identical to AUG in that both are perfectly complementary to the same sequence (5'-CAU). Exemplary alignment algorithms are the Smith-Waterman and Needleman-Wunsch algorithms, which are well-known in the art. One skilled in the art will understand what choice of algorithm and parameter settings are appropriate for a given pair of sequences to be aligned; for sequences of generally similar length and expected identity >50% for amino acids or >75% for nucleotides, the Needleman-Wunsch algorithm with default settings of the Needleman-Wunsch algorithm interface provided by the EBI at the www.ebi.ac.uk web server is generally appropriate.

"mRNA" is used herein to refer to a polynucleotide that is not DNA and comprises an open reading frame that can be translated into a polypeptide (i.e., can serve as a substrate for translation by a ribosome and amino-acylated tRNAs). mRNA can comprise a phosphate-sugar backbone including ribose residues or analogs thereof, e.g., 2'-methoxy ribose residues. In some embodiments, the sugars of an mRNA phosphate-sugar backbone consist essentially of ribose residues, 2'-methoxy ribose residues, or a combination thereof. In general, mRNAs do not contain a substantial quantity of thymidine residues (e.g., 0 residues or fewer than 30, 20, 10, 5, 4, 3, or 2 thymidine residues; or less than 10%, 9%, 8%, 7%, 6%, 5%, 4%, 4%, 3%, 2%, 1%, 0.5%, 0.2%, or 0.1% thymidine content). An mRNA can contain modified uridines at some or all of its uridine positions.

As used herein, "AAT" or "A1AT" refer to alpha-1 antitrypsin, which is the gene product of the SERPINA1 gene.

As used herein, "AATD" or "A1AD" refers to alpha-1 antitrypsin deficiency. AATD comprises diseases and disorders caused by a variety of different genetic mutations in SERPINA1. AATD may refer to a disease where decreased levels of AAT are expressed, AAT is not expressed, or a mutant or non-functional AAT is expressed.

Guide sequences useful in the guide RNA compositions and methods described herein are shown in Table 1.

As used herein, "indels" refer to insertion/deletion mutations consisting of a number of nucleotides that are either inserted or deleted at the site of double-stranded breaks (DSBs) in the nucleic acid.

As used herein, "knockdown" refers to a decrease in expression of a particular gene product (e.g., protein, mRNA, or both). Knockdown of a protein can be measured either by detecting protein secreted by tissue or population of cells (e.g., in serum or cell media) or by detecting total cellular amount of the protein from a tissue or cell population of interest. Methods for measuring knockdown of mRNA are known, and include sequencing of mRNA isolated from a tissue or cell population of interest. In some embodiments, "knockdown" may refer to some loss of expression of a particular gene product, for example a decrease in the amount of mRNA transcribed or a decrease in the amount of protein expressed or secreted by a population of cells (including in vivo populations such as those found in tissues).

As used herein, "knockout" refers to a loss of expression of a particular protein in a cell. Knockout can be measured either by detecting the amount of protein secretion from a tissue or population of cells (e.g., in serum or cell media) or by detecting total cellular amount of a protein a tissue or a population of cells. In some embodiments, the methods of the invention "knockout" AAT in one or more cells (e.g., in a population of cells including in vivo populations such as those found in tissues). In some embodiments, a knockout is not the formation of mutant AAT protein, for example, created by indels, but rather the complete loss of expression of AAT protein in a cell.

As used herein, "mutant AAT" refers to a gene product of SERPINA1 (i.e., the AAT protein) having a change in the amino acid sequence of AAT compared to the wildtype amino acid sequence of SERPINA1 (NCBI Gene ID: 5265; Ensembl: Ensembl:ENSG00000197249).

As used herein, "mutant SERPINA1" or "mutant SERPINA1 allele" refers to a SERPINA1 sequence having a change in the nucleotide sequence of SERPINA1 compared to the wildtype sequence (NCBI Gene ID: 5265; Ensembl: Ensembl:ENSG00000197249).

As used herein, "ribonucleoprotein" (RNP) or "RNP complex" refers to a guide RNA together with an RNA-guided DNA binding agent, such as a Cas protein. In some embodiments, the guide RNA guides an RNA-guided DNA binding agent such as Cas9 to a target sequence, and the guide RNA hybridizes with and an RNA-guided DNA binding agent cleaves the target sequence.

As used herein, a "target sequence" refers to a sequence of nucleic acid in a target gene that has complementarity to the guide sequence of the gRNA. The interaction of the target sequence and the guide sequence directs an RNA-guided DNA binding agent to bind, and potentially nick or cleave (depending on the activity of the agent), within the target sequence.

As used herein, "treatment" refers to any administration or application of a therapeutic for disease or disorder in a subject, and includes inhibiting the disease, arresting its development, relieving one or more symptoms of the disease, curing the disease, or preventing reoccurrence of one or more symptoms of the disease. For example, treatment of AATD may comprise alleviating symptoms of AATD.

As used herein, the "Z mutant", "Z form mutant", "Z variant", "PiZ variant", or the "ZZ-form" of AAT refer to a mutation in the SERPINA1 gene sequence that leads to a missense mutation of glutamic acid to lysine (E342K mutation) in the amino acid sequence of AAT.

The term "about" or "approximately" means an acceptable error for a particular value as determined by one of ordinary skill in the art, which depends in part on how the value is measured or determined.

I. Compositions

A. Guide RNA (gRNAs)

In some embodiments, the invention comprises a composition comprising one or more guide RNA (gRNA) comprising guide sequences that direct a RNA-guided DNA binding agent (e.g., Cas9) to a target DNA sequence in SERPINA1. The gRNA may comprise one or more of the guide sequences shown in Table 1. The guide sequences of Table 1 may further comprise a crRNA and/or a trRNA. In each composition and method embodiment described herein, the crRNA and trRNA may be associated on one RNA (sgRNA), or may be on separate RNAs (dgRNA).

In each of the composition and method embodiments described herein, the guide RNA may comprise two RNA molecules as a "dual guide RNA" or "dgRNA". The dgRNA comprises a first RNA molecule (e.g. a crRNA) comprising a guide sequence comprising any one of the guide sequences described in Table 1, and a second RNA molecule comprising a trRNA. The first and second RNA molecules are not covalently linked, but may form a RNA duplex via the base pairing between portions of the crRNA and the trRNA.

In each of the composition and method embodiments described herein, the guide RNA may comprise a single RNA molecule as a "single guide RNA" or "sgRNA". The sgRNA comprises a crRNA (or a portion thereof) comprising any one of the guide sequences described in Table 1 covalently linked to a trRNA (or a portion thereof). In some embodiments, the crRNA and the trRNA are covalently linked via a linker. In some embodiments, the sgRNA forms a stem-loop structure via the base pairing between portions of the crRNA and the trRNA.

In some embodiments, the trRNA may comprise all or a portion of a wild type trRNA sequence from a naturally-occurring CRISPR/Cas system. In some embodiments, the trRNA comprises a truncated or modified wild type trRNA. The length of the trRNA depends on the CRISPR/Cas system used. In some embodiments, the trRNA comprises or consists of 5, 6, 7, 8, 9, 10, 11, 12, 13, 14, 15, 16, 17, 18, 19, 20, 25, 30, 40, 50, 60, 70, 80, 90, 100, or more than 100 nucleotides. In some embodiments, the trRNA may comprise certain secondary structures, such as, for example, one or more hairpin or stem-loop structures, or one or more bulge structures.

In some embodiments, the invention comprises one or more guide RNAs comprising a guide sequence of any one of SEQ ID NOs: 5-129.

In one aspect, the invention comprises a gRNA that comprises a guide sequence that is at least 99%, 98%, 97%, 96%, 95%, 94%, 93%, 92%, 91%, or 90% identical to a sequence selected from SEQ ID NOs: 5-129.

In other embodiments, the composition comprises at least two gRNA's comprising guide sequences selected from any two or more of the guide sequences of SEQ ID NOs: 5-129.

In some embodiments, the composition comprises at least two gRNA's that each are at least 99%, 98%, 97%, 96%, 95%, 94%, 93%, 92%, 91%, or 90% identical to any of the nucleic acids of SEQ ID NOs: 5-129.

In some embodiments, the gRNA is a sgRNA comprising any one of the sequences shown in Table 2 (SEQ ID Nos. 130-139, 408, and 410-421). In some embodiments, the sgRNA comprises a sequence that is at least 99%, 98%, 97%, 96%, 95%, 94%, 93%, 92%, 91%, or 90% identical to any of the nucleic acids of SEQ ID Nos. 130-139, and 408. In some embodiments, the sgRNA comprises any one of the guide sequences shown in Table 1 in place of the guide sequences shown in the sgRNA sequences of Table 2 at SEQ ID Nos: 130-139, 408, and 410-421 with or without the modifications.

Guide RNAs are encompassed that comprise the modifications of any of the sequences shown in Table 2, and identified therein by SEQ ID No. That is, the nucleotides may be the same or different, but the modification pattern shown may be the same or similar to a modification pattern of a gRNA of Table 2. A modification pattern includes the relative position and identity of modifications of the gRNA or a region of the gRNA. In some embodiments, the modification pattern is at least 50%, 55%, 60%, 70%, 75%, 80%, 85%, 90%, 95%, 96%, 97%, 98%, and 99% identical to the modification pattern of any one of the sequences shown in the sequence column of Table 2. In some embodiments, the modification pattern differs from the modification pattern of a sequence of Table 2, or a region of such a sequence, at 0, 1, 2, 3, 4, 5, or 6 nucleotides. In some embodiments, the gRNA comprises modifications that differ from the modifications of a sequence of Table 2, at 0, 1, 2, 3, 4, 5, or 6 nucleotides.

The guide RNA compositions of the present invention are designed to recognize a target sequence in the SERPINA1 gene. For example, the SERPINA1 target sequence may be recognized and cleaved by the provided RNA-guided DNA binding agent. In some embodiments, a Cas protein may be directed by a guide RNA to a target sequence of the SERPINA1 gene, where the guide sequence of the guide RNA hybridizes with the target sequence and the Cas protein cleaves the target sequence.

In some embodiments, the selection of the one or more guide RNAs is determined based on target sequences within the SERPINA1 gene.

Without being bound by any particular theory, mutations in critical regions of the gene may be less tolerable than mutations in non-critical regions of the gene, thus the location of a DSB is an important factor in the amount or type of protein knockdown or knockout that may result. In some embodiments, a gRNA complementary or having complementarity to a target sequence within SERPINA1 is used to direct the Cas protein to a particular location in the SERPINA1 gene. In some embodiments, gRNAs are designed to have guide sequences that are complementary or have complementarity to target sequences in exons 2, 3, 4, or 5 of SERPINA1.

In some embodiments, gRNAs are designed to be complementary or have complementarity to target sequences in exons of SERPINA1 that code for the N-terminal region of AAT.

B. Chemically Modified gRNAs

In some embodiments, the invention comprises a gRNA comprising one or more modifications. In some embodiments, the modification comprises a 2'-O-methyl (2'-O-Me) modified nucleotide. In some embodiments, the modification comprises a phosphorothioate (PS) bond between nucleotides.

Modified sugars are believed to control the puckering of nucleotide sugar rings, a physical property that influences oligonucleotide binding affinity for complementary strands, duplex formation, and interaction with nucleases. Substitutions on sugar rings can therefore alter the confirmation and puckering of these sugars. For example, 2'-O-methyl (2'-O-Me) modifications can increase binding affinity and nuclease stability of oligonucleotides, though the effect of any modification at a given position in an oligonucleotide needs to be empirically determined.

The terms "mA," "mC," "mU," or "mG" may be used to denote a nucleotide that has been modified with 2'-O-Me.

Modification of 2'-O-methyl can be depicted as follows:

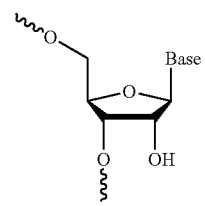

RNA

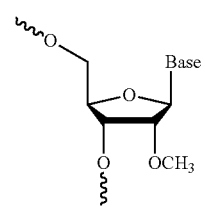

2'-O-Me

Another chemical modification that has been shown to influence nucleotide sugar rings is halogen substitution. For example, 2'-fluoro (2'-F) substitution on nucleotide sugar rings can increase oligonucleotide binding affinity and nuclease stability.

In this application, the terms "fA," "fC," "fU," or "fG" may be used to denote a nucleotide that has been substituted with 2'-F.

Substitution of 2'-F can be depicted as follows:

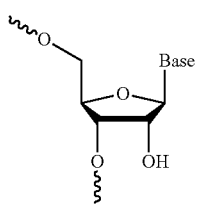

RNA
Natural composition of RNA

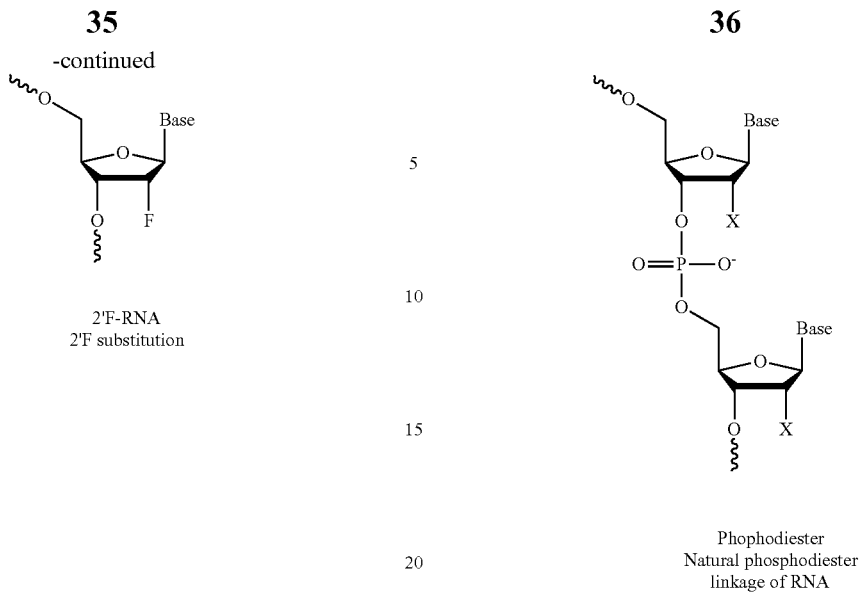

2'F-RNA
2'F substitution

In some embodiments, the modification may be 2'-O-(2-methoxyethyl) (2'-O-moe). Modification of a ribonucleotide as a 2'-O-moe ribonucleotide can be depicted as follows:

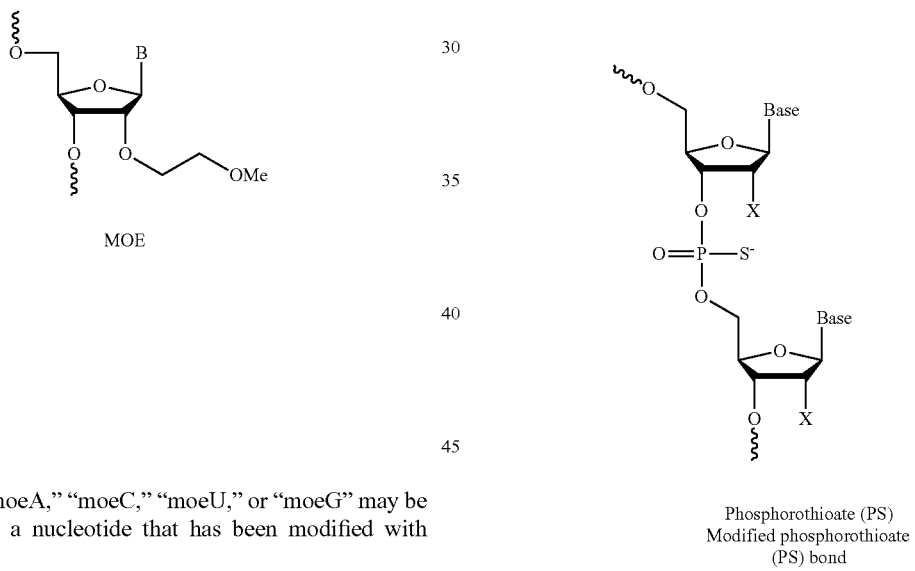

MOE

The terms "moeA," "moeC," "moeU," or "moeG" may be used to denote a nucleotide that has been modified with 2'-O-moe.

Phosphorothioate (PS) linkage or bond refers to a bond where a sulfur is substituted for one nonbridging phosphate oxygen in a phosphodiester linkage, for example in the bonds between nucleotides bases. When phosphorothioates are used to generate oligonucleotides, the modified oligonucleotides may also be referred to as S-oligos.

A "*" may be used to depict a PS modification. In this application, the terms A*, C*, U*, or G* may be used to denote a nucleotide that is linked to the next (e.g., 3') nucleotide with a PS bond.

In this application, the terms "mA*," "mC*," "mU*," or "mG*" may be used to denote a nucleotide that has been substituted with 2'-O-Me and that is linked to the next (e.g., 3') nucleotide with a PS bond.

The diagram below shows the substitution of S— into a nonbridging phosphate oxygen, generating a PS bond in lieu of a phosphodiester bond:

Phophodiester
Natural phosphodiester
linkage of RNA

Phosphorothioate (PS)
Modified phosphorothioate
(PS) bond

Abasic nucleotides refer to those which lack nitrogenous bases. The figure below depicts an oligonucleotide with an abasic (also known as apurinic) site that lacks a base:

Inverted bases refer to those with linkages that are inverted from the normal 5' to 3' linkage (i.e., either a 5' to 5' linkage or a 3' to 3' linkage). For example:

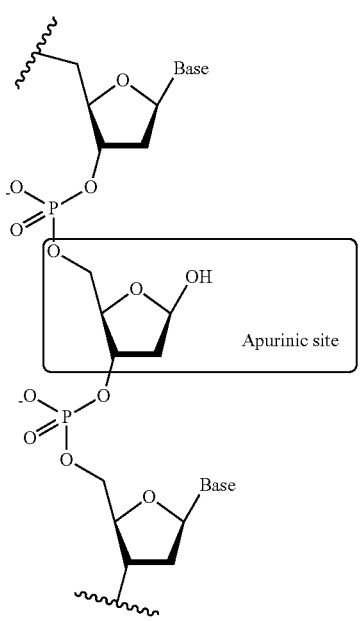

Apurinic site

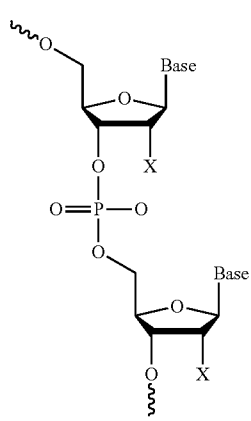

Normal oligonucleotide linkage

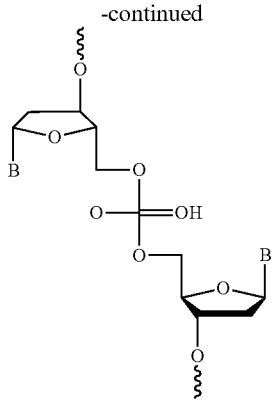

Inverted oligonucleotide linkage

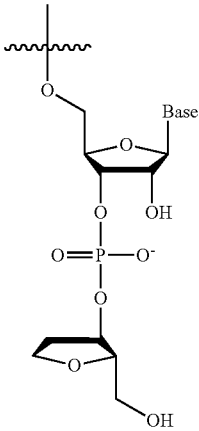

3' inverted abasic

An abasic nucleotide can be attached with an inverted linkage. For example, an abasic nucleotide may be attached to the terminal 5' nucleotide via a 5' to 5' linkage, or an abasic nucleotide may be attached to the terminal 3' nucleotide via a 3' to 3' linkage. An inverted abasic nucleotide at either the terminal 5' or 3' nucleotide may also be called an inverted abasic end cap.

In some embodiments, one or more of the first three, four, or five nucleotides at the 5' end of the 5' terminus, and one or more of the last three, four, or five nucleotides at the 3' end of the 3' terminus are modified. In some embodiments, the modification is a 2'-O-Me, 2'-F, 2'-O-moe, inverted abasic nucleotide, PS bond, or other nucleotide modification well known in the art to increase stability and/or performance.

In some embodiments, the first four nucleotides at the 5' end of the 5' terminus, and the last four nucleotides at the 3' end of the 3' terminus are linked with phosphorothioate (PS) bonds.

In some embodiments, the first three nucleotides at the 5' end of the 5' terminus, and the last three nucleotides at the 3' end of the 3' terminus comprise a 2'-O-methyl (2'-O-Me) modified nucleotide. In some embodiments, the first three nucleotides at the 5' end of the 5' terminus, and the last three nucleotides at the 3' end of the 3' terminus comprise a 2'-fluoro (2'-F) modified nucleotide. In some embodiments, the first three nucleotides at the 5' end of the 5' terminus, and the last three nucleotides at the 3' end of the 3' terminus comprise an inverted abasic nucleotide.

In some embodiments, the guide RNA comprises a modified sgRNA. In some embodiments, the sgRNA comprises the modification pattern shown in SEQ ID No: 130, where N is any natural or non-natural nucleotide, and where the totality of the N's comprise a guide sequence that directs a RNA-guided DNA binding agent (e.g., Cas9) to a target sequence. In some embodiments, the sgRNA comprises the modification pattern shown in any one of SEQ ID No: 410-421, where N is any natural or non-natural nucleotide, and where the totality of the N's comprise a guide sequence that directs a RNA-guided DNA binding agent (e.g., Cas9) to a target sequence. In some embodiments, the guide RNA comprises a sgRNA shown in any one of SEQ ID No: 131-139. In some embodiments, the guide RNA comprises a sgRNA comprising any one of the guide sequences of SEQ ID No: 5-129 and the nucleotides of SEQ ID No: 408, wherein the nucleotides of SEQ ID No: 408 are on the 3' end of the guide sequence, and wherein the guide sequence may be modified as shown in SEQ ID No: 130. In some embodiments, the guide RNA comprises a sgRNA comprising any one of the guide sequences of SEQ ID No: 5-129 and the nucleotides of SEQ ID No: 141, wherein the nucleotides of SEQ ID No: 141 are on the 3' end of the guide sequence, and wherein the guide sequence may be modified as shown in SEQ ID No: 130.

In some embodiments, the guide RNAs disclosed herein comprise one of the modification pattern disclosed in U.S. 62/431,756, filed Dec. 8, 2016, and PCT/US17/65306, filed Dec. 8, 2017, titled "Chemically Modified Guide RNAs," the contents of which are hereby incorporated by reference in their entirety.

C. Vectors

In certain embodiments, the invention comprises DNA vectors comprising any of the guide RNAs comprising any one or more of the guide sequences described herein. In some embodiments, in addition to guide RNA sequences, the vectors further comprise nucleic acids that do not encode guide RNAs. Nucleic acids that do not encode guide RNA include, but are not limited to, promoters, enhancers, regulatory sequences, and nucleic acids encoding a RNA-guided DNA binding agent (e.g., Cas9). In some embodiments, the vector comprises a nucleotide sequence encoding a crRNA, a trRNA, or a crRNA and trRNA. In some embodiments, the vector comprises a nucleotide sequence encoding a sgRNA. In some embodiments, the vector comprises a nucleotide sequence encoding a crRNA and an mRNA encoding a Cas protein, such as, Cas9. In some embodiments, the vector comprises a nucleotide sequence encoding a crRNA, a trRNA, and an mRNA encoding a Cas protein, such as, Cas9. In some embodiments, the vector comprises a nucleotide sequence encoding a sgRNA and an mRNA encoding a Cas protein, such as, Cas9. In one embodiment, the Cas9 is from *Streptococcus pyogenes* (i.e., Spy Cas9). In some embodiments, the nucleotide sequence encoding the crRNA, trRNA, or crRNA and trRNA comprises or consists of a guide sequence flanked by all or a portion of a repeat sequence from a naturally-occurring CRISPR/Cas system. The nucleic acid comprising or consisting of the crRNA, trRNA, or crRNA and trRNA may further comprise a vector sequence wherein the vector sequence comprises or consists of nucleic acids that are not naturally found together with the crRNA, trRNA, or crRNA and trRNA.

In some embodiments, the crRNA and the trRNA are encoded by non-contiguous nucleic acids within one vector. In other embodiments, the crRNA and the trRNA may be encoded by a contiguous nucleic acid. In some embodiments, the crRNA and the trRNA are encoded by opposite strands of a single nucleic acid. In other embodiments, the crRNA and the trRNA are encoded by the same strand of a single nucleic acid.

D. Ribonucleoprotein Complex

In some embodiments, a composition is encompassed comprising one or more gRNAs comprising one or more guide sequences from Table 1 or Table 2 and a RNA-guided DNA binding agent (e.g., Cas9). In some embodiments, the gRNA together with DNA binding agent such as a Cas9 is called a ribonucleoprotein complex (RNP). In some embodiments, the RNA-guided DNA binding agent is a Cas protein. In some embodiments, the gRNA together with a Cas protein is called a Cas RNP. In some embodiments, the RNP comprises Type-I, Type-II, or Type-III components. In some embodiments, the Cas protein is from the Type-I CRISPR/Cas system. In some embodiments, the Cas protein is from the Type-II CRISPR/Cas system. In some embodiments, the Cas protein is from the Type-III CRISPR/Cas system. In some embodiments, the Cas protein is Cas9. In some embodiments, the Cas protein is Cpf1. In some embodiments, the Cas protein is the Cas9 protein from the Type-II CRISPR/Cas system. In some embodiment, the gRNA together with Cas9 is called a Cas9 RNP.

In embodiments encompassing a Cas nuclease, the Cas nuclease may be from a Type-IIA, Type-IIB, or Type-IIC system. Non-limiting exemplary species that the Cas nuclease or other RNP components may be derived from include *Streptococcus pyogenes, Streptococcus thermophilus, Streptococcus sp., Staphylococcus aureus, Listeria innocua, Lactobacillus gasseri, Francisella novicida, Wolinella succinogenes, Sutterella wadsworthensis, Gammaproteobacterium, Neisseria meningitidis, Campylobacter jejuni, Pasteurella multocida, Fibrobacter succinogene, Rhodospirillum rubrum, Nocardiopsis dassonvillei, Streptomyces pristinaespiralis, Streptomyces viridochromogenes, Streptomyces viridochromogenes, Streptosporangium roseum, Streptosporangium roseum, Alicyclobacillus acidocaldarius, Bacillus pseudomycoides, Bacillus selenitireducens, Exiguobacterium sibiricum, Lactobacillus delbrueckii, Lactobacillus salivarius, Lactobacillus buchneri, Treponema denticola, Microscilla marina, Burkholderiales bacterium, Polaromonas naphthalenivorans, Polaromonas sp., Crocosphaera watsonii, Cyanothece sp., Microcystis aeruginosa, Synechococcus sp., Acetohalobium arabaticum, Ammonifex degensii, Caldicelulosiruptor becscii, Candidatus Desulforudis, Clostridium botulinum, Clostridium difficile, Finegoldia magna, Natranaerobius thermophilus, Pelotomaculum thermopropionicum, Acidithiobacillus caldus, Acidithiobacillus ferrooxidans, Allochromatium vinosum, Marinobacter sp., Nitrosococcus halophilus, Nitrosococcus watsoni, Pseudoalteromonas haloplanktis, Ktedonobacter racemifer, Methanohalobium evestigatum, Anabaena variabilis, Nodularia spumigena, Nostoc sp., Arthrospira maxima, Arthrospira platensis, Arthrospira sp., Lyngbya sp., Microcoleus chthonoplastes, Oscillatoria sp., Petrotoga mobilis, Thermosipho africanus, Streptococcus pasteurianus, Neisseria cinerea, Campylobacter lari, Parvibaculum lavamentivorans, Corynebacterium diphtheria, Acidaminococcus sp., Lachnospiraceae* bacterium ND2006, and *Acaryochloris marina*. In some embodiments, the Cas nuclease is the Cas9 protein from *Streptococcus pyogenes*. In some embodiments, the Cas nuclease is the Cas9 protein from *Streptococcus thermophilus*. In some embodiments, the Cas nuclease is the Cas9 protein from *Neisseria meningitidis*. In some embodiments, the Cas nuclease is the Cas9 protein is from Staphylococcus aureus. In some embodiments, the Cas nuclease is the Cpf1 protein from *Francisella novicida*. In some embodiments, the Cas nuclease is the Cpf1 protein from *Acidaminococcus* sp. In some embodiments, the Cas nuclease is the Cpf1 protein from *Lachnospiraceae* bacterium ND2006.

Wild type Cas9 has two nuclease domains: RuvC and HNH. The RuvC domain cleaves the non-target DNA strand, and the HNH domain cleaves the target strand of DNA. In some embodiments, the Cas9 protein comprises more than one RuvC domain and/or more than one HNH domain. In some embodiments, the Cas9 protein is a wild type Cas9. In each of the composition and method embodiments, the Cas induces a double strand break in target DNA.

Modified versions of Cas9 having one catalytic domain, either RuvC or HNH, that is inactive are termed "nickases". Nickases cut only one strand on the target DNA, thus creating a single-strand break. A single-strand break may also be known as a "nick." In some embodiments, the compositions and methods comprise nickases. In some embodiments, the compositions and methods comprise a nickase Cas9 that induces a nick rather than a double strand break in the target DNA.

In some embodiments, the Cas protein may be modified to contain only one functional nuclease domain. For example, the Cas protein may be modified such that one of the nuclease domains is mutated or fully or partially deleted to reduce its nucleic acid cleavage activity. In some embodiments, a nickase Cas is used having a RuvC domain with reduced activity. In some embodiments, a nickase Cas is used having an inactive RuvC domain. In some embodiments, a nickase Cas is used having an HNH domain with reduced activity. In some embodiments, a nickase Cas is used having an inactive HNH domain.

In some embodiments, a conserved amino acid within a Cas protein nuclease domain is substituted to reduce or alter nuclease activity. In some embodiments, a Cas protein may comprise an amino acid substitution in the RuvC or RuvC-like nuclease domain. Exemplary amino acid substitutions in the RuvC or RuvC-like nuclease domain include D10A (based on the *S. pyogenes* Cas9 protein). See, e.g., Zetsche et al. (2015) Cell October 22:163(3): 759-771. In some embodiments, the Cas protein may comprise an amino acid substitution in the HNH or HNH-like nuclease domain. Exemplary amino acid substitutions in the HNH or HNH-like nuclease domain include E762A, H840A, N863A, H983A, and D986A (based on the *S. pyogenes* Cas9 protein). See, e.g., Zetsche et al (2015).

In some embodiments, the RNP complex described herein comprises a nickase and a pair of guide RNAs that are complementary to the sense and antisense strands of the target sequence, respectively. In this embodiment, the guide RNAs direct the nickase to a target sequence and introduce a DSB by generating a nick on opposite strands of the target sequence (i.e., double nicking). In some embodiments, use of double nicking may improve specificity and reduce off-target effects. In some embodiments, a nickase Cas is used together with two separate guide RNAs targeting opposite strands of DNA to produce a double nick in the target DNA. In some embodiments, a nickase Cas is used together with two separate guide RNAs that are selected to be in close proximity to produce a double nick in the target DNA.

In some embodiments, chimeric Cas proteins are used, where one domain or region of the protein is replaced by a portion of a different protein. In some embodiments, a Cas nuclease domain may be replaced with a domain from a different nuclease such as Fok1. In some embodiments, a Cas protein may be a modified nuclease.

In other embodiments, the Cas protein may be from a Type-I CRISPR/Cas system. In some embodiments, the Cas protein may be a component of the Cascade complex of a Type-I CRISPR/Cas system. In some embodiments, the Cas protein may be a Cas3 protein. In some embodiments, the Cas protein may be from a Type-III CRISPR/Cas system. In some embodiments, the Cas protein may have an RNA cleavage activity.

E. Determination of Efficacy of gRNAs

In some embodiments, the efficacy of a gRNA is determined when expressed together with other components of an RNP. In some embodiments, the gRNA is expressed together with a Cas. In some embodiments, the gRNA is expressed in a cell line that already stably expresses Cas.

Use of the Cas RNP system can lead to double-stranded breaks in the DNA. Nonhomologous end joining (NHEJ) is a process whereby double-stranded breaks (DSBs) in the DNA are repaired via re-ligation of the break ends, which can produce errors in the form of insertion/deletion (indel) mutations. The DNA ends of the DSB frequently have been subjected to enzymatic processing, resulting in the addition or removal of nucleotides at one or both strands before the rejoining of the ends. These additions or removals prior to rejoining result in the presence of insertion or deletion (indel) mutations in the DNA sequence at the site of the NHEJ repair. Many mutations due to indels alter the reading frame or introduce premature stop codons and, therefore, produce a non-functional protein.

In some embodiments, the efficacy of particular gRNAs is determined based on in vitro models. In some embodiments, the in vitro model is HEK293 cells stably expressing Cas9 (HEK293_Cas9). In some embodiments, the in vitro model is HUH7 human hepatocarcinoma cells. In some embodiments, the in vitro model is sk-Hep human hepatic adenocarcinoma cells. In some embodiments, the in vitro model is primary human hepatocytes. In some embodiments, the in vitro model is HepG2 cells.

In some embodiments, the efficacy of particular guide sequences is determined across multiple in vitro cell models for a gRNA selection process. In some embodiments, a cell line comparison of data with selected gRNAs is performed. In some embodiments, cross screening in multiple cell models is performed.

In some embodiments, the efficacy of a guide RNA is measured by percent editing of SERPINA1. In some embodiments, the percent editing of SERPINA1 is compared to the percent editing of a control gene (e.g., a gene that the gRNA is not targeted to). In some embodiments, the control gene is Control 1, 2, 3, or 4 as shown in Table 1. In some embodiments, the editing percentage (e.g., the "editing efficiency" or "percent editing") is defined as the total number of sequence reads with insertions/deletions ("indels") or substitutions over the total number of sequence reads, including wild type. In some embodiments, the guide RNA has a percent editing that is about 100%. In some embodiments, the percent editing is, for example, between 5 and 10%, 10 and 15%, 15 and 20%, 20 and 25%, 30 and 35%, 35 and 40%, 40 and 45%, 45 and 50%, 50 and 55%, 55 and 60%, 60 and 65%, 65 and 70%, 70 and 75%, 75 and 80%, 80 and 85%, 85 and 90%, 90 and 95%, or 95 and 99%.

In some embodiments, the methods and compositions described herein comprise guide RNA having a reduction in off-target cleavage. In some embodiments, there are no detectable off-target cleavages. In some embodiments, a deletion or insertion of a nucleotide(s) occurs in the SER- PINA1 gene at least 50-fold or more than in off-target sites. In some embodiments, the deletion or insertion of a nucleotide(s) occurs in the SERPINA1 gene 50-fold to 150-fold, 150-fold to 500-fold, 500-fold to 1500-fold, 1500-fold to 5000-fold, 5000-fold to 15000-fold, 15000-fold to 30000-fold, or 30000-fold to 60000-fold more than in off-target sites.

In some embodiments, the efficacy of a guide RNA is measured by secretion of AAT. In some embodiments, secretion of AAT is measured using an enzyme-linked immunosorbent assay (ELISA) assay with culture media. In some embodiments, secretion of AAT is measured in the same in vitro systems used to measure editing. In some embodiments, secretion of AAT is measured in primary human hepatocytes. In some embodiments, secretion of AAT is measured in HUH7 cells.

In some embodiments, the amount of AAT in cells measures efficacy of a gRNA. In some embodiments, the amount of AAT in cells is measured using western blot. In some embodiments, the cell used is HUH7 cells. In some embodiments, the amount of AAT is compared to the amount of glyceraldehyde 3-phosphate dehydrogenase GAPDH (a housekeeping gene) to control for changes in cell number.

II. Treatment of AATD

In some embodiments, a method of inducing a double-stranded break (DSB) within the SERPINA1 gene is provided comprising administering a guide RNA comprising any one or more guide sequences of SEQ ID Nos: 5-129, or any one or more of the sgRNAs of SEQ ID Nos: 130-139. In some embodiments, gRNAs comprising any one or more of the guide sequences of SEQ ID Nos: 5-129 are administered to induce a DSB in the SERPINA1 gene. The guide RNAs may be administered together with a RNA-guided DNA binding agent such as a Cas protein, such as, for example, Cas9, or an mRNA or vector encoding a RNA-guided DNA binding agent such as a Cas protein, such as, for example, Cas9. In some embodiments, the guide RNA administered is one or more of the guide RNA compositions described herein.

In some embodiments, a method of modifying the SERPINA1 gene is provided comprising administering a guide RNA comprising any one or more of the guide sequences of SEQ ID Nos: 5-129, or any one or more of the sgRNAs of SEQ ID Nos: 130-139. In some embodiments, gRNAs comprising any one or more of the guide sequences of SEQ ID Nos: 5-129, or any one or more of the sgRNAs of SEQ ID Nos: 130-139, are administered to modify the SERPINA1 gene. The guide RNAs may be administered together with a Cas protein or an mRNA or vector encoding a Cas protein, such as, for example, Cas9.

In some embodiments, a method of treating AATD is provided comprising administering a guide RNA comprising any one or more of the guide sequences of SEQ ID Nos: 5-129, or any one or more of the sgRNAs of SEQ ID Nos: 130-139. In some embodiments, gRNAs comprising any one or more of the guide sequences of SEQ ID Nos: 5-129, or any one or more of the sgRNAs of SEQ ID Nos: 130-139 are administered to treat AATD. The guide RNAs may be administered together with a Cas protein or an mRNA or vector encoding a Cas protein, such as, for example, Cas9.

In some embodiments, a method of reducing or preventing the accumulation of AAT in the serum, liver, liver tissue, liver cells, and/or hepatocytes of a subject is provided comprising administering a guide RNA comprising any one or more of the guide sequences of SEQ ID Nos 5-129, or any one or more of the sgRNAs of SEQ ID Nos: 130-139. In some embodiments, gRNAs comprising any one or more of the guide sequences of SEQ ID Nos: 5-129 or any one or more of the sgRNAs of SEQ ID Nos: 130-139 are administered to reduce or prevent the accumulation of AAT in the liver, liver tissue, liver cells, and/or hepatocytes. The gRNAs may be administered together with an RNA-guided DNA binding agent such as a Cas protein or an mRNA or vector encoding a Cas protein, such as, for example, Cas9.

In some embodiments, the gRNAs comprising the guide sequences of Table 1 or Table 2 together with a Cas protein induce DSBs, and non-homologous ending joining (NHEJ) during repair leads to a mutation in the SERPINA1 gene. In some embodiments, NHEJ leads to a deletion or insertion of a nucleotide(s), which induces a frame shift or nonsense mutation in the SERPINA1 gene.

In some embodiments, administering the guide RNAs of the invention (e.g., in a composition provided herein) reduces levels of mutated alpha-1 antitrypsin (AAT) produced by the subject, and therefore prevents accumulation and aggregation of AAT in the liver.

In some embodiments, the subject is mammalian. In some embodiments, the subject is human. In some embodiments, the subject is cow, pig, monkey, sheep, dog, cat, fish, or poultry.

In some embodiments, the use of a guide RNAs comprising any one or more of the guide sequences in Table 1 or Table 2 (e.g., in a composition provided herein) is provided for the preparation of a medicament for treating a human subject having AATD.

In some embodiments, the guide RNAs, compositions, and formulations are administered intravenously. In some embodiments, the guide RNAs, compositions, and formulations are administered into the hepatic circulation.

In some embodiments, a single administration of the guide RNA of the invention (e.g., in a composition provided herein) is sufficient to knock down expression of the mutant protein. In some embodiments, a single administration of the guide RNA of the invention (e.g., in a composition provided herein) is sufficient to knock down or knock out expression of the mutant protein. In other embodiments, more than one administration of the guide RNA of the invention (e.g., in a composition provided herein) may be beneficial to maximize editing via cumulative effects.

In some embodiments, the efficacy of treatment with the compositions of the invention is seen at 1 year, 2 years, 3 years, 4 years, 5 years, or 10 years after delivery.

In some embodiments, treatment slows or halts liver disease progression. In some embodiments, treatment improves liver disease measures. In some embodiments, liver disease is measured by changes in liver structure, liver function, or symptoms in the subject.

In some embodiments, efficacy of treatment is measured by the ability to delay or avoid a liver transplantation in the subject. In some embodiments, efficacy of treatment is measured by increased survival time of the subject.

In some embodiments, efficacy of treatment is measured by reduction in liver enzymes in blood. In some embodiments, the liver enzymes are alanine transaminase (ALT) or aspartate transaminase (AST).

In some embodiments, efficacy of treatment is measured by the slowing of development of scar tissue or decrease in scar tissue in the liver based on biopsy results.

In some embodiments, efficacy of treatment is measured using patient-reported results such as fatigue, weakness, itching, loss of appetite, loss of appetite, weight loss, nausea, or bloating. In some embodiments, efficacy of treatment is measured by decreases in edema, ascites, or jaundice. In some embodiments, efficacy of treatment is measured by decreases in portal hypertension. In some embodiments, efficacy of treatment is measured by decreases in rates of liver cancer.

In some embodiments, efficacy of treatment is measured using imaging methods. In some embodiments, the imaging methods are ultrasound, computerized tomography, magnetic resonance imagery, or elastography.

In some embodiments, the serum and/or liver AAT levels are reduced by 40-50%, 50-60%, 60-70%, 70-80%, 80-90%, 90-95%, 95-98%, 98-99%, or 99-100% as compared to serum and/or liver AAT levels before administration of the composition.

In some embodiments, the percent editing of the SERPINA1 gene is between 30 and 99%. In some embodiments, the percent editing is between 30 and 35%, 35 and 40%, 40 and 45%, 45 and 50%, 50 and 55%, 55 and 60%, 60 and 65%, 65 and 70%, 70 and 75%, 75 and 80%, 80 and 85%, 85 and 90%, 90 and 95%, or 95 and 99%.

A. Combination Therapy

In some embodiments, the invention comprises combination therapies comprising any one of the gRNAs comprising any one or more of the guide sequences disclosed in Table 1 or any one or more of the sgRNAs in Table 2 (e.g., in a composition provided herein) together with an augmentation therapy suitable for alleviating the lung symptoms of AATD. In some embodiments, the augmentation therapy for lung disease is intravenous therapy with AAT purified from human plasma, as described in Turner, *BioDrugs* 2013 December; 27(6): 547-58. In some embodiments, the augmentation therapy is with Prolastin®, Zemaira®, Aralast®, or Kamada®.

In some embodiments, the combination therapy comprises any one of the gRNAs comprising any one or more of the guide sequences disclosed in Table 1 or any one or more of the sgRNAs in Table 2 (e.g., in a composition provided herein) together with a siRNA that targets ATT or mutant ATT. In some embodiments, the siRNA is any siRNA capable of further reducing or eliminating the expression of wild type or mutant AAT. In some embodiments, the siRNA is administered after any one of the gRNAs comprising any one or more of the guide sequences disclosed in Table 1 or any one or more of the sgRNAs in Table 2 (e.g., in a composition provided herein). In some embodiments, the siRNA is administered on a regular basis following treatment with any of the gRNA compositions provided herein.

B. Delivery of gRNA

In some embodiments, the guide RNA compositions described herein, alone or encoded on one or more vectors, are formulated in or administered via a lipid nanoparticle; see e.g., PCT/US2017/024973, filed Mar. 30, 2017 entitled "LIPID NANOPARTICLE FORMULATIONS FOR CRISPR/CAS COMPONENTS," the contents of which are hereby incorporated by reference in their entirety. Any lipid nanoparticle (LNP) formulation known to those of skill in the art to be capable of delivering nucleotides to subjects may be utilized with the guide RNAs described herein, as well as either mRNA encoding an RNA-guided DNA binding agent such as Cas or Cas9, or an RNA-guided DNA binding agent such as Cas or Cas9 protein itself In some embodiments, the invention comprises a method for delivering any one of the gRNAs disclosed herein to a subject, wherein the gRNA is associated with an LNP. In some embodiments, the gRNA/LNP is also associated with an RNA-guided DNA binding agent such as Cas9 or an mRNA encoding an RNA-guided DNA binding agent such as Cas9.

In some embodiments, the invention comprises a composition comprising any one of the gRNAs disclosed and an LNP. In some embodiments, the composition further comprises a Cas9 or an mRNA encoding Cas9.

In some embodiments, the LNPs comprise cationic lipids. In some embodiments, the LNPs comprise a lipid such as a CCD lipid such as Lipid A ((9Z,12Z)-3-((4,4-bis(octyloxy) butanoyl)oxy)-2-((((3-(diethylamino)propoxy)carbonyl) oxy)methyl)propyl octadeca-9,12-dienoate, also called 3-((4,4-bis(octyloxy)butanoyl)oxy)-2-((((3-(diethylamino) propoxy)carbonyl)oxy)methyl)propyl (9Z,12Z)-octadeca-9, 12-dienoate)), Lipid B (((5-((dimethylamino)methyl)-1,3-phenylene)bis(oxy))bis(octane-8,1-diyl)bis(decanoate), also called ((5-((dimethylamino)methyl)-1,3-phenylene)bis (oxy))bis(octane-8,1-diyl) bis(decanoate)), Lipid C (2-((4-4 (3-(dimethylamino)propoxy)carbonyl)oxy)hexadecanoyl) oxy)propane-1,3-diyl(9Z,9'Z, 12Z, 12'Z)-bis(octadeca-9,12-dienoate)), or Lipid D (dimethylamino)propoxy)carbonyl) oxy)-13-(octanoyloxy)tridecyl 3-octylundecanoate). In some embodiments, the LNPs comprise molar ratios of a cationic lipid amine to RNA phosphate (N:P) of about 4.5.

In some embodiments, LNPs associated with the gRNAs disclosed herein are for use in preparing a medicament for treating AATD. In some embodiments, LNPs associated with the gRNAs disclosed herein are for use in preparing a medicament for reducing or preventing accumulation and aggregation of AAT in subjects having AATD. In some embodiments, LNPs associated with the gRNAs disclosed herein are for use in preparing a medicament for reducing serum and/or liver AAT concentration. In some embodiments, LNPs associated with the gRNAs disclosed herein are for use in treating AATD in a subject, such as a mammal, e.g., a primate such as a human. In some embodiments, LNPs associated with the gRNAs disclosed herein are for use in reducing or preventing accumulation and aggregation of AAT in subjects having AATD, such as a mammal, e.g., a primate such as a human. In some embodiments, LNPs associated with the gRNAs disclosed herein are for use in reducing serum AAT concentration in a subject, such as a mammal, e.g., a primate such as a human.

Electroporation is also a well-known means for delivery of cargo, and any electroporation methodology may be used for delivery of any one of the gRNAs disclosed herein. In some embodiments, electroporation may be used to deliver any one of the gRNAs disclosed herein and an RNA-guided DNA binding agent such as Cas9 or an mRNA encoding an RNA-guided DNA binding agent such as Cas9.

In some embodiments, the invention comprises a method for delivering any one of the gRNAs disclosed herein to an ex vivo cell, wherein the gRNA is associated with an LNP or not associated with an LNP. In some embodiments, the gRNA/LNP or gRNA is also associated with an RNA-guided DNA binding agent such as Cas9 or an mRNA encoding an RNA-guided DNA agent such as Cas9.

In certain embodiments, the invention comprises DNA or RNA vectors encoding any of the guide RNAs comprising any one or more of the guide sequences described herein. In certain embodiments, the invention comprises DNA or RNA vectors encoding any one or more of the guide sequences described herein. In some embodiments, in addition to guide RNA sequences, the vectors further comprise nucleic acids that do not encode guide RNAs. Nucleic acids that do not encode guide RNA include, but are not limited to, promoters, enhancers, regulatory sequences, and nucleic acids encoding an RNA-guided DNA binding agent, which can be a nuclease such as Cas9. In some embodiments, the vector comprises one or more nucleotide sequence(s) encoding a crRNA, a trRNA, or a crRNA and trRNA. In some embodiments, the vector comprises one or more nucleotide sequence(s) encoding a sgRNA and an mRNA encoding an RNA-guided DNA binding agent, which can be a Cas protein, such as Cas9 or Cpf1. In some embodiments, the vector comprises one or more nucleotide sequence(s) encoding a crRNA, a trRNA, and an mRNA encoding an RNA-guided DNA binding agent, which can be a Cas protein, such as, Cas9 or Cpf1. In one embodiment, the Cas9 is from *Streptococcus pyogenes* (i.e., Spy Cas9). In some embodiments, the nucleotide sequence encoding the crRNA, trRNA, or crRNA and trRNA (which may be a sgRNA) comprises or consists of a guide sequence flanked by all or a portion of a repeat sequence from a naturally-occurring CRISPR/Cas system. The nucleic acid comprising or consisting of the crRNA, trRNA, or crRNA and trRNA may further comprise a vector sequence wherein the vector sequence comprises or consists of nucleic acids that are not naturally found together with the crRNA, trRNA, or crRNA and trRNA.

In some embodiments, the crRNA and the trRNA are encoded by non-contiguous nucleic acids within one vector. In other embodiments, the crRNA and the trRNA may be encoded by a contiguous nucleic acid. In some embodiments, the crRNA and the trRNA are encoded by opposite strands of a single nucleic acid. In other embodiments, the crRNA and the trRNA are encoded by the same strand of a single nucleic acid.

In some embodiments, the vector may be circular. In other embodiments, the vector may be linear. In some embodiments, the vector may be enclosed in a lipid nanoparticle, liposome, non-lipid nanoparticle, or viral capsid. Non-limiting exemplary vectors include plasmids, phagemids, cosmids, artificial chromosomes, minichromosomes, transposons, viral vectors, and expression vectors.

In some embodiments, the vector may be a viral vector. In some embodiments, the viral vector may be genetically modified from its wild type counterpart. For example, the viral vector may comprise an insertion, deletion, or substitution of one or more nucleotides to facilitate cloning or such that one or more properties of the vector is changed. Such properties may include packaging capacity, transduction efficiency, immunogenicity, genome integration, replication, transcription, and translation. In some embodiments, a portion of the viral genome may be deleted such that the virus is capable of packaging exogenous sequences having a larger size. In some embodiments, the viral vector may have an enhanced transduction efficiency. In some embodiments, the immune response induced by the virus in a host may be reduced. In some embodiments, viral genes (such as, e.g., integrase) that promote integration of the viral sequence into a host genome may be mutated such that the virus becomes non-integrating. In some embodiments, the viral vector may be replication defective. In some embodiments, the viral vector may comprise exogenous transcriptional or translational control sequences to drive expression of coding sequences on the vector. In some embodiments, the virus may be helper-dependent. For example, the virus may need one or more helper virus to supply viral components (such as, e.g., viral proteins) required to amplify and package the vectors into viral particles. In such a case, one or more helper components, including one or more vectors encoding the viral components, may be introduced into a host cell along with the vector system described herein. In other embodiments, the virus may be helper-free. For example, the virus may be capable of amplifying and packaging the vectors without any helper virus. In some embodiments, the vector system described herein may also encode the viral components required for virus amplification and packaging.

Non-limiting exemplary viral vectors include adeno-associated virus (AAV) vector, lentivirus vectors, adenovirus vectors, helper dependent adenoviral vectors (HDAd), herpes simplex virus (HSV-1) vectors, bacteriophage T4, baculovirus vectors, and retrovirus vectors. In some embodiments, the viral vector may be an AAV vector. In some embodiments, the viral vector is AAV2, AAV3, AAV3B, AAV5, AAV6, AAV6.2, AAV7, AAVrh.64R1, AAVhu.37, AAVrh.8, AAVrh.32.33, AAV8, AAV9, AAVrh10, or AAVLK03. In other embodiments, the viral vector may a lentivirus vector.

In some embodiments, the lentivirus may be non-integrating. In some embodiments, the viral vector may be an adenovirus vector. In some embodiments, the adenovirus may be a high-cloning capacity or "gutless" adenovirus, where all coding viral regions apart from the 5' and 3' inverted terminal repeats (ITRs) and the packaging signal ('I') are deleted from the virus to increase its packaging capacity. In yet other embodiments, the viral vector may be an HSV-1 vector. In some embodiments, the HSV-1-based vector is helper dependent, and in other embodiments it is helper independent. For example, an amplicon vector that retains only the packaging sequence requires a helper virus with structural components for packaging, while a 30 kb-deleted HSV-1 vector that removes non-essential viral functions does not require helper virus. In additional embodiments, the viral vector may be bacteriophage T4. In some embodiments, the bacteriophage T4 may be able to package any linear or circular DNA or RNA molecules when the head of the virus is emptied. In further embodiments, the viral vector may be a baculovirus vector. In yet further embodiments, the viral vector may be a retrovirus vector. In embodiments using AAV or lentiviral vectors, which have smaller cloning capacity, it may be necessary to use more than one vector to deliver all the components of a vector system as disclosed herein. For example, one AAV vector may contain sequences encoding an RNA-guided DNA binding agent such as a Cas protein (e.g., Cas9), while a second AAV vector may contain one or more guide sequences.

In some embodiments, the vector may be capable of driving expression of one or more coding sequences in a cell. In some embodiments, the cell may be a prokaryotic cell, such as, e.g., a bacterial cell. In some embodiments, the cell may be a eukaryotic cell, such as, e.g., a yeast, plant, insect, or mammalian cell. In some embodiments, the eukaryotic cell may be a mammalian cell. In some embodiments, the eukaryotic cell may be a rodent cell. In some embodiments, the eukaryotic cell may be a human cell. Suitable promoters to drive expression in different types of cells are known in the art. In some embodiments, the promoter may be wild type. In other embodiments, the promoter may be modified for more efficient or efficacious expression. In yet other embodiments, the promoter may be truncated yet retain its function. For example, the promoter may have a normal size or a reduced size that is suitable for proper packaging of the vector into a virus.

In some embodiments, the vector may comprise a nucleotide sequence encoding an RNA-guided DNA binding agent such as a Cas protein (e.g., Cas9) described herein. In some embodiments, the nuclease encoded by the vector may be a Cas protein. In some embodiments, the vector system may comprise one copy of the nucleotide sequence encoding the nuclease. In other embodiments, the vector system may comprise more than one copy of the nucleotide sequence encoding the nuclease. In some embodiments, the nucleotide sequence encoding the nuclease may be operably linked to at least one transcriptional or translational control sequence. In some embodiments, the nucleotide sequence encoding the nuclease may be operably linked to at least one promoter.

In some embodiments, the promoter may be constitutive, inducible, or tissue-specific. In some embodiments, the promoter may be a constitutive promoter. Non-limiting exemplary constitutive promoters include cytomegalovirus immediate early promoter (CMV), simian virus (SV40) promoter, adenovirus major late (MLP) promoter, Rous sarcoma virus (RSV) promoter, mouse mammary tumor virus (MMTV) promoter, phosphoglycerate kinase (PGK) promoter, elongation factor-alpha (EF1a) promoter, ubiquitin promoters, actin promoters, tubulin promoters, immunoglobulin promoters, a functional fragment thereof, or a combination of any of the foregoing. In some embodiments, the promoter may be a CMV promoter. In some embodiments, the promoter may be a truncated CMV promoter. In other embodiments, the promoter may be an EF1a promoter. In some embodiments, the promoter may be an inducible promoter. Non-limiting exemplary inducible promoters include those inducible by heat shock, light, chemicals, peptides, metals, steroids, antibiotics, or alcohol. In some embodiments, the inducible promoter may be one that has a low basal (non-induced) expression level, such as, e.g., the Tet-On® promoter (Clontech).

In some embodiments, the promoter may be a tissue-specific promoter, e.g., a promoter specific for expression in the liver.

The vector may further comprise a nucleotide sequence encoding the guide RNA described herein. In some embodiments, the vector comprises one copy of the guide RNA. In other embodiments, the vector comprises more than one copy of the guide RNA. In embodiments with more than one guide RNA, the guide RNAs may be non-identical such that they target different target sequences, or may be identical in that they target the same target sequence. In some embodiments where the vectors comprise more than one guide RNA, each guide RNA may have other different properties, such as activity or stability within a complex with an RNA-guided DNA nuclease, such as a Cas RNP complex. In some embodiments, the nucleotide sequence encoding the guide RNA may be operably linked to at least one transcriptional or translational control sequence, such as a promoter, a 3' UTR, or a 5' UTR. In one embodiment, the promoter may be a tRNA promoter, e.g., tRNA$^{Lys3}$, or a tRNA chimera. See Mefferd et al., RNA. 2015 21:1683-9; Scherer et al., *Nucleic Acids Res.* 2007 35: 2620-2628. In some embodiments, the promoter may be recognized by RNA polymerase III (Pol III). Non-limiting examples of Pol III promoters include U6 and H1 promoters. In some embodiments, the nucleotide sequence encoding the guide RNA may be operably linked to a mouse or human U6 promoter. In other embodiments, the nucleotide sequence encoding the guide RNA may be operably linked to a mouse or human H1 promoter. In embodiments with more than one guide RNA, the promoters used to drive expression may be the same or different. In some embodiments, the nucleotide encoding the crRNA of the guide RNA and the nucleotide encoding the trRNA of the guide RNA may be provided on the same vector. In some embodiments, the nucleotide encoding the crRNA and the nucleotide encoding the trRNA may be driven by the same promoter. In some embodiments, the crRNA and trRNA may be transcribed into a single transcript. For example, the crRNA and trRNA may be processed from the single transcript to form a double-molecule guide RNA. Alternatively, the crRNA and trRNA may be transcribed into a single-molecule guide RNA (sgRNA). In other embodiments, the crRNA and the trRNA may be driven by their corresponding promoters on the same vector. In yet other embodiments, the crRNA and the trRNA may be encoded by different vectors.

In some embodiments, the nucleotide sequence encoding the guide RNA may be located on the same vector comprising the nucleotide sequence encoding an RNA-guided DNA binding agent such as a Cas protein. In some embodiments, expression of the guide RNA and of the RNA-guided DNA binding agent such as a Cas protein may be driven by their own corresponding promoters. In some embodiments, expression of the guide RNA may be driven by the same promoter that drives expression of the RNA-guided DNA binding agent such as a Cas protein. In some embodiments, the guide RNA and the RNA-guided DNA binding agent such as a Cas protein transcript may be contained within a single transcript. For example, the guide RNA may be within an untranslated region (UTR) of the RNA-guided DNA binding agent such as a Cas protein transcript. In some embodiments, the guide RNA may be within the 5' UTR of the transcript. In other embodiments, the guide RNA may be within the 3' UTR of the transcript. In some embodiments, the intracellular half-life of the transcript may be reduced by containing the guide RNA within its 3' UTR and thereby shortening the length of its 3' UTR. In additional embodiments, the guide RNA may be within an intron of the transcript. In some embodiments, suitable splice sites may be added at the intron within which the guide RNA is located such that the guide RNA is properly spliced out of the transcript. In some embodiments, expression of the RNA-guided DNA binding agent such as a Cas protein and the guide RNA from the same vector in close temporal proximity may facilitate more efficient formation of the CRISPR RNP complex.

In some embodiments, the compositions comprise a vector system. In some embodiments, the vector system may comprise one single vector. In other embodiments, the vector system may comprise two vectors. In additional embodiments, the vector system may comprise three vectors. When different guide RNAs are used for multiplexing, or when multiple copies of the guide RNA are used, the vector system may comprise more than three vectors.

In some embodiments, the vector system may comprise inducible promoters to start expression only after it is delivered to a target cell. Non-limiting exemplary inducible promoters include those inducible by heat shock, light, chemicals, peptides, metals, steroids, antibiotics, or alcohol. In some embodiments, the inducible promoter may be one that has a low basal (non-induced) expression level, such as, e.g., the Tet-On® promoter (Clontech).

In additional embodiments, the vector system may comprise tissue-specific promoters to start expression only after it is delivered into a specific tissue.

The vector may be delivered by liposome, a nanoparticle, an exosome, or a microvesicle. The vector may also be delivered by a lipid nanoparticle (LNP). Any of the LNPs and LNP formulations described herein are suitable for delivery of the guides alone or together a cas nuclease or an mRNA encoding a cas nuclease. In some embodiments, an LNP composition is encompassed comprising: an RNA component and a lipid component, wherein the lipid component comprises an amine lipid, a neutral lipid, a helper lipid, and a stealth lipid; and wherein the N/P ratio is about 1-10.

In some instances, the lipid component comprises Lipid A, cholesterol, DSPC, and PEG-DMG; and wherein the N/P ratio is about 1-10. In some embodiments, the lipid component comprises: about 40-60 mol-% amine lipid; about 5-15 mol-% neutral lipid; and about 1.5-10 mol-% PEG lipid, wherein the remainder of the lipid component is helper lipid, and wherein the N/P ratio of the LNP composition is about 3-10. In some embodiments, the lipid component comprises about 50-60 mol-% amine lipid; about 8-10 mol-% neutral lipid; and about 2.5-4 mol-% PEG lipid, wherein the remainder of the lipid component is helper lipid, and wherein the N/P ratio of the LNP composition is about 3-8. In some instances, the lipid component comprises: about 50-60 mol-% amine lipid; about 5-15 mol-% DSPC; and about 2.5-4 mol-% PEG lipid, wherein the remainder of the lipid component is cholesterol, and wherein the N/P ratio of the LNP composition is about 3-8. In some instances, the lipid component comprises: 48-53 mol-% Lipid A; about 8-10 mol-% DSPC; and 1.5-10 mol-% PEG lipid, wherein the remainder of the lipid component is cholesterol, and wherein the N/P ratio of the LNP composition is 3-8±0.2.

In some embodiments, the vector may be delivered systemically. In some embodiments, the vector may be delivered into the hepatic circulation.

In some embodiments, the vector may be delivered systemically. In some embodiments, the vector may be delivered into the hepatic circulation.

III. Recitation of Certain Embodiments

In some embodiments, the invention comprises a composition comprising a guide RNA comprising a guide sequence selected from SEQ ID NOs: 5-129. In some instances, a composition comprising a guide RNA comprising a guide sequence that is at least 99%, 98%, 97%, 96%, 95%, 94%, 93%, 92%, 91%, or 90% identical to a sequence selected from SEQ ID NOs: 5-129 is provided.

The guide RNA may be at least partially complementary to a target sequence present in the human SERPINA1 gene.

The guide RNA may direct a nuclease to a target sequence that is in exon 2, 3, 4, or 5 of the human SERPINA1 gene.

In some embodiments, the guide RNA directs a nuclease to a target sequence that is in exon 2 of the human SERPINA1 gene. In some instances, the guide RNA that targets exon 2 is selected from CR001370, CR001373, CR001374, CR001376, CR001379, CR001380, CR001386, CR001386, CR003196, CR001391, CR003198, CR001395, CR001397, CR001400, CR001404, CR001405, CR003208, CR001409, CR001413, CR001421, CR001422, and CR001427.

In some embodiments, the guide RNA directs a nuclease to a target sequence that is in exon 3 of the human SERPINA1 gene. In some instances, the guide RNA that targets exon 3 is selected from CR001450, CR003214, CR001453, CR001454, and CR003217.

In some embodiments, the guide RNA directs a nuclease to a target sequence that is in exon 4 of the human SERPINA1 gene. In some instances, the guide RNA that targets exon 4 is selected from CR003225 and CR003226.

In some embodiments, the guide RNA directs a nuclease to a target sequence that is in exon 5 of the human SERPINA1 gene. In some instances, the guide RNA that targets exon 5 is selected from CR001475 and CR001476.

In some instances, the guide RNA is a dual guide (dgRNA). The guide may also be a single guide RNA (sgRNA).

In some embodiments, the invention comprises a crRNA comprising any one of the guide sequence disclosed herein, and further comprising a nucleotide sequence of SEQ ID No: 140, wherein the nucleotides of SEQ ID NO: 140 follow the guide sequence at its 3' end. In some embodiments, a dual guide RNA further comprises a trRNA.

In some embodiments, the invention comprises a sgRNA comprising a sequence selected from SEQ ID Nos: 130-139, or 408.

In some instances, the sgRNA comprises a guide sequence that is at least 99%, 98%, 97%, 96%, 95%, 94%, 93%, 92%, 91%, or 90% identical to a sequence selected from SEQ ID Nos: 130-139, or 408.

The invention comprises a sgRNA comprising the nucleotides of SEQ ID NO: 130, wherein N is any natural or non-natural nucleotide, and wherein the N's collectively form a guide sequence that targets Cas9 to the SERPINA1 gene.

In some embodiments, the sgRNA comprises a guide sequence selected from any one of SEQ ID Nos: 5-129.

In some embodiments, a sgRNA comprising any one of the guide sequences of SEQ ID Nos: 5-129 and the nucleotides of SEQ ID NO: 408 is provided.

In some embodiments, the guide sequence is encoded on a vector. In some embodiments, the guide RNA comprises a guide sequence that is complementary to a target sequence in the positive strand of SERPINA1. In some embodiments, the guide RNA comprises a guide sequence that is complementary to a target sequence in the negative strand of SERPINA1.

In some embodiments, the guide RNAs comprising a guide sequence further comprising a second guide sequence, wherein the first guide sequence is complementary to a first target sequence in the positive strand of the SERPINA1 gene and the second guide sequence is complementary to a second target sequence in the negative strand of the SERPINA1 gene.

The guide RNAs of the invention may be modified. In some embodiments, the modification comprises a 2'-O-methyl (2'-O-Me) modified nucleotide. In some embodiments, the modification comprises a phosphorothioate (PS) bond between nucleotides. In some embodiments, the modification comprises a 2'-fluoro (2'-F) modified nucleotide. In some embodiments, the modification comprises an inverted abasic nucleotide.

In some embodiments, the modification is at one or more of the first five nucleotides at the 5' end. In some embodiments, the modification is at one or more of the last five nucleotides at the 3' end.

In some embodiments, the modification comprises PS bonds between the first four nucleotides. In some embodiments, the modification comprises PS bonds between the last four nucleotides. The PS-modified guide may further comprise 2'-O-Me modified nucleotides at the first three nucleotides at the 5' end and the last three nucleotides at the 3' end.

In some embodiments, the guide RNA comprises the modified nucleotides of SEQ ID NO: 408.

In some embodiments, a composition or formulation comprising any of the described guide RNAs and a pharmaceutically acceptable excipient or carrier is provided.

In some embodiments, a composition is provided comprising a guide RNA as described herein associated with a lipid nanoparticle (LNP).

The composition may further comprise a nuclease protein or an mRNA that encodes a nuclease.

In some embodiments, the nuclease is a Cas. In some embodiments, the Cas is Cas9. In some embodiments, the Cas is Cpf1. In some embodiments, the nuclease is a nickase. In some embodiments, the nuclease is modified. In some embodiments, the modified nuclease comprises a nuclear localization signal (NLS).

In some embodiments, the Cas s from the Type-I, Type-II, or Type-III CRISPR/Cas

In some embodiments, a method of inducing a double-stranded break (DSB) within the SERPINA1 gene is provided comprising administering any one or more of the guide RNAs, compositions, or formulations described herein.

In some embodiments, a method of modifying the SERPINA1 gene is provided comprising, delivering a Cas protein or a nucleic acid encoding a Cas protein, and any one or more of the guide RNAs, compositions, or formulations described herein.

In some embodiments, a method of treating AATD is provided comprising, administering a Cas protein or a nucleic acid encoding a Cas protein, and any one or more of the guide RNAs, compositions, or formulations described herein, thereby treating AATD.

In some embodiments, a method for reducing or preventing the accumulation of AAT in the liver of a subject is provided comprising, administering a Cas protein or a nucleic acid encoding a Cas protein, and any one or more of the guide RNAs, compositions, or formulations described herein, thereby reducing accumulation of AAT in the liver.

In some embodiments, ATT is reduced or prevented in liver cells. In some embodiments, the liver cells are hepatocytes.

In some method and use embodiments, the subject has AATD.

In some embodiments, non-homologous ending joining (NHEJ) leads to a mutation during repair of a DSB in the SERPINA1 gene. In some instances, NHEJ leads to a deletion or insertion of a nucleotide(s) during repair of a DSB in the SERPINA1 gene. In some embodiments, the deletion or insertion of a nucleotide(s) induces a frame shift or nonsense mutation in the SERPINA1 gene.

In some embodiments, the administering reduces levels of alpha-1 antitrypsin (AAT). The levels of AAT may be measured in serum, plasma, blood, cerebral spinal fluid, or sputum. The levels of AAT may be measured in liver tissue.

In some method and use embodiments, the subject is human. The human subject may have alpha-1 antitrypsin deficiency (AATD). The subject may have a family history of AATD. The subject may have both liver and lung symptoms of AATD. The subject may have only or predominantly liver symptoms of AATD.

In some embodiments, the subject expresses AAT having a E342K mutation. In some embodiments, the subject has at least one Z allele at the SERPINA1 locus. In some embodiments, the subject has at least one S allele at the SERPINA1 locus. In some embodiments, the subject is homozygous for the Z allele at the SERPINA1 locus. In some embodiments, the subject is heterozygous for the Z allele at the SERPINA1 locus. In some embodiments, the subject has one Z allele and one S allele at the SERPINA1 locus.

The subject may not have a E342K mutation in the amino acid sequence of AAT, but still have a reduced level of wildtype AAT.

In some embodiments, after administration, the subject may have an improvement, stabilization, or slowing of edema, ascites, or jaundice, or a delay in need for liver transplantation. In some embodiments, after administration, the subject has an improvement, stabilization, or slowing of change as measured by imaging methods or liver enzyme levels as a result of administration.

Any of the guide, composition or pharmaceutical formulations described herein may be administered via a viral vector.

Any of the guide, composition or pharmaceutical formulations described herein may be administered via lipid nanoparticles.

In some embodiments, the subject is tested for specific mutations in the SERPINA1 gene before administering the guide, composition, or formulation.

In some embodiments, uses of any of the guide, composition, or formulations described herein for the preparation of a medicament for treating a human subject having AATD are encompassed.

This description and exemplary embodiments should not be taken as limiting. For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

EXAMPLES

The following examples are provided to illustrate certain disclosed embodiments and are not to be construed as limiting the scope of this disclosure in any way.

Example 1—Materials and Methods

1. In Vitro Transcription ("IVT") of Nuclease mRNA

Capped and polyadenylated *Streptococcus pyogenes* ("Spy") Cas9 mRNA containing N1-methyl pseudo-U was generated by in vitro transcription using a linearized plasmid DNA template and T7 RNA polymerase. Plasmid DNA containing a T7 promoter and a 100 nt poly (A/T) region was linearized by incubating at 37° C. for 2 hours with XbaI with the following conditions: 200 ng/4 plasmid, 2 U/µL XbaI (NEB), and 1× reaction buffer. The XbaI was inactivated by heating the reaction at 65° C. for 20 min. The linearized plasmid was purified from enzyme and buffer salts using a silica maxi spin column (Epoch Life Sciences) and analyzed by agarose gel to confirm linearization. The IVT reaction to generate Cas9 modified mRNA was incubated at 37° C. for 4 hours in the following conditions: 50 ng/4 linearized plasmid; 2 mM each of GTP, ATP, CTP, and N1-methyl pseudo-UTP (Trilink); 10 mM ARCA (Trilink); 5 U/μL T7 RNA polymerase (NEB); 1 U/μL Murine RNase inhibitor (NEB); 0.004 U/μL Inorganic *E. coli* pyrophosphatase (NEB); and 1× reaction buffer. After the 4-hour incubation, TURBO DNase (ThermoFisher) was added to a final concentration of 0.01 U/4, and the reaction was incubated for an additional 30 minutes to remove the DNA template. The Cas9 mRNA was purified from enzyme and nucleotides using a MegaClear Transcription Clean-up kit according to the manufacturer's protocol (ThermoFisher). The transcript concentration was determined by measuring the light absorbance at 260 nm (Nanodrop), and the transcript was analyzed by capillary electrophoresis by Bioanlayzer (Agilent).

For the experiments described in Examples 2 and 3, a plasmid DNA template comprising SEQ ID NO:422 was used to generate the IVT Cas9 mRNA. For the experiments described in Examples 4 and 5, a plasmid DNA template comprising SEQ ID NO:423 was used to generate the IVT Cas9 mRNA.

DNA sequence used to generate IVT mRNA used in Examples 2 and 3 (SEQ ID NO: 422):

```
TAATACGACTCACTATAGGGTCCCGCAGTCGGCGT
CCAGCGGCTCTGCTTGTTCGTGTGTGTCGTTGC
AGGCCTTATTCGGATCCATGGATAAGAAGTACTCA
ATCGGGCTGGATATCGGAACTAATTCCGTGGGTTG
GGCAGTGATCACGGATGAATACAAAGTGCCGTCCA
AGAAGTTCAAGGTCCTGGGGAACACCGATAGACAC
AGCATCAAGAAAAATCTCATCGGAGCCCTGCTGTT
TGACTCCGGCGAAACCGCAGAAGCGACCCGGCTCA
AACGTACCGCGAGGCGACGCTACACCCGGCGGAAG
AATCGCATCTGCTATCTGCAAGAGATCTTTTCGAA
CGAAATGGCAAAGGTCGACGACAGCTTCTTCCACC
GCCTGGAAGAATCTTTCCTGGTGGAGGAGGACAAG
AAGCATGAACGGCATCCTATCTTTGGAAACATCGT
CGACGAAGTGGCGTACCACGAAAAGTACCCGACCA
TCTACCATCTGCGGAAGAAGTTGGTTGACTCAACT
GACAAGGCCGACCTCAGATTGATCTACTTGGCCCT
CGCCCATATGATCAAATTCCGCGGACACTTCCTGA
TCGAAGGCGATCTGAACCCTGATAACTCCGACGTG
GATAAGCTTTTCATTCAACTGGTGCAGACCTACAA
CCAACTGTTCGAAGAAACCCAATCAATGCTAGCG
GCGTCGATGCCAAGGCCATCCTGTCCGCCCGGCTG
TCGAAGTCGCGGCGCCTCGAAAACCTGATCGCACA
GCTGCCGGGAGAGAAAAAGAACGGACTTTTCGGCA
ACTTGATCGCTCTCTCACTGGGACTCACTCCCAAT
TTCAAGTCCAATTTTGACCTGGCCGAGGACGCGAA
GCTGCAACTCTCAAAGGACACCTACGACGACGACT
TGGACAATTTGCTGGCACAAATTGGCGATCAGTAC
GCGGATCTGTTCCTTGCCGCTAAGAACCTTTCGGA
CGCAATCTTGCTGTCCGATATCCTGCGCGTGAACA
CCGAAATAACCAAAGCGCCGCTTAGCGCCTCGATG
ATTAAGCGGTACGACGAGCATCACCAGGATCTCAC
GCTGCTCAAAGCGCTCGTGAGACAGCAACTGCCTG
AAAAGTACAAGGAGATCTTCTTCGACCAGTCCAAG
AATGGGTACGCAGGGTACATCGATGGAGGCGCTAG
CCAGGAAGAGTTCTATAAGTTCATCAAGCCAATCC
TGGAAAAGATGGACGGAACCGAAGAACTGCTGGTC
AAGCTGAACAGGGAGGATCTGCTCCGGAAACAGAG
AACCTTTGACAACGGATCCATTCCCCACCAGATCC
ATCTGGGTGAGCTGCACGCCATCTTGCGGCGCCAG
GAGGACTTTTACCCATTCCTCAAGGACAACCGGGA
AAAGATCGAGAAAATTCTGACGTTCCGCATCCCGT
ATTACGTGGGCCCACTGGCGCGCGGCAATTCGCGC
TTCGCGTGGATGACTAGAAAATCAGAGGAAACCAT
CACTCCTTGGAATTTCGAGGAAGTTGTGGATAAGG
GAGCTTCGGCACAAAGCTTCATCGAACGAATGACC
AACTTCGACAAGAATCTCCCAAACGAGAAGGTGCT
TCCTAAGCACAGCCTCCTTTACGAATACTTCACTG
TCTACAACGAACTGACTAAAGTGAAATACGTTACT
GAAGGAATGAGGAAGCCGGCCTTTCTGTCCGGAGA
ACAGAAGAAAGCAATTGTCGATCTGCTGTTCAAGA
CCAACCGCAAGGTGACCGTCAAGCAGCTTAAAGAG
GACTACTTCAAGAAGATCGAGTGTTTCGACTCAGT
GGAAATCAGCGGGGTGGAGGACAGATTCAACGCTT
CGCTGGGAACCTATCATGATCTCCTGAAGATCATC
AAGGACAAGGACTTCCTTGACAACGAGGAGAACGA
GGACATCCTGGAAGATATCGTCCTGACCTTGACCC
TTTTCGAGGATCGCGAGATGATCGAGGAGAGGCTT
AAGACCTACGCTCATCTCTTCGACGATAAGGTCAT
GAAACAACTCAAGCGCCGCCGGTACACTGGTTGGG
GCCGCCTCTCCCGCAAGCTGATCAACGGTATTCGC
GATAAACAGAGCGGTAAAACTATCCTGGATTTCCT
CAAATCGGATGGCTTCGCTAATCGTAACTTCATGC
AATTGATCCACGACGACAGCCTGACCTTTAAGGAG
GACATCCAAAAAGCACAAGTGTCCGGACAGGGAGA
CTCACTCCATGAACACATCGCGAATCTGGCCGGTT
CGCCGGCGATTAAGAAGGGAATTCTGCAAACTGTG
AAGGTGGTCGACGAGCTGGTGAAGGTCATGGGACG
```

```
GCACAAACCGGAGAATATCGTGATTGAAATGGCCC
GAGAAAACCAGACTACCCAGAAGGGCCAGAAAAAC
TCCCGCGAAAGGATGAAGCGGATCGAAGAAGGAAT
CAAGGAGCTGGGCAGCCAGATCCTGAAAGAGCACC
CGGTGGAAAACACGCAGCTGCAGAACGAGAAGCTC
TACCTGTACTATTTGCAAAATGGACGGGACATGTA
CGTGGACCAAGAGCTGGACATCAATCGGTTGTCTG
ATTACGACGTGGACCACATCGTTCCACAGTCCTTT
CTGAAGGATGACTCGATCGATAACAAGGTGTTGAC
TCGCAGCGACAAGAACAGAGGGAAGTCAGATAATG
TGCCATCGGAGGAGGTCGTGAAGAAGATGAAGAAT
TACTGGCGGCAGCTCCTGAATGCGAAGCTGATTAC
CCAGAGAAAGTTTGACAATCTCACTAAAGCCGAGC
GCGGCGGACTCTCAGAGCTGGATAAGGCTGGATTC
ATCAAACGGCAGCTGGTCGAGACTCGGCAGATTAC
CAAGCACGTGGCGCAGATCTTGGACTCCCGCATGA
ACACTAAATACGACGAGAACGATAAGCTCATCCGG
GAAGTGAAGGTGATTACCCTGAAAAGCAAACTTGT
GTCGGACTTTCGGAAGGACTTTCAGTTTTACAAAG
TGAGAGAAATCAACAACTACCATCACGCGCATGAC
GCATACCTCAACGCTGTGGTCGGTACCGCCCTGAT
CAAAAAGTACCCTAAACTTGAATCGGAGTTTGTGT
ACGGAGACTACAAGGTCTACGACGTGAGGAAGATG
ATAGCCAAGTCCGAACAGGAAATCGGGAAAGCAAC
TGCGAAATACTTCTTTTACTCAAACATCATGAACT
TTTTCAAGACTGAAATTACGCTGGCCAATGGAGAA
ATCAGGAAGAGGCCACTGATCGAAACTAACGGAGA
AACGGGCGAAATCGTGTGGGACAAGGGCAGGGACT
TCGCAACTGTTCGCAAAGTGCTCTCTATGCCGCAA
GTCAATATTGTGAAGAAACCGAAGTGCAAACCGG
CGGATTTTCAAAGGAATCGATCCTCCCAAAGAGAA
ATAGCGACAAGCTCATTGCACGCAAGAAAGACTGG
GACCCGAAGAAGTACGGAGGATTCGATTCGCCGAC
TGTCGCATACTCCGTCCTCGTGGTGGCCAAGGTGG
AGAAGGGAAAGAGCAAAAAGCTCAAATCCGTCAAA
GAGCTGCTGGGGATTACCATCATGGAACGATCCTC
GTTCGAGAAGAACCCGATTGATTTCCTCGAGGCGA
AGGGTTACAAGGAGGTGAAGAAGGATCTGATCATC
AAACTCCCCAAGTACTCACTGTTCGAACTGGAAAA
TGGTCGGAAGCGCATGCTGGCTTCGGCCGGAGAAC
TCCAAAAAGGAAATGAGCTGGCCTTGCCTAGCAAG
TACGTCAACTTCCTCTATCTTGCTTCGCACTACGA
AAAACTCAAAGGGTCACCGGAAGATAACGAACAGA
AGCAGCTTTTCGTGGAGCAGCACAAGCATTATCTG
GATGAAATCATCGAACAAATCTCCGAGTTTTCAAA
GCGCGTGATCCTCGCCGACGCCAACCTCGACAAAG
TCCTGTCGGCCTACAATAAGCATAGAGATAAGCCG
ATCAGAGAACAGGCCGAGAACATTATCCACTTGTT
CACCCTGACTAACCTGGGAGCCCCAGCCGCCTTCA
AGTACTTCGATACTACTATCGATCGCAAAAGATAC
ACGTCCACCAAGGAAGTTCTGGACGCGACCCTGAT
CCACCAAAGCATCACTGGACTCTACGAAACTAGGA
TCGATCTGTCGCAGCTGGGTGGCGATGGCGGTGGA
TCTCCGAAAAAGAAGAGAAAGGTGTAATGAGCTAG
CCATCACATTTAAAAGCATCTCAGCCTACCATGAG
AATAAGAGAAAGAAAATGAAGATCAATAGCTTATT
CATCTCTTTTTCTTTTTCGTTGGTGTAAAGCCAAC
ACCCTGTCTAAAAAACATAAATTTCTTTAATCATT
TTGCCTCTTTTCTCTGTGCTTCAATTAATAAAAAA
TGGAAAGAACCTCGAGAAAAAAAAAAAAAAAAAAA
AAAAAAAAAAAAAAAAAAAAAAAAAAAAAAAAAAA
AAAAAAAAAAAAAAAAAAAAAAAAAAAAAAAAAAA
AAAAAAAAAA
```

DNA sequence used to generate IVT mRNA used in Examples 4 and 5 (SEQ ID NO: 423):

```
TAATACGACTCACTATAGGGTCCCGCAGTCGGCGT
CCAGCGGCTCTGCTTGTTCGTGTGTGTGTCGTTGC
AGGCCTTATTCGGATCCATGGATAAGAAGTACTCA
ATCGGGCTGGATATCGGAACTAATTCCGTGGGTTG
GGCAGTGATCACGGATGAATACAAAGTGCCGTCCA
AGAAGTTCAAGGTCCTGGGGAACACCGATAGACAC
AGCATCAAGAAAAATCTCATCGGAGCCCTGCTGTT
TGACTCCGGCGAAACCGCAGAAGCGACCCGGCTCA
AACGTACCGCGAGGCGACGCTACACCCGGCGGAAG
AATCGCATCTGCTATCTGCAAGAGATCTTTTCGAA
CGAAATGGCAAAGGTCGACGACAGCTTCTTCCACC
GCCTGGAAGAATCTTTCCTGGTGGAGGAGGACAAG
AAGCATGAACGGCATCCTATCTTTGAAACATCGT
CGACGAAGTGGCGTACCACGAAAAGTACCCGACCA
TCTACCATCTGCGGAAGAAGTTGGTTGACTCAACT
GACAAGGCCGACCTCAGATTGATCTACTTGGCCCT
```

```
CGCCCATATGATCAAATTCCGCGGACACTTCCTGA

TCGAAGGCGATCTGAACCCTGATAACTCCGACGTG

GATAAGCTTTTCATTCAACTGGTGCAGACCTACAA

CCAACTGTTCGAAGAAACCCAATCAATGCTAGCG

GCGTCGATGCCAAGGCCATCCTGTCCGCCCGGCTG

TCGAAGTCGCGGCGCCTCGAAAACCTGATCGCACA

GCTGCCGGGAGAGAAAAAGAACGGACTTTTCGGCA

ACTTGATCGCTCTCTCACTGGGACTCACTCCCAAT

TTCAAGTCCAATTTTGACCTGGCCGAGGACGCGAA

GCTGCAACTCTCAAAGGACACCTACGACGACGACT

TGGACAATTTGCTGGCACAAATTGGCGATCAGTAC

GCGGATCTGTTCCTTGCCGCTAAGAACCTTTCGGA

CGCAATCTTGCTGTCCGATATCCTGCGCGTGAACA

CCGAAATAACCAAAGCGCCGCTTAGCGCCTCGATG

ATTAAGCGGTACGACGAGCATCACCAGGATCTCAC

GCTGCTCAAAGCGCTCGTGAGACAGCAACTGCCTG

AAAAGTACAAGGAGATCTTCTTCGACCAGTCCAAG

AATGGGTACGCAGGGTACATCGATGGAGGCGCTAG

CCAGGAAGAGTTCTATAAGTTCATCAAGCCAATCC

TGGAAAAGATGGACGGAACCGAAGAACTGCTGGTC

AAGCTGAACAGGGAGGATCTGCTCCGGAAACAGAG

AACCTTTGACAACGGATCCATTCCCCACCAGATCC

ATCTGGGTGAGCTGCACGCCATCTTGCGGCGCCAG

GAGGACTTTTACCCATTCCTCAAGGACAACCGGGA

AAAGATCGAGAAAATTCTGACGTTCCGCATCCCGT

ATTACGTGGGCCCACTGGCGCGCGGCAATTCGCGC

TTCGCGTGGATGACTAGAAAATCAGAGGAAACCAT

CACTCCTTGGAATTTCGAGGAAGTTGTGGATAAGG

GAGCTTCGGCACAAAGCTTCATCGAACGAATGACC

AACTTCGACAAGAATCTCCCAAACGAGAAGGTGCT

TCCTAAGCACAGCCTCCTTTACGAATACTTCACTG

TCTACAACGAACTGACTAAAGTGAAATACGTTACT

GAAGGAATGAGGAAGCCGGCCTTTCTGTCCGGAGA

ACAGAAGAAAGCAATTGTCGATCTGCTGTTCAAGA

CCAACCGCAAGGTGACCGTCAAGCAGCTTAAAGAG

GACTACTTCAAGAAGATCGAGTGTTTCGACTCAGT

GGAAATCAGCGGGGTGGAGGACAGATTCAACGCTT

CGCTGGGAACCTATCATGATCTCCTGAAGATCATC

AAGGACAAGGACTTCCTTGACAACGAGGAGAACGA

GGACATCCTGGAAGATATCGTCCTGACCTTGACCC

TTTTCGAGGATCGCGAGATGATCGAGGAGAGGCTT

AAGACCTACGCTCATCTCTTCGACGATAAGGTCAT

GAAACAACTCAAGCGCCGCCGGTACACTGGTTGGG

GCCGCCTCTCCCGCAAGCTGATCAACGGTATTCGC

GATAAACAGAGCGGTAAAACTATCCTGGATTTCCT

CAAATCGGATGGCTTCGCTAATCGTAACTTCATGC

AATTGATCCACGACGACAGCCTGACCTTTAAGGAG

GACATCCAAAAGCACAAGTGTCCGGACAGGGAGA

CTCACTCCATGAACACATCGCGAATCTGGCCGGTT

CGCCGGCGATTAAGAAGGGAATTCTGCAAACTGTG

AAGGTGGTCGACGAGCTGGTGAAGGTCATGGGACG

GCACAAACCGGAGAATATCGTGATTGAAATGGCCC

GAGAAAACCAGACTACCCAGAAGGGCCAGAAAAAC

TCCCGCGAAAGGATGAAGCGGATCGAAGAAGGAAT

CAAGGAGCTGGGCAGCCAGATCCTGAAAGAGCACC

CGGTGGAAAACACGCAGCTGCAGAACGAGAAGCTC

TACCTGTACTATTTGCAAATGGACGGGACATGTA

CGTGGACCAAGAGCTGGACATCAATCGGTTGTCTG

ATTACGACGTGGACCACATCGTTCCACAGTCCTTT

CTGAAGGATGACTCGATCGATAACAAGGTGTTGAC

TCGCAGCGACAAGAACAGAGGGAAGTCAGATAATG

TGCCATCGGAGGAGGTCGTGAAGAAGATGAAGAAT

TACTGGCGGCAGCTCCTGAATGCGAAGCTGATTAC

CCAGAGAAAGTTTGACAATCTCACTAAAGCCGAGC

GCGGCGGACTCTCAGAGCTGGATAAGGCTGGATTC

ATCAAACGGCAGCTGGTCGAGACTCGGCAGATTAC

CAAGCACGTGGCGCAGATCTTGGACTCCCGCATGA

ACACTAAATACGACGAGAACGATAAGCTCATCCGG

GAAGTGAAGGTGATTACCCTGAAAAGCAAACTTGT

GTCGGACTTTCGGAAGGACTTTCAGTTTTACAAAG

TGAGAGAAATCAACAACTACCATCACGCGCATGAC

GCATACCTCAACGCTGTGGTCGGTACCGCCCTGAT

CAAAAAGTACCCTAAACTTGAATCGGAGTTTGTGT

ACGGAGACTACAAGGTCTACGACGTGAGGAAGATG

ATAGCCAAGTCCGAACAGGAAATCGGGAAAGCAAC

TGCGAAATACTTCTTTTACTCAAACATCATGAACT

TTTTCAAGACTGAAATTACGCTGGCCAATGGAGAA

ATCAGGAAGAGGCCACTGATCGAAACTAACGGAGA

AACGGGCGAAATCGTGTGGGACAAGGGCAGGGACT

TCGCAACTGTTCGCAAAGTGCTCTCTATGCCGCAA

GTCAATATTGTGAAGAAAACCGAAGTGCAAACCGG
```

-continued

CGGATTTTCAAAGGAATCGATCCTCCCAAAGAGAA

ATAGCGACAAGCTCATTGCACGCAAGAAAGACTGG

GACCCGAAGAAGTACGGAGGATTCGATTCGCCGAC

TGTCGCATACTCCGTCCTCGTGGTGGCCAAGGTGG

AGAAGGGAAAGAGCAAAAAGCTCAAATCCGTCAAA

GAGCTGCTGGGGATTACCATCATGGAACGATCCTC

GTTCGAGAAGAACCCGATTGATTTCCTCGAGGCGA

AGGGTTACAAGGAGGTGAAGAAGGATCTGATCATC

AAACTCCCCAAGTACTCACTGTTCGAACTGGAAAA

TGGTCGGAAGCGCATGCTGGCTTCGGCCGGAGAAC

TCCAAAAAGGAAATGAGCTGGCCTTGCCTAGCAAG

TACGTCAACTTCCTCTATCTTGCTTCGCACTACGA

AAAACTCAAAGGGTCACCGGAAGATAACGAACAGA

AGCAGCTTTTCGTGGAGCAGCACAAGCATTATCTG

GATGAAATCATCGAACAAATCTCCGAGTTTTCAAA

GCGCGTGATCCTCGCCGACGCCAACCTCGACAAAG

TCCTGTCGGCCTACAATAAGCATAGAGATAAGCCG

ATCAGAGAACAGGCCGAGAACATTATCCACTTGTT

CACCCTGACTAACCTGGGAGCCCCAGCCGCCTTCA

AGTACTTCGATACTACTATCGATCGCAAAAGATAC

ACGTCCACCAAGGAAGTTCTGGACGCGACCCTGAT

CCACCAAAGCATCACTGGACTCTACGAAACTAGGA

TCGATCTGTCGCAGCTGGGTGGCGATGGCTCGGCT

TACCCATACGACGTGCCTGACTACGCCTCGCTCGG

ATCGGGCTCCCCCAAAAAGAAACGGAAGGTGGACG

GATCCCCGAAAAAGAAGAGAAAGGTGGACTCCGGA

TGAGAATTATGCAGTCTAGCCATCACATTTAAAAG

CATCTCAGCCTACCATGAGAATAAGAGAAAGAAAA

TGAAGATCAATAGCTTATTCATCTCTTTTTCTTTT

TCGTTGGTGTAAAGCCAACACCCTGTCTAAAAAAC

ATAAATTTCTTTAATCATTTTGCCTCTTTTCTCTG

TGCTTCAATTAATAAAAAATGGAAAGAACCTCGAG

AAAAAAAAAAAAAAAAAAAAAAAAAAAAAAAAA

AAAAAAAAAAAAAAAAAAAAAAAAAAAAAAAAA

AAAAAAAAAAAAAAAAAAAAAAAAAAAAAA

2. Human SERPINA1 Guide Design and Human SERPINA1 with Cynomolgus Homology Guide Design Initial guide selection was performed in silico using a human reference genome (e.g., hg38) and user defined genomic regions of interest (e.g., SERPINA1 protein coding exons), for identifying PAMs in the regions of interest. For each identified PAM, analyses were performed and statistics reported. gRNA molecules were further selected and ranked based on a number of criteria known in the art (e.g., GC content, predicted on-target activity, and potential off-target activity).

A total of 88 guide RNAs were designed toward SERPINA1 (ENSG00000197249.13) targeting the protein coding regions within Exon 2 and 3. These 88 guides plus 4 control guides (in duplicate) were placed in 96 well format. In parallel, 51 guide RNAs targeting Exons 2 through 5 of SERPINA1 with 100% homology in cynomolgus monkey plus the 4 control guides (in duplicate) were placed in 96 well format. Guide sequences in the guide RNAs and corresponding genomic coordinates are provided below (Table 1).

3. Cas9 mRNA and Guide RNA Delivery In Vitro

The human embryonic kidney adenocarcinoma cell line HEK293 constitutively expressing Spy Cas9 ("HEK293_Cas9") was cultured in DMEM media supplemented with 10% fetal bovine serum and 500 µg/ml G418. Cells were plated at a density of 10,000 cells/well in a 96-well plate 20 hours prior to transfection (~70% confluent at time of transfection). Cells were transfected with Lipofectamine RNAiMAX (ThermoFisher, Cat. 13778150) according to the manufacturer's protocol. Cells were transfected with a lipoplex containing individual crRNA (25 nM), trRNA (25 nM), Lipofectamine RNAiMAX (0.3 µL/well) and OptiMem.

The human hepatocellular carcinoma cell line HUH7 (Japanese Collection of Research Bioresources Cell Bank, Cat. JCRB0403) was cultured in DMEM media supplemented with 10% fetal bovine serum. Cells were plated at a density of 15,000 cells/well in a 96-well plate 20 hours prior to transfection (~70% confluent at time of transfection). Cells were transfected with Lipofectamine MessengerMAX (ThermoFisher, Cat. LMRNA003) according to the manufacturer's protocol. Cells were sequentially transfected with a lipoplex containing Spy Cas9 mRNA (100 ng), MessengerMAX (0.3 µL/well) and OptiMem followed by a separate lipoplex containing individual crRNA (25 nM), tracer RNA (25 nM), MessengerMAX (0.3 µL/well) and OptiMem.

Primary human liver hepatocytes (PHH) (Gibco, Lot #Hu8249) were cultured according to the manufacturer's protocol (Invitrogen, protocol Nov. 28, 2012). In brief, the cells were thawed and resuspended in hepatocyte thawing medium with supplements (Gibco, Cat. CM7500) followed by centrifugation. The supernatant was discarded and the pelleted cells resuspended in hepatocyte plating medium plus supplement pack (Invitrogen, Cat. A1217601 and CM3000). Cells were counted and plated on Bio-coat collagen I coated 96-well plates (ThermoFisher, Cat. 877272) at a density of 33,000 cells/well. Plated cells were allowed to settle and adhere for 5 hours in a tissue culture incubator at 37° C. and 5% $CO_2$ atmosphere. After incubation cells were checked for monolayer formation and were washed once with hepatocyte culture medium with serum-free supplement pack (Invitrogen, Cat. A1217601 and CM4000). In parallel, individual crRNA and trRNA was pre-annealed by mixing equivalent amounts of reagent and incubating at 95° C. for 2 min and cooling to room temperature. The dual guide (dgRNA) consisting of pre-annealed crRNA and trRNA, was incubated with Spy Cas9 protein to form a ribonucleoprotein (RNP) complex. Cells were transfected with Lipofectamine RNAiMAX (ThermoFisher, Cat. 13778150) according to the manufacturer's protocol. Cells were transfected with an RNP containing Spy Cas9 (10 nM), individual crRNA (10 nM), tracer RNA (10 nM), Lipofectamine RNAiMAX (1.0 µL/well) and OptiMem.

The human hepatocellular carcinoma cell line HepG2 (American Type Culture Collection, Cat. HB-8065) was cultured in DMEM media supplemented with 10% fetal bovine serum. Cells were counted and plated on Bio-coat collagen I coated 96-well plates (ThermoFisher, Cat. 877272) at a density of 15,000 cells/well in a 96-well plate 24 hours prior to incubation with LNPs, as further described in Example 4.

4. Genomic DNA Isolation

HEK293 Cas9, HUH7 and PHH transfected cells were harvested post-transfection at 24 or 48 hours. The gDNA was extracted from each well of a 96-well plate using 50 µL/well BuccalAmp DNA Extraction solution (Epicentre, Cat. QE09050) according to manufacturer's protocol. All DNA samples were subjected to PCR and subsequent NGS analysis, as described herein.

5. Next-Generation Sequencing ("NGS") and Analysis for On-Target Cleavage Efficiency To quantitatively determine the efficiency of editing at the target location in the genome, deep sequencing was utilized to identify the presence of insertions and deletions introduced by gene editing.

PCR primers were designed around the target site within the gene of interest (e.g. SERPINA1), and the genomic area of interest was amplified. Primer sequences are provided in Table 3

TABLE 3

Sequencing Primers for SERPINA1 targeted and control crRNAs

| Description | Guide ID (Sequence primer designed for) | SEQ ID of forward sequence | Forward Sequence | SEQ ID of reverse sequence | Reverse Sequence |
|---|---|---|---|---|---|
| Control 1 | CR001261 | 142 | GAGGAGTCCACA GTAGGATTGATT | 280 | CCATCGGACGATC CTATCTGATTA |
| Control 2 | CR001262 | 143 | AGCTAGTTGGTA AGGTCAGTGTG | 281 | AAATCCTAACTGG GCTGGAAGG |
| Control 3 | CR001263 | 144 | AGCTAGTTGGTA AGGTCAGTGTG | 282 | AAATCCTAACTGG GCTGGAAGG |
| Control 4 | CR001264 | 145 | AGCTAGTTGGTA AGGTCAGTGTG | 283 | AAATCCTAACTGG GCTGGAAGG |
| SERPINA1 | CR001367 | 146 | TCATGGTGGGAT GTATCTGTCTTC | 284 | CTTGGCACAGGCT GGTTTAATAAT |
| SERPINA1 | CR001368 | 147 | TCATGGTGGGAT GTATCTGTCTTC | 285 | CTTGGCACAGGCT GGTTTAATAAT |
| SERPINA1 | CR001369 | 148 | TCATGGTGGGAT GTATCTGTCTTC | 286 | CTTGGCACAGGCT GGTTTAATAAT |
| SERPINA1 | CR001370 | 149 | GATCCTGATCATG GTGGGATGTAT | 287 | TTCTTTCAGTGTTA CTGATGTCGG |
| SERPINA1 | CR001371 | 150 | TCATGGTGGGAT GTATCTGTCTTC | 288 | CTTGGCACAGGCT GGTTTAATAAT |
| SERPINA1 | CR001372 | 151 | GATATTGGTGCTG TTGGACTGGTG | 289 | GTGTCAATCCCTG ATCACTGGG |
| SERPINA1 | CR001373 | 152 | ATGCTCACTGGG GAGAAGAAGATA | 290 | TCATCATGTGCCTT GACTCGG |
| SERPINA1 | CR001374 | 153 | ATGCTCACTGGG GAGAAGAAGATA | 291 | TCATCATGTGCCTT GACTCGG |
| SERPINA1 | CR001375 | 154 | ATGCTCACTGGG GAGAAGAAGATA | 292 | TCATCATGTGCCTT GACTCGG |
| SERPINA1 | CR001376 | 155 | GGGAGAAGAAGA TATTGGTGCTGT | 293 | GATCACTGGGAGT CATCATGTGC |
| SERPINA1 | CR001377 | 156 | GGGAGAAGAAGA TATTGGTGCTGT | 294 | GATCACTGGGAGT CATCATGTGC |
| SERPINA1 | CR001378 | 157 | GGGAGAAGAAGA TATTGGTGCTGT | 295 | GATCACTGGGAGT CATCATGTGC |
| SERPINA1 | CR001379 | 158 | GGGAGAAGAAGA TATTGGTGCTGT | 296 | GATCACTGGGAGT CATCATGTGC |
| SERPINA1 | CR001380 | 159 | GGGAGAAGAAGA TATTGGTGCTGT | 297 | GATCACTGGGAGT CATCATGTGC |

TABLE 3-continued

Sequencing Primers for SERPINA1 targeted and control crRNAs

| Description | Guide ID (Sequence primer designed for) | SEQ ID of forward sequence | Forward Sequence | SEQ ID of reverse sequence | Reverse Sequence |
|---|---|---|---|---|---|
| SERPINA1 | CR001381 | 160 | GATATTGGTGCTGTTGGACTGGTG | 298 | GTGTCAATCCCTGATCACTGGG |
| SERPINA1 | CR001382 | 161 | GGGAGAAGAAGATATTGGTGCTGT | 299 | GATCACTGGGAGTCATCATGTGC |
| SERPINA1 | CR001383 | 162 | GGGAGAAGAAGATATTGGTGCTGT | 300 | GATCACTGGGAGTCATCATGTGC |
| SERPINA1 | CR001384 | 163 | ATTGCAAAGGCTGTAGCGATGCTC | 301 | GTCTTGCAGGACAATGCCGTC |
| SERPINA1 | CR001385 | 164 | ATTGCAAAGGCTGTAGCGATGCTC | 302 | GTCTTGCAGGACAATGCCGTC |
| SERPINA1 | CR001386 | 165 | ATTGCAAAGGCTGTAGCGATGCTC | 303 | GTCTTGCAGGACAATGCCGTC |
| SERPINA1 | CR001387 | 166 | ATTGCAAAGGCTGTAGCGATGCTC | 304 | GTCTTGCAGGACAATGCCGTC |
| SERPINA1 | CR001388 | 167 | ATTTCATCGTGAGTGTCAGCCTT | 305 | AATGCCGTCTTCTGTCTCGTG |
| SERPINA1 | CR001389 | 168 | ATTTCATCGTGAGTGTCAGCCTT | 306 | AATGCCGTCTTCTGTCTCGTG |
| SERPINA1 | CR001390 | 169 | ATTTCATCGTGAGTGTCAGCCTT | 307 | AATGCCGTCTTCTGTCTCGTG |
| SERPINA1 | CR001391 | 170 | ATTTCATCGTGAGTGTCAGCCTT | 308 | AATGCCGTCTTCTGTCTCGTG |
| SERPINA1 | CR001392 | 171 | CCAGGATTTCATCGTGAGTGTCAG | 309 | GAGATGCTGCCCAGAAGACAGATA |
| SERPINA1 | CR001393 | 172 | CTCCAGGATTTCATCGTGAGTGTC | 310 | CCAGAAGACAGATACATCCCACC |
| SERPINA1 | CR001394 | 173 | CGGAATCTCCGTGAGGTTGAAAT | 311 | CTGCCCAGAAGACAGATACATCC |
| SERPINA1 | CR001395 | 174 | CGGAATCTCCGTGAGGTTGAAAT | 312 | ATGATCAGGATCACCCAACCTTC |
| SERPINA1 | CR001396 | 175 | CGGAATCTCCGTGAGGTTGAAAT | 313 | ATGATCAGGATCACCCAACCTTC |
| SERPINA1 | CR001397 | 176 | TTCATGGATCTGAGCCTCCGGAAT | 314 | CACCATGATCAGGATCACCCAAC |
| SERPINA1 | CR001398 | 177 | AAAACTTATCCACTAGCTTCAGGC | 315 | CTGAGTTCGCCTTCAGCCTATAC |
| SERPINA1 | CR001399 | 178 | AAAACTTATCCACTAGCTTCAGGC | 316 | CTGAGTTCGCCTTCAGCCTATAC |
| SERPINA1 | CR001400 | 179 | AAAACTTATCCACTAGCTTCAGGC | 317 | CTGAGTTCGCCTTCAGCCTATAC |
| SERPINA1 | CR001401 | 180 | AAAACTTATCCACTAGCTTCAGGC | 318 | CTGAGTTCGCCTTCAGCCTATAC |
| SERPINA1 | CR001402 | 181 | AAAACTTATCCACTAGCTTCAGGC | 319 | CCAACAGCACCAATATCTTCTTCT |
| SERPINA1 | CR001403 | 182 | TTATCCACTAGCTTCAGGCCCTC | 320 | CCAACAGCACCAATATCTTCTTCT |
| SERPINA1 | CR001404 | 183 | AGGCTTCTGAGTGGTACAACTTTT | 321 | AGTCCAACAGCACCAATATCTTCT |

TABLE 3-continued

Sequencing Primers for SERPINA1 targeted and control crRNAs

| Description | Guide ID (Sequence primer designed for) | SEQ ID of forward sequence | Forward Sequence | SEQ ID of reverse sequence | Reverse Sequence |
|---|---|---|---|---|---|
| SERPINA1 | CR001405 | 184 | AAAACTTATCCACTAGCTTCAGGC | 322 | ACAGCACCAATATCTTCTTCTCCC |
| SERPINA1 | CR001406 | 185 | AGGCTTCTGAGTGGTACAACTTTT | 323 | AGTCCAACAGCACCAATATCTTCT |
| SERPINA1 | CR001407 | 186 | AGGCTTCTGAGTGGTACAACTTTT | 324 | AGTCCAACAGCACCAATATCTTCT |
| SERPINA1 | CR001408 | 187 | AGGCTTCTGAGTGGTACAACTTTT | 325 | AGTCCAACAGCACCAATATCTTCT |
| SERPINA1 | CR001409 | 188 | AGGCTTCTGAGTGGTACAACTTTT | 326 | AGTCCAACAGCACCAATATCTTCT |
| SERPINA1 | CR001410 | 189 | ATTTTCCCTTGAGTACCCTTCTCC | 327 | CTGACACTCACGATGAAATCCTGG |
| SERPINA1 | CR001411 | 190 | ATTTTCCCTTGAGTACCCTTCTCC | 328 | CTGACACTCACGATGAAATCCTGG |
| SERPINA1 | CR001412 | 191 | TTGAGTACCCTTCTCCACGTAATC | 329 | GATGAAATCCTGGAGGGCCTGAAT |
| SERPINA1 | CR001413 | 192 | ATTTTCCCTTGAGTACCCTTCTCC | 330 | CTGACACTCACGATGAAATCCTGG |
| SERPINA1 | CR001414 | 193 | CCACAATTTTCCCTTGAGTACCCT | 331 | ATCCTGGAGGGCCTGAATTTCAAC |
| SERPINA1 | CR001415 | 194 | TCTCCACGTAATCGTTGATCTGTT | 332 | AAGGCTGACACTCACGATGAAATC |
| SERPINA1 | CR001416 | 195 | TCTCCACGTAATCGTTGATCTGTT | 333 | AAGGCTGACACTCACGATGAAATC |
| SERPINA1 | CR001417 | 196 | TCTCCACGTAATCGTTGATCTGTT | 334 | AAGGCTGACACTCACGATGAAATC |
| SERPINA1 | CR001418 | 197 | ATTTTCCCTTGAGTACCCTTCTCC | 335 | CTGACACTCACGATGAAATCCTGG |
| SERPINA1 | CR001419 | 198 | TCTCCACGTAATCGTTGATCTGTT | 336 | AAGGCTGACACTCACGATGAAATC |
| SERPINA1 | CR001420 | 199 | TCTCCACGTAATCGTTGATCTGTT | 337 | AAGGCTGACACTCACGATGAAATC |
| SERPINA1 | CR001421 | 200 | AAAACTGTGTCTCTGTCAAGCTCC | 338 | GAGATTCCGGAGGCTCAGATCCAT |
| SERPINA1 | CR001422 | 201 | CCACAATTTTCCCTTGAGTACCCT | 339 | GATGAAATCCTGGAGGGCCTGAAT |
| SERPINA1 | CR001423 | 202 | GCAACCTTACCTTTAAAGAAGATGTAAT | 340 | GGAACTCCTCCGTACCCTCAA |
| SERPINA1 | CR001424 | 203 | GCAACCTTACCTTTAAAGAAGATGTAAT | 341 | GGAACTCCTCCGTACCCTCAA |
| SERPINA1 | CR001425 | 204 | ACCTTTAAAGAAGATGTAATTCACCAGA | 342 | CTTCCAGGAACTCCTCCGTACC |
| SERPINA1 | CR001426 | 205 | ACCTTTAAAGAAGATGTAATTCACCAGA | 343 | CTTCCAGGAACTCCTCCGTACC |

TABLE 3-continued

Sequencing Primers for SERPINA1 targeted and control crRNAs

| Description | Guide ID (Sequence primer designed for) | SEQ ID of forward sequence | Forward Sequence | SEQ ID of reverse sequence | Reverse Sequence |
| --- | --- | --- | --- | --- | --- |
| SERPINA1 | CR001427 | 206 | ACCTTTAAAGAAGATGTAATTCACCAGA | 344 | CTTCCAGGAACTCCTCCGTACC |
| SERPINA1 | CR001428 | 207 | ACCTTTAAAGAAGATGTAATTCACCAGA | 345 | CTTCCAGGAACTCCTCCGTACC |
| SERPINA1 | CR001429 | 208 | GCAACCTTACCTTTAAAGAAGATGTAAT | 346 | GGAACTCCTCCGTACCCTCAA |
| SERPINA1 | CR001430 | 209 | CTTGTTTCTATGGGAACAGCTCAG | 347 | GGGCCTGAAGCTAGTGGATAAG |
| SERPINA1 | CR001431 | 210 | CTTGTTTCTATGGGAACAGCTCAG | 348 | GGGCCTGAAGCTAGTGGATAAG |
| SERPINA1 | CR001432 | 211 | CTTGTTTCTATGGGAACAGCTCAG | 349 | GGGCCTGAAGCTAGTGGATAAG |
| SERPINA1 | CR001433 | 212 | CTTGTTTCTATGGGAACAGCTCAG | 350 | GGGCCTGAAGCTAGTGGATAAG |
| SERPINA1 | CR001434 | 213 | CTTGTTTCTATGGGAACAGCTCAG | 351 | GGGCCTGAAGCTAGTGGATAAG |
| SERPINA1 | CR001435 | 214 | CTTGTTTCTATGGGAACAGCTCAG | 352 | GGGCCTGAAGCTAGTGGATAAG |
| SERPINA1 | CR001436 | 215 | AACTGAAGAATCCACGCTGAAAAG | 353 | TCAGAAGCCTTCACTGTCAACTTC |
| SERPINA1 | CR001437 | 216 | CATGCCTAAACGCTTCATCATAGG | 354 | GATGGTCAGTTTCAGCACCTTTTA |
| SERPINA1 | CR001438 | 217 | GGCATTGCCCAGGTATTTCATC | 355 | GAGGGATGTGTGTCGTCAAGG |
| SERPINA1 | CR001439 | 218 | GGCATTGCCCAGGTATTTCATC | 356 | GAGGGATGTGTGTCGTCAAGG |
| SERPINA1 | CR001440 | 219 | CATTGCCCAGGTATTTCATCAGC | 357 | GGAGGGGACTCATGGTTTCTTTAT |
| SERPINA1 | CR001441 | 220 | GTTCATTTTCCAGGTGCTGTAGTT | 358 | TGGTTTCTTTATTCTGCTACACTCT |
| SERPINA1 | CR001442 | 221 | GAGTTCATTTTCCAGGTGCTGTAG | 359 | ATTCTGCTACACTCTTCCAAACCT |
| SERPINA1 | CR001443 | 222 | GAGTTCATTTTCCAGGTGCTGTAG | 360 | ATTCTGCTACACTCTTCCAAACCT |
| SERPINA1 | CR001444 | 223 | GAGTTCATTTTCCAGGTGCTGTAG | 361 | ATTCTGCTACACTCTTCCAAACCT |
| SERPINA1 | CR001445 | 224 | TATCGTGGGTGAGTTCATTTTCCA | 362 | TACACTCTTCCAAACCTTCACTCA |
| SERPINA1 | CR001446 | 225 | TATCGTGGGTGAGTTCATTTTCCA | 363 | TACACTCTTCCAAACCTTCACTCA |
| SERPINA1 | CR001447 | 226 | GAGTTCATTTTCCAGGTGCTGTAG | 364 | ATTCTGCTACACTCTTCCAAACCT |
| SERPINA1 | CR001448 | 227 | GAGTTCATTTTCCAGGTGCTGTAG | 365 | ATTCTGCTACACTCTTCCAAACCT |
| SERPINA1 | CR001449 | 228 | TATCGTGGGTGAGTTCATTTTCCA | 366 | TACACTCTTCCAAACCTTCACTCA |

TABLE 3-continued

Sequencing Primers for SERPINA1 targeted and control crRNAs

| Description | Guide ID (Sequence primer designed for) | SEQ ID of forward sequence | Forward Sequence | SEQ ID of reverse sequence | Reverse Sequence |
| --- | --- | --- | --- | --- | --- |
| SERPINA1 | CR001450 | 229 | TATCGTGGGTGA GTTCATTTTCCA | 367 | TACACTCTTCCAA ACCTTCACTCA |
| SERPINA1 | CR001451 | 230 | AGGAACTTGGTG ATGATATCGTGG | 368 | AAATGGGAGAGAC CCTTTGAAGTC |
| SERPINA1 | CR001452 | 231 | CTTCATTTTCCAG GAACTTGGTGA | 369 | TTTGAAGTCAAGG ACACCGAGGAA |
| SERPINA1 | CR001453 | 232 | GGGAATCACCTT CTGTCTTCATTTT C | 370 | CCTTTGAAGTCAA GGACACCGAG |
| SERPINA1 | CR001454 | 233 | GGGAATCACCTT CTGTCTTCATTTT C | 371 | TTTGAAGTCAAGG ACACCGAGGAA |
| SERPINA1 | CR001474 | 234 | CAAAGGGTTTGTT GAACTTGACCT | 372 | CTATGTGACAGGG AGGGAGAGGAT |
| SERPINA1 | CR001475 | 235 | AGGGGAGACTTG GTATTTTGTTCA | 373 | CTATGTGACAGGG AGGGAGAGGAT |
| SERPINA1 | CR001476 | 236 | AGGGGAGACTTG GTATTTTGTTCA | 374 | CTATGTGACAGGG AGGGAGAGGAT |
| SERPINA1 | CR001477 | 237 | AGGGGAGACTTG GTATTTTGTTCA | 375 | CTATGTGACAGGG AGGGAGAGGAT |
| SERPINA1 | CR001478 | 238 | AGGGGAGACTTG GTATTTTGTTCA | 376 | CTATGTGACAGGG AGGGAGAGGAT |
| SERPINA1 | CR001483 | 239 | ACCCTTCTTTAAT GTCATCCAGGG | 377 | GATCAGCCTTACA ACGTGTCTCT |
| SERPINA1 | CR001484 | 240 | ACCCTTCTTTAAT GTCATCCAGGG | 378 | GATCAGCCTTACA ACGTGTCTCT |
| SERPINA1 | CR003190 | 241 | GATATTGGTGCTG TTGGACTGGTG | 379 | GTGTCAATCCCTG ATCACTGGG |
| SERPINA1 | CR003191 | 242 | GATATTGGTGCTG TTGGACTGGTG | 380 | GTGTCAATCCCTG ATCACTGGG |
| SERPINA1 | CR003196 | 243 | CAGGATTTCATCG TGAGTGTCAGC | 381 | CTTCTGTCTCGTGG GGCATCCTC |
| SERPINA1 | CR003204 | 244 | GTTGAGGGTACG GAGGAGTTC | 382 | ATGATCAGGATCA CCCAACCTTC |
| SERPINA1 | CR003205 | 245 | AAAACTTATCCA CTAGCTTCAGGC | 383 | CTGAGTTCGCCTT CAGCCTATAC |
| SERPINA1 | CR003206 | 246 | AAAACTTATCCA CTAGCTTCAGGC | 384 | CTGAGTTCGCCTT CAGCCTATAC |
| SERPINA1 | CR003207 | 247 | AGGCTTCTGAGT GGTACAACTTTT | 385 | AGTCCAACAGCAC CAATATCTTCT |
| SERPINA1 | CR003208 | 248 | ATTTTCCCTTGAG TACCCTTCTCC | 386 | CTGACACTCACGA TGAAATCCTGG |
| SERPINA1 | CR003217 | 249 | TCACCTTCTGTCT TCATTTTCCAG | 387 | GAGAGACCCTTTG AAGTCAAGGAC |
| SERPINA1 | CR003218 | 250 | GTCCCAACATGG CTAAGAGGTG | 388 | GAAGGTGCCTATG ATGAAGCGT |
| SERPINA1 | CR003219 | 251 | GTCCCAACATGG CTAAGAGGTG | 389 | GAAGGTGCCTATG ATGAAGCGT |

TABLE 3-continued

Sequencing Primers for SERPINA1 targeted and control crRNAs

| Description | Guide ID (Sequence primer designed for) | SEQ ID of forward sequence | Forward Sequence | SEQ ID of reverse sequence | Reverse Sequence |
|---|---|---|---|---|---|
| SERPINA1 | CR003220 | 252 | TATACAGAGTAG CAGTGACCCAGG | 390 | TTAACATCCAGCA CTGTAAGAAGC |
| SERPINA1 | CR003221 | 253 | TACAGATACCAG GGTGCAACAAG | 391 | AGGAGTAAGTGGC AGAAATAATCAGA |
| SERPINA1 | CR003222 | 254 | ATACCAGGGTGC AACAAGGTCG | 392 | GACACAGGAGTAA GTGGCAGAAAT |
| SERPINA1 | CR003223 | 255 | CCCACACATTCTT CCCTACAGATA | 393 | CAGAAGAACAAG AGGAATGCTGTG |
| SERPINA1 | CR003224 | 256 | CCCACACATTCTT CCCTACAGATA | 394 | CAGAAGAACAAG AGGAATGCTGTG |
| SERPINA1 | CR003225 | 257 | TCAGTGAATCAC GGGCATCTTC | 395 | TCTGCCAGCTTAC ATTTACCCAAA |
| SERPINA1 | CR003226 | 258 | GAATCACGGGCA TCTTCAGGAG | 396 | ACAGGTCTGCCAG CTTACATTTAC |
| SERPINA1 | CR003227 | 259 | TCAGTGAATCAC GGGCATCTTC | 397 | TCTGCCAGCTTAC ATTTACCCAAA |
| SERPINA1 | CR003235 | 260 | GCTCAACCCTTCT TTAATGTCATCC | 398 | CCTTACAACGTGT CTCTGCTTCT |
| SERPINA1 | CR003236 | 261 | ACCCTTCTTTAAT GTCATCCAGGG | 399 | GATCAGCCTTACA ACGTGTCTCT |
| SERPINA1 | CR003237 | 262 | ACCCTTCTTTAAT GTCATCCAGGG | 400 | GATCAGCCTTACA ACGTGTCTCT |
| SERPINA1 | CR003238 | 263 | ACCCTTCTTTAAT GTCATCCAGGG | 401 | GATCAGCCTTACA ACGTGTCTCT |
| SERPINA1 | CR003240 | 264 | ACCCTTCTTTAAT GTCATCCAGGG | 402 | GATCAGCCTTACA ACGTGTCTCT |
| SERPINA1 | CR003241 | 265 | ACCCTTCTTTAAT GTCATCCAGGG | 403 | GATCAGCCTTACA ACGTGTCTCT |
| SERPINA1 | CR003242 | 266 | GCTCAACCCTTCT TTAATGTCATCC | 404 | CCTTACAACGTGT CTCTGCTTCT |
| SERPINA1 | CR003243 | 267 | GCTCAACCCTTCT TTAATGTCATCC | 405 | CCTTACAACGTGT CTCTGCTTCT |
| SERPINA1 | CR003244 | 268 | AAACATGGGAGG GATTTACAGTCA | 406 | CATCGACGAGAAA GGGACTGAAG |
| SERPINA1 | CR003245 | 269 | GCTCAACCCTTCT TTAATGTCATCC | 407 | CCTTACAACGTGT CTCTGCTTCT |
| SERPINA1 | CR003246 | 270 | GCTCAACCCTTCT TTAATGTCATCC | 409 | CCTTACAACGTGT CTCTGCTTCT |

Additional PCR was performed according to the manufacturer's protocols (Illumina) to add chemistry for sequencing. The amplicons were sequenced on an Illumina MiSeq instrument. The reads were aligned to the human reference genome (e.g., hg38) after eliminating those having low quality scores. The resulting files containing the reads were mapped to the reference genome (BAM files), where reads that overlapped the target region of interest were selected and the number of wild type reads versus the number of reads which contain an insertion, substitution, or deletion was calculated.

The editing percentage (e.g., the "editing efficiency" or "percent editing") is defined as the total number of sequence reads with insertions/deletions ("indels") or substitutions over the total number of sequence reads, including wild type.

6. Alpha-1 Antitrypsin ("AAT") ELISA

The hepatocellular carcinoma cell line, HUH7, was transfected as previously described with select guides from Table 1. Six days post-transfection, cells were washed once with PBS and then replaced with 200 µL of standard DMEM media with 10% FBS. Four hours later, media was harvested and stored at −20° C. A CellTiter-Glo ("CTG") assay (Promega, Cat. G7570) was completed on the adherent cells according to the manufacturer's protocol. Total AAT levels were determined using an AAT ELISA Kit (R & D Systems, Cat. DY1268). Kit reagents and standards were prepared using the manufacturer's protocol. Prior to running the ELISA, frozen media was thawed at room temperature and centrifuged at 1000 rpm for 1 minute to pellet debris and then placed on ice. For the ELISA, 30 µL of media was diluted with 70 µL of 1× assay diluent. The ELISA procedure was completed according to the manufacturer's protocol. The plate was read on a SpectraMax M5 plate reader. AAT levels were calculated by SoftMax Pro software ver. 6.4.2 using a four parameter logistic curve fit off of the standard curve. Cell numbers for each well were estimated by comparison to the plate average based on the values obtained from the CTG assay. Final AAT levels (pg/ml) were adjusted for cell number.

7. AAT Protein Analysis by Western Blot

The hepatocellular carcinoma cell line, HUH7, was transfected as previously described with select guides from Table 1. Six-days post-transfection, the media was removed and the cells were lysed with 50 µL/well RIPA buffer (Boston Bio Products, Cat. BP-115) plus freshly added protease inhibitor mixture consisting of complete protease inhibitor cocktail (Sigma, Cat. 11697498001), 1 mM DTT, and 250 U/ml Benzonase (EMD Millipore, Cat. 71206-3). Cells were kept on ice for 30 minutes at which time NaCl (1 M final concentration) was added. Cell lysates were thoroughly mixed and retained on ice for 30 minutes. The whole cell extracts ("WCE") were transferred to a PCR plate and centrifuged to pellet debris. A Bradford assay (Bio-Rad, Cat. 500-0001) was used to assess protein content of the lysates. The Bradford assay procedure was completed according to the manufacturer's protocol. Extracts were stored at −20° C. prior to use. Western blots were performed to assess AAT protein levels. Lysates were mixed with Laemmli buffer and denatured at 95° C. for 10 minutes. Western blots were run using the NuPage system on 4-12% Bis-Tris gels (ThermoFisher) according to the manufacturer's protocol followed by wet transfer onto 0.45 µm nitrocellulose membrane (Bio-Rad, Cat. 1620115). After transfer membranes were rinsed thoroughly with water and stained with Ponceau S solution (Boston Bio Products, Cat. ST-180) to confirm complete and even transfer. Blots were blocked using 5% Dry Milk in TBS for 30 minutes on a lab rocker at room temperature. Blots were rinsed with TBST and probed with rabbit α-AAT polyclonal antibody (Sigma, Cat. HPA001292) at 1:1000 in TBST. GAPDH was used as a loading control (ThermoFisher, Cat. NB600502) at 1:2500 in TBST and incubated simultaneously with the AAT primary antibody. Blots were sealed in a bag and kept overnight at 4° C. on a lab rocker. After incubation, blots were rinsed 3 times for 5 minutes each in TBST and probed with secondary antibodies to Mouse and Rabbit (ThermoFisher, Cat. PI35518 and PISA535571) at 1:25,000 each in TBST for 30 minutes at room temperature. After incubation, blots were rinsed 3 times for 5 minutes each in TBST and 2 times with PBS. Blots were visualized and analyzed using a Licor Odyssey system.

8. Lipid Nanoparticle (LNP) Formulation

LNPs were formulated with an N:P ratio (amine to RNA phosphate) (N:P) of 4.5. The lipid nanoparticle components were dissolved in 100% ethanol with the following molar ratios: 45 mol-% cationic lipid (Lipid A); 44 mol-% cholesterol; 9 mol-% DSPC; and 2 mol-% PEG2k-DMG. The RNA cargo (1:1 mRNA:sgRNA (wt/wt)) were dissolved in 25 Mm sodium acetate buffer at pH 4.5, resulting in a concentration of RNA cargo of approximately 0.45 mg/mL. LNPs were formed by microfluidic mixing of the lipid and RNA solutions using a Precision Nanosystems NanoAssemblr™ Benchtop Instrument, according to the manufacturer's protocol. LNPs were collected in water at a ratio of 3:1. LNPs were incubated for one hour at RT. The remaining buffer was exchanged into 50 mM Tris at pH 7.5 (100-fold excess of sample volume), overnight at 4° C. under gentle stirring using a 10 kDa Slide-a-Lyzer™ G2 Dialysis Cassette (ThermoFisher Scientific). The next day the LNPs were concentrated using an Amicon filter (at 4000 g at 4 C) to twice the desired concentration. They were then mixed 1:1 with 2×TSS (50 mM Tris, 90 mM sodium chloride, 10% w/v sucrose at pH 7.5). The resulting mixture was then filtered using a 0.2 µM filter. The resulting filtrate was stored at 2-8° C.

Example 2—Screening and Guide Qualification

1. Cross Screening of SERPINA1 Guides in Multiple Cell Types

Guides targeting human SERPINA1 and those with homology in cynomolgus monkey were transfected into the HEK293 Cas9 and HUH7 cell lines, as well as primary human hepatocytes as described in Example 1. Percent editing was determined for crRNAs comprising each guide sequence across each cell type and the guide sequences were then rank ordered based on highest % edit. The screening data for the guide sequences in Table 1 in all three cell lines are listed below (Table 4, 5, and 6).

Table 4 shows the average and standard deviation for % Edit, % Insertion (Ins), and % Deletion (Del) for the SERPINA1 and control crRNAs in the human kidney adenocarcinoma cell line, HEK293 Cas9, which constitutively over expresses Spy Cas9 protein.

TABLE 4

| SERPINA1 editing data for crRNAs expressed in HEK293_Cas9 cells | | | | | |
|---|---|---|---|---|---|
| Guide ID | Avg % Edit | Std Dev % Edit | Avg % Ins | Std Dev % Ins | Avg % Del | Std Dev % Del |
| CR001261 (Control 1) | 37.14 | 10.50 | 29.56 | 7.80 | 7.58 | 2.70 |
| CR001262 (Control 2) | 61.12 | 6.39 | 6.27 | 1.02 | 54.85 | 5.37 |
| CR001263 (Control 2) | 49.83 | 5.97 | 4.14 | 0.71 | 45.70 | 5.75 |
| CR001264 (Control 3) | 63.96 | 2.58 | 12.77 | 1.85 | 51.19 | 2.62 |
| CR001367 | 19.98 | 1.45 | 2.35 | 1.20 | 17.63 | 2.22 |
| CR001368 | 33.11 | 4.48 | 6.16 | 2.34 | 26.95 | 4.20 |
| CR001369 | 39.81 | 1.81 | 18.42 | 1.08 | 21.40 | 1.10 |
| CR001370 | 57.97 | 6.52 | 7.76 | 1.07 | 50.21 | 5.61 |
| CR001371 | 35.04 | 7.59 | 7.13 | 1.42 | 27.92 | 6.25 |
| CR001372 | 15.72 | 3.21 | 8.30 | 1.95 | 7.42 | 1.27 |
| CR001373 | 45.15 | 13.06 | 4.13 | 0.99 | 41.01 | 12.06 |
| CR001374 | 58.18 | 5.41 | 2.56 | 0.13 | 55.62 | 5.54 |
| CR001375 | 7.50 | 2.34 | 2.23 | 0.51 | 5.28 | 1.85 |
| CR001376 | 44.31 | 6.67 | 7.74 | 0.64 | 36.57 | 6.06 |
| CR001377 | 20.40 | 4.28 | 1.27 | 0.29 | 19.13 | 3.99 |
| CR001378 | 28.03 | 11.43 | 3.88 | 0.83 | 24.15 | 10.95 |
| CR001379 | 53.08 | 2.61 | 16.18 | 0.22 | 36.90 | 2.39 |
| CR001380 | 46.85 | 3.14 | 14.28 | 2.62 | 32.57 | 1.47 |
| CR001381 | 36.58 | 17.60 | 8.97 | 3.66 | 27.62 | 14.60 |
| CR001382 | 44.55 | 11.27 | 4.13 | 1.16 | 40.42 | 10.40 |
| CR001383 | 30.09 | 2.46 | 6.47 | 6.04 | 23.62 | 3.58 |
| CR001384 | 33.33 | 12.19 | 6.60 | 2.35 | 26.73 | 10.30 |
| CR001385 | 17.84 | 2.09 | 2.90 | 1.09 | 14.93 | 1.01 |
| CR001386 | 28.33 | 12.64 | 5.41 | 2.41 | 22.91 | 10.28 |
| CR001387 | 1.31 | 0.11 | 0.31 | 0.06 | 1.00 | 0.05 |

TABLE 4-continued

SERPINA1 editing data for crRNAs expressed in HEK293_Cas9 cells

| Guide ID | Avg % Edit | Std Dev % Edit | Avg % Ins | Std Dev % Ins | Avg % Del | Std Dev % Del |
|---|---|---|---|---|---|---|
| CR001388 | 31.56 | 1.55 | 4.87 | 1.05 | 26.69 | 0.52 |
| CR001389 | 30.25 | 8.10 | 4.39 | 0.27 | 25.86 | 7.94 |
| CR001390 | 38.70 | 7.27 | 2.41 | 1.21 | 36.30 | 6.14 |
| CR001391 | 25.85 | 4.84 | 4.73 | 0.85 | 21.12 | 4.33 |
| CR001392 | 38.90 | 1.94 | 4.31 | 0.40 | 34.59 | 2.11 |
| CR001393 | 24.37 | 5.50 | 3.95 | 0.59 | 20.42 | 5.08 |
| CR001394 | 27.59 | 7.94 | 3.81 | 1.16 | 23.77 | 7.03 |
| CR001395 | 64.14 | 1.93 | 20.99 | 1.21 | 43.16 | 0.93 |
| CR001396 | 48.47 | 0.51 | 4.67 | 0.25 | 43.81 | 0.35 |
| CR001397 | 38.85 | 5.70 | 21.07 | 3.03 | 17.78 | 2.92 |
| CR001398 | 50.87 | 7.83 | 8.89 | 2.03 | 41.98 | 5.80 |
| CR001399 | 56.30 | 4.16 | 7.71 | 0.18 | 48.59 | 4.19 |
| CR001400 | 67.59 | 1.70 | 51.60 | 2.79 | 15.99 | 1.64 |
| CR001401 | 32.28 | 4.65 | 4.97 | 0.38 | 27.31 | 4.28 |
| CR001402 | 31.10 | 5.94 | 5.84 | 0.66 | 25.26 | 5.31 |
| CR001403 | 64.84 | 4.30 | 10.76 | 0.12 | 54.08 | 4.41 |
| CR001404 | 73.28 | 1.88 | 2.66 | 0.78 | 70.63 | 1.72 |
| CR001405 | 48.44 | 3.46 | 23.17 | 2.64 | 25.28 | 3.23 |
| CR001406 | 3.96 | 5.13 | 0.07 | 0.06 | 3.89 | 5.06 |
| CR001407 | 20.24 | 1.38 | 3.13 | 0.21 | 17.11 | 1.35 |
| CR001408 | 47.19 | 1.45 | 5.09 | 0.84 | 42.09 | 0.67 |
| CR001409 | 43.17 | 6.32 | 16.98 | 3.44 | 26.20 | 15.26 |
| CR001410 | 32.14 | 0.53 | 3.19 | 0.33 | 28.95 | 0.73 |
| CR001411 | 8.61 | 3.29 | 1.22 | 0.25 | 7.39 | 3.05 |
| CR001412 | 37.33 | 7.35 | 7.38 | 3.13 | 29.95 | 8.09 |
| CR001413 | 43.98 | 1.38 | 18.27 | 1.59 | 25.72 | 2.54 |
| CR001414 | 11.37 | 1.85 | 7.04 | 1.11 | 4.33 | 0.87 |
| CR001415 | 16.17 | 5.14 | 1.38 | 0.34 | 14.79 | 4.80 |
| CR001416 | 19.41 | 3.54 | 1.51 | 0.14 | 17.90 | 3.44 |
| CR001417 | 24.59 | 3.79 | 1.69 | 0.51 | 22.91 | 3.44 |
| CR001418 | 22.23 | 8.75 | 3.32 | 0.64 | 18.91 | 8.42 |
| CR001419 | 7.16 | 2.43 | 1.96 | 0.59 | 5.20 | 1.84 |
| CR001420 | 16.80 | 0.67 | 3.83 | 0.03 | 12.97 | 0.65 |
| CR001421 | 50.60 | 5.30 | 16.44 | 1.91 | 34.16 | 3.68 |
| CR001422 | 46.78 | 8.39 | 35.12 | 4.87 | 11.65 | 3.75 |
| CR001423 | 5.71 | 2.24 | 3.85 | 1.72 | 1.86 | 0.67 |
| CR001424 | 10.02 | 5.15 | 6.63 | 3.08 | 3.39 | 2.13 |
| CR001425 | 11.80 | 2.11 | 2.71 | 0.73 | 9.09 | 2.60 |
| CR001426 | 8.24 | 0.40 | 1.39 | 0.40 | 6.85 | 0.55 |
| CR001427 | 44.65 | 2.98 | 7.44 | 0.41 | 37.21 | 2.59 |
| CR001428 | 19.94 | 6.39 | 2.17 | 0.33 | 17.77 | 6.07 |
| CR001429 | 29.81 | 5.32 | 12.59 | 2.11 | 17.22 | 3.20 |
| CR001430 | 20.87 | 8.25 | 2.13 | 0.44 | 18.74 | 7.84 |
| CR001431 | 52.49 | 10.52 | 33.80 | 7.35 | 18.69 | 3.61 |
| CR001432 | 21.92 | 5.22 | 5.70 | 0.94 | 16.22 | 4.66 |
| CR001433 | 40.95 | 2.95 | 23.21 | 1.30 | 17.75 | 1.66 |
| CR001434 | 5.60 | 1.90 | 0.72 | 0.47 | 4.88 | 1.44 |
| CR001435 | 18.53 | 7.21 | 1.83 | 1.10 | 16.70 | 6.11 |
| CR001436 | 14.88 | 2.43 | 1.37 | 0.16 | 13.51 | 7.96 |
| CR001437 | 39.01 | 8.82 | 13.95 | 3.13 | 25.06 | 6.23 |
| CR001438 | 3.68 | 1.14 | 0.15 | 0.05 | 3.53 | 1.09 |
| CR001439 | 49.03 | 5.18 | 37.60 | 3.67 | 11.43 | 2.08 |
| CR001440 | 34.54 | 4.15 | 1.56 | 0.15 | 32.97 | 4.03 |
| CR001441 | 6.54 | 1.29 | 1.29 | 0.45 | 5.25 | 0.96 |
| CR001442 | 25.65 | 3.34 | 2.78 | 0.34 | 22.87 | 3.09 |
| CR001443 | 25.51 | 1.41 | 7.29 | 0.37 | 18.21 | 1.20 |
| CR001444 | 40.41 | 12.61 | 15.09 | 4.07 | 25.32 | 8.73 |
| CR001445 | 11.00 | 3.16 | 1.94 | 1.00 | 9.07 | 2.70 |
| CR001446 | 53.02 | 4.58 | 22.96 | 2.46 | 30.06 | 2.57 |
| CR001447 | 20.10 | 8.74 | 3.25 | 1.64 | 16.84 | 7.25 |
| CR001448 | 15.52 | 3.15 | 3.20 | 0.75 | 12.32 | 2.45 |
| CR001449 | 27.61 | 5.69 | 3.47 | 1.15 | 24.14 | 4.54 |
| CR001450 | 56.61 | 8.41 | 28.80 | 5.02 | 27.81 | 3.43 |
| CR001451 | 34.18 | 20.33 | 9.40 | 6.81 | 24.78 | 13.52 |
| CR001452 | 51.84 | 13.15 | 1.82 | 0.19 | 50.02 | 12.97 |
| CR001453 | 15.91 | 6.86 | 0.69 | 0.37 | 15.22 | 6.49 |
| CR001454 | 20.19 | 6.08 | 1.36 | 0.51 | 18.83 | 5.70 |
| CR001474 | 25.96 | 6.20 | 12.86 | 3.64 | 13.11 | 2.58 |
| CR001475 | 63.15 | 3.07 | 31.61 | 6.12 | 31.55 | 3.31 |
| CR001476 | 54.31 | 7.67 | 2.67 | 1.04 | 51.64 | 6.65 |
| CR001477 | 25.52 | 10.95 | 6.36 | 2.70 | 19.16 | 8.29 |
| CR001478 | 26.52 | 8.90 | 5.60 | 1.66 | 20.92 | 7.24 |
| CR001483 | 28.12 | 6.12 | 2.09 | 1.65 | 26.03 | 5.09 |
| CR001484 | 19.76 | 4.36 | 3.18 | 1.25 | 16.58 | 3.53 |
| CR003190 | 15.11 | 0.09 | 4.36 | 0.27 | 10.75 | 6.21 |
| CR003191 | 25.88 | 7.98 | 7.44 | 2.32 | 18.45 | 5.69 |
| CR003196 | 50.52 | 7.48 | 9.43 | 3.74 | 41.09 | 4.21 |
| CR003204 | 36.91 | 7.35 | 12.61 | 1.50 | 24.30 | 7.38 |
| CR003205 | 17.97 | 0.98 | 2.23 | 0.64 | 15.74 | 0.38 |
| CR003206 | 2.46 | 0.27 | 0.25 | 0.40 | 2.21 | 0.15 |
| CR003207 | 17.50 | 3.13 | 5.54 | 1.16 | 11.96 | 2.07 |
| CR003208 | 55.48 | 6.45 | 9.94 | 1.08 | 45.54 | 5.58 |
| CR003217 | 46.59 | 4.09 | 8.48 | 2.06 | 38.11 | 5.42 |
| CR003218 | 26.03 | 4.39 | 3.34 | 1.29 | 22.70 | 3.93 |
| CR003219 | 39.80 | 4.38 | 7.42 | 1.66 | 32.38 | 2.85 |
| CR003220 | 12.14 | 1.54 | 2.24 | 0.75 | 9.90 | 5.94 |
| CR003221 | 13.00 | 2.59 | 1.96 | 1.32 | 11.05 | 1.70 |
| CR003222 | 37.01 | 7.33 | 2.90 | 0.98 | 34.11 | 20.55 |
| CR003223 | 10.74 | 1.77 | 2.19 | 0.79 | 8.55 | 1.84 |
| CR003224 | 26.86 | 1.86 | 11.22 | 0.84 | 15.64 | 1.02 |
| CR003225 | 34.08 | 7.08 | 15.46 | 6.18 | 18.61 | 2.36 |
| CR003226 | 38.95 | 10.09 | 23.27 | 8.00 | 15.68 | 2.84 |
| CR003227 | 10.78 | 0.60 | 3.67 | 2.38 | 7.11 | 1.97 |
| CR003235 | 29.83 | 10.98 | 10.64 | 2.88 | 19.20 | 8.19 |
| CR003236 | 38.33 | 1.77 | 12.20 | 2.58 | 26.13 | 1.67 |
| CR003237 | 25.91 | 5.58 | 9.09 | 2.64 | 16.81 | 3.09 |
| CR003238 | 34.15 | 4.88 | 4.18 | 0.67 | 29.96 | 5.16 |
| CR003240 | 20.47 | 3.55 | 9.82 | 2.98 | 10.65 | 0.80 |
| CR003241 | 18.30 | 4.42 | 8.32 | 1.74 | 9.98 | 3.67 |
| CR003242 | 13.42 | 2.02 | 3.78 | 0.73 | 9.63 | 1.34 |
| CR003243 | 12.14 | 6.02 | 1.59 | 1.14 | 10.55 | 4.88 |
| CR003244 | 19.12 | 3.52 | 6.50 | 1.03 | 12.62 | 2.56 |
| CR003245 | 12.70 | 5.33 | 2.63 | 1.64 | 10.06 | 3.69 |
| CR003246 | 16.04 | 15.42 | 0.69 | 0.10 | 15.35 | 15.45 |

Table 5 shows the average and standard deviation for % Edit, % Insertion (Ins), and % Deletion (Del) for the tested SERPINA1 and control crRNAs co-transfected with Spy Cas9 mRNA in the human hepatocellular carcinoma cell line, HU-17.

TABLE 5

SERPINA1 editing data for crRNAs expressed in HUH7 cells

| Guide ID | Avg % Edit | Std Dev % Edit | Avg % Ins | Std Dev % Ins | Avg % Del | Std Dev % Del |
|---|---|---|---|---|---|---|
| CR001261 (Control 1) | 29.28 | 12.67 | 19.87 | 8.98 | 9.41 | 3.70 |
| CR001262 (Control 2) | 41.40 | 7.03 | 3.16 | 1.01 | 38.24 | 6.05 |
| CR001263 (Control 3) | 26.98 | 1.18 | 2.24 | 0.35 | 24.73 | 1.52 |
| CR001264 (Control 4) | 44.08 | 1.15 | 7.53 | 0.75 | 36.55 | 0.46 |
| CR001367 | 5.47 | 5.69 | 0.24 | 0.31 | 5.23 | 5.40 |
| CR001368 | 14.79 | 2.61 | 1.19 | 0.39 | 13.60 | 2.25 |
| CR001369 | 17.25 | 5.72 | 6.70 | 1.98 | 10.56 | 3.75 |
| CR001370 | 38.46 | 6.45 | 5.55 | 0.75 | 32.91 | 5.71 |
| CR001371 | 14.63 | 4.57 | 1.63 | 0.56 | 12.99 | 4.14 |
| CR001372 | 10.15 | 2.06 | 3.91 | 0.98 | 6.24 | 1.15 |
| CR001373 | 34.70 | 4.03 | 1.42 | 0.33 | 33.27 | 3.71 |
| CR001374 | 27.33 | 2.59 | 0.99 | 0.04 | 26.35 | 2.62 |
| CR001375 | 4.11 | 0.21 | 1.04 | 0.15 | 3.07 | 0.24 |
| CR001376 | 23.15 | 6.14 | 5.91 | 2.24 | 17.23 | 3.92 |
| CR001377 | 6.47 | 1.96 | 0.45 | 0.28 | 6.02 | 1.69 |
| CR001378 | 14.10 | 4.19 | 0.93 | 0.39 | 13.16 | 3.83 |
| CR001379 | 21.90 | 8.09 | 7.45 | 2.73 | 14.45 | 5.41 |
| CR001380 | 24.22 | 3.87 | 7.37 | 1.00 | 16.85 | 2.91 |
| CR001381 | 12.32 | 8.87 | 2.73 | 2.20 | 9.59 | 6.69 |
| CR001382 | 17.13 | 8.79 | 2.24 | 1.58 | 14.89 | 7.21 |
| CR001383 | 7.42 | 3.28 | 1.53 | 0.44 | 5.89 | 2.98 |
| CR001384 | 12.96 | 9.79 | 2.51 | 2.03 | 10.45 | 7.77 |

TABLE 5-continued

SERPINA1 editing data for crRNAs expressed in HUH7 cells

| Guide ID | Avg % Edit | Std Dev % Edit | Avg % Ins | Std Dev % Ins | Avg % Del | Std Dev % Del |
|---|---|---|---|---|---|---|
| CR001385 | 7.53 | 4.30 | 0.78 | 0.56 | 6.74 | 3.75 |
| CR001386 | 23.99 | 13.56 | 1.62 | 0.16 | 22.37 | 13.49 |
| CR001387 | 0.90 | 0.31 | 0.09 | 0.07 | 0.80 | 0.24 |
| CR001388 | 9.77 | 3.08 | 1.87 | 0.77 | 7.90 | 2.37 |
| CR001389 | 16.05 | 2.28 | 3.20 | 0.35 | 12.85 | 1.93 |
| CR001390 | 11.73 | 2.36 | 0.54 | 0.20 | 11.20 | 2.17 |
| CR001391 | 21.81 | 6.84 | 5.36 | 1.48 | 16.45 | 5.41 |
| CR001392 | 11.96 | 3.02 | 1.45 | 0.40 | 10.51 | 2.62 |
| CR001393 | 7.00 | 2.17 | 0.93 | 0.44 | 6.07 | 1.89 |
| CR001394 | 16.37 | 7.60 | 1.40 | 0.82 | 14.97 | 6.84 |
| CR001395 | 30.98 | 4.33 | 11.11 | 0.93 | 19.87 | 3.40 |
| CR001396 | 14.50 | 1.19 | 1.16 | 0.11 | 13.34 | 1.10 |
| CR001397 | 16.50 | 9.54 | 6.67 | 4.03 | 9.83 | 5.54 |
| CR001398 | 26.04 | 3.41 | 3.41 | 1.02 | 22.64 | 2.69 |
| CR001399 | 35.04 | 5.14 | 3.48 | 0.52 | 31.56 | 4.65 |
| CR001400 | 35.61 | 1.04 | 24.34 | 0.65 | 11.26 | 0.95 |
| CR001401 | 23.70 | 2.90 | 1.73 | 0.08 | 21.97 | 2.90 |
| CR001402 | 19.71 | 3.39 | 3.93 | 0.71 | 15.78 | 2.69 |
| CR001403 | 28.18 | 3.71 | 4.88 | 0.43 | 23.30 | 3.62 |
| CR001404 | 35.07 | 2.36 | 1.02 | 0.40 | 34.05 | 2.03 |
| CR001405 | 21.48 | 10.19 | 9.91 | 4.25 | 11.57 | 6.01 |
| CR001406 | 1.66 | 0.55 | 0.12 | 0.05 | 1.53 | 0.58 |
| CR001407 | 17.44 | 1.05 | 2.35 | 0.42 | 15.08 | 0.73 |
| CR001408 | 19.90 | 8.27 | 3.29 | 1.30 | 16.61 | 7.08 |
| CR001409 | 26.27 | 7.85 | 12.99 | 4.28 | 13.28 | 3.59 |
| CR001410 | 12.89 | 1.64 | 0.88 | 0.17 | 12.01 | 1.49 |
| CR001411 | 4.14 | 1.05 | 0.47 | 0.21 | 3.68 | 0.84 |
| CR001412 | 18.60 | 1.72 | 3.00 | 0.15 | 15.60 | 1.80 |
| CR001413 | 22.14 | 3.34 | 9.37 | 1.35 | 12.77 | 2.00 |
| CR001414 | 5.48 | 2.42 | 2.53 | 1.06 | 2.95 | 1.37 |
| CR001415 | 10.49 | 6.86 | 0.57 | 0.45 | 9.92 | 6.42 |
| CR001416 | 5.33 | 4.64 | 0.35 | 0.30 | 4.98 | 4.35 |
| CR001417 | 11.24 | 9.48 | 0.59 | 0.45 | 10.64 | 9.04 |
| CR001418 | 8.53 | 4.51 | 1.53 | 0.78 | 7.00 | 3.74 |
| CR001419 | 4.77 | 2.89 | 1.11 | 0.65 | 3.66 | 2.24 |
| CR001420 | 6.16 | 4.38 | 1.12 | 0.96 | 5.04 | 3.43 |
| CR001421 | 18.49 | 1.49 | 6.85 | 0.70 | 11.64 | 0.81 |
| CR001422 | 21.46 | 4.27 | 15.17 | 3.34 | 6.30 | 0.95 |
| CR001423 | 3.81 | 1.50 | 0.94 | 0.30 | 2.87 | 1.22 |
| CR001424 | 5.83 | 2.81 | 2.37 | 1.17 | 3.47 | 1.64 |
| CR001425 | 11.32 | 0.84 | 0.53 | 0.05 | 10.79 | 0.86 |
| CR001426 | 3.21 | 1.21 | 0.31 | 0.24 | 2.91 | 0.97 |
| CR001427 | 35.32 | 7.09 | 3.54 | 1.13 | 31.78 | 5.96 |
| CR001428 | 6.98 | 1.67 | 0.73 | 0.27 | 6.25 | 1.40 |
| CR001429 | 9.58 | 5.60 | 3.38 | 2.03 | 6.20 | 3.57 |
| CR001430 | 3.23 | 1.18 | 0.27 | 0.17 | 2.96 | 1.02 |
| CR001431 | 17.90 | 4.70 | 11.23 | 3.22 | 6.67 | 1.62 |
| CR001432 | 5.57 | 1.26 | 1.22 | 0.52 | 4.35 | 0.74 |
| CR001433 | 19.93 | 5.08 | 6.78 | 2.31 | 13.15 | 2.99 |
| CR001434 | 2.72 | 0.05 | 0.17 | 0.04 | 2.55 | 0.08 |
| CR001435 | 12.35 | 2.33 | 1.24 | 0.15 | 11.10 | 2.21 |
| CR001436 | 4.89 | 0.68 | 0.25 | 0.11 | 4.64 | 0.62 |
| CR001437 | 13.47 | 6.01 | 4.01 | 1.94 | 9.46 | 4.11 |
| CR001438 | 3.26 | 0.83 | 0.07 | 0.03 | 3.19 | 0.80 |
| CR001439 | 38.53 | 4.67 | 27.41 | 2.79 | 11.12 | 1.99 |
| CR001440 | 14.29 | 4.38 | 0.97 | 0.37 | 13.32 | 4.02 |
| CR001441 | 5.04 | 0.88 | 0.86 | 0.04 | 4.18 | 0.87 |
| CR001442 | 11.04 | 2.22 | 0.68 | 0.19 | 10.36 | 2.33 |
| CR001443 | 10.38 | 0.63 | 2.83 | 0.20 | 7.55 | 0.74 |
| CR001444 | 20.77 | 3.79 | 2.94 | 0.53 | 17.83 | 3.30 |
| CR001445 | 3.59 | 0.21 | 0.42 | 0.05 | 3.17 | 0.16 |
| CR001446 | 14.52 | 2.62 | 5.36 | 1.04 | 9.16 | 1.59 |
| CR001447 | 9.86 | 2.39 | 1.04 | 0.10 | 8.82 | 2.29 |
| CR001448 | 6.67 | 0.41 | 1.64 | 0.05 | 5.02 | 0.37 |
| CR001449 | 10.66 | 0.26 | 0.83 | 0.19 | 9.83 | 0.26 |
| CR001450 | 12.69 | 2.95 | 6.73 | 1.61 | 5.96 | 1.40 |
| CR001451 | 11.11 | 3.69 | 2.83 | 1.12 | 8.27 | 2.59 |
| CR001452 | 19.02 | 4.47 | 0.45 | 0.18 | 18.57 | 4.29 |
| CR001453 | 6.70 | 3.10 | 0.13 | 0.06 | 6.56 | 3.09 |
| CR001454 | 6.93 | 3.29 | 0.19 | 0.10 | 6.73 | 3.19 |
| CR001474 | 14.47 | 0.59 | 9.31 | 0.55 | 5.16 | 0.24 |
| CR001475 | 43.17 | 2.46 | 13.96 | 0.38 | 29.22 | 2.18 |
| CR001476 | 42.34 | 3.55 | 0.92 | 0.16 | 41.43 | 3.69 |
| CR001477 | 11.25 | 1.22 | 3.62 | 0.45 | 7.63 | 0.82 |
| CR001478 | 12.03 | 1.27 | 1.61 | 0.20 | 10.41 | 1.17 |
| CR001483 | 8.69 | 0.35 | 1.12 | 0.06 | 7.58 | 0.33 |
| CR001484 | 11.22 | 1.44 | 1.38 | 0.49 | 9.83 | 0.96 |
| CR003190 | 7.94 | 1.93 | 1.78 | 0.42 | 6.16 | 1.56 |
| CR003191 | 11.92 | 0.19 | 2.62 | 0.12 | 9.31 | 0.29 |
| CR003196 | 12.60 | 3.00 | 3.39 | 0.80 | 9.21 | 2.21 |
| CR003204 | 9.27 | 0.75 | 3.20 | 0.35 | 6.08 | 0.41 |
| CR003205 | 10.52 | 2.42 | 0.71 | 0.13 | 9.81 | 2.29 |
| CR003206 | 1.82 | 0.33 | 0.06 | 0.03 | 1.77 | 0.31 |
| CR003207 | 6.73 | 0.60 | 2.91 | 0.35 | 3.82 | 0.25 |
| CR003208 | 19.01 | 0.99 | 4.05 | 0.39 | 14.96 | 0.62 |
| CR003217 | 19.38 | 2.40 | 2.33 | 0.49 | 17.04 | 1.95 |
| CR003218 | 8.49 | 0.87 | 0.67 | 0.14 | 7.82 | 0.75 |
| CR003219 | 15.02 | 2.15 | 3.33 | 0.20 | 11.69 | 2.06 |
| CR003220 | 4.42 | 1.05 | 0.52 | 0.02 | 3.90 | 1.03 |
| CR003221 | 8.04 | 1.18 | 0.43 | 0.15 | 7.62 | 1.05 |
| CR003222 | 6.01 | 1.09 | 0.38 | 0.08 | 5.63 | 1.02 |
| CR003223 | 4.66 | 0.97 | 0.54 | 0.12 | 4.11 | 0.85 |
| CR003224 | 5.16 | 1.47 | 2.22 | 0.84 | 2.94 | 0.63 |
| CR003225 | 13.66 | 1.72 | 3.50 | 0.64 | 10.16 | 1.09 |
| CR003226 | 12.33 | 5.09 | 4.46 | 1.99 | 7.87 | 3.20 |
| CR003227 | 2.83 | 0.97 | 0.61 | 0.38 | 2.21 | 0.60 |
| CR003235 | 12.45 | 0.76 | 4.56 | 0.47 | 7.90 | 0.43 |
| CR003236 | 28.21 | 3.13 | 2.74 | 0.30 | 25.47 | 2.86 |
| CR003237 | 8.44 | 0.95 | 1.90 | 0.28 | 6.55 | 0.70 |
| CR003238 | 9.29 | 1.35 | 1.53 | 0.44 | 7.76 | 1.02 |
| CR003240 | 13.29 | 1.41 | 5.54 | 0.39 | 7.75 | 1.05 |
| CR003241 | 9.17 | 4.27 | 3.34 | 1.98 | 5.83 | 2.29 |
| CR003242 | 4.81 | 0.93 | 0.90 | 0.20 | 3.91 | 0.74 |
| CR003243 | 6.14 | 0.75 | 0.60 | 0.10 | 5.54 | 0.68 |
| CR003244 | 9.75 | 1.10 | 2.27 | 0.23 | 7.48 | 0.87 |
| CR003245 | 4.08 | 1.73 | 0.50 | 0.17 | 3.58 | 1.58 |
| CR003246 | 6.50 | 0.38 | 0.46 | 0.09 | 6.04 | 0.30 |

Table 6 shows the average and standard deviation for % Edit, % Insertion (Ins), and % Deletion (Del) for the tested SERPINA1 and control crRNAs co-transfected with Spy Cas9 protein in primary human hepatocytes.

TABLE 6

SERPINA1 editing data for crRNAs expressed in primary human hepatocytes

| GUIDE ID | Avg % Edit | Std Dev % Edit | Avg % Ins | Std Dev % Ins | Avg % Del | Std Dev % Del |
|---|---|---|---|---|---|---|
| CR001261 (Control 1) | 40.90 | 0.60 | 19.27 | 0.70 | 21.64 | 0.84 |
| CR001262 (Control 2) | 51.93 | 5.15 | 3.78 | 1.65 | 48.15 | 3.60 |
| CR001263 (Control 3) | 20.68 | 2.81 | 1.05 | 0.70 | 19.63 | 2.57 |
| CR001264 (Control 4) | 53.15 | 2.78 | 24.01 | 1.21 | 29.14 | 1.82 |
| CR001367 | 16.20 | 1.54 | 0.49 | 0.07 | 15.71 | 1.47 |
| CR001368 | 26.12 | 3.04 | 1.06 | 0.50 | 25.06 | 3.41 |
| CR001369 | 16.05 | 0.57 | 2.04 | 0.27 | 14.01 | 0.60 |
| CR001370 | NA | NA | NA | NA | NA | NA |
| CR001371 | 27.11 | 4.39 | 1.10 | 0.11 | 26.01 | 4.49 |
| CR001372 | 10.72 | 1.40 | 1.81 | 0.46 | 8.91 | 1.30 |
| CR001373 | 71.53 | 3.97 | 0.36 | 0.11 | 71.18 | 3.89 |
| CR001374 | 53.75 | 6.02 | 0.87 | 0.30 | 52.87 | 5.91 |
| CR001375 | 3.93 | 0.44 | 0.57 | 0.13 | 3.37 | 0.38 |
| CR001376 | 25.88 | 0.80 | 7.04 | 1.20 | 18.84 | 0.42 |
| CR001377 | 7.05 | 2.73 | 0.24 | 0.08 | 6.81 | 2.69 |
| CR001378 | 23.42 | 1.52 | 0.45 | 0.21 | 22.97 | 1.60 |
| CR001379 | 37.64 | 3.89 | 4.21 | 0.10 | 33.43 | 3.81 |
| CR001380 | 30.46 | 7.98 | 5.22 | 1.32 | 25.24 | 7.02 |
| CR001381 | 43.15 | 2.52 | 10.64 | 1.92 | 32.51 | 1.59 |
| CR001382 | 24.10 | 3.15 | 1.03 | 0.36 | 23.08 | 3.45 |

TABLE 6-continued

SERPINA1 editing data for crRNAs expressed in primary human hepatocytes

| GUIDE ID | Avg % Edit | Std Dev % Edit | Avg % Ins | Std Dev % Ins | Avg % Del | Std Dev % Del |
|---|---|---|---|---|---|---|
| CR001383 | 11.16 | 4.85 | 0.54 | 0.35 | 10.61 | 4.50 |
| CR001384 | 25.99 | 5.70 | 3.88 | 0.44 | 22.11 | 5.43 |
| CR001385 | 16.36 | 2.74 | 1.03 | 0.39 | 15.33 | 2.62 |
| CR001386 | 20.42 | 1.44 | 0.96 | 0.10 | 19.46 | 1.45 |
| CR001387 | 0.88 | 0.15 | 0.06 | 0.03 | 0.82 | 0.12 |
| CR001388 | 10.54 | 2.37 | 1.83 | 0.56 | 8.71 | 1.81 |
| CR001389 | 29.43 | 11.67 | 1.08 | 0.77 | 28.35 | 10.93 |
| CR001390 | 11.70 | 2.08 | 0.25 | 0.17 | 11.45 | 2.05 |
| CR001391 | 36.78 | 12.41 | 1.96 | 1.01 | 34.82 | 11.56 |
| CR001392 | 11.80 | 0.47 | 0.48 | 0.22 | 11.32 | 0.48 |
| CR001393 | 12.28 | 1.22 | 1.16 | 0.07 | 11.12 | 1.15 |
| CR001394 | 37.48 | 2.80 | 6.22 | 0.23 | 31.26 | 2.58 |
| CR001395 | 45.91 | 0.19 | 12.56 | 0.92 | 33.36 | 0.83 |
| CR001396 | 25.05 | 3.21 | 1.64 | 0.96 | 23.41 | 2.25 |
| CR001397 | 37.76 | 0.32 | 5.62 | 0.22 | 32.14 | 0.29 |
| CR001398 | 35.27 | 1.82 | 6.28 | 0.46 | 28.99 | 2.04 |
| CR001399 | 71.45 | 1.71 | 1.67 | 0.45 | 69.79 | 1.33 |
| CR001400 | 64.89 | 0.27 | 32.88 | 1.98 | 32.01 | 2.25 |
| CR001401 | 31.26 | 5.01 | 1.71 | 0.54 | 29.56 | 5.45 |
| CR001402 | 26.57 | 3.19 | 0.98 | 0.82 | 25.58 | 3.74 |
| CR001403 | 24.34 | 3.84 | 10.35 | 4.25 | 13.99 | 0.41 |
| CR001404 | 53.91 | 3.12 | 0.72 | 0.04 | 53.20 | 3.08 |
| CR001405 | 24.19 | 5.35 | 2.28 | 1.12 | 21.91 | 4.32 |
| CR001406 | 1.66 | 0.46 | 0.07 | 0.05 | 1.59 | 0.42 |
| CR001407 | 27.19 | 2.85 | 3.42 | 0.54 | 23.78 | 2.54 |
| CR001408 | 36.36 | 1.15 | 5.34 | 0.31 | 31.02 | 0.84 |
| CR001409 | 26.69 | 2.03 | 15.78 | 1.89 | 10.91 | 0.67 |
| CR001410 | 12.88 | 1.12 | 0.40 | 0.10 | 12.47 | 1.03 |
| CR001411 | 4.85 | 0.52 | 0.11 | 0.08 | 4.74 | 0.46 |
| CR001412 | 23.60 | 1.98 | 0.94 | 0.07 | 22.66 | 2.01 |
| CR001413 | 31.95 | 8.50 | 4.83 | 1.47 | 27.12 | 7.22 |
| CR001414 | 4.05 | 0.64 | 1.42 | 0.26 | 2.63 | 0.55 |
| CR001415 | 24.47 | 3.35 | 0.47 | 0.32 | 24.00 | 3.04 |
| CR001416 | 16.10 | 4.60 | 0.09 | 0.07 | 16.01 | 4.54 |
| CR001417 | 23.38 | 5.00 | 0.70 | 0.27 | 22.68 | 4.75 |
| CR001418 | 13.00 | 2.18 | 1.92 | 0.47 | 11.08 | 2.23 |
| CR001419 | 2.37 | 0.30 | 0.33 | 0.13 | 2.04 | 0.22 |
| CR001420 | 2.44 | 0.52 | 0.28 | 0.19 | 2.16 | 0.42 |
| CR001421 | 31.76 | 7.50 | 7.01 | 0.99 | 24.75 | 6.58 |
| CR001422 | 23.24 | 5.45 | 14.63 | 2.09 | 8.61 | 5.36 |
| CR001423 | 3.76 | 1.80 | 0.36 | 0.02 | 3.40 | 1.79 |
| CR001424 | 11.27 | 2.71 | 1.36 | 0.55 | 9.91 | 2.17 |
| CR001425 | 38.20 | 1.94 | 0.45 | 0.12 | 37.75 | 2.05 |
| CR001426 | 8.90 | 0.45 | 0.28 | 0.07 | 8.63 | 0.38 |
| CR001427 | 33.70 | 0.91 | 0.77 | 0.26 | 32.93 | 0.76 |
| CR001428 | 5.41 | 0.66 | 0.68 | 0.26 | 4.74 | 0.88 |
| CR001429 | 20.46 | 5.24 | 1.21 | 0.80 | 19.24 | 4.50 |
| CR001430 | 4.53 | 0.30 | 0.23 | 0.15 | 4.30 | 0.37 |
| CR001431 | 10.56 | 2.64 | 4.04 | 0.34 | 6.53 | 2.58 |
| CR001432 | 7.20 | 1.54 | 1.35 | 0.09 | 5.85 | 1.46 |
| CR001433 | 42.38 | 4.26 | 4.77 | 0.54 | 37.61 | 3.88 |
| CR001434 | 1.65 | 0.46 | 0.10 | 0.04 | 1.56 | 0.43 |
| CR001435 | 11.24 | 1.60 | 0.67 | 0.19 | 10.58 | 1.41 |
| CR001436 | 7.02 | 0.29 | 0.22 | 0.15 | 6.80 | 0.24 |
| CR001437 | 15.86 | 1.38 | 1.98 | 0.45 | 13.88 | 1.81 |
| CR001438 | 12.27 | 0.91 | 0.12 | 0.12 | 12.16 | 0.96 |
| CR001439 | 49.32 | 2.14 | 11.45 | 1.62 | 37.86 | 2.53 |
| CR001440 | 12.73 | 2.81 | 0.67 | 0.19 | 12.06 | 2.75 |
| CR001441 | 7.62 | 0.65 | 0.55 | 0.21 | 7.06 | 0.44 |
| CR001442 | 10.28 | 1.71 | 0.44 | 0.22 | 9.84 | 1.90 |
| CR001443 | 11.67 | 0.45 | 0.86 | 0.18 | 10.81 | 0.27 |
| CR001444 | 69.19 | 1.49 | 7.18 | 0.17 | 62.02 | 1.38 |
| CR001445 | 3.54 | 1.36 | 0.51 | 0.56 | 3.03 | 0.81 |
| CR001446 | 33.58 | 3.50 | 13.36 | 3.73 | 20.21 | 3.54 |
| CR001447 | 36.92 | 3.24 | 2.06 | 0.75 | 34.86 | 3.49 |
| CR001448 | 17.57 | 1.15 | 1.61 | 0.18 | 15.96 | 1.25 |
| CR001449 | 39.92 | 4.34 | 0.42 | 0.30 | 39.50 | 4.04 |
| CR001450 | 29.49 | 4.02 | 11.36 | 1.31 | 18.12 | 4.58 |
| CR001451 | 36.02 | 6.92 | 3.93 | 0.78 | 32.09 | 6.14 |
| CR001452 | 58.47 | 3.95 | 0.35 | 0.29 | 58.12 | 3.79 |
| CR001453 | 12.20 | 0.67 | 0.18 | 0.05 | 12.02 | 0.63 |
| CR001454 | 42.15 | 6.39 | 0.18 | 0.07 | 41.96 | 6.32 |
| CR001474 | 3.50 | 0.55 | 1.10 | 0.15 | 2.40 | 0.44 |
| CR001475 | 39.50 | 5.84 | 12.54 | 1.80 | 26.96 | 7.64 |
| CR001476 | 61.10 | 7.94 | 0.40 | 0.07 | 60.70 | 7.99 |
| CR001477 | 20.94 | 2.91 | 3.45 | 0.64 | 17.49 | 2.34 |
| CR001478 | 14.40 | 3.43 | 0.72 | 0.13 | 13.67 | 3.30 |
| CR001483 | 16.05 | 2.18 | 0.88 | 0.28 | 15.17 | 2.14 |
| CR001484 | 7.21 | 2.01 | 0.48 | 0.33 | 6.74 | 1.71 |
| CR003190 | 5.33 | 0.84 | 0.39 | 0.17 | 4.94 | 0.85 |
| CR003191 | 10.58 | 1.38 | 1.02 | 0.29 | 9.56 | 1.38 |
| CR003196 | 13.42 | 3.85 | 1.00 | 0.81 | 12.42 | 3.07 |
| CR003204 | 9.35 | 2.05 | 0.91 | 0.37 | 8.44 | 1.74 |
| CR003205 | 9.17 | 1.25 | 0.19 | 0.12 | 8.98 | 1.14 |
| CR003206 | 1.85 | 0.04 | 0.07 | 0.03 | 1.78 | 0.02 |
| CR003207 | 5.18 | 0.82 | 1.33 | 0.42 | 3.85 | 0.78 |
| CR003208 | 25.18 | 6.59 | 2.17 | 0.88 | 23.01 | 5.82 |
| CR003217 | 28.65 | 5.18 | 2.72 | 0.28 | 25.92 | 5.23 |
| CR003218 | 19.42 | 2.62 | 0.61 | 0.32 | 18.80 | 2.80 |
| CR003219 | 23.05 | 3.77 | 6.65 | 1.74 | 16.41 | 2.02 |
| CR003220 | 4.47 | 0.58 | 0.73 | 0.24 | 3.75 | 0.55 |
| CR003221 | 27.28 | 6.03 | 0.34 | 0.12 | 26.95 | 6.00 |
| CR003222 | 8.96 | 3.22 | 0.20 | 0.20 | 8.76 | 3.11 |
| CR003223 | 2.34 | 0.63 | 0.08 | 0.05 | 2.25 | 0.58 |
| CR003224 | 6.15 | 0.89 | 1.40 | 0.35 | 4.75 | 0.55 |
| CR003225 | 37.34 | 5.44 | 2.36 | 0.26 | 34.98 | 5.45 |
| CR003226 | 40.66 | 8.86 | 11.85 | 2.34 | 28.81 | 7.97 |
| CR003227 | 4.49 | 0.87 | 0.37 | 0.30 | 4.12 | 1.17 |
| CR003235 | 14.85 | 3.18 | 0.89 | 0.55 | 13.96 | 2.78 |
| CR003236 | 49.76 | 2.18 | 0.67 | 0.34 | 49.09 | 1.84 |
| CR003237 | 16.95 | 3.22 | 2.23 | 0.62 | 14.72 | 2.86 |
| CR003238 | 8.94 | 1.34 | 0.52 | 0.10 | 8.42 | 1.26 |
| CR003240 | 18.79 | 3.80 | 2.29 | 0.42 | 16.50 | 3.38 |
| CR003241 | 9.49 | 1.91 | 1.62 | 0.50 | 7.88 | 1.43 |
| CR003242 | 4.86 | 0.69 | 0.53 | 0.21 | 4.32 | 0.82 |
| CR003243 | 4.02 | 1.43 | 0.22 | 0.17 | 3.80 | 1.27 |
| CR003244 | 4.61 | 1.51 | 0.36 | 0.30 | 4.25 | 1.22 |
| CR003245 | 6.01 | 3.48 | 0.44 | 0.11 | 5.56 | 3.41 |
| CR003246 | 8.91 | 2.65 | 0.23 | 0.16 | 8.67 | 2.50 |

Figure 1:
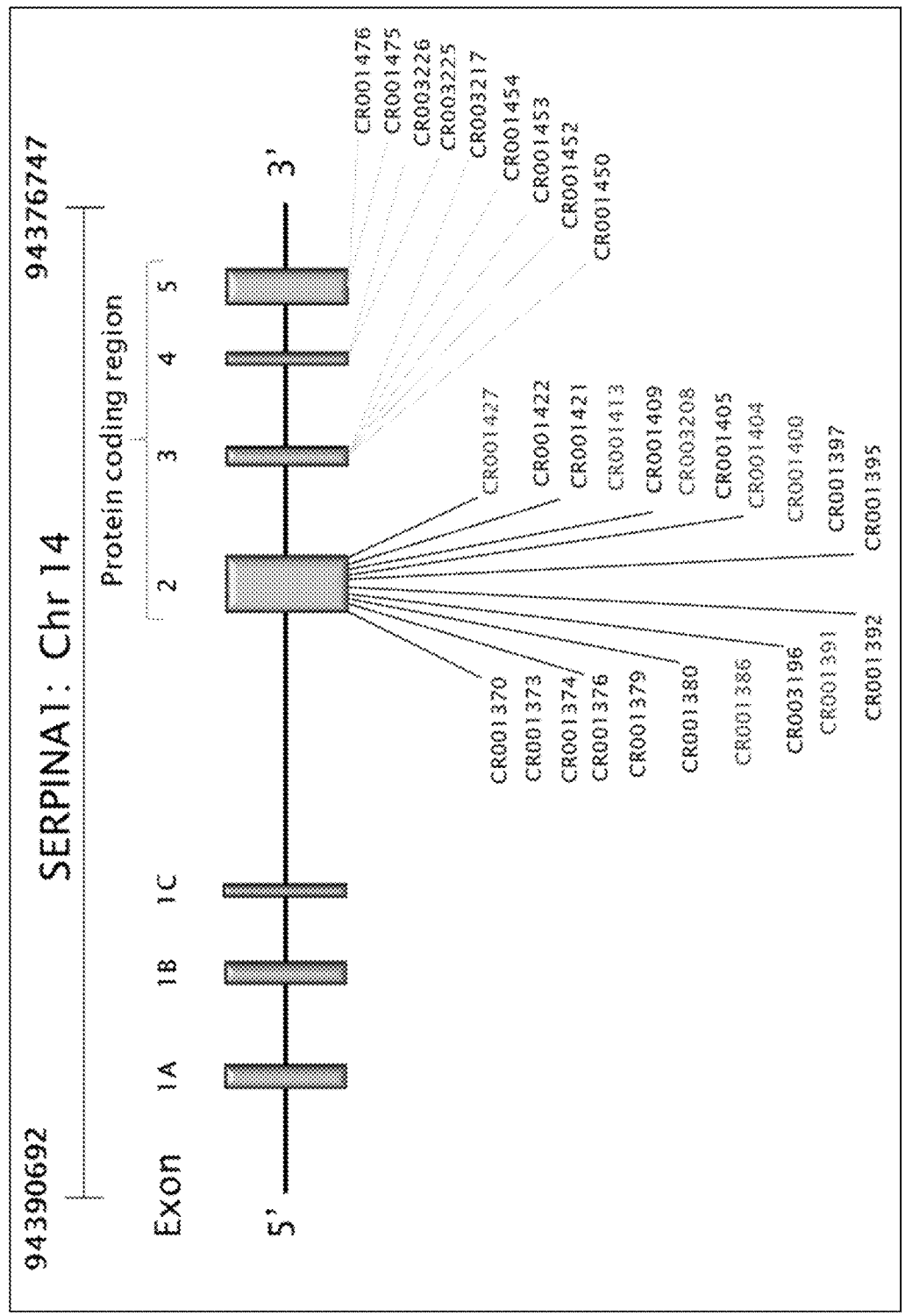
FIG. 1 shows a schematic of chromosome 14 with the regions of the SERPINA1 gene that are targeted by the guide sequences provided in Table 7.
Figure 2:
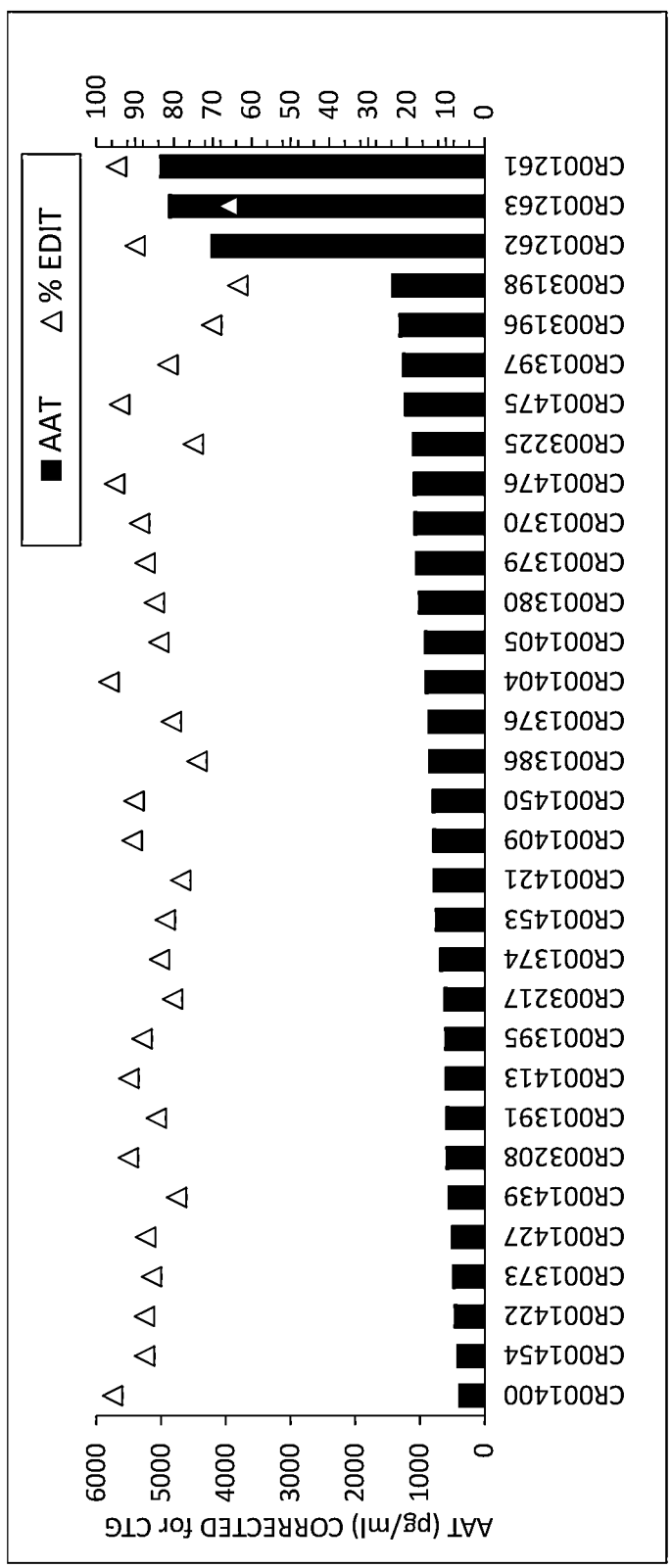
FIG. 2 shows percent editing (% edit) of AAT and levels of secreted AAT following administration of the guide sequences provided on the x-axis. CTG=CellTiter-Glo.

Selected guide sequences from each cell line were used to create a panel of 30 crRNAs for further analysis (Table 7). A schematic drawing overlaying chromosomal location of the selected SERPINA1 guides relative to exons 2-5 is presented in FIG. 1. Percent editing and AAT secretion levels are shown in FIG. 2.

TABLE 7

ELISA and western blot (WB) data for crRNAs targeting SERPINA1 in HUH7 cells

| GUIDE ID | % Edit | ELISA % Reduction | WB % Reduction |
|---|---|---|---|
| CR001370 | 89 | 78 | 16 |
| CR001373 | 86 | 90 | 37 |
| CR001374 | 84 | 86 | 28 |
| CR001376 | 81 | 83 | 42 |
| CR001379 | 87 | 78 | 58 |
| CR001380 | 85 | 79 | 49 |
| CR001386 | 74 | 74 | 43 |
| CR001391 | 74 | 74 | 45 |
| CR001392 | 64 | 71 | 37 |
| CR001395 | 88 | 88 | 47 |
| CR001397 | 82 | 75 | 40 |
| CR001400 | 96 | 92 | 57 |
| CR001404 | 97 | 82 | 47 |
| CR001405 | 84 | 81 | 70 |
| CR001409 | 91 | 84 | 70 |
| CR001413 | 92 | 88 | 72 |
| CR001421 | 78 | 84 | 55 |
| CR001422 | 88 | 91 | 36 |
| CR001427 | 87 | 60 | 66 |

TABLE 7-continued

ELISA and western blot (WB) data for crRNAs targeting SERPINA1 in HUH7 cells

| GUIDE ID | % Edit | ELISA % Reduction | WB % Reduction |
| --- | --- | --- | --- |
| CR001439 | 79 | 89 | 54 |
| CR001450 | 90 | 84 | 68 |
| CR001453 | 82 | 85 | 49 |
| CR001475 | 94 | 75 | 0 |
| CR001476 | 95 | 78 | 16 |
| CR003196 | 70 | 74 | 50 |
| CR003208 | 92 | 88 | 68 |
| CR003214 | NA | NA | 59 |
| CR003217 | 80 | 87 | 23 |
| CR003225 | 75 | 78 | 25 |
| CR003226 | NA | NA | 38 |

2. Off Target Analysis of SERPINA1 Guides

An oligo insertion based assay (See, e.g., Tsai et al., Nature Biotechnology 33, 187-197; 2015) was used to determine potential off-target genomic sites cleaved by Cas9 targeting SERPINA1. The 30 guides in Table 7 (and two control guides with known off-target profiles) were screened in the HEK293-Cas9 cells as described above, and the off-target results were plotted in FIG. 3. The assay identified potential off-target sites for some of the crRNAs and identified others that had no detectable off-targets.

Example 3. Phenotypic Analysis

1. ELISA Analysis of Secreted Alpha-1 Antitrypsin

The hepatocellular carcinoma cell line, HUH7, was transfected as described in Example 1 with guides from Table 1 in quadruplicate. Two days post-transfection, one replicate was harvested for genomic DNA and analysis by NGS sequencing. All guides, including control guides, had percent edits greater than 70% with some guides reaching 95%. Six-days post-transfection one replicate was prepared for media harvest for analysis of secreted AAT by ELISA as previously described. All of the AAT crRNAs reduced the levels of AAT secreted into the media by a factor of 5 to 10-fold when compared to the control guides. The data for % edit for each guide and reduction of extra-cellular AAT is provided in Table 7.

2. Western Analysis of Intracellular Alpha-1 Antitrypsin

The hepatocellular carcinoma cell line, HUH7, was transfected as described in Example 1 with crRNA comprising the guides from Table 1. The transfected pools of cells were retained in tissue culture and passaged for further analysis. At eleven days post-transfection, cells were harvested and whole cell extracts (WCEs) were prepared and subjected to analysis by Western Blot as previously described.

As cells were passaged samples were collected and processed for NGS sequencing as described herein. Select samples from day 2, 23, 32 and 40 were compared (Table 8) for % editing over time. This result suggests that there was not a proliferative change associated with AAT editing in regards to HUH7 cell growth.

TABLE 8

Time course of % editing in HUH7 cells

| Guide | Day 2 | Day 23 | Day 32 | Day 40 |
| --- | --- | --- | --- | --- |
| CR001261 | 95 | 96 | 97 | 96 |
| CR001263 | 66 | 70 | 71 | 70 |
| CR001373 | 86 | NA | 83 | 85 |
| CR001391 | 85 | 87 | 90 | 91 |
| CR001400 | 96 | 89 | 90 | 90 |
| CR001422 | 88 | 86 | 88 | 87 |
| CR001427 | 85 | 93 | 95 | 93 |
| CR001439 | 79 | 78 | 79 | 79 |
| CR003208 | 92 | 91 | 92 | 94 |

Figure 4:
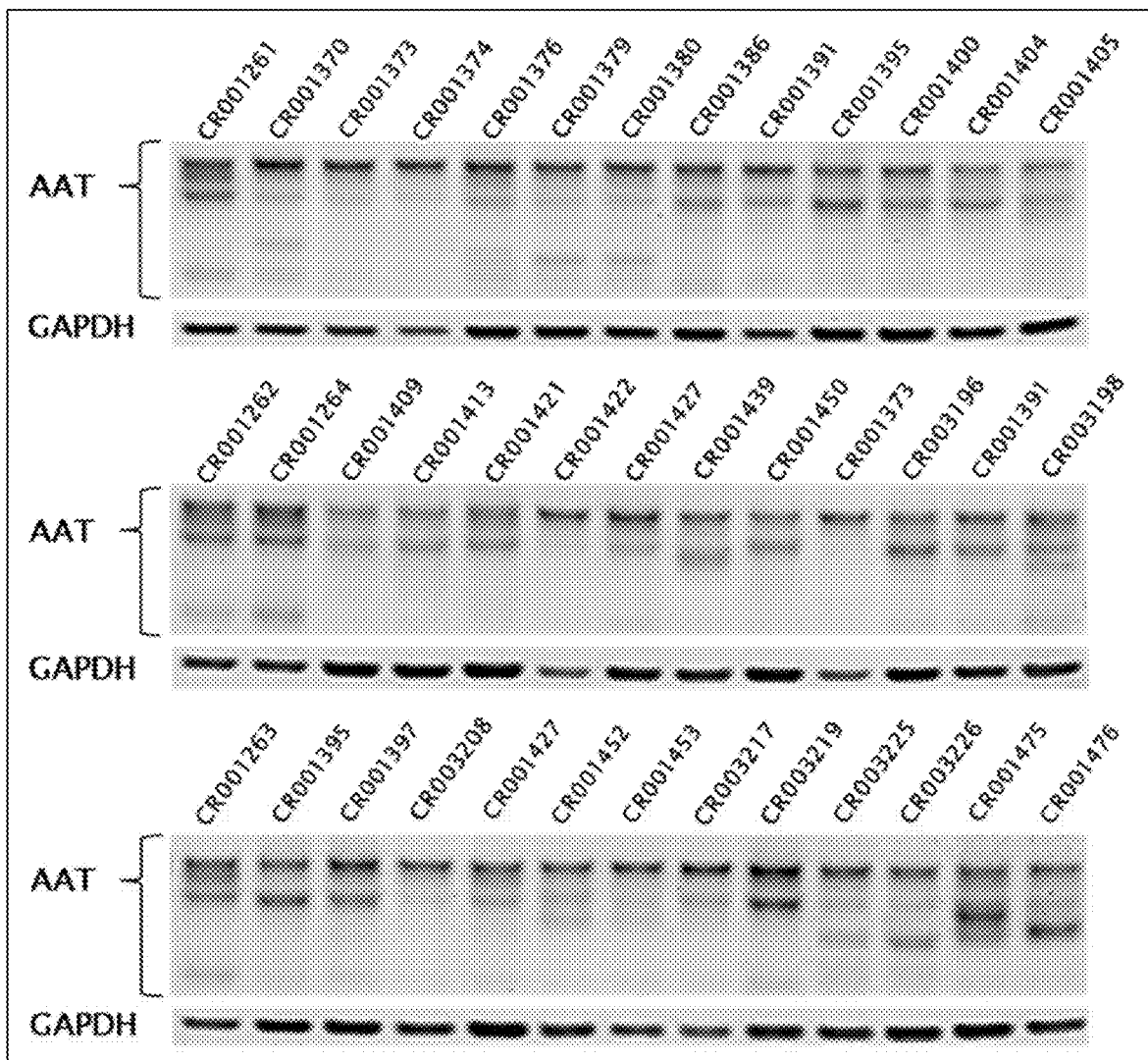
FIG. 4 shows western blot analysis of AAT-targeted guides in HUH7 cells.

WCEs were analyzed by Western Blot for reduction of AAT protein. Full length AAT protein has 418 amino acids, though the protein is heavily glycosylated prior to being secreted. Non-glycosylated AAT has a predicted molecular weight of 46 kD and a band at this molecular weight was observed in the control lanes in the Western Blot along with bands at 52 and 56 kD corresponding to various AAT protein species (FIG. 4).

Percent reduction of AAT protein was calculated using the Licor Odyssey Image Studio Ver 5.2 software. GAPDH was used as a loading control and probed simultaneously with AAT. A ratio was calculated for the densitometry values for GAPDH within each sample compared to the total region encompassing all three bands for AAT. Percent reduction of AAT protein was determined after the ratios were normalized to control lanes. Results are shown in Table 7.

3. Consolidated In Vitro Data for Select Guides

Focused data packages for individual guides were created by analyzing the data described herein. Lead candidates were characterized and rank ordered through a comparison of the reduction of secreted AAT (ELISA), reduction of total AAT protein versus production of extraneous bands (Western Blot), and off-target analysis. The homology, including any mismatches (mm) in sequence, to cynomolgus monkey is also represented. See, FIGS. 5 through 10.

Example 4. Lipid Nanoparticle (LNP) Delivery to Primary Human Hepatocytes (PHH) and HepG2 Cells Lipid nanoparticle formulations of Cas9 mRNA and modified sgRNAs targeting human SERPINA1 were tested on PHH and HepG2 cells in a dose response curve. PHH and HepG2 cells were plated as described in Example 1 (but at 15,000 PHH cells/well as opposed to 33,000/well). The cells were incubated at 37° C., 5% $CO_2$ for 24 hours prior to treatment with LNPs. The LNPs used in the experiment were prepared as described in Example 1, each containing the sgRNA specified in FIGS. 11 and 12 and Cas9 mRNA. LNPs were incubated in hepatocyte maintenance media containing 6% cyno serum at 37° C. for 5 minutes. Post incubation the LNPs were added onto the cells in an 8 point 2-fold dose response curve starting at 100 ng mRNA. The cells were lysed 72 hours post treatment for NGS analysis as described in Example 1. The dose response curve data for the guide sequences in both cell types is shown in FIGS. 11 and 12. The data show that the formulations are effective for editing both HepG2 cells, as well as primary human hepatocytes, which are the intended in vivo cell target in humans.

Example 5. Lipid Nanoparticle (LNP) Delivery and Editing of the Human PiZ Variant in Vivo Five of the six LNP formulations tested in Example 4 and a control LNP comprising a sgRNA targeting the murine TTR gene were administered to transgenic mice harboring copies of the human PiZ variant. The PiZ transgenic mouse has been described previously (See e.g., Carlson J A, Rogers B B, Sifers R N, et al. Accumulation of PiZ alpha 1-antitrypsin causes liver damage in transgenic mice. J Clin Invest 1989; 83:1183-1190), and is believed to carry 7-8 concatemerized copies of the human PiZ variant in mice heterozygous for the concatemer (data not shown).

PiZ mice (mix of male and female) ranging from 15-39 weeks of age were used in this study. LNPs were dosed via the lateral tail vein in a volume of 0.2 mL per animal (n=5 for each group), at a dose of 4 mg/kg (4 mg of total RNA content per kg). Animals were euthanized two weeks post-administration of LNPs. Blood was collected for serum analysis prior to LNP administration and at necropsy. Liver tissue was collected at necropsy from each animal for protein and DNA extraction followed by protein quantification (ELISA and Western blot analyses for serum and tissue levels of PiZ protein, respectively) and NGS analysis using the reagents and methods described in Example 1. Table 9 below shows the sgRNAs formulated in each LNP tested.

TABLE 9

| sgRNA | LNP | target |
|---|---|---|
| G000407 | 641 | hAAT |
| G000408 | 642 | hAAT |
| G000409 | 643 | hAAT |
| G000413 | 644 | hAAT |
| G000414 | 645 | hAAT |
| G000282 | 647 | mTTR |

G000282 (*=PS linkage; 'm'=2'-O-Me nucleotide):

(SEQ ID NO: 424)
mU*mU*mA*CAGCCACGUCUACAGCAGUUUUAGAmGmCmUmAmGm

AmAmAmUmAmGmCAAGUUAAAAUAAGGCUAGUCCGUUAUCAmAmC mUmUmGmAmAmAmAmGmUmGmGmCmAmCmCmGmAmGmUmCmGm

GmUmGmCmU*mU*mU*mU

As shown in FIG. 13A, robust editing of the PiZ variant of SERPINA1 (or TTR with respect to the murine control) was detected across each group, while no editing was detected in the vehicle control (TSS=Tris/sodium chloride/sucrose buffer). No editing was also detected in some animals within the experimental groups, and subsequent genotyping analysis (data not shown) revealed that these animals were negative for the PiZ transgene, and thus would not be expected to give rise to detectable editing, PiZ protein expression, or knockdown of PiZ secretion into serum. This was further confirmed by protein expression analysis (ELISA and Western blot; See FIGS. 13B and 13C).

Additionally, editing of the PiZ variant correlated with knockdown in serum levels in treated mice. Further, editing also correlated with a knockdown of PiZ protein in liver tissues as shown by Western blot (FIG. 13C). These data demonstrate that the formulations are effective for knocking down expression and secretion of the human PiZ allele in vivo.

What is claimed is:

1. A composition comprising a guide RNA or a vector encoding the guide RNA, wherein the guide RNA comprises a guide sequence selected from SEQ ID NOs: 29 and 38 or a guide sequence that is at least 95% or 90% identical to a sequence selected from SEQ ID NOs: 29 and 38, wherein the guide RNA is a single guide RNA comprising, from 5' to 3', (1) the guide sequence and (2) the sequence of SEQ ID NO: 141.

2. The composition of claim 1, wherein the guide RNA further comprises a modification selected from:
   (a) a 2'-O-methyl (2'-O-Me) modified nucleotide;
   (b) a phosphorothioate (PS) bond between nucleotides;
   (c) a 2'-fluoro (2'-F) modified nucleotide;
   (d) a modification at one, two, three, four or five of the first five nucleotides at the 5' end;
   (e) a modification at one, two, three, four, or five of the last five nucleotides at the 3' end;
   (f) PS bonds between the first four nucleotides;
   (g) PS bonds between the last four nucleotides;
   (h) 2'-O-Me modified nucleotides at the first three nucleotides at the 5' end;
   (i) 2'-O-Me modified nucleotides at the last three nucleotides at the 3' end; and
   (j) a combination of two, three, four, five, six, seven, eight, or nine of (a)-(i).

3. The composition of claim 2, wherein the modification includes PS bonds between the first four nucleotides and/or PS bonds between the last four nucleotides.

4. The composition of claim 2, wherein the modification includes 2'-O-Me modified nucleotides at the first three nucleotides at the 5' end and/or 2'-O-Me modified nucleotides at the last three nucleotides at the 3' end.

5. The composition of claim 1, wherein the guide RNA is a single guide (sgRNA) comprising a scaffold sequence comprising an upper stem (US) region, wherein the guide RNA comprises 2'-O-methyl (2'-O-Me) modified nucleotides at the first three nucleotides at the 5' end and/or 2'-O-Me modified nucleotides at the last three nucleotides at the 3' end, and wherein each nucleotide in the US region is modified with a 2'-O-Me.

6. The composition of claim 1, wherein the guide RNA comprises, from 5' to 3' (1) the guide sequence and (2) the nucleotide sequence of GUUUUAGAmGmCmUmAmGmAmAmAmUmAmGmCAAGUUAAAAUAAGGCUA-GUCC GUUAUCAmAmCmUmUmGmAmAmAmA-mAmGmUmGmGmCmAmCmCmGmAmGmUm CmGmGmUmGmCmU*mU*mU*mU (SEQ ID NO: 408), wherein * denotes that the nucleotide is linked to the next nucleotide with a phosphorothioate (PS) bond and a lower case "m" denotes that the nucleotide is modified with 2'-O-Me.

7. The composition of claim 1, wherein the guide RNA comprises a sequence comprising any one of SEQ ID NOs: 130, 410-414, and 416-421, wherein each N in the sequence is collectively replaced with the guide sequence.

8. The composition of claim 1, wherein the composition further comprises an RNA-guided DNA binding agent or an mRNA that encodes an RNA-guided DNA binding agent, wherein the RNA-guided DNA binding agent comprises a Cas nuclease.

9. The composition of claim 8, wherein the Cas nuclease is a Cas cleavase.

10. The composition of claim 8, wherein the Cas nuclease is a Cas nickase.

11. The composition of claim 8, wherein the Cas nuclease is modified.

12. The composition of claim 8, wherein the Cas nuclease is Cas9.

13. The composition of claim 1, wherein the composition comprises a lipid nanoparticle (LNP) formulation.

14. The composition of claim 13, wherein the LNP comprises (i) an ionizable lipid; (ii) a neutral lipid; (iii) a helper lipid; and (iv) a stealth lipid.

15. The composition of claim 14, wherein the ionizable lipid is (9Z,12Z)-3-((4,4-bis(octyloxy)butanoyl)oxy)-2-((((3-(diethylamino)propoxy)carbonyl)oxy)methyl)propyloctadeca-9,12-dienoate.

16. The composition of claim 13, wherein the LNP comprises:
   (i) (9Z,12Z)-3-((4,4-bis(octyloxy)butanoyl)oxy)-2-((((3-(diethylamino)propoxy)carbonyl)oxy)methyl)propyl octadeca-9,12-dienoate;
   (ii) DSPC;
   (iii) cholesterol; and
   (iv) PEG-DMG.

17. The method of claim 13, wherein the LNP formulation comprises:
   (i) about 50 mol-% (9Z,12Z)-3-((4,4-bis(octyloxy)butanoyl)oxy)-2-((((3-(diethylamino)propoxy)carbonyl)oxy)methyl)propyloctadeca-9,12-dienoate;
   (ii) about 9 mol-% DSPC;
   (iii) about 38 mol-% cholesterol; and
   (iv) about 3 mol-% PEG-DMG.

18. The composition of claim 1, wherein the composition is a pharmaceutical formulation and further comprises a pharmaceutically acceptable carrier or excipient.

* * * * *

SEQUENCE LISTING

```
Sequence total quantity: 424
SEQ ID NO: 1            moltype = RNA  length = 20
FEATURE                 Location/Qualifiers
misc_feature            1..20
                        note = Synthetic
source                  1..20
                        mol_type = other RNA
                        organism = synthetic construct
SEQUENCE: 1
gccagactcc aagttctgcc                                               20

SEQ ID NO: 2            moltype = RNA  length = 20
FEATURE                 Location/Qualifiers
misc_feature            1..20
                        note = Synthetic
source                  1..20
                        mol_type = other RNA
                        organism = synthetic construct
SEQUENCE: 2
taaggccagt ggaaagaatt                                               20

SEQ ID NO: 3            moltype = RNA  length = 20
FEATURE                 Location/Qualifiers
misc_feature            1..20
                        note = Synthetic
source                  1..20
                        mol_type = other RNA
                        organism = synthetic construct
SEQUENCE: 3
ggcagcgagg agtccacagt                                               20

SEQ ID NO: 4            moltype = RNA  length = 20
FEATURE                 Location/Qualifiers
misc_feature            1..20
                        note = Synthetic
source                  1..20
                        mol_type = other RNA
```

```
                          organism = synthetic construct
SEQUENCE: 4
tctttccact ggccttaacc                                                        20

SEQ ID NO: 5             moltype = RNA   length = 20
FEATURE                  Location/Qualifiers
misc_feature             1..20
                         note = Synthetic
source                   1..20
                         mol_type = other RNA
                         organism = synthetic construct
SEQUENCE: 5
caatgccgtc ttctgtctcg                                                        20

SEQ ID NO: 6             moltype = RNA   length = 20
FEATURE                  Location/Qualifiers
misc_feature             1..20
                         note = Synthetic
source                   1..20
                         mol_type = other RNA
                         organism = synthetic construct
SEQUENCE: 6
aatgccgtct tctgtctcgt                                                        20

SEQ ID NO: 7             moltype = RNA   length = 20
FEATURE                  Location/Qualifiers
misc_feature             1..20
                         note = Synthetic
source                   1..20
                         mol_type = other RNA
                         organism = synthetic construct
SEQUENCE: 7
atgccgtctt ctgtctcgtg                                                        20

SEQ ID NO: 8             moltype = RNA   length = 20
FEATURE                  Location/Qualifiers
misc_feature             1..20
                         note = Synthetic
source                   1..20
                         mol_type = other RNA
                         organism = synthetic construct
SEQUENCE: 8
atgccccacg agacagaaga                                                        20

SEQ ID NO: 9             moltype = RNA   length = 20
FEATURE                  Location/Qualifiers
misc_feature             1..20
                         note = Synthetic
source                   1..20
                         mol_type = other RNA
                         organism = synthetic construct
SEQUENCE: 9
ctcgtggggc atcctcctgc                                                        20

SEQ ID NO: 10            moltype = RNA   length = 20
FEATURE                  Location/Qualifiers
misc_feature             1..20
                         note = Synthetic
source                   1..20
                         mol_type = other RNA
                         organism = synthetic construct
SEQUENCE: 10
ggatcctcag ccagggagac                                                        20

SEQ ID NO: 11            moltype = RNA   length = 20
FEATURE                  Location/Qualifiers
misc_feature             1..20
                         note = Synthetic
source                   1..20
                         mol_type = other RNA
                         organism = synthetic construct
SEQUENCE: 11
tccctggctg aggatcccca                                                        20

SEQ ID NO: 12            moltype = RNA   length = 20
FEATURE                  Location/Qualifiers
misc_feature             1..20
                         note = Synthetic
source                   1..20
```

```
                        mol_type = other RNA
                        organism = synthetic construct
SEQUENCE: 12
tccctgggga tcctcagcca                                                 20

SEQ ID NO: 13           moltype = RNA   length = 20
FEATURE                 Location/Qualifiers
misc_feature            1..20
                        note = Synthetic
source                  1..20
                        mol_type = other RNA
                        organism = synthetic construct
SEQUENCE: 13
ctccctgggg atcctcagcc                                                 20

SEQ ID NO: 14           moltype = RNA   length = 20
FEATURE                 Location/Qualifiers
misc_feature            1..20
                        note = Synthetic
source                  1..20
                        mol_type = other RNA
                        organism = synthetic construct
SEQUENCE: 14
gtgggatgta tctgtcttct                                                 20

SEQ ID NO: 15           moltype = RNA   length = 20
FEATURE                 Location/Qualifiers
misc_feature            1..20
                        note = Synthetic
source                  1..20
                        mol_type = other RNA
                        organism = synthetic construct
SEQUENCE: 15
ggtgggatgt atctgtcttc                                                 20

SEQ ID NO: 16           moltype = RNA   length = 20
FEATURE                 Location/Qualifiers
misc_feature            1..20
                        note = Synthetic
source                  1..20
                        mol_type = other RNA
                        organism = synthetic construct
SEQUENCE: 16
agatacatcc caccatgatc                                                 20

SEQ ID NO: 17           moltype = RNA   length = 20
FEATURE                 Location/Qualifiers
misc_feature            1..20
                        note = Synthetic
source                  1..20
                        mol_type = other RNA
                        organism = synthetic construct
SEQUENCE: 17
tgggtgatcc tgatcatggt                                                 20

SEQ ID NO: 18           moltype = RNA   length = 20
FEATURE                 Location/Qualifiers
misc_feature            1..20
                        note = Synthetic
source                  1..20
                        mol_type = other RNA
                        organism = synthetic construct
SEQUENCE: 18
ttgggtgatc ctgatcatgg                                                 20

SEQ ID NO: 19           moltype = RNA   length = 20
FEATURE                 Location/Qualifiers
misc_feature            1..20
                        note = Synthetic
source                  1..20
                        mol_type = other RNA
                        organism = synthetic construct
SEQUENCE: 19
aggttgggtg atcctgatca                                                 20

SEQ ID NO: 20           moltype = RNA   length = 20
FEATURE                 Location/Qualifiers
misc_feature            1..20
                        note = Synthetic
```

```
source                       1..20
                             mol_type = other RNA
                             organism = synthetic construct
SEQUENCE: 20
gggtgatctt gttgaaggtt                                                    20

SEQ ID NO: 21                moltype = RNA   length = 20
FEATURE                      Location/Qualifiers
misc_feature                 1..20
                             note = Synthetic
source                       1..20
                             mol_type = other RNA
                             organism = synthetic construct
SEQUENCE: 21
ggggtgatct tgttgaaggt                                                    20

SEQ ID NO: 22                moltype = RNA   length = 20
FEATURE                      Location/Qualifiers
misc_feature                 1..20
                             note = Synthetic
source                       1..20
                             mol_type = other RNA
                             organism = synthetic construct
SEQUENCE: 22
caacaagatc accccccaacc                                                   20

SEQ ID NO: 23                moltype = RNA   length = 20
FEATURE                      Location/Qualifiers
misc_feature                 1..20
                             note = Synthetic
source                       1..20
                             mol_type = other RNA
                             organism = synthetic construct
SEQUENCE: 23
aggcgaactc agccaggttg                                                    20

SEQ ID NO: 24                moltype = RNA   length = 20
FEATURE                      Location/Qualifiers
misc_feature                 1..20
                             note = Synthetic
source                       1..20
                             mol_type = other RNA
                             organism = synthetic construct
SEQUENCE: 24
gaaggcgaac tcagccaggt                                                    20

SEQ ID NO: 25                moltype = RNA   length = 20
FEATURE                      Location/Qualifiers
misc_feature                 1..20
                             note = Synthetic
source                       1..20
                             mol_type = other RNA
                             organism = synthetic construct
SEQUENCE: 25
ggctgaaggc gaactcagcc                                                    20

SEQ ID NO: 26                moltype = RNA   length = 20
FEATURE                      Location/Qualifiers
misc_feature                 1..20
                             note = Synthetic
source                       1..20
                             mol_type = other RNA
                             organism = synthetic construct
SEQUENCE: 26
cagctggcgg tataggctga                                                    20

SEQ ID NO: 27                moltype = RNA   length = 20
FEATURE                      Location/Qualifiers
misc_feature                 1..20
                             note = Synthetic
source                       1..20
                             mol_type = other RNA
                             organism = synthetic construct
SEQUENCE: 27
cttcagccta taccgccagc                                                    20

SEQ ID NO: 28                moltype = RNA   length = 20
FEATURE                      Location/Qualifiers
misc_feature                 1..20
```

```
                    note = Synthetic
source              1..20
                    mol_type = other RNA
                    organism = synthetic construct
SEQUENCE: 28
ggtgtgccag ctggcggtat                                                    20

SEQ ID NO: 29       moltype = RNA   length = 20
FEATURE             Location/Qualifiers
misc_feature        1..20
                    note = Synthetic
source              1..20
                    mol_type = other RNA
                    organism = synthetic construct
SEQUENCE: 29
tgttggactg gtgtgccagc                                                    20

SEQ ID NO: 30       moltype = RNA   length = 20
FEATURE             Location/Qualifiers
misc_feature        1..20
                    note = Synthetic
source              1..20
                    mol_type = other RNA
                    organism = synthetic construct
SEQUENCE: 30
agatattggt gctgttggac                                                    20

SEQ ID NO: 31       moltype = RNA   length = 20
FEATURE             Location/Qualifiers
misc_feature        1..20
                    note = Synthetic
source              1..20
                    mol_type = other RNA
                    organism = synthetic construct
SEQUENCE: 31
gaagaagata ttggtgctgt                                                    20

SEQ ID NO: 32       moltype = RNA   length = 20
FEATURE             Location/Qualifiers
misc_feature        1..20
                    note = Synthetic
source              1..20
                    mol_type = other RNA
                    organism = synthetic construct
SEQUENCE: 32
cactggggag aagaagatat                                                    20

SEQ ID NO: 33       moltype = RNA   length = 20
FEATURE             Location/Qualifiers
misc_feature        1..20
                    note = Synthetic
source              1..20
                    mol_type = other RNA
                    organism = synthetic construct
SEQUENCE: 33
ggctgtagcg atgctcactg                                                    20

SEQ ID NO: 34       moltype = RNA   length = 20
FEATURE             Location/Qualifiers
misc_feature        1..20
                    note = Synthetic
source              1..20
                    mol_type = other RNA
                    organism = synthetic construct
SEQUENCE: 34
aggctgtagc gatgctcact                                                    20

SEQ ID NO: 35       moltype = RNA   length = 20
FEATURE             Location/Qualifiers
misc_feature        1..20
                    note = Synthetic
source              1..20
                    mol_type = other RNA
                    organism = synthetic construct
SEQUENCE: 35
aaggctgtag cgatgctcac                                                    20

SEQ ID NO: 36       moltype = RNA   length = 20
FEATURE             Location/Qualifiers
```

```
misc_feature         1..20
                     note = Synthetic
source               1..20
                     mol_type = other RNA
                     organism = synthetic construct
SEQUENCE: 36
tgacactcac gatgaaatcc                                                      20

SEQ ID NO: 37        moltype = RNA   length = 20
FEATURE              Location/Qualifiers
misc_feature         1..20
                     note = Synthetic
source               1..20
                     mol_type = other RNA
                     organism = synthetic construct
SEQUENCE: 37
cactcacgat gaaatcctgg                                                      20

SEQ ID NO: 38        moltype = RNA   length = 20
FEATURE              Location/Qualifiers
misc_feature         1..20
                     note = Synthetic
source               1..20
                     mol_type = other RNA
                     organism = synthetic construct
SEQUENCE: 38
actcacgatg aaatcctgga                                                      20

SEQ ID NO: 39        moltype = RNA   length = 20
FEATURE              Location/Qualifiers
misc_feature         1..20
                     note = Synthetic
source               1..20
                     mol_type = other RNA
                     organism = synthetic construct
SEQUENCE: 39
ggttgaaatt caggccctcc                                                      20

SEQ ID NO: 40        moltype = RNA   length = 20
FEATURE              Location/Qualifiers
misc_feature         1..20
                     note = Synthetic
source               1..20
                     mol_type = other RNA
                     organism = synthetic construct
SEQUENCE: 40
gggcctgaat tcaacctca                                                       20

SEQ ID NO: 41        moltype = RNA   length = 20
FEATURE              Location/Qualifiers
misc_feature         1..20
                     note = Synthetic
source               1..20
                     mol_type = other RNA
                     organism = synthetic construct
SEQUENCE: 41
tttcaacctc acggagattc                                                      20

SEQ ID NO: 42        moltype = RNA   length = 20
FEATURE              Location/Qualifiers
misc_feature         1..20
                     note = Synthetic
source               1..20
                     mol_type = other RNA
                     organism = synthetic construct
SEQUENCE: 42
caacctcacg gagattccgg                                                      20

SEQ ID NO: 43        moltype = RNA   length = 20
FEATURE              Location/Qualifiers
misc_feature         1..20
                     note = Synthetic
source               1..20
                     mol_type = other RNA
                     organism = synthetic construct
SEQUENCE: 43
gagcctccgg aatctccgtg                                                      20

SEQ ID NO: 44        moltype = RNA   length = 20
```

```
FEATURE              Location/Qualifiers
misc_feature         1..20
                     note = Synthetic
source               1..20
                     mol_type = other RNA
                     organism = synthetic construct
SEQUENCE: 44
ccggaggctc agatccatga                                                   20

SEQ ID NO: 45        moltype = RNA  length = 20
FEATURE              Location/Qualifiers
misc_feature         1..20
                     note = Synthetic
source               1..20
                     mol_type = other RNA
                     organism = synthetic construct
SEQUENCE: 45
tgagggtacg gaggagttcc                                                   20

SEQ ID NO: 46        moltype = RNA  length = 20
FEATURE              Location/Qualifiers
misc_feature         1..20
                     note = Synthetic
source               1..20
                     mol_type = other RNA
                     organism = synthetic construct
SEQUENCE: 46
ctggctggtt gagggtacgg                                                   20

SEQ ID NO: 47        moltype = RNA  length = 20
FEATURE              Location/Qualifiers
misc_feature         1..20
                     note = Synthetic
source               1..20
                     mol_type = other RNA
                     organism = synthetic construct
SEQUENCE: 47
ctggctgtct ggctggttga                                                   20

SEQ ID NO: 48        moltype = RNA  length = 20
FEATURE              Location/Qualifiers
misc_feature         1..20
                     note = Synthetic
source               1..20
                     mol_type = other RNA
                     organism = synthetic construct
SEQUENCE: 48
ctccagctga ccaccggcaa                                                   20

SEQ ID NO: 49        moltype = RNA  length = 20
FEATURE              Location/Qualifiers
misc_feature         1..20
                     note = Synthetic
source               1..20
                     mol_type = other RNA
                     organism = synthetic construct
SEQUENCE: 49
ggccattgcc ggtggtcagc                                                   20

SEQ ID NO: 50        moltype = RNA  length = 20
FEATURE              Location/Qualifiers
misc_feature         1..20
                     note = Synthetic
source               1..20
                     mol_type = other RNA
                     organism = synthetic construct
SEQUENCE: 50
gaggaacagg ccattgccgg                                                   20

SEQ ID NO: 51        moltype = RNA  length = 20
FEATURE              Location/Qualifiers
misc_feature         1..20
                     note = Synthetic
source               1..20
                     mol_type = other RNA
                     organism = synthetic construct
SEQUENCE: 51
gctgaggaac aggccattgc                                                   20
```

```
SEQ ID NO: 52              moltype = RNA   length = 20
FEATURE                    Location/Qualifiers
misc_feature               1..20
                           note = Synthetic
source                     1..20
                           mol_type = other RNA
                           organism = synthetic construct
SEQUENCE: 52
caatggcctg ttcctcagcg                                                   20

SEQ ID NO: 53              moltype = RNA   length = 20
FEATURE                    Location/Qualifiers
misc_feature               1..20
                           note = Synthetic
source                     1..20
                           mol_type = other RNA
                           organism = synthetic construct
SEQUENCE: 53
aatggcctgt tcctcagcga                                                   20

SEQ ID NO: 54              moltype = RNA   length = 20
FEATURE                    Location/Qualifiers
misc_feature               1..20
                           note = Synthetic
source                     1..20
                           mol_type = other RNA
                           organism = synthetic construct
SEQUENCE: 54
tcaggccctc gctgaggaac                                                   20

SEQ ID NO: 55              moltype = RNA   length = 20
FEATURE                    Location/Qualifiers
misc_feature               1..20
                           note = Synthetic
source                     1..20
                           mol_type = other RNA
                           organism = synthetic construct
SEQUENCE: 55
ctagcttcag gccctcgctg                                                   20

SEQ ID NO: 56              moltype = RNA   length = 20
FEATURE                    Location/Qualifiers
misc_feature               1..20
                           note = Synthetic
source                     1..20
                           mol_type = other RNA
                           organism = synthetic construct
SEQUENCE: 56
cagcgagggc ctgaagctag                                                   20

SEQ ID NO: 57              moltype = RNA   length = 20
FEATURE                    Location/Qualifiers
misc_feature               1..20
                           note = Synthetic
source                     1..20
                           mol_type = other RNA
                           organism = synthetic construct
SEQUENCE: 57
aaaacttatc cactagcttc                                                   20

SEQ ID NO: 58              moltype = RNA   length = 20
FEATURE                    Location/Qualifiers
misc_feature               1..20
                           note = Synthetic
source                     1..20
                           mol_type = other RNA
                           organism = synthetic construct
SEQUENCE: 58
gaagctagtg gataagtttt                                                   20

SEQ ID NO: 59              moltype = RNA   length = 20
FEATURE                    Location/Qualifiers
misc_feature               1..20
                           note = Synthetic
source                     1..20
                           mol_type = other RNA
                           organism = synthetic construct
SEQUENCE: 59
gctagtggat aagttttggg                                                   20
```

```
SEQ ID NO: 60          moltype = RNA   length = 20
FEATURE                Location/Qualifiers
misc_feature           1..20
                       note = Synthetic
source                 1..20
                       mol_type = other RNA
                       organism = synthetic construct
SEQUENCE: 60
tgacagtgaa ggcttctgag                                                  20

SEQ ID NO: 61          moltype = RNA   length = 20
FEATURE                Location/Qualifiers
misc_feature           1..20
                       note = Synthetic
source                 1..20
                       mol_type = other RNA
                       organism = synthetic construct
SEQUENCE: 61
aagccttcac tgtcaacttc                                                  20

SEQ ID NO: 62          moltype = RNA   length = 20
FEATURE                Location/Qualifiers
misc_feature           1..20
                       note = Synthetic
source                 1..20
                       mol_type = other RNA
                       organism = synthetic construct
SEQUENCE: 62
agccttcact gtcaacttcg                                                  20

SEQ ID NO: 63          moltype = RNA   length = 20
FEATURE                Location/Qualifiers
misc_feature           1..20
                       note = Synthetic
source                 1..20
                       mol_type = other RNA
                       organism = synthetic construct
SEQUENCE: 63
gtccccgaag ttgacagtga                                                  20

SEQ ID NO: 64          moltype = RNA   length = 20
FEATURE                Location/Qualifiers
misc_feature           1..20
                       note = Synthetic
source                 1..20
                       mol_type = other RNA
                       organism = synthetic construct
SEQUENCE: 64
caacttcggg gacaccgaag                                                  20

SEQ ID NO: 65          moltype = RNA   length = 20
FEATURE                Location/Qualifiers
misc_feature           1..20
                       note = Synthetic
source                 1..20
                       mol_type = other RNA
                       organism = synthetic construct
SEQUENCE: 65
gatctgtttc ttggcctctt                                                  20

SEQ ID NO: 66          moltype = RNA   length = 20
FEATURE                Location/Qualifiers
misc_feature           1..20
                       note = Synthetic
source                 1..20
                       mol_type = other RNA
                       organism = synthetic construct
SEQUENCE: 66
gtaatcgttg atctgtttct                                                  20

SEQ ID NO: 67          moltype = RNA   length = 20
FEATURE                Location/Qualifiers
misc_feature           1..20
                       note = Synthetic
source                 1..20
                       mol_type = other RNA
                       organism = synthetic construct
SEQUENCE: 67
```
gaaacagatc aacgattacg                                             20

SEQ ID NO: 68          moltype = RNA   length = 20
FEATURE                Location/Qualifiers
misc_feature           1..20
                       note = Synthetic
source                 1..20
                       mol_type = other RNA
                       organism = synthetic construct
SEQUENCE: 68
gatcaacgat tacgtggaga                                             20

SEQ ID NO: 69          moltype = RNA   length = 20
FEATURE                Location/Qualifiers
misc_feature           1..20
                       note = Synthetic
source                 1..20
                       mol_type = other RNA
                       organism = synthetic construct
SEQUENCE: 69
atcaacgatt acgtggagaa                                             20

SEQ ID NO: 70          moltype = RNA   length = 20
FEATURE                Location/Qualifiers
misc_feature           1..20
                       note = Synthetic
source                 1..20
                       mol_type = other RNA
                       organism = synthetic construct
SEQUENCE: 70
tacgtggaga agggtactca                                             20

SEQ ID NO: 71          moltype = RNA   length = 20
FEATURE                Location/Qualifiers
misc_feature           1..20
                       note = Synthetic
source                 1..20
                       mol_type = other RNA
                       organism = synthetic construct
SEQUENCE: 71
acgtggagaa gggtactcaa                                             20

SEQ ID NO: 72          moltype = RNA   length = 20
FEATURE                Location/Qualifiers
misc_feature           1..20
                       note = Synthetic
source                 1..20
                       mol_type = other RNA
                       organism = synthetic construct
SEQUENCE: 72
tcaagggaaa attgtggatt                                             20

SEQ ID NO: 73          moltype = RNA   length = 20
FEATURE                Location/Qualifiers
misc_feature           1..20
                       note = Synthetic
source                 1..20
                       mol_type = other RNA
                       organism = synthetic construct
SEQUENCE: 73
gaaaattgtg gatttggtca                                             20

SEQ ID NO: 74          moltype = RNA   length = 20
FEATURE                Location/Qualifiers
misc_feature           1..20
                       note = Synthetic
source                 1..20
                       mol_type = other RNA
                       organism = synthetic construct
SEQUENCE: 74
cagagacaca gtttttgctc                                             20

SEQ ID NO: 75          moltype = RNA   length = 20
FEATURE                Location/Qualifiers
misc_feature           1..20
                       note = Synthetic
source                 1..20
                       mol_type = other RNA
                       organism = synthetic construct

```
SEQUENCE: 75
tcccctctct ccaggcaaat                                            20

SEQ ID NO: 76           moltype = RNA  length = 20
FEATURE                 Location/Qualifiers
misc_feature            1..20
                        note = Synthetic
source                  1..20
                        mol_type = other RNA
                        organism = synthetic construct
SEQUENCE: 76
ctcggtgtcc ttgacttcaa                                            20

SEQ ID NO: 77           moltype = RNA  length = 20
FEATURE                 Location/Qualifiers
misc_feature            1..20
                        note = Synthetic
source                  1..20
                        mol_type = other RNA
                        organism = synthetic construct
SEQUENCE: 77
ctttgaagtc aaggacaccg                                            20

SEQ ID NO: 78           moltype = RNA  length = 20
FEATURE                 Location/Qualifiers
misc_feature            1..20
                        note = Synthetic
source                  1..20
                        mol_type = other RNA
                        organism = synthetic construct
SEQUENCE: 78
cacgtggaag tcctcttcct                                            20

SEQ ID NO: 79           moltype = RNA  length = 20
FEATURE                 Location/Qualifiers
misc_feature            1..20
                        note = Synthetic
source                  1..20
                        mol_type = other RNA
                        organism = synthetic construct
SEQUENCE: 79
cgaggaagag gacttccacg                                            20

SEQ ID NO: 80           moltype = RNA  length = 20
FEATURE                 Location/Qualifiers
misc_feature            1..20
                        note = Synthetic
source                  1..20
                        mol_type = other RNA
                        organism = synthetic construct
SEQUENCE: 80
agaggacttc cacgtggacc                                            20

SEQ ID NO: 81           moltype = RNA  length = 20
FEATURE                 Location/Qualifiers
misc_feature            1..20
                        note = Synthetic
source                  1..20
                        mol_type = other RNA
                        organism = synthetic construct
SEQUENCE: 81
cggtggtcac ctggtccacg                                            20

SEQ ID NO: 82           moltype = RNA  length = 20
FEATURE                 Location/Qualifiers
misc_feature            1..20
                        note = Synthetic
source                  1..20
                        mol_type = other RNA
                        organism = synthetic construct
SEQUENCE: 82
ggaccaggtg accaccgtga                                            20

SEQ ID NO: 83           moltype = RNA  length = 20
FEATURE                 Location/Qualifiers
misc_feature            1..20
                        note = Synthetic
source                  1..20
                        mol_type = other RNA
```

```
                          organism = synthetic construct
SEQUENCE: 83
gcaccttcac ggtggtcacc                                                     20

SEQ ID NO: 84             moltype = RNA   length = 20
FEATURE                   Location/Qualifiers
misc_feature              1..20
                          note = Synthetic
source                    1..20
                          mol_type = other RNA
                          organism = synthetic construct
SEQUENCE: 84
catcataggc accttcacgg                                                     20

SEQ ID NO: 85             moltype = RNA   length = 20
FEATURE                   Location/Qualifiers
misc_feature              1..20
                          note = Synthetic
source                    1..20
                          mol_type = other RNA
                          organism = synthetic construct
SEQUENCE: 85
gtgcctatga tgaagcgttt                                                     20

SEQ ID NO: 86             moltype = RNA   length = 20
FEATURE                   Location/Qualifiers
misc_feature              1..20
                          note = Synthetic
source                    1..20
                          mol_type = other RNA
                          organism = synthetic construct
SEQUENCE: 86
atgcctaaac gcttcatcat                                                     20

SEQ ID NO: 87             moltype = RNA   length = 20
FEATURE                   Location/Qualifiers
misc_feature              1..20
                          note = Synthetic
source                    1..20
                          mol_type = other RNA
                          organism = synthetic construct
SEQUENCE: 87
tggacagctt cttacagtgc                                                     20

SEQ ID NO: 88             moltype = RNA   length = 20
FEATURE                   Location/Qualifiers
misc_feature              1..20
                          note = Synthetic
source                    1..20
                          mol_type = other RNA
                          organism = synthetic construct
SEQUENCE: 88
ctgtaagaag ctgtccagct                                                     20

SEQ ID NO: 89             moltype = RNA   length = 20
FEATURE                   Location/Qualifiers
misc_feature              1..20
                          note = Synthetic
source                    1..20
                          mol_type = other RNA
                          organism = synthetic construct
SEQUENCE: 89
ggtgctgctg atgaaatacc                                                     20

SEQ ID NO: 90             moltype = RNA   length = 20
FEATURE                   Location/Qualifiers
misc_feature              1..20
                          note = Synthetic
source                    1..20
                          mol_type = other RNA
                          organism = synthetic construct
SEQUENCE: 90
gtgctgctga tgaaatacct                                                     20

SEQ ID NO: 91             moltype = RNA   length = 20
FEATURE                   Location/Qualifiers
misc_feature              1..20
                          note = Synthetic
source                    1..20
```

```
                        mol_type = other RNA
                        organism = synthetic construct
SEQUENCE: 91
agatggcggt ggcattgccc                                                   20

SEQ ID NO: 92           moltype = RNA   length = 20
FEATURE                 Location/Qualifiers
misc_feature            1..20
                        note = Synthetic
source                  1..20
                        mol_type = other RNA
                        organism = synthetic construct
SEQUENCE: 92
aggcaggaag aagatggcgg                                                   20

SEQ ID NO: 93           moltype = RNA   length = 20
FEATURE                 Location/Qualifiers
misc_feature            1..20
                        note = Synthetic
source                  1..20
                        mol_type = other RNA
                        organism = synthetic construct
SEQUENCE: 93
ggtcagcaca gccttatgca                                                   20

SEQ ID NO: 94           moltype = RNA   length = 20
FEATURE                 Location/Qualifiers
misc_feature            1..20
                        note = Synthetic
source                  1..20
                        mol_type = other RNA
                        organism = synthetic construct
SEQUENCE: 94
agaaagggac tgaagctgct                                                   20

SEQ ID NO: 95           moltype = RNA   length = 20
FEATURE                 Location/Qualifiers
misc_feature            1..20
                        note = Synthetic
source                  1..20
                        mol_type = other RNA
                        organism = synthetic construct
SEQUENCE: 95
gaaagggact gaagctgctg                                                   20

SEQ ID NO: 96           moltype = RNA   length = 20
FEATURE                 Location/Qualifiers
misc_feature            1..20
                        note = Synthetic
source                  1..20
                        mol_type = other RNA
                        organism = synthetic construct
SEQUENCE: 96
tgctggggcc atgttttag                                                    20

SEQ ID NO: 97           moltype = RNA   length = 20
FEATURE                 Location/Qualifiers
misc_feature            1..20
                        note = Synthetic
source                  1..20
                        mol_type = other RNA
                        organism = synthetic construct
SEQUENCE: 97
gggtatggcc tctaaaaaca                                                   20

SEQ ID NO: 98           moltype = RNA   length = 20
FEATURE                 Location/Qualifiers
misc_feature            1..20
                        note = Synthetic
source                  1..20
                        mol_type = other RNA
                        organism = synthetic construct
SEQUENCE: 98
tgttgaactt gacctcgggg                                                   20

SEQ ID NO: 99           moltype = RNA   length = 20
FEATURE                 Location/Qualifiers
misc_feature            1..20
                        note = Synthetic
```

```
source                          1..20
                                mol_type = other RNA
                                organism = synthetic construct
SEQUENCE: 99
gggtttgttg aacttgacct                                                    20

SEQ ID NO: 100                  moltype = RNA   length = 20
FEATURE                         Location/Qualifiers
misc_feature                    1..20
                                note = Synthetic
source                          1..20
                                mol_type = other RNA
                                organism = synthetic construct
SEQUENCE: 100
ttctgggcag catctccctg                                                    20

SEQ ID NO: 101                  moltype = RNA   length = 20
FEATURE                         Location/Qualifiers
misc_feature                    1..20
                                note = Synthetic
source                          1..20
                                mol_type = other RNA
                                organism = synthetic construct
SEQUENCE: 101
tcttctgggc agcatctccc                                                    20

SEQ ID NO: 102                  moltype = RNA   length = 20
FEATURE                         Location/Qualifiers
misc_feature                    1..20
                                note = Synthetic
source                          1..20
                                mol_type = other RNA
                                organism = synthetic construct
SEQUENCE: 102
tggactggtg tgccagctgg                                                    20

SEQ ID NO: 103                  moltype = RNA   length = 20
FEATURE                         Location/Qualifiers
misc_feature                    1..20
                                note = Synthetic
source                          1..20
                                mol_type = other RNA
                                organism = synthetic construct
SEQUENCE: 103
agcctttgca atgctctccc                                                    20

SEQ ID NO: 104                  moltype = RNA   length = 20
FEATURE                         Location/Qualifiers
misc_feature                    1..20
                                note = Synthetic
source                          1..20
                                mol_type = other RNA
                                organism = synthetic construct
SEQUENCE: 104
ttcatcgtga gtgtcagcct                                                    20

SEQ ID NO: 105                  moltype = RNA   length = 20
FEATURE                         Location/Qualifiers
misc_feature                    1..20
                                note = Synthetic
source                          1..20
                                mol_type = other RNA
                                organism = synthetic construct
SEQUENCE: 105
tctccgtgag gttgaaattc                                                    20

SEQ ID NO: 106                  moltype = RNA   length = 20
FEATURE                         Location/Qualifiers
misc_feature                    1..20
                                note = Synthetic
source                          1..20
                                mol_type = other RNA
                                organism = synthetic construct
SEQUENCE: 106
gtcagctgga gctggctgtc                                                    20

SEQ ID NO: 107                  moltype = RNA   length = 20
FEATURE                         Location/Qualifiers
misc_feature                    1..20
```

```
                        note = Synthetic
source                  1..20
                        mol_type = other RNA
                        organism = synthetic construct
SEQUENCE: 107
agccagctcc agctgaccac                                                    20

SEQ ID NO: 108          moltype = RNA   length = 20
FEATURE                 Location/Qualifiers
misc_feature            1..20
                        note = Synthetic
source                  1..20
                        mol_type = other RNA
                        organism = synthetic construct
SEQUENCE: 108
atcaggcagg aagaagatgg                                                    20

SEQ ID NO: 109          moltype = RNA   length = 20
FEATURE                 Location/Qualifiers
misc_feature            1..20
                        note = Synthetic
source                  1..20
                        mol_type = other RNA
                        organism = synthetic construct
SEQUENCE: 109
catcttcttc ctgcctgatg                                                    20

SEQ ID NO: 110          moltype = RNA   length = 20
FEATURE                 Location/Qualifiers
misc_feature            1..20
                        note = Synthetic
source                  1..20
                        mol_type = other RNA
                        organism = synthetic construct
SEQUENCE: 110
atcttcttcc tgcctgatga                                                    20

SEQ ID NO: 111          moltype = RNA   length = 20
FEATURE                 Location/Qualifiers
misc_feature            1..20
                        note = Synthetic
source                  1..20
                        mol_type = other RNA
                        organism = synthetic construct
SEQUENCE: 111
cgatatcatc accaagttcc                                                    20

SEQ ID NO: 112          moltype = RNA   length = 20
FEATURE                 Location/Qualifiers
misc_feature            1..20
                        note = Synthetic
source                  1..20
                        mol_type = other RNA
                        organism = synthetic construct
SEQUENCE: 112
cagatcatag gttccagtaa                                                    20

SEQ ID NO: 113          moltype = RNA   length = 20
FEATURE                 Location/Qualifiers
misc_feature            1..20
                        note = Synthetic
source                  1..20
                        mol_type = other RNA
                        organism = synthetic construct
SEQUENCE: 113
atcactaagg tcttcagcaa                                                    20

SEQ ID NO: 114          moltype = RNA   length = 20
FEATURE                 Location/Qualifiers
misc_feature            1..20
                        note = Synthetic
source                  1..20
                        mol_type = other RNA
                        organism = synthetic construct
SEQUENCE: 114
tcactaaggt cttcagcaat                                                    20

SEQ ID NO: 115          moltype = RNA   length = 20
FEATURE                 Location/Qualifiers
```

```
misc_feature                1..20
                            note = Synthetic
source                      1..20
                            mol_type = other RNA
                            organism = synthetic construct
SEQUENCE: 115
cactaaggtc ttcagcaatg                                                    20

SEQ ID NO: 116              moltype = RNA   length = 20
FEATURE                     Location/Qualifiers
misc_feature                1..20
                            note = Synthetic
source                      1..20
                            mol_type = other RNA
                            organism = synthetic construct
SEQUENCE: 116
ctcaccttgg agagcttcag                                                    20

SEQ ID NO: 117              moltype = RNA   length = 20
FEATURE                     Location/Qualifiers
misc_feature                1..20
                            note = Synthetic
source                      1..20
                            mol_type = other RNA
                            organism = synthetic construct
SEQUENCE: 117
tctcaccttg gagagcttca                                                    20

SEQ ID NO: 118              moltype = RNA   length = 20
FEATURE                     Location/Qualifiers
misc_feature                1..20
                            note = Synthetic
source                      1..20
                            mol_type = other RNA
                            organism = synthetic construct
SEQUENCE: 118
atctcacctt ggagagcttc                                                    20

SEQ ID NO: 119              moltype = RNA   length = 20
FEATURE                     Location/Qualifiers
misc_feature                1..20
                            note = Synthetic
source                      1..20
                            mol_type = other RNA
                            organism = synthetic construct
SEQUENCE: 119
ttgttgaact tgacctcggg                                                    20

SEQ ID NO: 120              moltype = RNA   length = 20
FEATURE                     Location/Qualifiers
misc_feature                1..20
                            note = Synthetic
source                      1..20
                            mol_type = other RNA
                            organism = synthetic construct
SEQUENCE: 120
tttgttgaac ttgacctcgg                                                    20

SEQ ID NO: 121              moltype = RNA   length = 20
FEATURE                     Location/Qualifiers
misc_feature                1..20
                            note = Synthetic
source                      1..20
                            mol_type = other RNA
                            organism = synthetic construct
SEQUENCE: 121
gtttgttgaa cttgacctcg                                                    20

SEQ ID NO: 122              moltype = RNA   length = 20
FEATURE                     Location/Qualifiers
misc_feature                1..20
                            note = Synthetic
source                      1..20
                            mol_type = other RNA
                            organism = synthetic construct
SEQUENCE: 122
ggtttgttga acttgacctc                                                    20

SEQ ID NO: 123              moltype = RNA   length = 20
```

| | | |
|---|---|---|
| FEATURE | Location/Qualifiers | |
| misc_feature | 1..20 | |
| | note = Synthetic | |
| source | 1..20 | |
| | mol_type = other RNA | |
| | organism = synthetic construct | |
| SEQUENCE: 123 | | |
| tcaatcatta agaagacaaa | | 20 |
| | | |
| SEQ ID NO: 124 | moltype = RNA   length = 20 | |
| FEATURE | Location/Qualifiers | |
| misc_feature | 1..20 | |
| | note = Synthetic | |
| source | 1..20 | |
| | mol_type = other RNA | |
| | organism = synthetic construct | |
| SEQUENCE: 124 | | |
| ttcaatcatt aagaagacaa | | 20 |
| | | |
| SEQ ID NO: 125 | moltype = RNA   length = 20 | |
| FEATURE | Location/Qualifiers | |
| misc_feature | 1..20 | |
| | note = Synthetic | |
| source | 1..20 | |
| | mol_type = other RNA | |
| | organism = synthetic construct | |
| SEQUENCE: 125 | | |
| taccaagtct ccctcttca | | 20 |
| | | |
| SEQ ID NO: 126 | moltype = RNA   length = 20 | |
| FEATURE | Location/Qualifiers | |
| misc_feature | 1..20 | |
| | note = Synthetic | |
| source | 1..20 | |
| | mol_type = other RNA | |
| | organism = synthetic construct | |
| SEQUENCE: 126 | | |
| accaagtctc ccctcttcat | | 20 |
| | | |
| SEQ ID NO: 127 | moltype = RNA   length = 20 | |
| FEATURE | Location/Qualifiers | |
| misc_feature | 1..20 | |
| | note = Synthetic | |
| source | 1..20 | |
| | mol_type = other RNA | |
| | organism = synthetic construct | |
| SEQUENCE: 127 | | |
| tccctcttc atgggaaaag | | 20 |
| | | |
| SEQ ID NO: 128 | moltype = RNA   length = 20 | |
| FEATURE | Location/Qualifiers | |
| misc_feature | 1..20 | |
| | note = Synthetic | |
| source | 1..20 | |
| | mol_type = other RNA | |
| | organism = synthetic construct | |
| SEQUENCE: 128 | | |
| caccactttt cccatgaaga | | 20 |
| | | |
| SEQ ID NO: 129 | moltype = RNA   length = 20 | |
| FEATURE | Location/Qualifiers | |
| misc_feature | 1..20 | |
| | note = Synthetic | |
| source | 1..20 | |
| | mol_type = other RNA | |
| | organism = synthetic construct | |
| SEQUENCE: 129 | | |
| tcaccactt tcccatgaag | | 20 |
| | | |
| SEQ ID NO: 130 | moltype = RNA   length = 100 | |
| FEATURE | Location/Qualifiers | |
| misc_feature | 1..100 | |
| | note = Synthetic | |
| source | 1..100 | |
| | mol_type = other RNA | |
| | organism = synthetic construct | |
| SEQUENCE: 130 | | |
| nnnnnnnnnn nnnnnnnnnn gttttagagc tagaaatagc aagttaaaat aaggctagtc | | 60 |
| cgttatcaac ttgaaaaagt ggcaccgagt cggtgctttt | | 100 |

```
SEQ ID NO: 131         moltype = RNA  length = 100
FEATURE                Location/Qualifiers
misc_feature           1..100
                       note = Synthetic
source                 1..100
                       mol_type = other RNA
                       organism = synthetic construct
SEQUENCE: 131
agccagctcc agctgaccac gttttagagc tagaaatagc aagttaaaat aaggctagtc    60
cgttatcaac ttgaaaaagt ggcaccgagt cggtgctttt                         100

SEQ ID NO: 132         moltype = RNA  length = 100
FEATURE                Location/Qualifiers
misc_feature           1..100
                       note = Synthetic
source                 1..100
                       mol_type = other RNA
                       organism = synthetic construct
SEQUENCE: 132
gctgaggaac aggccattgc gttttagagc tagaaatagc aagttaaaat aaggctagtc    60
cgttatcaac ttgaaaaagt ggcaccgagt cggtgctttt                         100

SEQ ID NO: 133         moltype = RNA  length = 100
FEATURE                Location/Qualifiers
misc_feature           1..100
                       note = Synthetic
source                 1..100
                       mol_type = other RNA
                       organism = synthetic construct
SEQUENCE: 133
actcacgatg aaatcctgga gttttagagc tagaaatagc aagttaaaat aaggctagtc    60
cgttatcaac ttgaaaaagt ggcaccgagt cggtgctttt                         100

SEQ ID NO: 134         moltype = RNA  length = 100
FEATURE                Location/Qualifiers
misc_feature           1..100
                       note = Synthetic
source                 1..100
                       mol_type = other RNA
                       organism = synthetic construct
SEQUENCE: 134
ttgggtgatc ctgatcatgg gttttagagc tagaaatagc aagttaaaat aaggctagtc    60
cgttatcaac ttgaaaaagt ggcaccgagt cggtgctttt                         100

SEQ ID NO: 135         moltype = RNA  length = 100
FEATURE                Location/Qualifiers
misc_feature           1..100
                       note = Synthetic
source                 1..100
                       mol_type = other RNA
                       organism = synthetic construct
SEQUENCE: 135
tgggtgatcc tgatcatggt gttttagagc tagaaatagc aagttaaaat aaggctagtc    60
cgttatcaac ttgaaaaagt ggcaccgagt cggtgctttt                         100

SEQ ID NO: 136         moltype = RNA  length = 100
FEATURE                Location/Qualifiers
misc_feature           1..100
                       note = Synthetic
source                 1..100
                       mol_type = other RNA
                       organism = synthetic construct
SEQUENCE: 136
gatctgtttc ttggcctctt gttttagagc tagaaatagc aagttaaaat aaggctagtc    60
cgttatcaac ttgaaaaagt ggcaccgagt cggtgctttt                         100

SEQ ID NO: 137         moltype = RNA  length = 100
FEATURE                Location/Qualifiers
misc_feature           1..100
                       note = Synthetic
source                 1..100
                       mol_type = other RNA
                       organism = synthetic construct
SEQUENCE: 137
gaaggcgaac tcagccaggt gttttagagc tagaaatagc aagttaaaat aaggctagtc    60
cgttatcaac ttgaaaaagt ggcaccgagt cggtgctttt                         100

SEQ ID NO: 138         moltype = RNA  length = 100
```

```
FEATURE                 Location/Qualifiers
misc_feature            1..100
                        note = Synthetic
source                  1..100
                        mol_type = other RNA
                        organism = synthetic construct
SEQUENCE: 138
caacctcacg gagattccgg gttttagagc tagaaatagc aagttaaaat aaggctagtc   60
cgttatcaac ttgaaaaagt ggcaccgagt cggtgctttt                        100

SEQ ID NO: 139          moltype = RNA   length = 100
FEATURE                 Location/Qualifiers
misc_feature            1..100
                        note = Synthetic
source                  1..100
                        mol_type = other RNA
                        organism = synthetic construct
SEQUENCE: 139
tgttggactg gtgtgccagc gttttagagc tagaaatagc aagttaaaat aaggctagtc   60
cgttatcaac ttgaaaaagt ggcaccgagt cggtgctttt                        100

SEQ ID NO: 140          moltype = RNA   length = 22
FEATURE                 Location/Qualifiers
misc_feature            1..22
                        note = Synthetic
source                  1..22
                        mol_type = other RNA
                        organism = synthetic construct
SEQUENCE: 140
gttttagagc tatgctgttt tg                                            22

SEQ ID NO: 141          moltype = RNA   length = 80
FEATURE                 Location/Qualifiers
misc_feature            1..80
                        note = Synthetic
source                  1..80
                        mol_type = other RNA
                        organism = synthetic construct
SEQUENCE: 141
gttttagagc tagaaatagc aagttaaaat aaggctagtc cgttatcaac ttgaaaaagt   60
ggcaccgagt cggtgctttt                                               80

SEQ ID NO: 142          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 142
gaggagtcca cagtaggatt gatt                                          24

SEQ ID NO: 143          moltype = DNA   length = 23
FEATURE                 Location/Qualifiers
misc_feature            1..23
                        note = Synthetic
source                  1..23
                        mol_type = other DNA
                        organism = synthetic construct
SEQUENCE: 143
agctagttgg taaggtcagt gtg                                           23

SEQ ID NO: 144          moltype = DNA   length = 23
FEATURE                 Location/Qualifiers
misc_feature            1..23
                        note = Synthetic
source                  1..23
                        mol_type = other DNA
                        organism = synthetic construct
SEQUENCE: 144
agctagttgg taaggtcagt gtg                                           23

SEQ ID NO: 145          moltype = DNA   length = 23
FEATURE                 Location/Qualifiers
misc_feature            1..23
                        note = Synthetic
source                  1..23
                        mol_type = other DNA
                        organism = synthetic construct
```

```
SEQUENCE: 145
agctagttgg taaggtcagt gtg                                           23

SEQ ID NO: 146          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 146
tcatggtggg atgtatctgt cttc                                          24

SEQ ID NO: 147          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 147
tcatggtggg atgtatctgt cttc                                          24

SEQ ID NO: 148          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 148
tcatggtggg atgtatctgt cttc                                          24

SEQ ID NO: 149          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 149
gatcctgatc atggtgggat gtat                                          24

SEQ ID NO: 150          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 150
tcatggtggg atgtatctgt cttc                                          24

SEQ ID NO: 151          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 151
gatattggtg ctgttggact ggtg                                          24

SEQ ID NO: 152          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 152
atgctcactg gggagaagaa gata                                          24

SEQ ID NO: 153          moltype = DNA  length = 24
FEATURE                 Location/Qualifiers
misc_feature            1..24
                        note = Synthetic
source                  1..24
                        mol_type = other DNA
```

```
                        organism = synthetic construct
SEQUENCE: 153
atgctcactg gggagaagaa gata                                              24

SEQ ID NO: 154          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 154
atgctcactg gggagaagaa gata                                              24

SEQ ID NO: 155          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 155
gggagaagaa gatattggtg ctgt                                              24

SEQ ID NO: 156          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 156
gggagaagaa gatattggtg ctgt                                              24

SEQ ID NO: 157          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 157
gggagaagaa gatattggtg ctgt                                              24

SEQ ID NO: 158          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 158
gggagaagaa gatattggtg ctgt                                              24

SEQ ID NO: 159          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 159
gggagaagaa gatattggtg ctgt                                              24

SEQ ID NO: 160          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 160
gatattggtg ctgttggact ggtg                                              24

SEQ ID NO: 161          moltype = DNA   length = 24
FEATURE                 Location/Qualifiers
misc_feature            1..24
                        note = Synthetic
source                  1..24
```

```
                        mol_type = other DNA
                        organism = synthetic construct
SEQUENCE: 161
gggagaagaa gatattggtg ctgt                                              24

SEQ ID NO: 162          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 162
gggagaagaa gatattggtg ctgt                                              24

SEQ ID NO: 163          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 163
attgcaaagg ctgtagcgat gctc                                              24

SEQ ID NO: 164          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 164
attgcaaagg ctgtagcgat gctc                                              24

SEQ ID NO: 165          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 165
attgcaaagg ctgtagcgat gctc                                              24

SEQ ID NO: 166          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 166
attgcaaagg ctgtagcgat gctc                                              24

SEQ ID NO: 167          moltype = DNA   length = 23
FEATURE                 Location/Qualifiers
misc_feature            1..23
                        note = Synthetic
source                  1..23
                        mol_type = other DNA
                        organism = synthetic construct
SEQUENCE: 167
atttcatcgt gagtgtcagc ctt                                               23

SEQ ID NO: 168          moltype = DNA   length = 23
FEATURE                 Location/Qualifiers
misc_feature            1..23
                        note = Synthetic
source                  1..23
                        mol_type = other DNA
                        organism = synthetic construct
SEQUENCE: 168
atttcatcgt gagtgtcagc ctt                                               23

SEQ ID NO: 169          moltype = DNA   length = 23
FEATURE                 Location/Qualifiers
misc_feature            1..23
                        note = Synthetic
```

```
source                  1..23
                        mol_type = other DNA
                        organism = synthetic construct
SEQUENCE: 169
atttcatcgt gagtgtcagc ctt                                                23

SEQ ID NO: 170          moltype = DNA   length = 23
FEATURE                 Location/Qualifiers
misc_feature            1..23
                        note = Synthetic
source                  1..23
                        mol_type = other DNA
                        organism = synthetic construct
SEQUENCE: 170
atttcatcgt gagtgtcagc ctt                                                23

SEQ ID NO: 171          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 171
ccaggatttc atcgtgagtg tcag                                               24

SEQ ID NO: 172          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 172
ctccaggatt tcatcgtgag tgtc                                               24

SEQ ID NO: 173          moltype = DNA   length = 23
FEATURE                 Location/Qualifiers
misc_feature            1..23
                        note = Synthetic
source                  1..23
                        mol_type = other DNA
                        organism = synthetic construct
SEQUENCE: 173
cggaatctcc gtgaggttga aat                                                23

SEQ ID NO: 174          moltype = DNA   length = 23
FEATURE                 Location/Qualifiers
misc_feature            1..23
                        note = Synthetic
source                  1..23
                        mol_type = other DNA
                        organism = synthetic construct
SEQUENCE: 174
cggaatctcc gtgaggttga aat                                                23

SEQ ID NO: 175          moltype = DNA   length = 23
FEATURE                 Location/Qualifiers
misc_feature            1..23
                        note = Synthetic
source                  1..23
                        mol_type = other DNA
                        organism = synthetic construct
SEQUENCE: 175
cggaatctcc gtgaggttga aat                                                23

SEQ ID NO: 176          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 176
ttcatggatc tgagcctccg gaat                                               24

SEQ ID NO: 177          moltype = DNA   length = 24
FEATURE                 Location/Qualifiers
misc_feature            1..24
```

```
                        note = Synthetic
source                  1..24
                        mol_type = other DNA
                        organism = synthetic construct
SEQUENCE: 177
aaaacttatc cactagcttc aggc                                              24

SEQ ID NO: 178          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 178
aaaacttatc cactagcttc aggc                                              24

SEQ ID NO: 179          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 179
aaaacttatc cactagcttc aggc                                              24

SEQ ID NO: 180          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 180
aaaacttatc cactagcttc aggc                                              24

SEQ ID NO: 181          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 181
aaaacttatc cactagcttc aggc                                              24

SEQ ID NO: 182          moltype = DNA  length = 23
FEATURE                 Location/Qualifiers
misc_feature            1..23
                        note = Synthetic
source                  1..23
                        mol_type = other DNA
                        organism = synthetic construct
SEQUENCE: 182
ttatccacta gcttcaggcc ctc                                               23

SEQ ID NO: 183          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 183
aggcttctga gtggtacaac tttt                                              24

SEQ ID NO: 184          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 184
aaaacttatc cactagcttc aggc                                              24

SEQ ID NO: 185          moltype = DNA  length = 24
FEATURE                 Location/Qualifiers
```

```
misc_feature              1..24
                          note = Synthetic
source                    1..24
                          mol_type = other DNA
                          organism = synthetic construct
SEQUENCE: 185
aggcttctga gtggtacaac tttt                                              24

SEQ ID NO: 186            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 186
aggcttctga gtggtacaac tttt                                              24

SEQ ID NO: 187            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 187
aggcttctga gtggtacaac tttt                                              24

SEQ ID NO: 188            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 188
aggcttctga gtggtacaac tttt                                              24

SEQ ID NO: 189            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 189
attttccctt gagtaccctt ctcc                                              24

SEQ ID NO: 190            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 190
attttccctt gagtaccctt ctcc                                              24

SEQ ID NO: 191            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 191
ttgagtaccc ttctccacgt aatc                                              24

SEQ ID NO: 192            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 192
attttccctt gagtaccctt ctcc                                              24

SEQ ID NO: 193            moltype = DNA   length = 24
```

```
FEATURE                 Location/Qualifiers
misc_feature            1..24
                        note = Synthetic
source                  1..24
                        mol_type = other DNA
                        organism = synthetic construct
SEQUENCE: 193
ccacaatttt cccttgagta ccct                                              24

SEQ ID NO: 194          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 194
tctccacgta atcgttgatc tgtt                                              24

SEQ ID NO: 195          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 195
tctccacgta atcgttgatc tgtt                                              24

SEQ ID NO: 196          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 196
tctccacgta atcgttgatc tgtt                                              24

SEQ ID NO: 197          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 197
attttccctt gagtacccgt ctcc                                              24

SEQ ID NO: 198          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 198
tctccacgta atcgttgatc tgtt                                              24

SEQ ID NO: 199          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 199
tctccacgta atcgttgatc tgtt                                              24

SEQ ID NO: 200          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 200
aaaactgtgt ctctgtcaag ctcc                                              24
```

| | | |
|---|---|---|
| SEQ ID NO: 201<br>FEATURE<br>misc_feature<br><br>source | moltype = DNA   length = 24<br>Location/Qualifiers<br>1..24<br>note = Synthetic<br>1..24<br>mol_type = other DNA<br>organism = synthetic construct | |
| SEQUENCE: 201<br>ccacaatttt cccttgagta ccct | | 24 |
| SEQ ID NO: 202<br>FEATURE<br>misc_feature<br><br>source | moltype = DNA   length = 28<br>Location/Qualifiers<br>1..28<br>note = Synthetic<br>1..28<br>mol_type = other DNA<br>organism = synthetic construct | |
| SEQUENCE: 202<br>gcaaccttac ctttaaagaa gatgtaat | | 28 |
| SEQ ID NO: 203<br>FEATURE<br>misc_feature<br><br>source | moltype = DNA   length = 28<br>Location/Qualifiers<br>1..28<br>note = Synthetic<br>1..28<br>mol_type = other DNA<br>organism = synthetic construct | |
| SEQUENCE: 203<br>gcaaccttac ctttaaagaa gatgtaat | | 28 |
| SEQ ID NO: 204<br>FEATURE<br>misc_feature<br><br>source | moltype = DNA   length = 28<br>Location/Qualifiers<br>1..28<br>note = Synthetic<br>1..28<br>mol_type = other DNA<br>organism = synthetic construct | |
| SEQUENCE: 204<br>acctttaaag aagatgtaat tcaccaga | | 28 |
| SEQ ID NO: 205<br>FEATURE<br>misc_feature<br><br>source | moltype = DNA   length = 28<br>Location/Qualifiers<br>1..28<br>note = Synthetic<br>1..28<br>mol_type = other DNA<br>organism = synthetic construct | |
| SEQUENCE: 205<br>acctttaaag aagatgtaat tcaccaga | | 28 |
| SEQ ID NO: 206<br>FEATURE<br>misc_feature<br><br>source | moltype = DNA   length = 28<br>Location/Qualifiers<br>1..28<br>note = Synthetic<br>1..28<br>mol_type = other DNA<br>organism = synthetic construct | |
| SEQUENCE: 206<br>acctttaaag aagatgtaat tcaccaga | | 28 |
| SEQ ID NO: 207<br>FEATURE<br>misc_feature<br><br>source | moltype = DNA   length = 28<br>Location/Qualifiers<br>1..28<br>note = Synthetic<br>1..28<br>mol_type = other DNA<br>organism = synthetic construct | |
| SEQUENCE: 207<br>acctttaaag aagatgtaat tcaccaga | | 28 |
| SEQ ID NO: 208<br>FEATURE<br>misc_feature<br><br>source | moltype = DNA   length = 28<br>Location/Qualifiers<br>1..28<br>note = Synthetic<br>1..28<br>mol_type = other DNA<br>organism = synthetic construct | |
| SEQUENCE: 208<br>gcaaccttac ctttaaagaa gatgtaat | | 28 |

```
SEQ ID NO: 209            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 209
cttgtttcta tgggaacagc tcag                                              24

SEQ ID NO: 210            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 210
cttgtttcta tgggaacagc tcag                                              24

SEQ ID NO: 211            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 211
cttgtttcta tgggaacagc tcag                                              24

SEQ ID NO: 212            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 212
cttgtttcta tgggaacagc tcag                                              24

SEQ ID NO: 213            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 213
cttgtttcta tgggaacagc tcag                                              24

SEQ ID NO: 214            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 214
cttgtttcta tgggaacagc tcag                                              24

SEQ ID NO: 215            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 215
aactgaagaa tccacgctga aaag                                              24

SEQ ID NO: 216            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 216
```

```
catgcctaaa cgcttcatca tagg                                          24

SEQ ID NO: 217          moltype = DNA  length = 22
FEATURE                 Location/Qualifiers
misc_feature            1..22
                        note = Synthetic
source                  1..22
                        mol_type = other DNA
                        organism = synthetic construct
SEQUENCE: 217
ggcattgccc aggtatttca tc                                            22

SEQ ID NO: 218          moltype = DNA  length = 22
FEATURE                 Location/Qualifiers
misc_feature            1..22
                        note = Synthetic
source                  1..22
                        mol_type = other DNA
                        organism = synthetic construct
SEQUENCE: 218
ggcattgccc aggtatttca tc                                            22

SEQ ID NO: 219          moltype = DNA  length = 23
FEATURE                 Location/Qualifiers
misc_feature            1..23
                        note = Synthetic
source                  1..23
                        mol_type = other DNA
                        organism = synthetic construct
SEQUENCE: 219
cattgcccag gtatttcatc agc                                           23

SEQ ID NO: 220          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 220
gttcattttc caggtgctgt agtt                                          24

SEQ ID NO: 221          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 221
gagttcattt tccaggtgct gtag                                          24

SEQ ID NO: 222          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 222
gagttcattt tccaggtgct gtag                                          24

SEQ ID NO: 223          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 223
gagttcattt tccaggtgct gtag                                          24

SEQ ID NO: 224          moltype = DNA  length = 24
FEATURE                 Location/Qualifiers
misc_feature            1..24
                        note = Synthetic
source                  1..24
                        mol_type = other DNA
                        organism = synthetic construct
```

```
SEQUENCE: 224
tatcgtgggt gagttcattt tcca                                          24

SEQ ID NO: 225         moltype = DNA  length = 24
FEATURE                Location/Qualifiers
misc_feature           1..24
                       note = Synthetic
source                 1..24
                       mol_type = other DNA
                       organism = synthetic construct
SEQUENCE: 225
tatcgtgggt gagttcattt tcca                                          24

SEQ ID NO: 226         moltype = DNA  length = 24
FEATURE                Location/Qualifiers
misc_feature           1..24
                       note = Synthetic
source                 1..24
                       mol_type = other DNA
                       organism = synthetic construct
SEQUENCE: 226
gagttcattt tccaggtgct gtag                                          24

SEQ ID NO: 227         moltype = DNA  length = 24
FEATURE                Location/Qualifiers
misc_feature           1..24
                       note = Synthetic
source                 1..24
                       mol_type = other DNA
                       organism = synthetic construct
SEQUENCE: 227
gagttcattt tccaggtgct gtag                                          24

SEQ ID NO: 228         moltype = DNA  length = 24
FEATURE                Location/Qualifiers
misc_feature           1..24
                       note = Synthetic
source                 1..24
                       mol_type = other DNA
                       organism = synthetic construct
SEQUENCE: 228
tatcgtgggt gagttcattt tcca                                          24

SEQ ID NO: 229         moltype = DNA  length = 24
FEATURE                Location/Qualifiers
misc_feature           1..24
                       note = Synthetic
source                 1..24
                       mol_type = other DNA
                       organism = synthetic construct
SEQUENCE: 229
tatcgtgggt gagttcattt tcca                                          24

SEQ ID NO: 230         moltype = DNA  length = 24
FEATURE                Location/Qualifiers
misc_feature           1..24
                       note = Synthetic
source                 1..24
                       mol_type = other DNA
                       organism = synthetic construct
SEQUENCE: 230
aggaacttgg tgatgatatc gtgg                                          24

SEQ ID NO: 231         moltype = DNA  length = 24
FEATURE                Location/Qualifiers
misc_feature           1..24
                       note = Synthetic
source                 1..24
                       mol_type = other DNA
                       organism = synthetic construct
SEQUENCE: 231
cttcattttc caggaacttg gtga                                          24

SEQ ID NO: 232         moltype = DNA  length = 26
FEATURE                Location/Qualifiers
misc_feature           1..26
                       note = Synthetic
source                 1..26
                       mol_type = other DNA
```

```
                              organism = synthetic construct
SEQUENCE: 232
gggaatcacc ttctgtcttc attttc                                              26

SEQ ID NO: 233            moltype = DNA  length = 26
FEATURE                   Location/Qualifiers
misc_feature              1..26
                          note = Synthetic
source                    1..26
                          mol_type = other DNA
                          organism = synthetic construct
SEQUENCE: 233
gggaatcacc ttctgtcttc attttc                                              26

SEQ ID NO: 234            moltype = DNA  length = 24
FEATURE                   Location/Qualifiers
misc_feature              1..24
                          note = Synthetic
source                    1..24
                          mol_type = other DNA
                          organism = synthetic construct
SEQUENCE: 234
caaagggttt gttgaacttg acct                                                24

SEQ ID NO: 235            moltype = DNA  length = 24
FEATURE                   Location/Qualifiers
misc_feature              1..24
                          note = Synthetic
source                    1..24
                          mol_type = other DNA
                          organism = synthetic construct
SEQUENCE: 235
aggggagact tggtattttg ttca                                                24

SEQ ID NO: 236            moltype = DNA  length = 24
FEATURE                   Location/Qualifiers
misc_feature              1..24
                          note = Synthetic
source                    1..24
                          mol_type = other DNA
                          organism = synthetic construct
SEQUENCE: 236
aggggagact tggtattttg ttca                                                24

SEQ ID NO: 237            moltype = DNA  length = 24
FEATURE                   Location/Qualifiers
misc_feature              1..24
                          note = Synthetic
source                    1..24
                          mol_type = other DNA
                          organism = synthetic construct
SEQUENCE: 237
aggggagact tggtattttg ttca                                                24

SEQ ID NO: 238            moltype = DNA  length = 24
FEATURE                   Location/Qualifiers
misc_feature              1..24
                          note = Synthetic
source                    1..24
                          mol_type = other DNA
                          organism = synthetic construct
SEQUENCE: 238
aggggagact tggtattttg ttca                                                24

SEQ ID NO: 239            moltype = DNA  length = 24
FEATURE                   Location/Qualifiers
misc_feature              1..24
                          note = Synthetic
source                    1..24
                          mol_type = other DNA
                          organism = synthetic construct
SEQUENCE: 239
acccttcttt aatgtcatcc aggg                                                24

SEQ ID NO: 240            moltype = DNA  length = 24
FEATURE                   Location/Qualifiers
misc_feature              1..24
                          note = Synthetic
source                    1..24
```

```
                              mol_type = other DNA
                              organism = synthetic construct
SEQUENCE: 240
acccttcttt aatgtcatcc aggg                                              24

SEQ ID NO: 241                moltype = DNA   length = 24
FEATURE                       Location/Qualifiers
misc_feature                  1..24
                              note = Synthetic
source                        1..24
                              mol_type = other DNA
                              organism = synthetic construct
SEQUENCE: 241
gatattggtg ctgttggact ggtg                                              24

SEQ ID NO: 242                moltype = DNA   length = 24
FEATURE                       Location/Qualifiers
misc_feature                  1..24
                              note = Synthetic
source                        1..24
                              mol_type = other DNA
                              organism = synthetic construct
SEQUENCE: 242
gatattggtg ctgttggact ggtg                                              24

SEQ ID NO: 243                moltype = DNA   length = 24
FEATURE                       Location/Qualifiers
misc_feature                  1..24
                              note = Synthetic
source                        1..24
                              mol_type = other DNA
                              organism = synthetic construct
SEQUENCE: 243
caggatttca tcgtgagtgt cagc                                              24

SEQ ID NO: 244                moltype = DNA   length = 21
FEATURE                       Location/Qualifiers
misc_feature                  1..21
                              note = Synthetic
source                        1..21
                              mol_type = other DNA
                              organism = synthetic construct
SEQUENCE: 244
gttgagggta cggaggagtt c                                                 21

SEQ ID NO: 245                moltype = DNA   length = 24
FEATURE                       Location/Qualifiers
misc_feature                  1..24
                              note = Synthetic
source                        1..24
                              mol_type = other DNA
                              organism = synthetic construct
SEQUENCE: 245
aaaacttatc cactagcttc aggc                                              24

SEQ ID NO: 246                moltype = DNA   length = 24
FEATURE                       Location/Qualifiers
misc_feature                  1..24
                              note = Synthetic
source                        1..24
                              mol_type = other DNA
                              organism = synthetic construct
SEQUENCE: 246
aaaacttatc cactagcttc aggc                                              24

SEQ ID NO: 247                moltype = DNA   length = 24
FEATURE                       Location/Qualifiers
misc_feature                  1..24
                              note = Synthetic
source                        1..24
                              mol_type = other DNA
                              organism = synthetic construct
SEQUENCE: 247
aggcttctga gtggtacaac tttt                                              24

SEQ ID NO: 248                moltype = DNA   length = 24
FEATURE                       Location/Qualifiers
misc_feature                  1..24
                              note = Synthetic
```

```
source                  1..24
                        mol_type = other DNA
                        organism = synthetic construct
SEQUENCE: 248
attttccctt gagtacccett ctcc                                             24

SEQ ID NO: 249          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 249
tcaccttctg tcttcattt ccag                                               24

SEQ ID NO: 250          moltype = DNA   length = 22
FEATURE                 Location/Qualifiers
misc_feature            1..22
                        note = Synthetic
source                  1..22
                        mol_type = other DNA
                        organism = synthetic construct
SEQUENCE: 250
gtcccaacat ggctaagagg tg                                                22

SEQ ID NO: 251          moltype = DNA   length = 22
FEATURE                 Location/Qualifiers
misc_feature            1..22
                        note = Synthetic
source                  1..22
                        mol_type = other DNA
                        organism = synthetic construct
SEQUENCE: 251
gtcccaacat ggctaagagg tg                                                22

SEQ ID NO: 252          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 252
tatacagagt agcagtgacc cagg                                              24

SEQ ID NO: 253          moltype = DNA   length = 23
FEATURE                 Location/Qualifiers
misc_feature            1..23
                        note = Synthetic
source                  1..23
                        mol_type = other DNA
                        organism = synthetic construct
SEQUENCE: 253
tacagatacc agggtgcaac aag                                               23

SEQ ID NO: 254          moltype = DNA   length = 22
FEATURE                 Location/Qualifiers
misc_feature            1..22
                        note = Synthetic
source                  1..22
                        mol_type = other DNA
                        organism = synthetic construct
SEQUENCE: 254
ataccagggt gcaacaaggt cg                                                22

SEQ ID NO: 255          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 255
cccacacatt cttccctaca gata                                              24

SEQ ID NO: 256          moltype = DNA   length = 24
FEATURE                 Location/Qualifiers
misc_feature            1..24
```

```
                                    note = Synthetic
source                              1..24
                                    mol_type = other DNA
                                    organism = synthetic construct
SEQUENCE: 256
cccacacatt cttccctaca gata                                                  24

SEQ ID NO: 257          moltype = DNA  length = 22
FEATURE                 Location/Qualifiers
misc_feature            1..22
                        note = Synthetic
source                  1..22
                        mol_type = other DNA
                        organism = synthetic construct
SEQUENCE: 257
tcagtgaatc acgggcatct tc                                                    22

SEQ ID NO: 258          moltype = DNA  length = 22
FEATURE                 Location/Qualifiers
misc_feature            1..22
                        note = Synthetic
source                  1..22
                        mol_type = other DNA
                        organism = synthetic construct
SEQUENCE: 258
gaatcacggg catcttcagg ag                                                    22

SEQ ID NO: 259          moltype = DNA  length = 22
FEATURE                 Location/Qualifiers
misc_feature            1..22
                        note = Synthetic
source                  1..22
                        mol_type = other DNA
                        organism = synthetic construct
SEQUENCE: 259
tcagtgaatc acgggcatct tc                                                    22

SEQ ID NO: 260          moltype = DNA  length = 25
FEATURE                 Location/Qualifiers
misc_feature            1..25
                        note = Synthetic
source                  1..25
                        mol_type = other DNA
                        organism = synthetic construct
SEQUENCE: 260
gctcaaccct tctttaatgt catcc                                                 25

SEQ ID NO: 261          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 261
acccttcttt aatgtcatcc aggg                                                  24

SEQ ID NO: 262          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 262
acccttcttt aatgtcatcc aggg                                                  24

SEQ ID NO: 263          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 263
acccttcttt aatgtcatcc aggg                                                  24

SEQ ID NO: 264          moltype = DNA  length = 24
FEATURE                 Location/Qualifiers
```

```
misc_feature              1..24
                          note = Synthetic
source                    1..24
                          mol_type = other DNA
                          organism = synthetic construct
SEQUENCE: 264
acccttcttt aatgtcatcc aggg                                                 24

SEQ ID NO: 265            moltype = DNA  length = 24
FEATURE                   Location/Qualifiers
misc_feature              1..24
                          note = Synthetic
source                    1..24
                          mol_type = other DNA
                          organism = synthetic construct
SEQUENCE: 265
acccttcttt aatgtcatcc aggg                                                 24

SEQ ID NO: 266            moltype = DNA  length = 25
FEATURE                   Location/Qualifiers
misc_feature              1..25
                          note = Synthetic
source                    1..25
                          mol_type = other DNA
                          organism = synthetic construct
SEQUENCE: 266
gctcaaccct tctttaatgt catcc                                                25

SEQ ID NO: 267            moltype = DNA  length = 25
FEATURE                   Location/Qualifiers
misc_feature              1..25
                          note = Synthetic
source                    1..25
                          mol_type = other DNA
                          organism = synthetic construct
SEQUENCE: 267
gctcaaccct tctttaatgt catcc                                                25

SEQ ID NO: 268            moltype = DNA  length = 24
FEATURE                   Location/Qualifiers
misc_feature              1..24
                          note = Synthetic
source                    1..24
                          mol_type = other DNA
                          organism = synthetic construct
SEQUENCE: 268
aaacatggga gggatttaca gtca                                                 24

SEQ ID NO: 269            moltype = DNA  length = 25
FEATURE                   Location/Qualifiers
misc_feature              1..25
                          note = Synthetic
source                    1..25
                          mol_type = other DNA
                          organism = synthetic construct
SEQUENCE: 269
gctcaaccct tctttaatgt catcc                                                25

SEQ ID NO: 270            moltype = DNA  length = 25
FEATURE                   Location/Qualifiers
misc_feature              1..25
                          note = Synthetic
source                    1..25
                          mol_type = other DNA
                          organism = synthetic construct
SEQUENCE: 270
gctcaaccct tctttaatgt catcc                                                25

SEQ ID NO: 271            moltype = RNA  length = 20
FEATURE                   Location/Qualifiers
misc_feature              1..20
                          note = Synthetic
source                    1..20
                          mol_type = other RNA
                          organism = synthetic construct
SEQUENCE: 271
gttgaggaac aggccgttgc                                                      20

SEQ ID NO: 272            moltype = RNA  length = 20
```

```
FEATURE              Location/Qualifiers
misc_feature         1..20
                     note = Synthetic
source               1..20
                     mol_type = other RNA
                     organism = synthetic construct
SEQUENCE: 272
actcacagtg aaatcctgga                                               20

SEQ ID NO: 273       moltype = RNA  length = 20
FEATURE              Location/Qualifiers
misc_feature         1..20
                     note = Synthetic
source               1..20
                     mol_type = other RNA
                     organism = synthetic construct
SEQUENCE: 273
gaagccgaac tcagccaggc                                               20

SEQ ID NO: 274       moltype = RNA  length = 20
FEATURE              Location/Qualifiers
misc_feature         1..20
                     note = Synthetic
source               1..20
                     mol_type = other RNA
                     organism = synthetic construct
SEQUENCE: 274
caacgtcacg gagattccgg                                               20

SEQ ID NO: 275       moltype =     length =
SEQUENCE: 275
000

SEQ ID NO: 276       moltype =     length =
SEQUENCE: 276
000

SEQ ID NO: 277       moltype =     length =
SEQUENCE: 277
000

SEQ ID NO: 278       moltype =     length =
SEQUENCE: 278
000

SEQ ID NO: 279       moltype =     length =
SEQUENCE: 279
000

SEQ ID NO: 280       moltype = DNA  length = 24
FEATURE              Location/Qualifiers
misc_feature         1..24
                     note = Synthetic
source               1..24
                     mol_type = other DNA
                     organism = synthetic construct
SEQUENCE: 280
ccatcggacg atcctatctg atta                                          24

SEQ ID NO: 281       moltype = DNA  length = 22
FEATURE              Location/Qualifiers
misc_feature         1..22
                     note = Synthetic
source               1..22
                     mol_type = other DNA
                     organism = synthetic construct
SEQUENCE: 281
aaatcctaac tgggctggaa gg                                            22

SEQ ID NO: 282       moltype = DNA  length = 22
FEATURE              Location/Qualifiers
misc_feature         1..22
                     note = Synthetic
source               1..22
                     mol_type = other DNA
                     organism = synthetic construct
SEQUENCE: 282
aaatcctaac tgggctggaa gg                                            22
```

| | | |
|---|---|---|
| SEQ ID NO: 283 | moltype = DNA length = 22 | |
| FEATURE | Location/Qualifiers | |
| misc_feature | 1..22 | |
| | note = Synthetic | |
| source | 1..22 | |
| | mol_type = other DNA | |
| | organism = synthetic construct | |
| SEQUENCE: 283 | | |
| aaatcctaac tgggctggaa gg | | 22 |

| | | |
|---|---|---|
| SEQ ID NO: 284 | moltype = DNA length = 24 | |
| FEATURE | Location/Qualifiers | |
| misc_feature | 1..24 | |
| | note = Synthetic | |
| source | 1..24 | |
| | mol_type = other DNA | |
| | organism = synthetic construct | |
| SEQUENCE: 284 | | |
| cttggcacag gctggtttaa taat | | 24 |

| | | |
|---|---|---|
| SEQ ID NO: 285 | moltype = DNA length = 24 | |
| FEATURE | Location/Qualifiers | |
| misc_feature | 1..24 | |
| | note = Synthetic | |
| source | 1..24 | |
| | mol_type = other DNA | |
| | organism = synthetic construct | |
| SEQUENCE: 285 | | |
| cttggcacag gctggtttaa taat | | 24 |

| | | |
|---|---|---|
| SEQ ID NO: 286 | moltype = DNA length = 24 | |
| FEATURE | Location/Qualifiers | |
| misc_feature | 1..24 | |
| | note = Synthetic | |
| source | 1..24 | |
| | mol_type = other DNA | |
| | organism = synthetic construct | |
| SEQUENCE: 286 | | |
| cttggcacag gctggtttaa taat | | 24 |

| | | |
|---|---|---|
| SEQ ID NO: 287 | moltype = DNA length = 24 | |
| FEATURE | Location/Qualifiers | |
| misc_feature | 1..24 | |
| | note = Synthetic | |
| source | 1..24 | |
| | mol_type = other DNA | |
| | organism = synthetic construct | |
| SEQUENCE: 287 | | |
| ttctttcagt gttactgatg tcgg | | 24 |

| | | |
|---|---|---|
| SEQ ID NO: 288 | moltype = DNA length = 24 | |
| FEATURE | Location/Qualifiers | |
| misc_feature | 1..24 | |
| | note = Synthetic | |
| source | 1..24 | |
| | mol_type = other DNA | |
| | organism = synthetic construct | |
| SEQUENCE: 288 | | |
| cttggcacag gctggtttaa taat | | 24 |

| | | |
|---|---|---|
| SEQ ID NO: 289 | moltype = DNA length = 22 | |
| FEATURE | Location/Qualifiers | |
| misc_feature | 1..22 | |
| | note = Synthetic | |
| source | 1..22 | |
| | mol_type = other DNA | |
| | organism = synthetic construct | |
| SEQUENCE: 289 | | |
| gtgtcaatcc ctgatcactg gg | | 22 |

| | | |
|---|---|---|
| SEQ ID NO: 290 | moltype = DNA length = 21 | |
| FEATURE | Location/Qualifiers | |
| misc_feature | 1..21 | |
| | note = Synthetic | |
| source | 1..21 | |
| | mol_type = other DNA | |
| | organism = synthetic construct | |
| SEQUENCE: 290 | | |
| tcatcatgtg ccttgactcg g | | 21 |

```
SEQ ID NO: 291          moltype = DNA  length = 21
FEATURE                 Location/Qualifiers
misc_feature            1..21
                        note = Synthetic
source                  1..21
                        mol_type = other DNA
                        organism = synthetic construct
SEQUENCE: 291
tcatcatgtg ccttgactcg g                                                 21

SEQ ID NO: 292          moltype = DNA  length = 21
FEATURE                 Location/Qualifiers
misc_feature            1..21
                        note = Synthetic
source                  1..21
                        mol_type = other DNA
                        organism = synthetic construct
SEQUENCE: 292
tcatcatgtg ccttgactcg g                                                 21

SEQ ID NO: 293          moltype = DNA  length = 23
FEATURE                 Location/Qualifiers
misc_feature            1..23
                        note = Synthetic
source                  1..23
                        mol_type = other DNA
                        organism = synthetic construct
SEQUENCE: 293
gatcactggg agtcatcatg tgc                                               23

SEQ ID NO: 294          moltype = DNA  length = 23
FEATURE                 Location/Qualifiers
misc_feature            1..23
                        note = Synthetic
source                  1..23
                        mol_type = other DNA
                        organism = synthetic construct
SEQUENCE: 294
gatcactggg agtcatcatg tgc                                               23

SEQ ID NO: 295          moltype = DNA  length = 23
FEATURE                 Location/Qualifiers
misc_feature            1..23
                        note = Synthetic
source                  1..23
                        mol_type = other DNA
                        organism = synthetic construct
SEQUENCE: 295
gatcactggg agtcatcatg tgc                                               23

SEQ ID NO: 296          moltype = DNA  length = 23
FEATURE                 Location/Qualifiers
misc_feature            1..23
                        note = Synthetic
source                  1..23
                        mol_type = other DNA
                        organism = synthetic construct
SEQUENCE: 296
gatcactggg agtcatcatg tgc                                               23

SEQ ID NO: 297          moltype = DNA  length = 23
FEATURE                 Location/Qualifiers
misc_feature            1..23
                        note = Synthetic
source                  1..23
                        mol_type = other DNA
                        organism = synthetic construct
SEQUENCE: 297
gatcactggg agtcatcatg tgc                                               23

SEQ ID NO: 298          moltype = DNA  length = 22
FEATURE                 Location/Qualifiers
misc_feature            1..22
                        note = Synthetic
source                  1..22
                        mol_type = other DNA
                        organism = synthetic construct
SEQUENCE: 298
```

```
gtgtcaatcc ctgatcactg gg                                              22

SEQ ID NO: 299          moltype = DNA   length = 23
FEATURE                 Location/Qualifiers
misc_feature            1..23
                        note = Synthetic
source                  1..23
                        mol_type = other DNA
                        organism = synthetic construct
SEQUENCE: 299
gatcactggg agtcatcatg tgc                                             23

SEQ ID NO: 300          moltype = DNA   length = 23
FEATURE                 Location/Qualifiers
misc_feature            1..23
                        note = Synthetic
source                  1..23
                        mol_type = other DNA
                        organism = synthetic construct
SEQUENCE: 300
gatcactggg agtcatcatg tgc                                             23

SEQ ID NO: 301          moltype = DNA   length = 21
FEATURE                 Location/Qualifiers
misc_feature            1..21
                        note = Synthetic
source                  1..21
                        mol_type = other DNA
                        organism = synthetic construct
SEQUENCE: 301
gtcttgcagg acaatgccgt c                                               21

SEQ ID NO: 302          moltype = DNA   length = 21
FEATURE                 Location/Qualifiers
misc_feature            1..21
                        note = Synthetic
source                  1..21
                        mol_type = other DNA
                        organism = synthetic construct
SEQUENCE: 302
gtcttgcagg acaatgccgt c                                               21

SEQ ID NO: 303          moltype = DNA   length = 21
FEATURE                 Location/Qualifiers
misc_feature            1..21
                        note = Synthetic
source                  1..21
                        mol_type = other DNA
                        organism = synthetic construct
SEQUENCE: 303
gtcttgcagg acaatgccgt c                                               21

SEQ ID NO: 304          moltype = DNA   length = 21
FEATURE                 Location/Qualifiers
misc_feature            1..21
                        note = Synthetic
source                  1..21
                        mol_type = other DNA
                        organism = synthetic construct
SEQUENCE: 304
gtcttgcagg acaatgccgt c                                               21

SEQ ID NO: 305          moltype = DNA   length = 21
FEATURE                 Location/Qualifiers
misc_feature            1..21
                        note = Synthetic
source                  1..21
                        mol_type = other DNA
                        organism = synthetic construct
SEQUENCE: 305
aatgccgtct tctgtctcgt g                                               21

SEQ ID NO: 306          moltype = DNA   length = 21
FEATURE                 Location/Qualifiers
misc_feature            1..21
                        note = Synthetic
source                  1..21
                        mol_type = other DNA
                        organism = synthetic construct
```

```
SEQUENCE: 306
aatgccgtct tctgtctcgt g                                              21

SEQ ID NO: 307          moltype = DNA   length = 21
FEATURE                 Location/Qualifiers
misc_feature            1..21
                        note = Synthetic
source                  1..21
                        mol_type = other DNA
                        organism = synthetic construct
SEQUENCE: 307
aatgccgtct tctgtctcgt g                                              21

SEQ ID NO: 308          moltype = DNA   length = 21
FEATURE                 Location/Qualifiers
misc_feature            1..21
                        note = Synthetic
source                  1..21
                        mol_type = other DNA
                        organism = synthetic construct
SEQUENCE: 308
aatgccgtct tctgtctcgt g                                              21

SEQ ID NO: 309          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 309
gagatgctgc ccagaagaca gata                                           24

SEQ ID NO: 310          moltype = DNA   length = 23
FEATURE                 Location/Qualifiers
misc_feature            1..23
                        note = Synthetic
source                  1..23
                        mol_type = other DNA
                        organism = synthetic construct
SEQUENCE: 310
ccagaagaca gatacatccc acc                                            23

SEQ ID NO: 311          moltype = DNA   length = 23
FEATURE                 Location/Qualifiers
misc_feature            1..23
                        note = Synthetic
source                  1..23
                        mol_type = other DNA
                        organism = synthetic construct
SEQUENCE: 311
ctgcccagaa gacagataca tcc                                            23

SEQ ID NO: 312          moltype = DNA   length = 23
FEATURE                 Location/Qualifiers
misc_feature            1..23
                        note = Synthetic
source                  1..23
                        mol_type = other DNA
                        organism = synthetic construct
SEQUENCE: 312
atgatcagga tcacccaacc ttc                                            23

SEQ ID NO: 313          moltype = DNA   length = 23
FEATURE                 Location/Qualifiers
misc_feature            1..23
                        note = Synthetic
source                  1..23
                        mol_type = other DNA
                        organism = synthetic construct
SEQUENCE: 313
atgatcagga tcacccaacc ttc                                            23

SEQ ID NO: 314          moltype = DNA   length = 23
FEATURE                 Location/Qualifiers
misc_feature            1..23
                        note = Synthetic
source                  1..23
                        mol_type = other DNA
```

```
                       organism = synthetic construct
SEQUENCE: 314
caccatgatc aggatcaccc aac                                               23

SEQ ID NO: 315         moltype = DNA  length = 23
FEATURE                Location/Qualifiers
misc_feature           1..23
                       note = Synthetic
source                 1..23
                       mol_type = other DNA
                       organism = synthetic construct
SEQUENCE: 315
ctgagttcgc cttcagccta tac                                               23

SEQ ID NO: 316         moltype = DNA  length = 23
FEATURE                Location/Qualifiers
misc_feature           1..23
                       note = Synthetic
source                 1..23
                       mol_type = other DNA
                       organism = synthetic construct
SEQUENCE: 316
ctgagttcgc cttcagccta tac                                               23

SEQ ID NO: 317         moltype = DNA  length = 23
FEATURE                Location/Qualifiers
misc_feature           1..23
                       note = Synthetic
source                 1..23
                       mol_type = other DNA
                       organism = synthetic construct
SEQUENCE: 317
ctgagttcgc cttcagccta tac                                               23

SEQ ID NO: 318         moltype = DNA  length = 23
FEATURE                Location/Qualifiers
misc_feature           1..23
                       note = Synthetic
source                 1..23
                       mol_type = other DNA
                       organism = synthetic construct
SEQUENCE: 318
ctgagttcgc cttcagccta tac                                               23

SEQ ID NO: 319         moltype = DNA  length = 24
FEATURE                Location/Qualifiers
misc_feature           1..24
                       note = Synthetic
source                 1..24
                       mol_type = other DNA
                       organism = synthetic construct
SEQUENCE: 319
ccaacagcac caatatcttc ttct                                              24

SEQ ID NO: 320         moltype = DNA  length = 24
FEATURE                Location/Qualifiers
misc_feature           1..24
                       note = Synthetic
source                 1..24
                       mol_type = other DNA
                       organism = synthetic construct
SEQUENCE: 320
ccaacagcac caatatcttc ttct                                              24

SEQ ID NO: 321         moltype = DNA  length = 24
FEATURE                Location/Qualifiers
misc_feature           1..24
                       note = Synthetic
source                 1..24
                       mol_type = other DNA
                       organism = synthetic construct
SEQUENCE: 321
agtccaacag caccaatatc ttct                                              24

SEQ ID NO: 322         moltype = DNA  length = 24
FEATURE                Location/Qualifiers
misc_feature           1..24
                       note = Synthetic
source                 1..24
```

```
                              mol_type = other DNA
                              organism = synthetic construct
SEQUENCE: 322
acagcaccaa tatcttcttc tccc                                              24

SEQ ID NO: 323            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 323
agtccaacag caccaatatc ttct                                              24

SEQ ID NO: 324            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 324
agtccaacag caccaatatc ttct                                              24

SEQ ID NO: 325            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 325
agtccaacag caccaatatc ttct                                              24

SEQ ID NO: 326            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 326
agtccaacag caccaatatc ttct                                              24

SEQ ID NO: 327            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 327
ctgacactca cgatgaaatc ctgg                                              24

SEQ ID NO: 328            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 328
ctgacactca cgatgaaatc ctgg                                              24

SEQ ID NO: 329            moltype = DNA   length = 24
FEATURE                   Location/Qualifiers
misc_feature              1..24
                          note = Synthetic
source                    1..24
                          mol_type = other DNA
                          organism = synthetic construct
SEQUENCE: 329
gatgaaatcc tggagggcct gaat                                              24

SEQ ID NO: 330            moltype = DNA   length = 24
FEATURE                   Location/Qualifiers
misc_feature              1..24
                          note = Synthetic
```

```
source                   1..24
                         mol_type = other DNA
                         organism = synthetic construct
SEQUENCE: 330
ctgacactca cgatgaaatc ctgg                                              24

SEQ ID NO: 331           moltype = DNA   length = 24
FEATURE                  Location/Qualifiers
misc_feature             1..24
                         note = Synthetic
source                   1..24
                         mol_type = other DNA
                         organism = synthetic construct
SEQUENCE: 331
atcctggagg gcctgaattt caac                                              24

SEQ ID NO: 332           moltype = DNA   length = 24
FEATURE                  Location/Qualifiers
misc_feature             1..24
                         note = Synthetic
source                   1..24
                         mol_type = other DNA
                         organism = synthetic construct
SEQUENCE: 332
aaggctgaca ctcacgatga aatc                                              24

SEQ ID NO: 333           moltype = DNA   length = 24
FEATURE                  Location/Qualifiers
misc_feature             1..24
                         note = Synthetic
source                   1..24
                         mol_type = other DNA
                         organism = synthetic construct
SEQUENCE: 333
aaggctgaca ctcacgatga aatc                                              24

SEQ ID NO: 334           moltype = DNA   length = 24
FEATURE                  Location/Qualifiers
misc_feature             1..24
                         note = Synthetic
source                   1..24
                         mol_type = other DNA
                         organism = synthetic construct
SEQUENCE: 334
aaggctgaca ctcacgatga aatc                                              24

SEQ ID NO: 335           moltype = DNA   length = 24
FEATURE                  Location/Qualifiers
misc_feature             1..24
                         note = Synthetic
source                   1..24
                         mol_type = other DNA
                         organism = synthetic construct
SEQUENCE: 335
ctgacactca cgatgaaatc ctgg                                              24

SEQ ID NO: 336           moltype = DNA   length = 24
FEATURE                  Location/Qualifiers
misc_feature             1..24
                         note = Synthetic
source                   1..24
                         mol_type = other DNA
                         organism = synthetic construct
SEQUENCE: 336
aaggctgaca ctcacgatga aatc                                              24

SEQ ID NO: 337           moltype = DNA   length = 24
FEATURE                  Location/Qualifiers
misc_feature             1..24
                         note = Synthetic
source                   1..24
                         mol_type = other DNA
                         organism = synthetic construct
SEQUENCE: 337
aaggctgaca ctcacgatga aatc                                              24

SEQ ID NO: 338           moltype = DNA   length = 24
FEATURE                  Location/Qualifiers
misc_feature             1..24
```

```
                        note = Synthetic
source                  1..24
                        mol_type = other DNA
                        organism = synthetic construct
SEQUENCE: 338
gagattccgg aggctcagat ccat                                              24

SEQ ID NO: 339          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 339
gatgaaatcc tggagggcct gaat                                              24

SEQ ID NO: 340          moltype = DNA  length = 21
FEATURE                 Location/Qualifiers
misc_feature            1..21
                        note = Synthetic
source                  1..21
                        mol_type = other DNA
                        organism = synthetic construct
SEQUENCE: 340
ggaactcctc cgtaccctca a                                                 21

SEQ ID NO: 341          moltype = DNA  length = 21
FEATURE                 Location/Qualifiers
misc_feature            1..21
                        note = Synthetic
source                  1..21
                        mol_type = other DNA
                        organism = synthetic construct
SEQUENCE: 341
ggaactcctc cgtaccctca a                                                 21

SEQ ID NO: 342          moltype = DNA  length = 22
FEATURE                 Location/Qualifiers
misc_feature            1..22
                        note = Synthetic
source                  1..22
                        mol_type = other DNA
                        organism = synthetic construct
SEQUENCE: 342
cttccaggaa ctcctccgta cc                                                22

SEQ ID NO: 343          moltype = DNA  length = 22
FEATURE                 Location/Qualifiers
misc_feature            1..22
                        note = Synthetic
source                  1..22
                        mol_type = other DNA
                        organism = synthetic construct
SEQUENCE: 343
cttccaggaa ctcctccgta cc                                                22

SEQ ID NO: 344          moltype = DNA  length = 22
FEATURE                 Location/Qualifiers
misc_feature            1..22
                        note = Synthetic
source                  1..22
                        mol_type = other DNA
                        organism = synthetic construct
SEQUENCE: 344
cttccaggaa ctcctccgta cc                                                22

SEQ ID NO: 345          moltype = DNA  length = 22
FEATURE                 Location/Qualifiers
misc_feature            1..22
                        note = Synthetic
source                  1..22
                        mol_type = other DNA
                        organism = synthetic construct
SEQUENCE: 345
cttccaggaa ctcctccgta cc                                                22

SEQ ID NO: 346          moltype = DNA  length = 21
FEATURE                 Location/Qualifiers
```

```
misc_feature            1..21
                        note = Synthetic
source                  1..21
                        mol_type = other DNA
                        organism = synthetic construct
SEQUENCE: 346
ggaactcctc cgtaccctca a                                                 21

SEQ ID NO: 347          moltype = DNA  length = 22
FEATURE                 Location/Qualifiers
misc_feature            1..22
                        note = Synthetic
source                  1..22
                        mol_type = other DNA
                        organism = synthetic construct
SEQUENCE: 347
gggcctgaag ctagtggata ag                                                22

SEQ ID NO: 348          moltype = DNA  length = 22
FEATURE                 Location/Qualifiers
misc_feature            1..22
                        note = Synthetic
source                  1..22
                        mol_type = other DNA
                        organism = synthetic construct
SEQUENCE: 348
gggcctgaag ctagtggata ag                                                22

SEQ ID NO: 349          moltype = DNA  length = 22
FEATURE                 Location/Qualifiers
misc_feature            1..22
                        note = Synthetic
source                  1..22
                        mol_type = other DNA
                        organism = synthetic construct
SEQUENCE: 349
gggcctgaag ctagtggata ag                                                22

SEQ ID NO: 350          moltype = DNA  length = 22
FEATURE                 Location/Qualifiers
misc_feature            1..22
                        note = Synthetic
source                  1..22
                        mol_type = other DNA
                        organism = synthetic construct
SEQUENCE: 350
gggcctgaag ctagtggata ag                                                22

SEQ ID NO: 351          moltype = DNA  length = 22
FEATURE                 Location/Qualifiers
misc_feature            1..22
                        note = Synthetic
source                  1..22
                        mol_type = other DNA
                        organism = synthetic construct
SEQUENCE: 351
gggcctgaag ctagtggata ag                                                22

SEQ ID NO: 352          moltype = DNA  length = 22
FEATURE                 Location/Qualifiers
misc_feature            1..22
                        note = Synthetic
source                  1..22
                        mol_type = other DNA
                        organism = synthetic construct
SEQUENCE: 352
gggcctgaag ctagtggata ag                                                22

SEQ ID NO: 353          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 353
tcagaagcct tcactgtcaa cttc                                              24

SEQ ID NO: 354          moltype = DNA  length = 24
```

```
FEATURE                 Location/Qualifiers
misc_feature            1..24
                        note = Synthetic
source                  1..24
                        mol_type = other DNA
                        organism = synthetic construct
SEQUENCE: 354
gatggtcagt ttcagcacct ttta                                              24

SEQ ID NO: 355          moltype = DNA   length = 21
FEATURE                 Location/Qualifiers
misc_feature            1..21
                        note = Synthetic
source                  1..21
                        mol_type = other DNA
                        organism = synthetic construct
SEQUENCE: 355
gagggatgtg tgtcgtcaag g                                                 21

SEQ ID NO: 356          moltype = DNA   length = 21
FEATURE                 Location/Qualifiers
misc_feature            1..21
                        note = Synthetic
source                  1..21
                        mol_type = other DNA
                        organism = synthetic construct
SEQUENCE: 356
gagggatgtg tgtcgtcaag g                                                 21

SEQ ID NO: 357          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 357
ggaggggact catggtttct ttat                                              24

SEQ ID NO: 358          moltype = DNA   length = 25
FEATURE                 Location/Qualifiers
misc_feature            1..25
                        note = Synthetic
source                  1..25
                        mol_type = other DNA
                        organism = synthetic construct
SEQUENCE: 358
tggtttcttt attctgctac actct                                             25

SEQ ID NO: 359          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 359
attctgctac actcttccaa acct                                              24

SEQ ID NO: 360          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 360
attctgctac actcttccaa acct                                              24

SEQ ID NO: 361          moltype = DNA   length = 24
FEATURE                 Location/Qualifiers
misc_feature            1..24
                        note = Synthetic
source                  1..24
                        mol_type = other DNA
                        organism = synthetic construct
SEQUENCE: 361
attctgctac actcttccaa acct                                              24
```

| | | |
|---|---|---|
| SEQ ID NO: 362 | moltype = DNA  length = 24 | |
| FEATURE | Location/Qualifiers | |
| misc_feature | 1..24 | |
| | note = Synthetic | |
| source | 1..24 | |
| | mol_type = other DNA | |
| | organism = synthetic construct | |
| SEQUENCE: 362 | | |
| tacactcttc caaaccttca ctca | | 24 |
| | | |
| SEQ ID NO: 363 | moltype = DNA  length = 24 | |
| FEATURE | Location/Qualifiers | |
| misc_feature | 1..24 | |
| | note = Synthetic | |
| source | 1..24 | |
| | mol_type = other DNA | |
| | organism = synthetic construct | |
| SEQUENCE: 363 | | |
| tacactcttc caaaccttca ctca | | 24 |
| | | |
| SEQ ID NO: 364 | moltype = DNA  length = 24 | |
| FEATURE | Location/Qualifiers | |
| misc_feature | 1..24 | |
| | note = Synthetic | |
| source | 1..24 | |
| | mol_type = other DNA | |
| | organism = synthetic construct | |
| SEQUENCE: 364 | | |
| attctgctac actcttccaa acct | | 24 |
| | | |
| SEQ ID NO: 365 | moltype = DNA  length = 24 | |
| FEATURE | Location/Qualifiers | |
| misc_feature | 1..24 | |
| | note = Synthetic | |
| source | 1..24 | |
| | mol_type = other DNA | |
| | organism = synthetic construct | |
| SEQUENCE: 365 | | |
| attctgctac actcttccaa acct | | 24 |
| | | |
| SEQ ID NO: 366 | moltype = DNA  length = 24 | |
| FEATURE | Location/Qualifiers | |
| misc_feature | 1..24 | |
| | note = Synthetic | |
| source | 1..24 | |
| | mol_type = other DNA | |
| | organism = synthetic construct | |
| SEQUENCE: 366 | | |
| tacactcttc caaaccttca ctca | | 24 |
| | | |
| SEQ ID NO: 367 | moltype = DNA  length = 24 | |
| FEATURE | Location/Qualifiers | |
| misc_feature | 1..24 | |
| | note = Synthetic | |
| source | 1..24 | |
| | mol_type = other DNA | |
| | organism = synthetic construct | |
| SEQUENCE: 367 | | |
| tacactcttc caaaccttca ctca | | 24 |
| | | |
| SEQ ID NO: 368 | moltype = DNA  length = 24 | |
| FEATURE | Location/Qualifiers | |
| misc_feature | 1..24 | |
| | note = Synthetic | |
| source | 1..24 | |
| | mol_type = other DNA | |
| | organism = synthetic construct | |
| SEQUENCE: 368 | | |
| aaatgggaga gaccctttga agtc | | 24 |
| | | |
| SEQ ID NO: 369 | moltype = DNA  length = 24 | |
| FEATURE | Location/Qualifiers | |
| misc_feature | 1..24 | |
| | note = Synthetic | |
| source | 1..24 | |
| | mol_type = other DNA | |
| | organism = synthetic construct | |
| SEQUENCE: 369 | | |
| tttgaagtca aggacaccga ggaa | | 24 |

```
SEQ ID NO: 370          moltype = DNA  length = 23
FEATURE                 Location/Qualifiers
misc_feature            1..23
                        note = Synthetic
source                  1..23
                        mol_type = other DNA
                        organism = synthetic construct
SEQUENCE: 370
cctttgaagt caaggacacc gag                                               23

SEQ ID NO: 371          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 371
tttgaagtca aggacaccga ggaa                                              24

SEQ ID NO: 372          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 372
ctatgtgaca gggagggaga ggat                                              24

SEQ ID NO: 373          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 373
ctatgtgaca gggagggaga ggat                                              24

SEQ ID NO: 374          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 374
ctatgtgaca gggagggaga ggat                                              24

SEQ ID NO: 375          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 375
ctatgtgaca gggagggaga ggat                                              24

SEQ ID NO: 376          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 376
ctatgtgaca gggagggaga ggat                                              24

SEQ ID NO: 377          moltype = DNA  length = 23
FEATURE                 Location/Qualifiers
misc_feature            1..23
                        note = Synthetic
source                  1..23
                        mol_type = other DNA
                        organism = synthetic construct
SEQUENCE: 377
```

```
gatcagcctt acaacgtgtc tct                                              23

SEQ ID NO: 378            moltype = DNA   length = 23
FEATURE                   Location/Qualifiers
misc_feature              1..23
                          note = Synthetic
source                    1..23
                          mol_type = other DNA
                          organism = synthetic construct
SEQUENCE: 378
gatcagcctt acaacgtgtc tct                                              23

SEQ ID NO: 379            moltype = DNA   length = 22
FEATURE                   Location/Qualifiers
misc_feature              1..22
                          note = Synthetic
source                    1..22
                          mol_type = other DNA
                          organism = synthetic construct
SEQUENCE: 379
gtgtcaatcc ctgatcactg gg                                               22

SEQ ID NO: 380            moltype = DNA   length = 22
FEATURE                   Location/Qualifiers
misc_feature              1..22
                          note = Synthetic
source                    1..22
                          mol_type = other DNA
                          organism = synthetic construct
SEQUENCE: 380
gtgtcaatcc ctgatcactg gg                                               22

SEQ ID NO: 381            moltype = DNA   length = 23
FEATURE                   Location/Qualifiers
misc_feature              1..23
                          note = Synthetic
source                    1..23
                          mol_type = other DNA
                          organism = synthetic construct
SEQUENCE: 381
cttctgtctc gtggggcatc ctc                                              23

SEQ ID NO: 382            moltype = DNA   length = 23
FEATURE                   Location/Qualifiers
misc_feature              1..23
                          note = Synthetic
source                    1..23
                          mol_type = other DNA
                          organism = synthetic construct
SEQUENCE: 382
atgatcagga tcacccaacc ttc                                              23

SEQ ID NO: 383            moltype = DNA   length = 23
FEATURE                   Location/Qualifiers
misc_feature              1..23
                          note = Synthetic
source                    1..23
                          mol_type = other DNA
                          organism = synthetic construct
SEQUENCE: 383
ctgagttcgc cttcagccta tac                                              23

SEQ ID NO: 384            moltype = DNA   length = 23
FEATURE                   Location/Qualifiers
misc_feature              1..23
                          note = Synthetic
source                    1..23
                          mol_type = other DNA
                          organism = synthetic construct
SEQUENCE: 384
ctgagttcgc cttcagccta tac                                              23

SEQ ID NO: 385            moltype = DNA   length = 24
FEATURE                   Location/Qualifiers
misc_feature              1..24
                          note = Synthetic
source                    1..24
                          mol_type = other DNA
                          organism = synthetic construct
```

```
SEQUENCE: 385
agtccaacag caccaatatc ttct                                               24

SEQ ID NO: 386          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 386
ctgacactca cgatgaaatc ctgg                                               24

SEQ ID NO: 387          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 387
gagagaccct tgaagtcaa ggac                                                24

SEQ ID NO: 388          moltype = DNA  length = 22
FEATURE                 Location/Qualifiers
misc_feature            1..22
                        note = Synthetic
source                  1..22
                        mol_type = other DNA
                        organism = synthetic construct
SEQUENCE: 388
gaaggtgcct atgatgaagc gt                                                 22

SEQ ID NO: 389          moltype = DNA  length = 22
FEATURE                 Location/Qualifiers
misc_feature            1..22
                        note = Synthetic
source                  1..22
                        mol_type = other DNA
                        organism = synthetic construct
SEQUENCE: 389
gaaggtgcct atgatgaagc gt                                                 22

SEQ ID NO: 390          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 390
ttaacatcca gcactgtaag aagc                                               24

SEQ ID NO: 391          moltype = DNA  length = 26
FEATURE                 Location/Qualifiers
misc_feature            1..26
                        note = Synthetic
source                  1..26
                        mol_type = other DNA
                        organism = synthetic construct
SEQUENCE: 391
aggagtaagt ggcagaaata atcaga                                             26

SEQ ID NO: 392          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 392
gacacaggag taagtggcag aaat                                               24

SEQ ID NO: 393          moltype = DNA  length = 24
FEATURE                 Location/Qualifiers
misc_feature            1..24
                        note = Synthetic
source                  1..24
                        mol_type = other DNA
```

```
                          organism = synthetic construct
SEQUENCE: 393
cagaagaaca agaggaatgc tgtg                                              24

SEQ ID NO: 394          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 394
cagaagaaca agaggaatgc tgtg                                              24

SEQ ID NO: 395          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 395
tctgccagct tacatttacc caaa                                              24

SEQ ID NO: 396          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 396
acaggtctgc cagcttacat ttac                                              24

SEQ ID NO: 397          moltype = DNA  length = 24
FEATURE                 Location/Qualifiers
misc_feature            1..24
                        note = Synthetic
source                  1..24
                        mol_type = other DNA
                        organism = synthetic construct
SEQUENCE: 397
tctgccagct tacatttacc caaa                                              24

SEQ ID NO: 398          moltype = DNA  length = 23
FEATURE                 Location/Qualifiers
misc_feature            1..23
                        note = Synthetic
source                  1..23
                        mol_type = other DNA
                        organism = synthetic construct
SEQUENCE: 398
ccttacaacg tgtctctgct tct                                               23

SEQ ID NO: 399          moltype = DNA  length = 23
FEATURE                 Location/Qualifiers
misc_feature            1..23
                        note = Synthetic
source                  1..23
                        mol_type = other DNA
                        organism = synthetic construct
SEQUENCE: 399
gatcagcctt acaacgtgtc tct                                               23

SEQ ID NO: 400          moltype = DNA  length = 23
FEATURE                 Location/Qualifiers
misc_feature            1..23
                        note = Synthetic
source                  1..23
                        mol_type = other DNA
                        organism = synthetic construct
SEQUENCE: 400
gatcagcctt acaacgtgtc tct                                               23

SEQ ID NO: 401          moltype = DNA  length = 23
FEATURE                 Location/Qualifiers
misc_feature            1..23
                        note = Synthetic
source                  1..23
```

```
                          mol_type = other DNA
                          organism = synthetic construct
SEQUENCE: 401
gatcagcctt acaacgtgtc tct                                              23

SEQ ID NO: 402          moltype = DNA   length = 23
FEATURE                 Location/Qualifiers
misc_feature            1..23
                          note = Synthetic
source                  1..23
                          mol_type = other DNA
                          organism = synthetic construct
SEQUENCE: 402
gatcagcctt acaacgtgtc tct                                              23

SEQ ID NO: 403          moltype = DNA   length = 23
FEATURE                 Location/Qualifiers
misc_feature            1..23
                          note = Synthetic
source                  1..23
                          mol_type = other DNA
                          organism = synthetic construct
SEQUENCE: 403
gatcagcctt acaacgtgtc tct                                              23

SEQ ID NO: 404          moltype = DNA   length = 23
FEATURE                 Location/Qualifiers
misc_feature            1..23
                          note = Synthetic
source                  1..23
                          mol_type = other DNA
                          organism = synthetic construct
SEQUENCE: 404
ccttacaacg tgtctctgct tct                                              23

SEQ ID NO: 405          moltype = DNA   length = 23
FEATURE                 Location/Qualifiers
misc_feature            1..23
                          note = Synthetic
source                  1..23
                          mol_type = other DNA
                          organism = synthetic construct
SEQUENCE: 405
ccttacaacg tgtctctgct tct                                              23

SEQ ID NO: 406          moltype = DNA   length = 23
FEATURE                 Location/Qualifiers
misc_feature            1..23
                          note = Synthetic
source                  1..23
                          mol_type = other DNA
                          organism = synthetic construct
SEQUENCE: 406
catcgacgag aaagggactg aag                                              23

SEQ ID NO: 407          moltype = DNA   length = 23
FEATURE                 Location/Qualifiers
misc_feature            1..23
                          note = Synthetic
source                  1..23
                          mol_type = other DNA
                          organism = synthetic construct
SEQUENCE: 407
ccttacaacg tgtctctgct tct                                              23

SEQ ID NO: 408          moltype = RNA   length = 80
FEATURE                 Location/Qualifiers
misc_feature            1..80
                          note = Synthetic
source                  1..80
                          mol_type = other RNA
                          organism = synthetic construct
SEQUENCE: 408
gttttagagc tagaaatagc aagttaaaat aaggctagtc cgttatcaac ttgaaaaagt       60
ggcaccgagt cggtgctttt                                                  80

SEQ ID NO: 409          moltype = DNA   length = 23
FEATURE                 Location/Qualifiers
misc_feature            1..23
```

```
                    note = Synthetic
source              1..23
                    mol_type = other DNA
                    organism = synthetic construct
SEQUENCE: 409
ccttacaacg tgtctctgct tct                                              23

SEQ ID NO: 410      moltype = RNA  length = 100
FEATURE             Location/Qualifiers
misc_feature        1..100
                    note = Synthetic
source              1..100
                    mol_type = other RNA
                    organism = synthetic construct
SEQUENCE: 410
nnnnnnnnnn nnnnnnnnnn gttttagagc tagaaatagc aagttaaaat aaggctagtc      60
cgttatcaac ttgaaaaagt ggcaccgagt cggtgctttt                            100

SEQ ID NO: 411      moltype = RNA  length = 100
FEATURE             Location/Qualifiers
misc_feature        1..100
                    note = Synthetic
source              1..100
                    mol_type = other RNA
                    organism = synthetic construct
SEQUENCE: 411
nnnnnnnnnn nnnnnnnnnn gttttagagc tagaaatagc aagttaaaat aaggctagtc      60
cgttatcaac ttgaaaaagt ggcaccgagt cggtgctttt                            100

SEQ ID NO: 412      moltype = RNA  length = 100
FEATURE             Location/Qualifiers
misc_feature        1..100
                    note = Synthetic
source              1..100
                    mol_type = other RNA
                    organism = synthetic construct
SEQUENCE: 412
nnnnnnnnnn nnnnnnnnnn gttttagagc tagaaatagc aagttaaaat aaggctagtc      60
cgttatcaac ttgaaaaagt ggcaccgagt cggtgctttt                            100

SEQ ID NO: 413      moltype = RNA  length = 100
FEATURE             Location/Qualifiers
misc_feature        1..100
                    note = Synthetic
source              1..100
                    mol_type = other RNA
                    organism = synthetic construct
SEQUENCE: 413
nnnnnnnnnn nnnnnnnnnn gttttagagc tagaaatagc aagttaaaat aaggctagtc      60
cgttatcaac ttgaaaaagt ggcaccgagt cggtgctttt                            100

SEQ ID NO: 414      moltype = RNA  length = 100
FEATURE             Location/Qualifiers
misc_feature        1..100
                    note = Synthetic
source              1..100
                    mol_type = other RNA
                    organism = synthetic construct
SEQUENCE: 414
nnnnnnnnnn nnnnnnnnnn gttttagagc tagaaatagc aagttaaaat aaggctagtc      60
cgttatcaac ttgaaaaagt ggcaccgagt cggtgctttt                            100

SEQ ID NO: 415      moltype = RNA  length = 100
FEATURE             Location/Qualifiers
misc_feature        1..100
                    note = Synthetic
source              1..100
                    mol_type = other RNA
                    organism = synthetic construct
SEQUENCE: 415
nnnnnnnnnn nnnnnnnnnn gttttagagc tagaaatagc aagttaaaat aaggctagtc      60
cgttatcaac ttgaaaaagt ggcaccgagt cggtgctttt                            100

SEQ ID NO: 416      moltype = RNA  length = 100
FEATURE             Location/Qualifiers
misc_feature        1..100
                    note = Synthetic
source              1..100
                    mol_type = other RNA
```

```
                        organism = synthetic construct
SEQUENCE: 416
nnnnnnnnnn nnnnnnnnnn gttttagagc tagaaatagc aagttaaaat aaggctagtc    60
cgttatcaac ttgaaaaagt ggcaccgagt cggtgctttt                         100

SEQ ID NO: 417          moltype = RNA   length = 100
FEATURE                 Location/Qualifiers
misc_feature            1..100
                        note = Synthetic
source                  1..100
                        mol_type = other RNA
                        organism = synthetic construct
SEQUENCE: 417
nnnnnnnnnn nnnnnnnnnn gttttagagc tagaaatagc aagttaaaat aaggctagtc    60
cgttatcaac ttgaaaaagt ggcaccgagt cggtgctttt                         100

SEQ ID NO: 418          moltype = RNA   length = 100
FEATURE                 Location/Qualifiers
misc_feature            1..100
                        note = Synthetic
source                  1..100
                        mol_type = other RNA
                        organism = synthetic construct
SEQUENCE: 418
nnnnnnnnnn nnnnnnnnnn gttttagagc tagaaatagc aagttaaaat aaggctagtc    60
cgttatcaac ttgaaaaagt ggcaccgagt cggtgctttt                         100

SEQ ID NO: 419          moltype = RNA   length = 100
FEATURE                 Location/Qualifiers
misc_feature            1..100
                        note = Synthetic
source                  1..100
                        mol_type = other RNA
                        organism = synthetic construct
SEQUENCE: 419
nnnnnnnnnn nnnnnnnnnn gttttagagc tagaaatagc aagttaaaat aaggctagtc    60
cgttatcaac ttgaaaaagt ggcaccgagt cggtgctttt                         100

SEQ ID NO: 420          moltype = RNA   length = 100
FEATURE                 Location/Qualifiers
misc_feature            1..100
                        note = Synthetic
source                  1..100
                        mol_type = other RNA
                        organism = synthetic construct
SEQUENCE: 420
nnnnnnnnnn nnnnnnnnnn gttttagagc tagaaatagc aagttaaaat aaggctagtc    60
cgttatcaac ttgaaaaagt ggcaccgagt cggtgctttt                         100

SEQ ID NO: 421          moltype = RNA   length = 100
FEATURE                 Location/Qualifiers
misc_feature            1..100
                        note = Synthetic
source                  1..100
                        mol_type = other RNA
                        organism = synthetic construct
SEQUENCE: 421
nnnnnnnnnn nnnnnnnnnn gttttagagc tagaaatagc aagttaaaat aaggctagtc    60
cgttatcaac ttgaaaaagt ggcaccgagt cggtgctttt                         100

SEQ ID NO: 422          moltype = DNA   length = 4526
FEATURE                 Location/Qualifiers
misc_feature            1..4526
                        note = Synthetic
source                  1..4526
                        mol_type = other DNA
                        organism = synthetic construct
SEQUENCE: 422
taatacgact cactataggg tcccgcagtc ggcgtccagc ggctctgctt gttcgtgtgt    60
gtgtcgttgc aggccttatt cggatccatg gataagaagt actcaatcgg ctggatatc   120
ggaactaatt ccgtgggttg ggcagtgatc acgatgaat acaaagtgcc gtccaagaag   180
ttcaaggtcc tggggaacac cgatagacac agcatcaaga aaaatctcat cggagccctg   240
ctgtttgact ccggcgaaac cgcagaagcg acccggctca acgtaccgc gaggcgacgc   300
tacacccggc ggaagaatcg catctgctat ctgcaagaga tcttttcgaa cgaaatggca   360
aaggtcgacg acagcttctt ccaccgcctg gaagaatctt tcctggtgga ggaggacaag   420
aagcatgaac ggcatcctat ctttggaaac atcgtcgacg aagtggcgta ccacgaaaag   480
tacccgacca tctaccatct gcggaagaag ttggttgact caactgacaa ggccgacctc   540
agattgatct acttggccct cgcccatatg atcaaattcc gcggacactt cctgatcgaa   600
ggcgatctga accctgataa ctccgacgtg gataagcttt tcattcaact ggtgcagacc   660
```

```
tacaaccaac tgttcgaaga aaacccaatc aatgctagcg gcgtcgatgc caaggccatc    720
ctgtccgccc ggctgtcgaa gtcgcggcgc ctcgaaaacc tgatcgcaca gctgccggga    780
gagaaaaaga acggactttt cggcaacttg atcgctctct cactgggact cactcccaat    840
ttcaagtcca atttttgacct ggccgaggac gcgaagctgc aactctcaaa ggacacctac    900
gacgacgact tggacaattt gctggcacaa attggcgatc agtacgcgga tctgttcctt    960
gccgctaaga acctttcgga cgcaatcttg ctgtccgata tcctgcgcgt gaacaccgaa   1020
ataaccaaag cgccgcttag cgcctcgatg attaagcggt acgacgagca tcaccaggat   1080
ctcacgctgc tcaaagcgct cgtgagacag caactgcctg aaaagtacaa ggagatcttc   1140
ttcgaccagt ccaagaatgg gtacgcaggg tacatcggat gaggcgctag ccaggaagag   1200
ttctataagt tcatcaagcc aatcctggaa aagatgacg gaaccgaaga actgctggtc   1260
aagctgaaca gggaggatct gctccggaaa cagagaacct ttgacaacgg atccattccc   1320
caccagatcc atctgggtga gctgcacgcc atcttgcggc gccaggagga cttttaccca   1380
ttcctcaagg acaaccggga aaagatcgag aaaattctga cgttccgcat cccgtattac   1440
gtgggcccac tggcgcgcgg caattcgcgc ttcgcgttga tgactagaaa atcagaggaa   1500
accatcactc cttggaattt cgaggaagtt gtggataagg gagcttcggc acaaagcttc   1560
atcgaacgaa tgaccaactt cgacaagaat ctcccaaacg agaaggtgct tcctaagcac   1620
agcctccttt acgaatactt cactgtctac aacgaactga ctaaagtgaa atacgttact   1680
gaaggaatga ggaagccggc cttctgtcc ggagaacaga agaaagcaat tgtcgatctg   1740
ctgttcaaga ccaaccgcaa ggtgaccgtc aagcagctta agaggacta cttcaagaag   1800
atcgagtgtt tcgactcagt ggaaatcagc ggggtggagg acagattcaa cgcttcgctg   1860
ggaacctatc atgatctcct gaagatcatc aaggacaagg acttcttga caacgaggag   1920
aacgaggaca tcctggaaga tatcgtcctg accttgacc ttttcgagga tcgcgagatg   1980
atcgaggaga ggcttaagac ctacgctcat ctcttcgacg ataaggtcat gaaacaactc   2040
aagcgccgcc ggtacactgg ttggggccgc ctctcccgca agctgatcaa cggtattcgc   2100
gataaacaga gcggtaaaac tatcctggat ttcctcaaat cggatggctt cgctaatcgt   2160
aacttcatgc aattgatcca cgacgacagc ctgacctta aggaggacat ccaaaaagca   2220
caagtgtccg gacagggaga ctcactccat gaacacatcg cgaatctggc cggttcgccg   2280
gcgattaaga agggaattct gcaaactgtg aaggtggtcg acgagctggt gaaggtcatg   2340
ggacggcaca aaccggagaa tatcgtgatt gaaatggccc gagaaaacca gactacccag   2400
aagggccaga aaaactcccg cgaaaggatg aagcggatcg aagaaggaat caaggagctg   2460
ggcagccaga tcctgaaaga gcacccggtg gaaaacacgc agctgcagaa cgagaagctc   2520
tacctgtact atttgcaaaa tggacgggac atgtacgtgg accaagagct ggacatcaat   2580
cggttgtctg attcgacgt ggaccacatc gttccacagt cctttctgaa ggatgactcg   2640
atcgataaca aggtgttgac tcgcagcgac aagaacagag ggaagtcaga taatgtgcca   2700
tcggaggagg tcgtgaagaa gatgaagaat tactggcggc agctcctgaa tgcgaagctg   2760
attcccagg gaaagtttga caatctcact aaagccgagc gcggcggact ctcagagctg   2820
gataaggctg gattcatcaa acggcagctg gtcgagactc ggcagattac caagcacgtg   2880
gcgcagatct tggactcccg catgaacact aaatacgacg agaacgataa gctcatccgg   2940
gaagtgaagg tgattcccct gaaaagcaaa ctttgtgtgg actttcggaa ggactttcag   3000
ttttacaaag tgagagaaat caacaactac catcacgcgc atgacgcata cctcaacgct   3060
gtggtcggta ccgccctgat caaaaagtac cctaaacttg aatcggagtt tgtgtacgga   3120
gactacaagg tctacgacgt gaggaagatg atagccaagt ccgaacagga aatcgggaaa   3180
gcaactgcga aatacttctt ttactcaaac atcatgaact ttttcaagac tgaaattacg   3240
ctggccaatg gagaaatcag gaagaggcca ctgatcgaaa ctaacggaga aacgggcgaa   3300
atcgtgtggg acaagggcag ggacttcgca actgttcgca aagtgctctc tatgccgcaa   3360
gtcaatattg tgaagaaaac cgaagtgcaa accggcggat tttcaaagga atcgatcctc   3420
ccaaagagaa atagcgacaa gctcattgca cgcaagaaga ctgggaccc gaagaagtac   3480
ggaggattcg attcgccgac tgtcgcatac tccgtcctcg tggtggccaa ggtgagaag   3540
ggaaagagca aaaagctcaa atcgtcaaa gagctgctgg ggattaccat catgaacga   3600
tcctcgttca agaagaaccc gattgattc ctcgaggcga agggtacaa ggaggtgaag   3660
aaggatctga tcatcaaact ccccaagtac tcactgttcg aactggaaaa tggtcggaag   3720
cgcatgctgg cttcggccgg agaactccaa aaaggaaatg agctggcctt gcctagcaag   3780
tacgtcaact tcctctatct tgcttcgcac tacgaaaaac tcaaagggtc accgaagat   3840
aacgaacaga agcagctttt cgtggagcag cacaagcatt atctggatga atcatcgaa   3900
caaatctccg agttttcaaa gcgcgtgatc ctcgccgacg ccaacctgca caagtcctg   3960
tcggcctaca ataagcatag agataagcgc atcagaaac aggccgagaa cattatccac   4020
ttgttcaccc tgactaacct gggagcccca gccgccttca agtacttcga tactactatc   4080
gatcgcaaaa gatacacgtc caccaaggaa gttctggacg cgaccctgat ccaccaaagc   4140
atcactggac tctacgaaac taggatcgat ctgtcgcagc tgggtggcga tggcggtgga   4200
tctccgaaaa agaagagaaa ggtgtaatga gctagccatc acatttaaaa gcatctcag   4260
ctaccatgag aataagagaa agaaaatgaa gatcaatagc ttattcatct cttttttctt   4320
ttcgttggtg taaagccaac accctgtcta aaaaacataa attctcttaa tcattttgcc   4380
tcttttctct gtgcttcaat taataaaaa tggaagaac ctcgagaaaa aaaaaaaaa   4440
aaaaaaaaaa aaaaaaaaaa aaaaaaaaaa aaaaaaaaaa aaaaaaaaaa aaaaaaaaaa   4500
aaaaaaaaaa aaaaaaaaaa aaaaaa                                         4526

SEQ ID NO: 423          moltype = DNA  length = 4615
FEATURE                 Location/Qualifiers
misc_feature            1..4615
                        note = Synthetic
source                  1..4615
                        mol_type = other DNA
                        organism = synthetic construct
SEQUENCE: 423
taatacgact cactataggg tcccgcagtc ggcgtccagc ggctctgctt gttcgtgtgt     60
gtgtcgttgc aggccttatt cggatccatg gataagaagt actcaatcgg gctggatatc    120
ggaactaatt ccgtgggttg ggcagtgatc acggatgaat acaaagtgcc gtccaagaag    180
ttcaaggtcc tggggaacac cgatagacac agcatcaaga aaaatctcat cggagccctg    240
ctgtttgact ccggcgaaac cgcagaagcg acccggctca acgtaccgc gaggcgacgc    300
```

```
tacacccggc ggaagaatcg catctgctat ctgcaagaga tcttttcgaa cgaaatggca    360
aaggtcgacg acagcttctt ccaccgcctg gaagaatctt tcctggtgga ggaggacaag    420
aagcatgaac ggcatcctat ctttggaaac atcgtcgacg aagtggcgta ccacgaaaag    480
tacccgacca tctaccatct gcggaagaag ttggttgact caactgacaa ggccgaccctc    540
agattgatct acttggccct cgcccatatg atcaaattcc gcggacactt cctgatcgaa    600
ggcgatctga accctgataa ctccgacgtg gataagcttt tcattcaact ggtgcagacc    660
tacaaccaac tgttcgaaga aaacccaatc aatgctagcg gcgtcgatgc caaggccatc    720
ctgtccgccc ggctgtcgaa gtcgcggcgc ctcgaaaacc tgatcgcaca gctgccggga    780
gagaaaaaga acggacttt cggcaacttg atcgctctct cactgggact cactcccaat    840
ttcaagtcca attttgacct ggccgaggac gcgaagctgc aactctcaaa ggacacctac    900
gacgacgact tggacaattt gctggcacaa attggcgatc agtacgcgga tctgttcctt    960
gccgctaaga acctttcgga cgcaatcttg ctgtccgata tcctgcgcgt gaacaccgaa    1020
ataaccaaag cgccgcttag cgcctcgatg attaagcggt acgacgagca tcaccaggat    1080
ctcacgctgc tcaaagcgct cgtgacagca caactgcctg aaaagtacaa ggagatcttc    1140
ttcgaccagt ccaagaatgg gtacgcaggg tacatcgatg gaggcgctag ccaggaagag    1200
ttctataagt tcatcaagcc aatcctggaa aagatggacg gaaccgaaga actgctggtc    1260
aagctgaaca gggaggatct gctccggaaa cagagaacct tgacaacgg atccattccc    1320
caccagatcc atctgggtga gctgcacgcc atcttgcgc gccaggagga cttttaccca    1380
ttcctcaagg acaaccggga aaagatcgag aaaattctga cgttccgcat cccgtattac    1440
gtgggcccac tggcgcgcgg caattcgcgc ttcgcgtgga tgactagaaa atcagaggaa    1500
accatcactc cttggaattt cgaggaagtt gtggataagg gagcttcggc acaaagcttc    1560
atcgaacgaa tgaccaactt cgacaagaat ctcccaaacg agaaggtgct tcctaagcaa    1620
agcctcctt acgaatactt cactgtctac aacgaactga ctaaagtgaa atacgttact    1680
gaaggaatga ggaagccggc cttctctgtcc ggaacagaga agaaagcaat tgtcgatctg    1740
ctgttcaaga ccaaccgcaa ggtgaccgtc aagcagctta agaggacta cttcaagaag    1800
atcgagtgtt tcgactcagt ggaaatcagc ggggtgggga acagattcaa cgcttcgctg    1860
ggaacctatc atgatctcct gaagatcatc aaggacaagg acttccttga caacggagag    1920
aacgaggaca tcctggaaga tatcgtcctg accttgaccc tttttcgagga tcgcgagatg    1980
atcgaggaga ggcttaagac ctacgctcat ctcttcgacg ataaggtcat gaaacaactc    2040
aagcgccgcc ggtacactgg ttggggccgc ctctcccgca agctgatcaa cggtatttcgc    2100
gataaacaga gcggtaaaac tatcctggat ttcctcaaat cggatggctt cgctaatcgt    2160
aacttcatgc aattgatcca cgacgacagc ctgacctta aggaggacat ccaaaaagca    2220
caagtgtccg gacagggaga ctcactccat gaacacatcg cgaatctggc cggttcgccg    2280
gcgattaaga agggaattct gcaaactgtg aaggtggtcg acgagctggt gaaggtcatg    2340
ggacggcaca aaccggagaa tatcgtgatt gaaatgcccc gagaaaacca gactacccag    2400
aagggccaga aaaactcccg cgaaaggatg aagcggatcg aagaaggaat caaggagctg    2460
ggcagccaga tcctgaaaga gcaccggtg gaaaacacgc agctgcagaa cgagaagctc    2520
tacctgtact atttgcaaaa tggacgggac atgtacgtgg accaagagct ggacatcaat    2580
cggttgctct attacgacgt ggaccacatc gttccacagt cctttctgaa ggatgactcg    2640
atcgataaca aggtgttgac tcgcagcgac aagaacagag ggaagtcaga taatgtgcca    2700
tcggaggagg tcgtgaagaa gatgaagaat tactggcggc agctcctgaa tgcgaagctg    2760
attcccagaa gaaagtttga caatctcact aaagccgagc gcggcggact ctcagagctg    2820
gataaggctg gattcatcaa acggcagctg gtcgagactc ggcagattac caagcacgtg    2880
gcgcagatct tggactcccg catgaacact aaatacgacg agaacgataa gctcatccgg    2940
gaagtgaagg tgattaccct gaaaagcaaa cttgtgtcgg actttcggaa ggactttcag    3000
ttttacaaag tgagagaaat caacaactac catcacgcgc atgacgcata cctcaacgct    3060
gtggtcggta ccgccctgat caaaaagtac cctaaacttg aatcggagtt tgtgtacgga    3120
gactacaagg tctacgacgt gaggaagatg ataccccaagt ccgaacagga aatcgggaaa    3180
gcaactgcga aatactctt ttactcaaac atcatgaact ttttcaagac tgaaattacg    3240
ctggccaatg agaaatcag gaagaggcca ctgatcgaaa ctaacggaga aacgggcgaa    3300
atcgtgtggg acaagggcag ggacttcgca actgttcgca aagtgctctc tatgccgcaa    3360
gtcaatattg tgaagaaaac cgaagtgcaa accggcggat tttcaaagga atcgatcctc    3420
ccaaagagaa atagcgacaa gctcattgca cgcaagaaag actgggaccc gaagaagtac    3480
ggaggattcg attcgccgac tgtcgcatac tccgtcctcg tggtggccaa ggtggagaag    3540
ggaaagagca aaaagctcaa atccgtcaaa gagctgctgg ggattaccat catggaacga    3600
tcctcgttcg agaagaaccc gattgatttc ctcgaggcga agggttacaa ggaggtgaag    3660
aaggatctga tcatcaaact ccccaagtac tcactgttcg aactgaaaa tggtcggaag    3720
cgcatgctgg cttcggccgg agaactccaa aaaggaaatg agctgccctt gcctagcaag    3780
tacgtcaact tcctctatct tgcttcgcac tacgaaaaac tcaaagggtc accggaagat    3840
aacgaacaga agcagctttt cgtggagcag cacaagcatt atctggatga aatcatcgaa    3900
caaatctccg agttttcaaa gcgcgtgatc ctcgccgacg ccaacctcga caaagtcctg    3960
tcggcctaca ataagcatag agataagccg atcagagaac aggccgagaa cattatccac    4020
ttgttcaccc tgactaacct gggagcccca gccgccttca gtacttcga tactactatc    4080
gatcgcaaaa gatacacgtc caccaaggaa gttctggacg ccacctgat ccaccaaagc    4140
atcactggac tctacgaaac taggatcgat ctgtcgcagc tgggtggcga tggctcggct    4200
tacccatacg acgtgcctga ctacgcctcg ctcggatcgg gctccccaa aaagaaacgg    4260
aaggtggacg gatccccgaa aaagaagaga aaggtggact ccggatgaga attatgcagt    4320
ctagccatca catttaaaag catctcagcc taccatgaga ataagagaaa gaaaatgaag    4380
atcaatagct tattcatctc ttttcttt tcgttggtgt aaagcccaaca ccctgtctaa    4440
aaaacataaa tttctttaat cattttgcct ctttctctg tgcttcaatt aataaaaat    4500
ggaaagaacc tcgagaaaaa aaaaaaaaaa aaaaaaaaaa aaaaaaaaaa aaaaaaaaaa    4560
aaaaaaaaaa aaaaaaaaaa aaaaaaaaaa aaaaaaaaaa aaaaaaaaaa aaaaa         4615
```

SEQ ID NO: 424      moltype = RNA   length = 100
FEATURE            Location/Qualifiers
misc_feature     1..100
                   note = Synthetic
source            1..100
                   mol_type = other RNA

```
                    organism = synthetic construct
SEQUENCE: 424
ttacagccac gtctacagca gttttagagc tagaaatagc aagttaaaat aaggctagtc   60
cgttatcaac ttgaaaaagt ggcaccgagt cggtgctttt                        100
```